(12) United States Patent
Sorg

(10) Patent No.: US 12,107,376 B2
(45) Date of Patent: Oct. 1, 2024

(54) DEVICE AND METHOD FOR ASSEMBLING AN ELECTRICAL PLUG CONNECTOR

(71) Applicant: Metzner Holding GmbH, Ulm (DE)

(72) Inventor: Manfred Sorg, Ulm (DE)

(73) Assignee: Metzner Holding GmbH, Ulm (DE)

( * ) Notice: Subject to any disclaimer, the term of this patent is extended or adjusted under 35 U.S.C. 154(b) by 0 days.

(21) Appl. No.: 17/599,704

(22) PCT Filed: Mar. 19, 2020

(86) PCT No.: PCT/EP2020/057692
§ 371 (c)(1),
(2) Date: Sep. 29, 2021

(87) PCT Pub. No.: WO2020/200827
PCT Pub. Date: Oct. 8, 2020

(65) Prior Publication Data
US 2022/0200224 A1    Jun. 23, 2022

(30) Foreign Application Priority Data

Mar. 29, 2019 (DE) .................... 10 2019 108 322.2
Apr. 17, 2019 (DE) .................... 10 2019 110 163.8
(Continued)

(51) Int. Cl.
*H01R 43/20* (2006.01)
*H01R 43/048* (2006.01)
(Continued)

(52) U.S. Cl.
CPC ........... *H01R 43/20* (2013.01); *H01R 43/048* (2013.01); *H01R 43/05* (2013.01); *H01R 43/052* (2013.01);
(Continued)

(58) Field of Classification Search
CPC .. H02G 1/1297; H02G 1/1273; H02G 1/1275; H02G 1/1285; H02G 1/128;
(Continued)

(56) References Cited

U.S. PATENT DOCUMENTS

| | | |
|---|---|---|
| 4,380,117 A | 4/1983 | Brandewie |
| 5,082,256 A | 1/1992 | Bryson |

(Continued)

FOREIGN PATENT DOCUMENTS

| | | |
|---|---|---|
| EP | 0927444 B1 | 7/1999 |
| EP | 1071175 A | 1/2001 |

(Continued)

OTHER PUBLICATIONS

Office Action issued by the European Patent Office dated Apr. 24, 2023.

*Primary Examiner* — Thiem D Phan
(74) *Attorney, Agent, or Firm* — Randall Danskin P.S.

(57) ABSTRACT

An apparatus for assembling an electrical plug connector on a first cable end and/or on a second cable end of an electrical cable which has one or more inner conductors. The apparatus has at least one module group with at least two processing modules for processing the cable. The apparatus furthermore has a feed device for feeding the cable end along a feed direction (X) to a processing station (B) in the module group. The module group has a module transport device for feeding in each case one of the processing modules of the module group to the processing station (B). The feed device is configured to remove the cable end from the module group counter to the feed direction (X) after the processing.

19 Claims, 40 Drawing Sheets

(30) Foreign Application Priority Data

| Apr. 24, 2019 | (DE) | ..................... 10 2019 110 572.2 |
|---|---|---|
| May 17, 2019 | (DE) | ..................... 10 2019 113 050.6 |
| May 27, 2019 | (DE) | ..................... 10 2019 114 166.4 |
| May 27, 2019 | (DE) | ..................... 10 2019 114 178.8 |
| Jun. 14, 2019 | (DE) | ..................... 10 2019 116 252.1 |
| Jun. 25, 2019 | (DE) | ..................... 10 2019 117 031.1 |
| Jun. 25, 2019 | (DE) | ..................... 10 2019 117 035.4 |
| Jul. 19, 2019 | (DE) | ..................... 10 2019 119 662.0 |
| Jul. 22, 2019 | (DE) | ..................... 10 2019 119 724.4 |
| Jul. 22, 2019 | (DE) | ..................... 10 2019 119 726.0 |
| Jul. 30, 2019 | (DE) | ..................... 10 2019 120 487.9 |
| Oct. 15, 2019 | (DE) | ..................... 10 2019 127 749.3 |
| Oct. 15, 2019 | (DE) | ..................... 10 2019 127 760.4 |
| Oct. 25, 2019 | (DE) | ..................... 10 2019 128 918.1 |
| Nov. 11, 2019 | (DE) | ..................... 10 2019 130 317.6 |

(51) Int. Cl.
  *H01R 43/05* (2006.01)
  *H01R 43/052* (2006.01)
  *H01R 43/28* (2006.01)
  *H02G 1/12* (2006.01)

(52) U.S. Cl.
  CPC ........... *H01R 43/28* (2013.01); *H02G 1/1253* (2013.01); *H02G 1/1265* (2013.01); *Y10T 29/53209* (2015.01)

(58) Field of Classification Search
  CPC .... H02G 1/1282; H02G 1/1287; H02G 1/129; H02G 1/1265; H02G 15/184; H01R 43/20; Y10T 29/53209; Y10T 29/53213
  USPC ......... 29/745, 747, 748, 751, 753, 787, 857, 29/861, 863, 865, 867
  See application file for complete search history.

(56) References Cited

U.S. PATENT DOCUMENTS

| 5,208,977 | A | 5/1993 | Ricard |
| 5,606,795 | A | 3/1997 | Ohba |
| 8,234,772 | B2 | 8/2012 | Locher |
| 9,954,346 | B2* | 4/2018 | Meierhans ........... H02G 1/1248 |
| 2015/0357094 | A1* | 12/2015 | Ishigure ............... H02G 1/1282 29/825 |

FOREIGN PATENT DOCUMENTS

| EP | 1237236 A | 9/2002 |
| GB | 2030061 A | 4/1980 |
| GB | 1587342 A | 4/1981 |

* cited by examiner

DEVICE AND METHOD FOR ASSEMBLING AN ELECTRICAL PLUG CONNECTOR

CROSS REFERENCE TO RELATED APPLICATIONS

This Non-Provisional Patent Application is a United States National Stage Patent Application which claims the benefit of priority to earlier filed PCT Patent Application No. PCT/EP2020/057692, which was filed on 19 Mar. 2020. Said earlier filed PCT Patent Application No. PCT/EP2020/057692 is published as WO 2020/200827 A1, and was published on 8 Oct. 2020. This United States National Stage Patent Application also claims the benefit of priority to earlier filed German Patent Application No. 10 2019 130 317.6 filed on 11 Nov. 2019; and to earlier filed German Patent Application No. 10 2019 128 918.1 filed on 25 Oct. 2019; and to earlier filed German Patent Application No. 10 2019 127 760.4 filed on 15 Oct. 2019; and to earlier filed German Patent Application No. 10 2019 127 749.3 filed on 15 Oct. 2019; and to earlier filed German Patent Application No. 10. 2019 120 487.9 filed on 30 Jul., 2019; and to earlier filed German Patent Application No. 10 2019 119 726.0 filed on 22 Jul. 2019; and to earlier filed German Patent Application No. 10 2019 119 724.4 filed on 22 Jul. 2019; and to earlier filed German Patent Application No. 10 2019 119 662.0 filed on 19 Jul. 2019; and to earlier filed German Patent Application No. 10 2019 117 035.4 filed on 25 Jun. 2019; and to earlier filed German Patent Application No. 10.2019 117 031.1 filed on 25 Jun. 2019; and to earlier filed German Patent Application No. 10 2019 116 252.1 filed on 14 Jun. 2019; and to earlier filed German Patent Application No. 10 2019 114 178.8 filed on 27 May 2019; and to earlier filed German Patent Application No. 10 2019 114 166.4 filed on 27 May 2019; and to earlier filed German Patent Application No. 10 2019 113 050.6 filed on 17 May 2019; and to earlier filed German Patent Application No. 10 2019 110 572.2 filed on 24 Apr. 2019; and to earlier filed German Patent Application No. 10 2019 110 163.8 filed on 17 Apr. 2019; and to earlier filed German Patent Application No. 10 2019 108 322.2 filed on 29 Mar. 2019.

The entire contents of the aforementioned earlier filed PCT Patent Application No. PCT/EP2020/057692 filed on 19 Mar. 2020, and the multiple earlier filed German Patent Applications are all expressly incorporated herein by this reference.

Pursuant to USPTO rules, this priority claim to earlier filed PCT Patent Application No. PCT/EP2020/057692 filed on 19 Mar. 2020, and to the identified earlier filed multiple German Patent Applications, is also included in the Application Data Sheet (ADS) filed herewith.

TECHNICAL FIELD

The invention relates to an apparatus for assembling an electrical plug connector on a first cable end and/or on a second cable end of an electrical cable which has one or more inner conductors.

The invention furthermore relates to a method for assembling an electrical plug connector on a first cable end and/or on a second cable end of an electrical cable which has one or more inner conductors.

The invention furthermore relates to a computer program product with program code means in order to carry out a method for assembling an electrical plug connector.

BACKGROUND

The assembly of an electrical plug connector on a cable end of an electrical cable may include various, sometimes extremely complex working steps, from pre-processing of the cable (for example cutting to length and measurement of the cable) to a concluding final assembly process of individual plug connector components and a check of the finished plug connector. The assembly of a plug connector on a cable is sometimes also referred to as cable fabrication.

In the context of the invention, a plug connector or mating plug connector may be a plug, a built-in plug, a socket, a coupling or an adapter. The term "plug connector" or "mating plug connector" used in the context of the invention is representative of all variants.

High demands are placed in particular on plug connectors for the automotive industry or for vehicles with regard to their robustness and the security of the plug connections. Electromobility in particular poses major challenges for the automotive industry and its suppliers, as high currents with voltages of up to 1500 V are sometimes transmitted in the vehicles via the cables or lines. With regard to the danger that would result from a failure of components in an electric vehicle, it is accordingly necessary for particularly high demands to be placed on the quality of the cables or lines and plug connections.

Accordingly, a plug connection must withstand sometimes high loads, for example mechanical loads, and remain closed in defined fashion, such that the electrical connection is not inadvertently severed for example during the operation of a vehicle.

A further demand on plug connectors for the automotive industry is that they must be able to be manufactured economically in large quantities. For this reason, fully automated plug connector assembly is preferable. Corresponding production lines therefore have to be established in order to achieve the required quantities with simultaneously high quality.

For reasons of quality assurance and in order to make the plug connector assembly process as transparent as possible and comprehensible for the end customer, it may be advantageous to document the fabrication of the individual cables. Comprehensive documentation of the cable processing in the course of the plug connector assembly is complex, in particular with regard to fully or partially automated cable fabrication.

In view of the known prior art, the object of the present invention is to provide an apparatus for assembling an electrical plug connector, which apparatus is advantageously suitable in particular in the context of automated cable fabrication.

The present invention is also based on the object of providing a method for assembling an electrical plug connector, which method is advantageously suitable in particular in the context of automated cable fabrication.

Finally, it is also an object of the invention to provide a suitable computer program product for assembling an electrical plug connector.

The dependent claims and the features described below concern advantageous embodiments and variants of the invention.

An apparatus for assembling an electrical plug connector on a first cable end and/or on a second cable end of an electrical cable which has one or more inner conductors is provided.

By means of the apparatus according to the invention, one or more assembly or processing steps can be performed in the course of a plug connector assembly process. Thus, a plug connector can be partially or even completely assembled on one or on both ends of the cable.

The plug connector to be assembled on the first cable end may also be referred to as first plug connector, and the plug connector to be assembled on the second cable end may also be referred to as second plug connector.

That region of the electrical cable in which the processing or the fabrication/assembly of the plug connector primarily takes place is sometimes also referred to below as the "cable section to be processed". The cable section to be processed may be a cable end piece, in particular the first cable end and/or the second cable end. Preferably, two cable sections of the cable, in particular both cable ends, are processed or partially or completely provided with a respective plug connector.

In particular, the invention may be provided for partially automated or fully automated fabrication of an electrical cable.

In principle, any plug connector may be assembled on any electrical cable within the scope of the invention.

The invention is particularly advantageously suitable for fabricating electrical cables with a large cross section for high power transmission, for example in the automotive sector, particularly preferably in the field of electromobility. It is thus possible for an electrical cable for the high-voltage range to be provided, in particular a high-voltage line.

Preferably, the electrical cable has an outer conductor or is designed as a shielded electrical cable.

The exactly one inner conductor (in the case of a single-core cable) or the multiple inner conductors (in the case of a multicore cable) run from the first cable end to the second cable end.

It should be emphasized that features and advantages of the apparatus or of the method described below which relate to a single-core cable may also be transferred to the processing of the multicore cable—and vice versa, provided that this is not technically ruled out.

In the context of the invention, an inner conductor is understood to mean, in particular, a line running through the cable, which line is composed of an insulation and of an electrical conductor (core) running within the insulation. The electrical conductor or the core may be designed as a single wire or as a composite of multiple wires (also referred to as stranded wire). In principle, however, the inner conductor mentioned in the context of the invention may also be composed exclusively of the electrical conductor or the core, or may also have further components in addition to the insulator.

The electrical cable or the at least one electrical plug connector may in particular have any number of inner conductors, for example only a single inner conductor. It is however also possible for two inner conductors or more inner conductors, three inner conductors or more inner conductors, four inner conductors or even more inner conductors to be provided. If the cable has multiple inner conductors, these may run in twisted fashion through the cable, in the manner of a twisted pair cable known from telecommunications or communications engineering. The inner conductors may however also be led in parallel in the cable.

The electrical cable is particularly preferably designed as a coaxial cable with exactly one inner conductor and exactly one outer conductor or as a cable shielded with exactly one outer conductor and with exactly two inner conductors.

The electrical plug connector to be assembled preferably has exactly one electrical cable. However, the plug connector may also have exactly two (or even more) electrical cables. Provision may thus also be made, for example, to assemble a common plug connector on two (or more) cables.

In principle, the electrical plug connector to be assembled may have any number of cables, for example three electrical cables or more electrical cables, four electrical cables or more electrical cables, five electrical cables or more electrical cables, six electrical cables or even more electrical cables.

Where "the" electrical cable or "an" electrical cable is referred to below, this is not to be understood as limiting, but is intended merely to improve readability. In principle, all refinements, embodiments and variants of the invention described below may relate to exactly one electrical cable, to exactly two electrical cables or to even more electrical cables, even if this is not explicitly stated. In particular, features and variants that relate to the electrical cable can also relate to the cable referred to below as the "second" electrical cable—and vice versa.

The electrical cable and/or the electrical plug connector may be regarded in the context of the invention as being part of the apparatus. The electrical cable and/or the electrical plug connector may however optionally also be independent of the apparatus.

According to the invention, the apparatus has at least one module group with at least two processing modules for processing the cable. The apparatus furthermore has a feed device for feeding the cable end along a feed direction to a processing station in the module group.

The processing of the cable end takes place in the module group preferably at the processing station.

The cable is preferably fed rectilinearly or linearly along the feed direction.

According to the invention, the module group has a module transport device for feeding in each case one of the processing modules of the module group to the processing station.

The feed device is preferably able to introduce the cable end into the processing module that is already situated at the processing station.

According to the invention, the feed device is configured to remove the cable end from the module group again counter to the feed direction after the processing.

It is preferably possible for multiple feed devices to be provided, in particular one feed device for each module group. In principle, however, it is also possible for only a single feed device to be provided, which is moved onward between the module groups for example by the transport device yet to be mentioned below.

The cable end may be completely removed from the module group again after the processing by one, multiple or all of the processing modules of the module group. In particular, it may be provided that the feed device is configured to, after each processing operation by one of the processing modules, pull the cable end out of the module group at least to such an extent that it is made possible for the module transport device to exchange the processing module at the processing station without a processing tool of one of the processing modules colliding with the cable end. In particular, the feed device may be configured to, after each processing by one of the processing modules, at least remove the cable end from the processing station counter to the feed direction.

Advantageously, the invention makes it possible to provide a modular and particularly easily configurable apparatus for plug connector assembly. The individual processing modules can be conveniently exchangeable in the module group. The module group can (in a manner dependent on the processing modules contained therein) autonomously carry out a series of processing operations in the course of the plug connector assembly process.

A module group is thus preferably a unit which can also be operated independently of the further module groups and which is preferably able to carry out a defined and self-contained processing sequence in the course of the cable fabrication or plug connector assembly process.

A processing module may however preferably also be a unit which can be operated independently of the other processing modules and which is preferably able to carry out a defined and self-contained processing operation in the course of the cable fabrication or plug connector assembly process.

Each of the processing modules may have one or more processing tools, which are preferably accommodated in a common module housing.

The processing modules may be spatially separated from one another within the module group.

The individual processing modules may be of modular construction, whereby individual processing modules of the apparatus or of one of the module groups can be replaced, modified or removed without great effort. In this way, the apparatus can be configurable with simple means, in particular for processing different cable types or plug connectors.

The distribution of the processing steps according to the invention across multiple mutually independent processing modules and module groups make it possible to operate the apparatus as an "assembly line process" or as a "cycle machine" with successive individual steps, in order to reduce the processing time for mass processing.

The cable is preferably fed from the feed device into the module group while the module group is stationary. However, provision may also be made for the module group to be fed to the cable while the cable is stationary. A joint feed of the cable and of the module group may also be provided.

In one advantageous refinement of the invention, it may be provided that at least one of the module groups and/or one of the processing modules has a control unit in order to control and/or monitor the processing of the cable.

Each of the module groups preferably has a dedicated control unit. The control unit can preferably control and/or monitor the processing within the module group assigned thereto in an autonomous manner, and independently of the further module groups. Optionally, a communication connection may be provided between the control units of multiple module groups.

The control unit may be designed as a microprocessor. Instead of a microprocessor, any other device for implementing the control unit may also be provided, for example one or more arrangements of discrete electrical components on a printed circuit board, a programmable logic controller (PLC), an application-specific integrated circuit (ASIC) or some other programmable circuit, for example also a field programmable gate array (FPGA), a programmable logic arrangement (PLA) and/or a commercially available computer.

In one refinement of the invention, it may be provided that the module transport device is designed to feed the processing modules of the module group along a module transport direction to the processing station.

The module transport device preferably runs rectilinearly. However, the module transport device does not necessarily have to run rectilinearly, and may for example also follow a curved profile.

In one refinement of the invention, it may be provided that the feed direction deviates from the module transport direction, preferably runs substantially orthogonally and particularly preferably orthogonally with respect to the module transport direction.

The module transport device can thus in particular be used to feed the processing modules laterally to the processing station, whilst the feed device feeds the cable end to the processing station from the front.

In one refinement of the invention, it may be provided that the module transport device is designed to feed in each case only a single one of the processing modules of the module group to the processing station.

The processing station may be dimensioned to accommodate only a single one of the processing modules. It can thus be provided that the cable end is only ever processed by a single one of the processing modules and not by multiple processing modules simultaneously.

In one refinement of the invention, it may be provided that the module transport device is designed to move all processing modules of the module group simultaneously in a coupled movement.

For this purpose, the processing modules may be connected to one another, for example by means of a common frame, wherein the frame is ultimately transported by the module transport device. The module transport device can hereby be of particularly simple construction, even if many processing modules are provided in the module group.

In one advantageous refinement of the invention, it may be provided that at least one of the processing modules of the module group has a processing tool that can be fed to the cable end when the processing module and the cable end are situated at the processing station.

For example, a blade and/or a counterholder and/or a pulling-off tool of a stripping device or of a stripping module yet to be described below may be fed to the cable end simultaneously or one after the other, after the cable end and the stripping module have each previously been positioned at the processing station.

In one refinement of the invention, it may be provided that the module group has at least one storage location in order to store at least one of the processing modules of the module group.

It is thus possible in particular for processing modules be temporarily stored at the storage locations for as long as they are not being used, for example while one of the processing modules is situated at the processing station for processing the cable end.

In one advantageous refinement of the invention, it may be provided that the number of storage locations in the module group corresponds to twice the number of processing modules in the module group minus one storage location.

In this way, coupled processing module transport is advantageously possible from a first side of the module group to a second side, which is situated opposite the first side, of the module group orthogonally with respect to the feed direction. In particular, if the processing modules in the module group are arranged in a row adjacent to one another in the sequence intended for the processing operation, an exchange of the processing modules at the processing station can be performed particularly efficiently, wherein, on the side to which the processing modules are fed, sufficient storage locations are available in order that the final processing module in the row can also reach the processing station.

In one advantageous refinement of the invention, it may be provided that at least one single processing module is provided that is not part of a module group of processing modules.

It is thus possible in particular for individual stations to also be provided, for example manual processing modules, at which a production technician can carry out manual or machine-assisted processing operations.

In one advantageous refinement of the invention, it may be provided that the module group has exactly two processing modules or more processing modules, three processing modules or more processing modules, four processing modules or more processing modules or five processing modules or even more processing modules.

In principle, any number of processing modules may be provided. The number depends here substantially on the extent to which individual processing steps of the plug connector assembly can be sensibly grouped, in particular also with regard to the processing times in the apparatus. In general, a small number of processing modules within the module group is advantageous in order to minimize the processing duration, because the processing within the module group is performed by means of the processing modules sequentially. A combination of three to four processing modules is generally the most practicable.

In one refinement of the invention, it may be provided that exactly one module group or more module groups, two module groups or more module groups, three module groups or more module groups, four module groups or more module groups, five module groups or more module groups, six module groups or more module groups, seven module groups or more module groups, eight module groups or even more module groups are provided.

In principle, any number of module groups may be provided. In general, a large number of module groups each with a small number of processing modules is advantageous, because the processing of the individual module groups can take place in parallel or simultaneously, which can increase the throughput of fabricated cables. However, the cost of providing the apparatus may then be higher.

Module groups each with a different number of processing modules may be provided, in particular in order to sensibly divide the different process times of the processing steps of the processing modules.

In one refinement of the invention, it may be provided that the apparatus has a common transport device for transporting the cable along a transport direction between multiple module groups or between at least one module group and at least one individual processing module.

The transport direction does not necessarily have to run rectilinearly, and may for example also follow a curved profile. However, the transport direction preferably runs as linearly or rectilinearly as possible.

The feed device, the module transport device and the transport device may preferably each be drivable independently of one another.

The module groups and/or the individual processing modules may be spatially separated from one another along the transport direction.

In one advantageous refinement of the invention, it may be provided that the feed direction deviates from the transport direction. The feed direction preferably runs substantially orthogonally with respect to the transport device. The feed direction particularly preferably runs orthogonally with respect to the transport direction.

In one advantageous refinement of the invention, it may also be provided that the module transport direction corresponds to the transport direction, preferably runs parallel to the transport direction.

The feed device preferably introduces the cable with the cable end to be processed into the module group that has previously been brought in by the transport device.

In one refinement of the invention, it may be provided that the transport device has a workpiece carrier system with at least one workpiece carrier for the cable in order to transport the cable along the transport direction.

The workpiece carrier may also be referred to as a cable carrier. For transport, the cable may be fastened, preferably fastened in twist-proof fashion, to the workpiece carrier.

The workpiece carrier system may use a workpiece conveyor (for example a conveyor line/conveyor belt) to transport the cable fastened to the workpiece carrier between the individual module groups or the individual processing modules along the production line or along the transport direction. In principle, it is also possible for multiple workpiece carriers to be provided, for example one workpiece carrier per module group.

The workpiece carrier may have one or more fixing means in order to fix the cable axially and/or radially.

The feed device may also be part of the workpiece carrier system. For example, the feed device may be arranged on the workpiece carrier in order to feed the cable into the module group.

The workpiece carrier is preferably assigned to the cable throughout the entire plug connector assembly process. However, it may also be provided that the workpiece carrier is assigned to the cable only during a section of the assembly process and that the cable, for further fabrication or for processing by a second module group after the processing by a first module group, is firstly transferred onward to a further workpiece carrier or assigned to another workpiece carrier.

In a particularly advantageous refinement of the invention, it may be provided that the transport device has a gripper device with at least one gripper in order to transport the cable along the transport direction.

The cable may for example be transferred onward between individual feed devices of individual module groups, preferably in a known or unchanged alignment or orientation, by means of the gripper device.

The gripper device may also advantageously be used for turning the cable round or over, for example in order, after the first plug connector has been assembled on the first cable end, to rotate the cable in order to assemble the second plug connector on the second cable end in a second processing cycle.

In one embodiment of the invention, it may be provided that the transport device has a roller conveyor in order to assist manual transport of the cable between at least two of the module groups or to provide a low-friction support for long cables.

Instead of a workpiece conveyor or some other automatic system, the workpiece carrier may also be transported between the individual processing modules by a production technician, for example with the aid of the roller conveyor mentioned.

In one advantageous refinement of the invention, it may be provided that the at least two processing modules and/or the module groups are clocked in a synchronized manner.

The assembly of the plug connector by the individual module groups can in particular hereby be ideally intercoordinated in terms of time, as a result of which the processing time for mass processing can be further reduced.

The transport device and/or the feed device is preferably also clocked in a manner synchronized with the module groups.

In one refinement of the invention, it may be provided that the apparatus has a control device in order to control and/or monitor the assembly of the plug connector by the module groups.

The control device may in particular be communicatively connected to the control units of the module groups in order to collect data collected by the control units in the course of the plug connector assembly process and to evaluate and/or document said data where necessary. The control device may also be configured to control the control units in order to control the assembly process as a whole.

The control device may be integrated in one of the module groups or designed to be independent of the module groups. In particular, it may also be provided that one of the control units of the module groups forms the control device—or vice versa.

The control device may be designed as a microprocessor. Instead of a microprocessor, any other device for implementing the control device may also be provided, for example one or more arrangements of discrete electrical components on a printed circuit board, a programmable logic controller (PLC), an application-specific integrated circuit (ASIC) or some other programmable circuit, for example also a field programmable gate array (FPGA), a programmable logic arrangement (PLA) and/or a commercially available computer.

In one embodiment of the apparatus, it may be provided that in each case one checking device is positioned upstream, for example positioned upstream along the feed direction, of at least one of the module groups (preferably of the majority of the module groups and particularly preferably of all module groups) in order to be able, during the insertion of the cable into the module groups and/or during the movement of the cable out of the module groups, to check correct processing of the cable.

In particular, it may be provided that the checking device is used to check for correct pre-fitting of the cable sheath of the cable with plug connector components (for example a line seal).

In particular, provision may be made to check the presence, the correct sequence, the correct spacing and/or the integrity of plug connector components that have been pushed onto the cable. Very particularly preferably, the check may be performed while the cable is being fed by the feed device.

The integrity of the cable itself may also be checked. In this way, it is for example possible for protruding strands of a cable shielding braid to be identified, and the cable can be rejected if necessary.

For example, the checking device may carry out an optical quality check using optical sensors.

An incorrectly processed or fitted cable may for example be excluded from the subsequent assembly process, labelled or marked as faulty, sorted into a corresponding quality class, and/or reprocessed.

In one advantageous refinement of the invention, it may be provided that at least one of the following module groups is provided, wherein the terms "first", "second" etc. do not necessarily indicate a specific sequence in the arrangement but are substantially intended to serve for linguistic differentiation between the module groups. Module groups may also be present in a plurality in the apparatus.

A first module group may be provided, comprising processing modules for aligning, orienting, measuring and/or marking the cable.

A second module group may be provided, comprising processing modules for pre-fitting the cable with plug connector components of the plug connector.

A third module group may be provided, comprising processing modules for stripping and processing cable components of the cable.

A fourth module group may be provided, comprising processing modules for assembling plug connector components on the cable.

A combined module group may be provided, comprising processing modules for stripping and processing cable components of the cable and for assembling plug connector components on the cable and optionally for cleaning the cable end. The combined module group may therefore in particular advantageously combine processing modules of the third and fourth module groups.

A fifth module group may be provided, comprising processing modules for checking and/or cleaning the cable end.

In principle, yet further module groups may also be provided. The module groups may also be subdivided or combined in other ways. It may also be provided that only a single processing module forms a module group.

In one advantageous embodiment of the invention, the apparatus may have a conveying device which is configured to unroll the electrical cable from a cable drum.

In particular, a roller conveyor device with one, two or even more rollers may be provided in order to guide the electrical cable linearly between the rollers. A belt conveyor or some other conveying device may also be provided in order to unroll the cable from the cable drum.

In one advantageous embodiment of the invention, the apparatus may have a cutting device which is configured to cut the electrical cable to a defined fabrication length.

In one embodiment of the invention, it may be provided that one of the processing modules is designed as an alignment module for aligning the electrical cable. The alignment module may preferably be encompassed by the first module group.

In particular, if the electrical cable is to be provided with an electrical plug connector at both cable ends, specifications for a setpoint twist between the respective plug connectors or a relative alignment of the plug connectors with respect to one another must be observed during the cable fabrication or plug connector assembly process.

The consideration of a setpoint twist during the plug connector assembly process proves to be difficult, in particular in the course of a partially automated or fully automated plug connector assembly process. Furthermore, the specifications of the cable manufacturer and safety specifications must be observed, which can limit the possibilities with regard to the twist of inner conductors of the cable.

The proposed alignment module may preferably have the features yet to be described below. In principle, the alignment module may however also have alternative features and/or additional features.

The alignment module may in particular also have any features that are described in German patent application DE 10 2019 119 660.4, the disclosure content of which is fully integrated into this patent application by the present reference.

In one refinement of the invention, it may be provided that one of the processing modules is designed as an alignment module for aligning the electrical cable which has exactly one inner conductor (hereinafter also referred to as "single-core cable"). The control unit and/or the control device may be configured to, for the processing of the first cable end, initially determine an actual alignment and a setpoint alignment of a plug connector component, which has been assembled on the second cable end, of a second plug connector.

An "alignment" in the context of the invention can be understood in particular to mean a radial alignment along the longitudinal axis or central axis of the cable. A twist of the cable about its central axis or longitudinal axis can thus lead to a change in the actual alignment.

The setpoint alignment is preferably identical for all electrical cables of a cable series to be fabricated.

A plug connector component may be, for example, a contact part carrier of what will later be the electrical plug connector. The contact part carrier may also be referred to as an inner housing or inner housing shell, and will be described in more detail below. The contact part carrier is preferably formed from a plastic.

A plug connector component may however also be a contact element (also referred to as an inner conductor contact element), for example a socket contact, which is fastened to an inner conductor of the cable. The inner conductor contact element may for example be pressed (in particular crimped), welded and/or soldered to the inner conductor of the electrical cable.

The plug connector component may also be a support sleeve or ferrule, a surrounding housing (also referred to as an outer housing shell or outer housing), for example a socket housing.

Furthermore, the plug connector component may be an end cap or retaining cap, a line seal, a so-called power contact or an insulating shell.

Any further plug connector components may also be provided depending on the respective plug connector type.

In the context of the invention, the plug connector component may also be an assembly composed of multiple individual components of the plug connector. In the context of the invention, the plug connector as a whole may also be referred to as a "plug connector component" where appropriate.

Basically, in the course of the alignment of the single-core cable, it is important in particular that at least one component or one part of what will later be the plug connector has already been assembled or fastened (which relates to the actual alignment and the setpoint alignment) on the second cable end.

The plug connector component is preferably fastened in twist-proof fashion on the second cable end.

In one refinement of the invention, it may be provided that one of the processing modules is designed as an alignment module for aligning the electrical cable which has multiple inner conductors (hereinafter also referred to as "multicore cable"). The control unit and/or the control device may be configured to, for the processing of the multicore cable, determine an actual alignment and a setpoint alignment of the inner conductors of the first cable end.

It should be emphasized at this juncture that, for the fabrication of the single-core cable, the alignment of the first cable end is used to adjust the setpoint alignment of the plug connector component of the second cable end, whereas, for the fabrication of the multicore cable, the alignment of the first cable end also directly leads to an adjustment of the setpoint alignment of the inner conductors of the first cable end.

In one advantageous refinement, it may be provided that the alignment module has an actuator device which is communicatively connected to the control unit and/or to the control device and which is configured to align the first cable end in order to approximate the actual alignment to the setpoint alignment.

The aligned first cable end is preferably fixed on the workpiece carrier.

By virtue of the fact that the control unit and/or the control device determine the actual alignment and the setpoint alignment, an adaptation of the actual alignment to the setpoint alignment in the course of the plug connector assembly process is advantageously possible. Manual intervention is then generally not necessary.

In particular, the setpoint alignment may, in the course of the plug connector assembly process or cable fabrication process, be specified to the control unit and/or the control device, for example by means of a data or user interface, as a parameterizable target specification for a cable series to be fabricated or for a plug connector series to be assembled.

The actual alignment may also be specified to the control unit and/or the control device by means of a user interface or a data interface. The control unit and/or the control device preferably determine the actual alignment by means of sensors and/or on the basis of a cable database (for example on the basis of manufacturer information relating to the twist of the inner conductors over the length of the cable). In particular, an optical sensor system may be provided, for example one or more cameras, which are aligned on the front side with the first cable end and/or with the second cable end.

In the context of the invention, the determination of the actual alignment and/or of the setpoint alignment may relate to the acquisition of an analogue or digital numerical value.

In one advantageous embodiment of the invention, one of the processing modules may be designed as a turning-round module in order to turn the cable round after the assembly of the first plug connector on the first cable end, in order, by swapping of the two cable ends (for example by swapping of the cable ends on the workpiece carrier), to provide the second cable end with the second plug connector in a second pass of the assembly process. The turning-round module may preferably be encompassed by the first module group.

By processing the cable ends sequentially, it is advantageously possible for processing modules and components of the apparatus to be reused. In principle, however, simultaneous processing of the first cable end and of the second cable end may be provided in order to increase the processing speed for the entire cable or the throughput, in particular if the cable is fixed with both cable ends in the workpiece carrier, for example is fixed in a U-shape.

In one embodiment of the invention, it may be provided that one of the processing modules is designed as an assembly module for processing the electrical cable. The assembly module may preferably be encompassed by the fourth module group.

The assembly module may preferably have the features yet to be described below. In principle, the assembly module may however also have alternative features and/or additional features.

The assembly module may in particular also have any features that are described in German patent application DE 10 2019 119 4687, the disclosure content of which is fully integrated into this patent application by the present reference.

In one advantageous refinement of the invention, it may be provided that one of the processing modules is designed as an assembly module for processing the electrical cable which has multiple inner conductors (hereinafter also referred to as "multicore cable"). The control unit and/or the control device may be configured to detect an actual twist and a setpoint twist between ends of the inner conductors that emerge from the first cable end and from the second cable end (hereinafter also referred to as "inner conductor ends").

In the context of the invention, an "end of an inner conductor" or an "inner conductor end" can be understood to mean the entire region of the inner conductor that emerges from the respective cable end, and also only the front, free end of the inner conductor. The inner conductor end may comprise the pure cable core, that is to say the (generally metallic) electrical conductor, and also an insulator or insulation (also referred to as "primary insulation") surrounding the respective electrical conductor.

In general, at the respective cable end, the inner conductor ends emerge in individually stripped form from a filler layer (also referred to as an intermediate sheath or "filler") which jointly encases the inner conductors. In principle, however, the inner conductors may emerge from any component of the electrical cable that jointly encases them and have been made correspondingly accessible in a preceding method step.

An "actual twist" and a "setpoint twist" can mean, in particular, a relative orientation of the inner conductors emerging from the opposite cable ends with respect to one another. The actual twist and/or the setpoint twist may in principle be arbitrary within the scope of the invention. The orientation of the inner conductors emerging from the respective cable ends may be twisted by 0 to 360°. The setpoint twist may in particular correspond to the special cases of a twist of the emerging inner conductors of 22.5°, 45°, 60°, 90°, 120°, 180°, 240° and 300°. In principle, however, the setpoint twist may be arbitrary.

By virtue of the fact that the control unit and/or the control device determine the actual twist and the setpoint twist, an adaptation of the actual twist to the setpoint twist in the course of the plug connector assembly process is advantageously possible. Manual intervention is then generally not necessary.

In particular, the setpoint twist may, in the course of the plug connector assembly process or cable fabrication process, be specified to the control unit and/or the control device, for example by means of a data or user interface, as a parameterizable target specification for a cable series to be fabricated or for a plug connector series to be assembled.

The actual twist may also be specified to the control unit and/or the control device by means of a user interface or a data interface. The control unit and/or the control device preferably determine the actual alignment by means of sensors and/or on the basis of a cable database (for example on the basis of manufacturer information relating to the twist of the inner conductors over the length of the cable). In particular, an optical sensor system may be provided, for example one or more cameras, which are aligned on the front side with the first cable end and/or with the second cable end.

In the context of the invention, the determination of the actual alignment and/or of the setpoint alignment may relate to the acquisition of an analogue or digital numerical value.

The assembly module (in particular the assembly module for processing the multicore cable) may preferably have an actuator module which is communicatively connected to the control unit and/or to the control device and which is configured to twist the inner conductors at at least one of the cable ends in order to approximate the actual twist to the setpoint twist in accordance with the specification of the control unit and/or control device.

Since the orientation of the inner conductors emerging from the cable ends is decisive for the assembly of what will later be the plug connector or determines the orientation of what will later be the plug connector, the orientation of the plug connectors applied to the respective cable end relative to one another can be relatively easily specified by means of a twist of the inner conductors emerging from the respective cable ends.

The assembly module (in particular the assembly module for processing the multicore cable) may preferably have a pressing tool which, in order to fix the twist, is designed to fix a contact part carrier of the electrical plug connector that is to be assembled on the cable end, which contact part carrier receives the ends of the inner conductors, to the cable in twist-proof fashion.

In particular, contact elements or inner conductor contact elements may be fastened, in particular crimped, to the respective inner conductor ends. It is thus possible in particular for the inner conductor contact elements to be introduced into the contact part carrier. However, it may also be provided that the inner conductor ends are inserted without inner conductor contact elements fastened thereto into the contact part carrier.

The contact part carrier may have corresponding receptacles for receiving the inner conductor (ends) and/or the inner conductor contact elements. The receptacles may extend axially through the contact part carrier. In this way, the inner conductors can be received in twist-proof fashion in the contact part carrier.

By virtue of the fact that the inner conductors are held in twist-proof fashion in the contact part carrier, fixing of the contact part carrier to the cable (in particular to the cable sheath thereof)—directly or indirectly via a further component of what will later be the plug connector—can advantageously fix the twist and thus the approximation of the actual twist to the setpoint twist.

In one refinement of the invention, it may be provided that one of the processing modules is designed as an assembly module for processing the electrical cable which has exactly one inner conductor (hereinafter also referred to as "single-core cable"). The assembly module may have a first means for twist-proof fastening of a first inner conductor contact element in a first orientation to the first cable end and a second means for twist-proof fastening of a second inner conductor contact element to the second cable end. The control unit and/or the control device may be configured to detect the first orientation and a setpoint twist between the two inner conductor contact elements and from this to ascertain a second orientation for the fastening of the second inner conductor contact element.

In the context of the invention, an inner conductor contact element may preferably be an inner conductor contact element for transmitting high currents, for example a so-called "power contact". In principle, however, it may be any inner conductor contact element.

The inner conductor contact element may for example be designed to be assembled in a subsequent method step in an insulating housing (or in the previously mentioned contact part carrier), but in particular in a multi-part insulating housing. For example, the inner conductor contact element may be placed between two insulating shells, following which the insulating shells are latched together.

After the inner conductor contact element has been assembled in the insulating housing (or the contact part carrier), the insulating housing may optionally be pushed into a further housing assembly or into a plug connector housing of the plug connector and latched therein.

In one embodiment of the invention, it may be provided that one of the processing modules is designed as a stripping module for incising and pulling off a part of a cable component of the cable. The stripping module may preferably be encompassed by the third module group.

In the context of the invention, the "cable component" may be any cable component. The stripping module may however in particular be designed to remove the insulations or dielectrics from a wide variety of cable types. The "cable component" may thus in particular be a cable sheath of the cable, a filler layer (also referred to as "filler") that jointly encases multiple inner conductors, an insulation (also referred to as "primary insulation") that individually encases a respective inner conductor, and/or a dielectric of the cable.

The stripping module may however also be used for stripping other cable components, for example also for stripping a cable foil or an outer conductor of the cable, for example a cable shielding braid.

In the context of the invention, the term "part" denotes the separated-off or at least partially separated-off axial section of the cable component.

The part may be completely or partially pulled off the electrical cable in the course of the processing by the stripping module. Basically, a distinction may be made between so-called full pulling-off and partial pulling-off. A full pulling-off is to be understood as meaning that the stripped piece or the part of the cable component (that is to say the "stripped remainder") is completely pulled off the cable. In the case of partial pulling-off, the cut-off part is pulled off the cable only over a certain axial length, and thus still remains on the cable. A production technician or a subsequent processing module may then completely pull off the partially pulled-off section. Partial pulling-off has the advantage that the cable end remains protected during onward transport and also during storage and, for example, splaying of further cable components at the cable end is prevented. In general, therefore, partial pulling-off of the part is preferred.

In the stripping of cable components of a cable, it is sometimes necessary to observe stringent demands with regard to the accuracy of the stripped lengths along which individual cable components are exposed, because the stripped lengths can determine inter alia the relative positions and spacings of plug connector components to be assembled on the cable, which are normally subject to strict specifications. The admissible tolerances in the case of plug connectors, in particular in the automotive sector, are generally very low.

In particular, it is often a problem that the pulling-off tools do not ideally engage into the incisions generated by means of the stripping blade, in particular owing to the elasticity of the cable sheath and a cable geometry that is generally not ideally circular. The stripping blades must accordingly have relatively wide cutting edges and also cut deeply into the cable component, which can lead to damage of the cable components. Ultimately, this can increase the processing time of the cable and the production waste, and thus worsen the economy of automated processing or of a production line.

The proposed stripping module may preferably have the features yet to be described below. In principle, the stripping module may however also have alternative features and/or additional features.

The stripping module may in particular also have any features that are described in German patent application DE 10 2019 119 662.0, the disclosure content of which is fully integrated into this patent application by the present reference.

In one advantageous refinement of the invention, it may be provided that one of the processing modules is designed as a stripping module for incising and pulling off a part of a cable component of the cable, having a rotary head which is rotatable about a central axis and on which a blade and a counterholder for the cable are arranged opposite one another and so as to be aligned with the central axis.

The blade (also referred to as "stripping blade") and the counterholder are preferably arranged on a radial line or a straight line which extends through the central axis of the rotary head. In the case of a linear movement of the blade and/or of the counterholder, these can consequently move directly towards or away from one another.

The cable may be guided in the stripping module along the central axis. The blade may be capable of being fed in the direction of the central axis to the cable in order to generate a radial incision in the cable component of the cable at a defined axial position.

The stripping module may particularly advantageously be used to firstly remove the cable sheath from a cable in order to expose an outer conductor or a shield, for example a cable shielding braid or a cable foil of the cable. The outer conductor may subsequently be removed, preferably in a manner offset axially in the longitudinal direction or feed direction along the central axis. Finally, an insulation or a dielectric arranged under the outer conductor may be removed, preferably again in a manner axially offset in the longitudinal direction or feed direction of the cable, in order, for example, to make one or more inner conductors of the cable accessible for the cable fabrication process. The cable may thus be stripped in multiple stages in the longitudinal direction or feed direction.

The stripping module may be used to strip one or more cable components of the cable.

It may thus be provided that stripping is performed sequentially, that is to say in multiple successive working steps, at multiple points on the cable and/or at multiple incision depths. It may however also be provided that stripping or sheath removal is performed simultaneously, that is to say in one working step, at multiple points on the cable and/or at multiple incision depths, wherein the stripping module may be configured for this purpose through the use of a corresponding number of axially offset blades, counterholders and/or pulling-off tools (on one common rotary head or on multiple axially offset rotary heads).

In one advantageous refinement, it may be provided that the stripping module has at least one pulling-off tool which is arranged on the rotary head and which can be fed in the direction of the central axis to the cable. The pulling-off tool is preferably positioned relative to the blade such that, in order to pull off the section of the cable component, the pulling-off tool engages into the incision generated by the blade when the pulling-off tool has been fed to the cable.

In a particularly preferred embodiment of the stripping module, it may be provided that the blade and the at least one pulling-off tool are arranged adjacent to one another on the rotary head and are equally spaced apart from an end side of the rotary head. The counterholder may also be positioned correspondingly.

The blade and the at least one pulling-off tool may be arranged on the rotary head such that they assume the same axial position along the cable when they have been fed to the cable or to the central axis—without the cable having to be axially repositioned.

By virtue of the fact that the blade and the pulling-off tool are arranged jointly on the same rotary head, it is not necessary, after the incising by means of the blade, for the cable to be repositioned and fed to the pulling-off tool (or vice versa). The position of the incision generated by means of the blade relative to the rotary head is thus positively known. In this way, the pulling-off tool can be aligned so exactly that it can engage in an ideal manner into the incision in order to pull the part off the cable. Even in the case of large tolerances in the cable geometry, an exact engagement of the pulling-off tool into the incision can be ensured.

Advantageously, the cutting edge of the blade may be very thin and the region of the pulling-off tool by which the pulling-off tool engages into the incision may be relatively wide, which on the one hand simplifies the processing and prevents damage to the cable and its components. The cutting edge of the blade is thus preferably thinner than the engagement region of the pulling-off tool by which the pulling-off tool engages into the incision.

By virtue of the fact that the engagement region or the "knife" of the at least one pulling-off tool can be made wider, the at least one pulling-off tool can be made more robust than the known pulling-off tools. Breakage of the pulling-off tool can hereby be avoided, and the service life of the apparatus can be lengthened.

It has also been found that, owing to the almost ideal alignment of the blade and of the pulling-off tool as a result of the joint positioning on the rotary head, the radial incision depth of the blade into the cable component can be reduced, because, owing to the ideal engagement of the pulling-off tool into the incision, the part can be reliably pulled off or separated off/torn off even if the blade has not cut fully through the cable component. As a result of the reduction of the incision depth, damage to cable components situated under the part can be ruled out, even in the case of cables that are relatively non-circular owing to tolerances. The incision depth may advantageously be selected in a manner dependent on the cross section of the cable component such that, after the incising operation, a narrow residual ring remains that connects the part to the rest of the cable component. Provision can thus be made for a groove, in particular a fully encircling groove, and thus a specified breaking point, to be formed into the cable component, into which the pulling-off tool can later engage in order to pull off the part.

It should be emphasized that the blade and the at least one pulling-off tool are preferably mutually independent assemblies.

The proposed stripping module advantageously makes it possible that the blade cuts into the cable in encircling fashion, or all the way around, owing to the rotation of the rotary head, whereby the part of the cable component can be particularly easily and reliably pulled off the cable.

In one advantageous embodiment of the stripping module, it may be provided that the feed device is usable for linearly conveying the cable along the feed direction in order to feed the cable along the central axis into the stripping module.

The feed device may for example have a roller conveyor device with one, two or even more rollers in order to guide the electrical cable linearly between the rollers. A belt conveyor or some other conveying device may also be provided in order to feed the cable and/or the stripping module.

In one embodiment of the stripping module, it may be provided that the rotary head is designed as a disk and a belt drive is provided for rotating the disk.

A design of the rotary head as a disk has been found to be particularly suitable for feeding the blade, and optionally the counterholder, radially. Furthermore, a disk can be rotated particularly easily, whereby the blade and the counterholder can also be rotated in a particularly simple manner about the central axis and thus about the cable that is to be incised.

A rotation of the disk may be implemented particularly advantageously by means of a belt drive. Here, an electric motor may be coupled to the disk via a belt drive. Preferably, a belt of the belt drive is driven by an output shaft of the electric motor, and the belt is tensioned around the circumference of the disk in order to drive the latter, whereby a particularly suitable transmission can also be implemented.

The rotary head may be driven by a belt drive without the need for a complex construction; in particular, sliding electrical contacts and the like can be omitted.

In one embodiment of the stripping module, it may be provided that the blade is designed as a shaped blade or as a circular blade.

The shape of the blade may for example run circularly or elliptically in the cutting edge region or at its knife in order to at least approximately follow the contour of the cable or of the cable component. In principle, however, a straight cutting edge/knife or a straight blade may also be provided.

A circular blade may also be provided, which has a completely circular knife. The knife may be mounted in a freely rotatable manner on the blade in order to be able to roll on the cable (in principle, however, a non-rotatable knife or a driven knife may also be provided). In particular, a freely rotatable circular blade can incise the cable component in a particularly advantageous and controlled manner during the rotation of the rotary head about the cable. In particular, a cable component composed of silicone, for example a cable sheath composed of silicone, can be incised in a particularly advantageous manner by a circular blade.

In one embodiment of the stripping module, it may be provided that the counterholder forms an abutment that is adapted to the outer diameter of the cable component and/or a conically tapering abutment.

The abutment of the counterholder may have a pure V shape or any tapering shape into which a cable can be placed, preferably in the manner of a two-point bracket. A tapered abutment is suitable in particular for holding cables with different cable diameters.

The counterholder may preferably be detachably connected to the rotary head, whereby the apparatus can be adapted quickly and easily to a wide variety of cable types and/or cable diameters. The blade may also be exchangeable in a modular manner.

The counterholder may have a slot into which the blade can penetrate. In this way, the apparatus can be used for different cable types, in particular with different cable diameters.

It may also be provided that the abutment of the counterholder is formed by rollers or by a sliding surface. The use of rollers or a sliding surface may be advantageous, because friction of the cable, in particular during the rotation of the counterholder about the cable is hereby kept low.

It may for example be provided that the counterholder has at least four rollers for forming the abutment, wherein the rollers are arranged on two axes running parallel to one another, and wherein in each case at least two rollers are arranged on the same axis, wherein two rollers arranged on the same axis have an axial spacing to one another in order to form the slot for penetration of the blade.

The axes for the rollers preferably run in the axial or feed direction of the cable.

In order to be able to strip a large number of different cable types and cable diameters, it may be advantageous if the blade can penetrate into the counterholder to different depths. If rollers are used, a configuration with four rollers may be advantageous, because a corresponding slot can then be formed in a technically simple manner between in each case two rollers. Alternatively, provision may self-evidently also be made for only two rollers to be arranged on two axes running parallel to one another, wherein the rollers have one or more slots.

It may also be provided that the counterholder has exchangeable rollers. If a counterholder is used which has a technically simple facility for exchanging rollers, the apparatus can easily be adjusted to different cable types and/or cable diameters.

In one embodiment of the stripping module, it may be provided that the counterholder can be fed in the direction of the central axis to the cable.

By virtue of the fact that, in addition to the blade, the counterholder is also displaceable radially in the direction of the central axis, the cable can be even more effectively positioned and fixed during the processing operation. The cut in the cable can thus be made even more exactly. It may thus advantageously not be necessary to additionally provide a guide and/or a cumbersome centering means for the cable in order to align the latter before the incising operation. In principle, however, a separate guide and/or a separate fixing means may also be provided for the cable, irrespective of whether or not the counterholder is capable of performing a feed movement.

It may be provided that, during the conveyance or the advancing movement of the cable by the feed device, the counterholder is radially remote from the central axis such that the cable does not make contact with the counterholder during the conveyance.

A corresponding offset of the counterholder with respect to the central axis during the conveyance of the cable may be advantageous, because friction of the cable against the counterholder is thereby avoided.

However, it may also be provided that, during the conveyance of the cable by the feed device, the counterholder lies against the cable and positions the latter preferably coaxially with respect to the central axis of the rotary head. The counterholder can thus be used as a guide for the cable.

An immovable positioning of the counterholder, at least during the operation of the stripping module, may be advantageous, because then no or only simple means for adjusting the counterholder, in order to position it once for the stripping process of a cable type, are required.

It may be provided that the counterholder is initially mechanically positioned before the start of the stripping process, in particular for a new cable. For the initial calibration of the stripping module for different cable types and/or cable diameters, a mechanical adjustment by hand may also be provided in a simple embodiment.

However, it may also be provided that the counterholder is arranged basically immovably on the rotary head.

In one embodiment of the stripping module, it may be provided that the counterholder forms a stop for the blade or that the blade forms a stop for the cable in order to limit the maximum depth of the radial incision into the cable component.

A stop of the counterholder may be an advantageous means for preventing damage, for example scratching, of another component of the cable that is situated under the cable component. The blade or a part of the cutting edge/knife of the blade or some other part of the blade may thus advantageously impact against the counterholder or a region of the counterholder before the blade has cut fully through the part. The stop of the counterholder may optionally also be settable or adjustable. For example, the stop may be adjusted by means of an adjusting screw or designed as an adjusting screw.

It may however also be provided that the blade itself forms or has a stop in order to limit the cutting depth. The stop may for example be formed from a plastic or from a metal, for example aluminium.

In the case of a linear blade with a straight knife or a shaped blade with a shape of the knife at least partially adapted to the cable component to be cut, provision may be made for the front cutting edge region of the knife to be clamped with a defined spacing to a blade receptacle. In a similar way, a cutting depth limitation for a circular blade may be implemented for example by virtue of a cylindrical stop with a smaller radius than the knife being arranged coaxially adjacent to the knife.

In one advantageous embodiment of the stripping module, it may be provided that a respective slotted-guide device and/or a respective rail system is provided for the feed of the blade, of the counterholder and/or of the at least one pulling-off tool to the cable.

In particular, the use of a slotted-guide device may be advantageous.

In one embodiment of the stripping module, it may be provided that the pulling-off tool is designed as a shaped tool that is adapted to an inner diameter of the cable component. The pulling-off tool may however also be linear or straight.

The pulling-off tool may basically be designed similarly to the blade or to a shaped blade but, by contrast to the shaped blade or blade, may have a thicker cutting edge/knife.

Provision is preferably not made to incise the cable component by means of the pulling-off tool. The pulling-off tool should serve only to plunge into the incision already generated by the blade and to thus generate a corresponding form fit with the cable component in order to be able to subsequently pull off, or optionally also tear off/separate off, the part.

In one advantageous embodiment of the stripping module, two pulling-off tools may be provided, wherein a first pulling-off tool is arranged opposite a second pulling-off tool, and wherein the pulling-off tools are aligned with the central axis.

The pulling-off tools are preferably arranged on a radial line or a straight line which extends through the central axis of the rotary head. In the case of a linear movement of the two pulling-off tools, these can consequently move directly towards or away from one another.

The alignment of the two pulling-off tools is preferably rotationally offset by 90° with respect to the arrangement of the blade and of the counterholder on the rotary head. In this way, the space on the rotary head can be utilized as optimally as possible. In principle, however, it may also be provided that the pulling-off tools are offset by an angle other than 90° with respect to the alignment of the blade and the counterholder.

In one refinement of the invention, it may be provided that the control unit of one of the processing modules and/or the control device are configured to detect the actual twist and the setpoint twist between the ends of the inner conductors or the inner conductor ends at the respective cable ends.

The setpoint twist and the actual twist are preferably detected before the inner conductor ends are exposed or made accessible in a subsequent processing step. Optionally, the detection of the setpoint twist and of the actual twist is thus performed before the processing of the cable by the stripping module.

It may also be provided that the detection of the setpoint twist and of the actual twist is performed before the cable or one of its components is cut to length.

According to the refinement relating to the detection of the actual twist and of the setpoint twist, it may be provided that the control unit and/or the control device are configured to calculate an axial length reduction, caused by later approximation of the actual twist to the setpoint twist, of the total length of the cable.

It is in particular also possible for any further features that are described in the German patent application DE 10 2019 119 663.9, the disclosure content of which is fully integrated into this patent application by the present reference, to be provided for the detection of the actual twist and of the setpoint twist in order to calculate the subsequent length reduction of the total length of the cable.

As a result of the later twist of the cable ends, for example by the assembly module, although the actual twist can advantageously be approximated to the setpoint twist, at the same time the "twisting" of the inner conductor shortens the axial length of the exposed inner conductor with respect to the central axis or longitudinal axis of the cable (that is to say the front spacing of the inner conductor ends to the point at which the inner conductors emerge from a cable component encasing them, for example the filler layer, in relation to the central axis of the cable). This ultimately reduces the total length of the cable, that is to say the spacing between the inner conductor ends of the inner conductors of the first cable end and the inner conductor ends of the inner conductors of the second cable end.

According to the refinement relating to the detection of the actual twist and the setpoint twist, it may be provided that the control unit and/or the control device are furthermore configured to increase a specified stripping length, along which the stripping module or some other stripping device is able to expose the inner conductors starting from their ends, at at least one of the cable ends taking into consideration the calculated length reduction in order to at least partially compensate the length reduction.

It can thus advantageously be ensured that, despite the approximation of the actual twist to the setpoint twist, the total length of the cable does not change or does not change to an extent that is practically relevant in the context of the cable fabrication process or exceeds given tolerance specifications. At the same time, it can be ensured that the stripping length of the inner conductors, even after the twisting thereof, still corresponds to the specification—at least to a practically relevant extent for adhering to the given tolerances.

The length reduction is preferably fully compensated. However, it may also be provided that the length reduction is compensated only to the extent necessary in the context of tolerance specifications for the fabrication of a respective cable type and/or of a respective plug connector type during the plug connector assembly process. In principle, overcompensation may also be provided, provided that the tolerance specifications are still adhered to.

By virtue of the fact that the control unit and/or the control device determine the actual twist and the setpoint twist, an adaptation of the actual twist to the setpoint twist in the course of the plug connector assembly process is advantageously possible. Manual intervention is then generally not necessary.

In particular, the setpoint twist may, in the course of the plug connector assembly process or cable fabrication process, be specified to the control unit and/or the control device, for example by means of a data or user interface, as a parameterizable target specification for a cable series to be fabricated or for a plug connector series to be assembled.

The actual twist may also be specified to the control unit and/or the control device by means of a user interface or a data interface. The control unit and/or the control device preferably determine the actual twist by means of sensors and/or on the basis of a cable database (for example on the basis of manufacturer information relating to the twist of the inner conductors over the length of the cable). In particular, an optical sensor system may be provided, for example one or more cameras, which are aligned on the front side with the first cable end and/or with the second cable end.

In the context of the invention, the determination of the actual twist and/or of the setpoint twist may relate to the acquisition of an analogue or digital numerical value.

In one embodiment of the invention, it may be provided that one of the processing modules is designed as a fitting module in order to fit the cable with at least one plug connector component of the plug connector starting from one of the cable ends. The fitting module may preferably be encompassed by the second module group.

The plug connector components may be any components of the electrical plug connector that is to be assembled on the corresponding cable end, which components preferably have a respective passage bore for receiving the cable. The plug connector components can thus be pushed onto the electrical cable, in particular onto the cable sheath of the cable. The diameter of the passage bores may substantially correspond here to the diameter of the electrical cable or of its cable sheath. The diameter of the passage bore may however also be larger or slightly smaller than the diameter of the electrical cable or of its cable sheath in order to be able to influence the mechanical play of a plug connector component pushed onto the cable.

In principle, the electrical cable may, by means of the fitting module, be fitted with any plug connector components, some of which will be described below by way of example.

In the course of the plug connector assembly process at one of the cable ends of an electrical cable, it is generally necessary to push various plug connector components onto the cable sheath of the cable in the sequence required later in order to make said components available for the later plug connector assembly process. The previously pushed-on components can then be moved one after the other or at the same time on the cable sheath in the direction of the front, free end of the cable in order to be joined together with further plug connector component parts or plug connector components.

In particular, in the context of mass production, the fitting of the cable or of its cable sheath with the plug connector components is relatively complex and is therefore generally performed manually.

In particular, the fitting of the cable with multiple plug connector components proves to be time-consuming. Furthermore, it is in particular also the case that the fitting of the cable sheath with an elastic ring body, for example with a line seal, which by its nature is to be fastened to the cable in non-positively locking fashion or closely abutting fashion, is difficult.

The proposed fitting module may preferably have the features of the multiple fitting module or the single fitting module to be described below. In principle, the fitting module may however also have alternative features and/or additional features.

In one advantageous embodiment of the fitting module (in particular of the multiple fitting module or of the single fitting module to be described below), it may be provided that at least one of the plug connector components is a shielding sleeve, a plug connector housing, a line seal, a cable retainer, a retaining cap or an angle cap.

The shielding sleeve may also be referred to as a "ferrule" (or outer ferrule) and is generally provided in order to electromagnetically shield a contact part carrier, in particular in the region of the inner conductor contact elements of the electrical plug connector. For twist-proof fastening, the contact part carrier and the shielding sleeve may have a corresponding mechanical coding, for example a latching lug on the one hand and a corresponding latching groove on the other. The shielding sleeve can for example be pushed onto the contact part carrier only in one specified orientation or in two orientations.

The shielding sleeve is preferably already pushed from the front onto the electrical cable or onto its cable sheath by the fitting module in advance and can, after the assembly of the contact part carrier (for example by the fitting module), be pushed over the contact part carrier from the rear, that is to say starting from the cable sheath, or fastened in some other way to said contact part carrier.

The plug connector housing may in particular be a socket housing/plug housing (also referred to as an enclosing housing, outer housing or outer housing shell) which, in the course of the plug connector assembly process, is pushed over the assembled shielding sleeve, for example from the rear, and fastened to the shielding sleeve. In particular, positionally correct locking to the shielding sleeve and/or to the contact part carrier may be provided for this purpose.

The line seal may in particular be a mechanical seal, for example a sealing ring for sealing against dirt, dust, liquids or gases, which can for example be pushed into an assembled plug connector housing from the rear. The diameter of the passage bore of the line seal may preferably be made somewhat smaller than the diameter of the cable sheath in order to improve the leak-tightness. The line seal may have any cross-sectional geometry. Circular line seals are often used. It is however also possible for oval or polygonal, in particular rectangular, for example also square line seals to be provided. A particular orientation is generally not of importance for the assembly of the line seal, in particular in the case of line seals with a circular cross-sectional geometry. If an oval or polygonal (for example rectangular) line seal is provided, a specified orientation relative to further plug connector components may however be important for the line seal too.

A cable retainer may in particular be a plug connector component that enables or supports an absorption of tensile forces on the cable.

A terminating retaining cap—or in the case of an angled plug connector, an angle cap may be a plug connector component that terminates the plug connector on the cable side and which, for example, fixes a cable retainer and/or a line seal in the plug connector, for example the plug connector housing. It may be provided that the retaining cap or angle cap has latching means in order to latch with the cable retainer and/or the plug connector housing. The retaining cap or angle cap may also be referred to as a terminating cap assembly.

In one advantageous embodiment, it may be provided that the plug connector components are designed to receive a second electrical cable, and for this purpose each have a passage bore for receiving the first electrical cable and the second electrical cable. Such a plug connector component may be suitable in particular for the assembly of a plug connector that has two or more electrical cables.

The plug connector components preferably each have only a single passage bore for receiving only a single electrical cable or for assembling a plug connector which has a single electrical cable. In a likewise preferred variant, at least one of the plug connector components (preferably all plug connector components) however has exactly two passage bores for fabricating exactly two electrical cables or for assembling a plug connector which has exactly two electrical cables. In principle, in the context of the invention, a plug connector component may however even have more than two passage bores, for example three passage bores or more, four passage bores or more, five passage bores or more, six passage bores or more, seven passage bores or more, eight passage bores or more, nine passage bores or more, ten passage bores or even more passage bores.

The cables may for example be pushed sequentially or in parallel into the corresponding passage bores of the plug connector components. The fitting is preferably performed in parallel, wherein a correspondingly suitable feed device is used which is able to push the cables simultaneously into the plug connector components.

Where "the" or "a" passage bore is referred to above or below, this is only to be understood as serving to simplify the description and not as being limiting. In principle, it is thus also possible, with regard to every embodiment or refinement of the invention described above and below, for multiple passage bores to be provided, even if this is not explicitly mentioned.

In one advantageous refinement of the invention, it may be provided that one of the processing modules is designed as a multiple fitting module and is configured to fit the cable with two or more plug connector components of the plug connector starting from one of the cable ends. The multiple fitting module may preferably have chambers for receiving the individual plug connector components. The chambers may be arranged such that the plug connector components received in the chambers form a common channel with a common central axis.

The multiple fitting module may in particular also have any features that are described in German patent application DE 10 2019 127 749.3, the disclosure content of which is fully integrated into this patent application by the present reference.

The chambers of the multiple fitting module are preferably designed to receive in each case only a single plug connector component. The chambers are particularly preferably structurally separated from one another, for example by respective walls, which walls however have recesses for the leadthrough of the electrical cable and possibly additionally shape the channel for the leadthrough of the electrical cable or are able to guide the electrical cable during the leadthrough thereof. The chambers may however also be merely "imaginary" regions within the multiple fitting module that are not structurally separated from one another.

Preferably, the channel runs linearly, or the chambers are arranged linearly one behind the other. The arrangement of the chambers relative to one another or of the channel may however also have a curved profile.

It may be provided that the feed device is designed to lead the cable with its cable end along the central axis through the plug connector components in order to push the plug connector components onto the cable sheath of the cable.

The feed device may be designed to move the cable and/or the fitting module (for example the multiple fitting module or the single fitting module described below). It can thus be possible in particular for a relative movement between the cable and the fitting module to be provided in order to push the plug connector components onto the cable sheath of the cable. The electrical cable is preferably pushed into the fitting module along the feed direction. For this purpose, the feed device may for example have a roller conveyor device with one, two or even more rollers in order to guide the electrical cable linearly between the rollers.

By virtue of the fact that the plug connector components are arranged in the chambers of the multiple fitting module, the plug connector components can be subsequently pushed onto the cable sheath by the feed device in a coherent movement sequence. Sequential fitting of the cable with the plug connector components, for example by respectively gripping and pushing on each individual plug connector component, is thus no longer necessary.

The plug connector components may advantageously already be arranged in the desired sequence in the chambers of the multiple fitting module.

The multiple fitting module is suitable in particular for fully automated cable fabrication. Owing to the fitting by means of the multiple fitting module with the individual chambers, manual intervention or manual fitting of the cable with the plug connector components can be avoided. The throughput of cables can thus be increased. Furthermore, assembly errors or fitting errors can be avoided, in particular if the chambers of the multiple fitting module are designed to receive in each case only certain plug connector components. Mixed-up fitting or fitting in the incorrect sequence or in the incorrect orientation can thus be avoided.

In one advantageous embodiment of the fitting module (in particular of the multiple fitting module or of the single fitting module to be described below), it may be provided that the fitting module has a magazine in order to hold ready further plug connector components for fitting additional cables.

It is thus advantageously possible for storage of the plug connector components in magazines to be provided.

For example, a hopper-type magazine may be provided. The hoppers of the hopper-type magazine may for example open into the chambers of the multiple fitting module, as a result of which the plug connector components can be placed in from above in an ordered or unordered manner. A shaft-type magazine may preferably also be provided, in the case of which the individual plug connector components lie one above the other and finally (for example) open into the chambers.

In principle, any types of magazine may be provided, for example also a roller conveyor-type magazine, a step-type magazine, a conveyor belt-type magazine, a sliding track-type magazine, a chain-type magazine, a lifting magazine or some other magazine, but in particular a magazine using gravitational force, in order to convey the individual plug connector components as easily as possible into the fitting module, for example into the chambers of the multiple fitting module.

In one advantageous embodiment of the multiple fitting module, it may be provided that the chambers of the multiple fitting module are arranged such that the plug connector components received in the chambers are spaced apart from one another along the central axis at defined spacings.

The plug connector components may however also be arranged directly adjacent to one another. It may furthermore also be provided that individual plug connector components are arranged in the chambers having already been partially pushed one over the other or pre-assembled with one another.

In an advantageous manner, the individual plug connector components may be positively guided or positively positioned by the chambers.

The individual plug connector components may optionally already be held ready at the defined spacings to one another provided later on the electrical cable. For example, a spacing may be provided between the plug connector components in order to be able to more easily grip or assemble these in the subsequent fabrication steps. In particular, a defined spacing to the front, free end or to the cable end of the cable may also be provided in order to be able to process (for example be able to strip) the front, free end in the course of the plug connector assembly process without the need to damage or displace the foremost plug connector component.

In one advantageous embodiment of the multiple fitting module, it may be provided that the chambers of the multiple fitting module are designed such that passage bores running through the plug connector components for receiving the cable are aligned coaxially with one another when the plug connector components are received in the chambers.

In particular, a coaxial alignment of passage bores running through the plug connector components may be advantageous in order to be able to particularly easily pass the electrical cable through the coaxially arranged plug connector components in one working step.

A coaxial alignment of the passage bores of the plug connector components may be advantageous in particular if the diameters of the passage bores correspond to, approximately correspond to, or are smaller than, the diameter of the cable sheath of the cable. In particular, if the passage bores are relatively large with regard to the cable diameter, a coaxial alignment may optionally also be omitted.

In one embodiment of the multiple fitting module, it may be provided that the chambers of the multiple fitting module are designed to block the plug connector components in positively locking fashion in the axial direction along the central axis. It may also be provided that only one of the chambers or some of the chambers are designed to block the plug connector components in positively locking fashion in the axial direction along the central axis.

In particular, it may be advantageous if the plug connector components are blocked in positively locking fashion in the feed direction in order that they are not displaced by the cable during the leadthrough of the electrical cable.

In one embodiment of the multiple fitting module, it may be provided that the chambers of the multiple fitting module are designed to hold the plug connector components in twist-proof fashion. It may also be provided that only one of the chambers or some of the chambers are designed to hold the plug connector components in twist-proof fashion.

In particular if, in the course of the plug connector assembly process, individual plug connector components are to be held ready in a defined alignment, or it is advantageous to hold one of the plug connector components ready in a defined alignment, the chambers may preferably be designed to hold the plug connector components in twist-proof fashion with respect to the central axis.

In principle, it may be provided that chambers of the multiple fitting module are designed to fix the plug connector components in positively locking and/or non-positively locking fashion in one, two, three, four, five or in all degrees of freedom.

In particular, if the assembly between the shielding sleeve and the contact part carrier has to take place in one or more defined alignments, it may be advantageous if at least that chamber of the multiple fitting module which receives the shielding sleeve is designed to receive the shielding sleeve in twist-proof and pre-aligned fashion. Twist-proof mounting within the corresponding chamber may be advantageous with regard also to the plug connector housing.

In one refinement of the invention, it may be provided that one of the processing modules is designed as a single fitting module and is configured to fit the cable with an elastic ring body at a defined axial position.

The single fitting module may in particular also have any features that are described in German patent application DE 10 2019 127 760.4, the disclosure content of which is fully integrated into this patent application by the present reference.

In the context of the single fitting module, the electrical cable may be fitted with only a single ring body or with multiple ring bodies, for example with two ring bodies or more ring bodies, three ring bodies or more ring bodies, four ring bodies or more ring bodies, five ring bodies or more ring bodies.

The defined axial position may in particular be an axial position along the central axis or longitudinal axis of the electrical cable. The defined axial position is preferably not an arbitrary position on the cable, but a previously defined setpoint position, for example an assembly position.

The defined axial position may for example also be the final position of the ring body on the cable. However, the defined axial position may preferably be an assembly position of the ring body on the cable, starting from which the ring body is later pushed together with other plug connector components.

The inner diameter of the passage bore of the ring body may substantially correspond to the diameter of the electrical cable, in particular of its cable sheath. The inner diameter of the passage bore is however preferably slightly smaller than the diameter of the electrical cable or of its cable sheath, in order that the elastic ring body later applied to the cable is fixed in non-positively locking fashion at the defined axial position. However, it may optionally also be provided that the inner diameter of the passage bore is larger than the diameter of the cable or of its cable sheath.

The deformability or elasticity of the ring body may be selected such that the ring body provides a sufficient holding force for the final fastening on the cable, in particular on the cable sheath, but can reversibly expand to an extent sufficient for fitting on the cable and on the inclined tube to be described below without experiencing (irreversible) plastic deformation.

The ring body may preferably be composed of an elastomer, that is to say of an elastically deformable plastic, for example a vulcanizate composed of natural rubber or silicone rubber, for example rubber.

In principle, however, the ring body may also have yet further components, for example metallic components or components composed of a non-elastic plastic. The elastic part of the ring body can then preferably face towards the cable, for example in the manner of an inner ring. The non-elastic components may face away from the cable, for example in the manner of an outer ring that guides the inner ring within it.

The single fitting module preferably has an inclined tube with an end face which is inclined by an angle of inclination with respect to a tube cross section of the inclined tube, which inclined tube can be introduced into a passage bore of the ring body.

In other words, the inclined tube may have a beveled end section by which it can be introduced into the passage bore of the ring body.

The tube cross section is preferably aligned orthogonally with respect to the longitudinal axis or central axis of the inclined tube.

The end section or the end face of the inclined tube is preferably beveled such that a tip is formed at one end of the inclined tube in a section along the longitudinal axis through the inclined tube.

The inclined tube may for example be machined from a conventional tube with straight ends by oblique cutting of one of the ends to size or by grinding of one of the ends. The inclined tube may however also be manufactured using other methods, for example also directly in the later intended shape, for example by welding, casting or drawing.

The inclined tube may be formed from any material and preferably has the smallest possible wall thickness. For example, the inclined tube may be formed from a plastic. However, the inclined tube is preferably formed from a metal.

The cable may preferably be positioned by the feed device in the inclined tube such that the ring body is situated at the defined axial position on the cable when the ring body is slipped from the inclined tube onto the cable.

For positioning of the cable in the inclined tube, the cable and/or the inclined tube and/or the single fitting module may be moved. Basically, only a relative movement between the cable and the inclined tube is important. Preferably, however, only the cable is moved in order to position it in the inclined tube.

The inner diameter of the inclined tube may correspond to the outer diameter of the cable or be slightly larger than the outer diameter of the cable.

The outer diameter of the inclined tube may correspond to the inner diameter of the ring body or be slightly larger than the inner diameter of the ring body. The outer diameter of the inclined tube may however optionally also be smaller than the inner diameter of the ring body.

Through the use of the inclined tube and the subsequent slipping of the ring body from the inclined tube, even ring bodies can be applied to the cable which later adhere to the cable with great holding force. In principle, although the inclined tube has an even larger outer diameter than the cable, the inclined end face makes it easier, in turn, for the ring body to be pushed onto the inclined tube. Furthermore, the material of the inclined tube may advantageously be selected in order to allow easy displacement of the ring body on the surface of the inclined tube.

The single fitting module can inter alia allow extremely exact positioning of the ring body on the cable, because the cable can be positioned in the inclined tube in virtually force-free fashion. The ring body can furthermore also be fastened very easily at axial positions of the cable which are spaced apart from the cable end to a relatively great extent, for example are spaced apart from the cable end by up to 300 mm or more.

The single fitting module may have a slipping-off means in order to slip off the ring body onto the cable. The slipping-off means may for example run in part-ring-shaped or ring-shaped fashion around the inclined tube. The slipping-off means may furthermore optionally have, at its end facing towards the ring body, a section which tapers in the direction of the ring body, in particular a conically tapering section.

The feed device may be designed to slip the ring body off the inclined tube onto the cable using the slipping-off means. For this purpose, provision may be made for the inclined tube fitted with the ring body to be moved back again counter to the feed direction after the cable has been positioned in the inclined tube. In particular, if the slipping-off means has a recess with a sufficiently large inner diameter for the leadthrough of the inclined tube but with an inner diameter smaller than the outer diameter of the ring body, the ring body can impact against the wall or end face surrounding the recess of the slipping-off means and ultimately remain at this axial position until the inclined tube has been pulled fully out of the ring body.

The single fitting module may have a support body, preferably a support body with a passage bore. The support body may be designed to support the ring body, during the insertion of the inclined tube, at its side facing away from the inclined tube. Here, the support body preferably supports the ring body such that, during the insertion of the inclined tube, the ring body tilts in the direction of its side facing away from the inclined tube.

The support body may be of multi-part form, preferably with at least two half-shells which can be opened in order to be able to more easily remove the fitted cable from the apparatus.

The single fitting module may have a magazine in order to hold further ring bodies ready for the fitting of further cables.

The single fitting module may furthermore have means for applying a lubricant, preferably an alcohol or a silicone oil, to the inclined tube and/or to the ring body.

In the context of the invention, the ring body may be regarded as part of the apparatus, in particular of the single fitting module—at least until it has been applied to the cable.

In one advantageous embodiment of the fitting module (in particular of the multiple fitting module and/or the single fitting module), suitable sensors may be provided which are configured to monitor the position of the cable in the fitting module, for example in the chambers or in the inclined tube. The monitoring may be performed throughout, or only in sections. Provision may be made, for example using one or more light barriers, to detect discrete positions of the cable. For example, it may be detected by means of the sensors whether the electrical cable has been inserted up to a certain length into the inclined tube of the single fitting module, has already emerged up to a certain length from that end of the inclined tube which is situated opposite the entry point, has been inserted as far as into a defined chamber of the multiple fitting module, and/or has emerged from the final chamber of the multiple fitting module.

In one embodiment of the invention, it may be provided that one of the processing modules is designed as a press-in module in order to press that cable end of the cable which has been prefabricated with an inner conductor contact element along the feed direction into a corresponding slot of a housing assembly or of a plug connector housing of the plug connector. The press-in module may preferably be encompassed by the fourth module group.

In the course of a plug connector assembly process, support sleeves, compression or crimp sleeves and/or inner conductor contact elements are generally connected to, in particular pressed onto or welded or soldered to, the electrical conductors of the cable. This process is sometimes referred to as "prefabrication" of the cable. The support sleeves and compression or crimp sleeves are provided here for connection to an outer conductor of the cable (in particular for assembly on an outer conductor shielding braid), whereas the inner conductor contact elements are connected to the inner conductor or the inner conductors of the cable.

Following the prefabrication process, the cable is then generally assembled in a housing assembly or in a plug connector housing of what will later be the plug connector. Here, it is optionally also possible for multiple cables to be assembled in one housing assembly, depending on the plug connector type. For this purpose, the prefabricated cables often have to be pressed with sufficient pressing force into corresponding slots in the housing assembly.

In particular, in the context of mass production, the pressing of the prefabricated cables into a housing assembly or into a plug connector housing is relatively complex. In addition, to ensure a high-quality and robust plug connector, the pressing-in process must be performed with high precision and accurate process monitoring.

The proposed press-in module may preferably have the features to be described below. In principle, the press-in module may however also have alternative features and/or additional features.

In one refinement of the invention, it may be provided that one of the processing modules is designed as a press-in module, having an advancing device, which is designed to press the cable end, which has been prefabricated with an inner conductor contact element, of the cable along an advancing direction into a corresponding slot of a housing assembly (also referred to as "plug connector housing") of the plug connector until the inner conductor contact element has reached a setpoint position within the housing assembly.

The advancing device may also be the feed device. Preferably, however, an advancing device separate from the feed device is provided.

The advancing direction may be the feed direction.

The front end of the cable preferably has a support sleeve and/or a compression or crimp sleeve which, on the front end of the cable, is pressed together with an outer conductor of the cable, in particular an outer conductor shielding braid of the cable. The cable particularly preferably has a support sleeve which is mounted on the cable sheath of the cable and/or on the outer conductor shielding braid of the cable, wherein the outer conductor shielding braid is folded back over the support sleeve and pressed between the crimp sleeve and the support sleeve.

The support sleeve and/or compression or crimp sleeve may advantageously be used for the compression of the cable within the slot of the housing assembly.

The setpoint position is preferably a position of the inner conductor contact element within the housing assembly in which the inner conductor contact element engages with a latching means of the housing assembly, and/or has assumed a plug-in position intended for the later use of the plug connector, in order to be connected to a corresponding mating plug connector.

Provision may be made for exactly one electrical cable or exactly two electrical cables to be pressed in by means of the press-in module. In principle, however, it is also possible for even more than two electrical cables to be pressed in, for example three electrical cables or more electrical cables, four electrical cables or more electrical cables, five electrical cables or more electrical cables, six electrical cables or even more electrical cables.

The respective cables may be pressed in successively or simultaneously, as will be described in more detail below.

Where "the" electrical cable or "an" electrical cable is referred to below in the context of the press-in module, this is not to be understood as limiting, but is intended merely to improve readability. In principle, all embodiments and variants of the press-in module described below may relate to exactly one electrical cable, to exactly two electrical cables or to even more electrical cables, even if this is not explicitly stated. In particular, features and variants that relate to the electrical cable can also relate to the cable referred to below as the "second" electrical cable—and vice versa.

The press-in module may preferably have an optical sensor unit which is designed to detect the actual position of the inner conductor contact element within the housing assembly while the cable is being pressed in.

The optical sensor unit is preferably designed as a camera, in particular a high-speed camera, and/or as a light band or light barrier.

The optical sensor unit may be designed to detect the actual position of the inner conductor contact element continuously or in quick succession. For example, 20 to 50 evaluations per second, preferably 50 to 200 evaluations per second, particularly preferably 200 to 400 evaluations per second, very particularly preferably 400 to 600 evaluations per second, even more preferably 600 to 1000 evaluations per second, for example 800 evaluations per second, or even more than 1000 evaluations per second, may be provided.

By virtue of the fact that the optical sensor unit monitors the actual position of the inner conductor contact element while the cable is being pressed in along the feed direction, a high level of precision can be ensured during the assembly of the plug connector. In particular, the inner conductor contact element can be positioned with high accuracy within the housing assembly.

The press-in module may preferably have a force transducer for detecting the pressing force applied while the cable is pressed in.

The force transducer may for example be integrated in the advancing device or the feed device.

By monitoring the pressing force, the assembly process of the plug connector can advantageously be monitored and thus made particularly reliable in process terms.

In particular, monitoring the pressing force and comparing it with the actual position simultaneously detected by the optical sensor device can be advantageous in order to check the assembly process. The pressing force can thus be detected and evaluated for example in a manner dependent on the actual position of the inner conductor contact element.

In one advantageous embodiment of the press-in module, it may be provided that the advancing device or the feed device has a holding device for fixing the cable during the pressing-in process. The holding device may preferably have at least one clamping jaw that can be fed to a cable sheath of the cable.

The holding device can be moved by the advancing device or the feed device, preferably together with the cable fixed therein, along the advancing direction or feed direction in order to press the front end of the cable or the cable end of the cable into the slot of the housing assembly.

The holding device preferably has exactly one clamping jaw or exactly two clamping jaws which can be fed in the direction of the central axis of the cable in order to fix the cable at its cable sheath.

If exactly one clamping jaw that can perform a feed movement is provided, this can press the cable against a support, which is situated opposite the clamping jaw along the cable sheath, in order to fix said cable.

The holding device preferably fixes the cable in twist-proof fashion.

The transport device and/or the feed device may be designed to feed the cable into the advancing device, in particular into the holding device of the advancing device. The feed device may for example have drivable transport rollers in order to guide the cable tangentially between them. In particular, the feed device may impart a first feed movement of the cable along the feed direction, following which the advancing device imparts the onward transport and the pressing-in of the cable along the advancing direction.

In one embodiment of the press-in module, it may be provided that the control unit of the press-in module is configured to monitor the assembly process, in particular to evaluate the detected actual position and the detected pressing force in the context of quality assurance.

In particular, the control unit of the press-in module may be configured to compare the detected pressing force with a specification for the pressing force and to classify the plug connector accordingly. The plug connector may be marked or labelled in a manner dependent on the classification. Depending on the classification, the plug connector may be allocated into different quality classes and also removed from the production process where necessary.

The control unit of the press-in module may in particular also be designed to cause the advancing device and/or the feed device to stop the pressing-in of the cable or the advancing of the cable as soon as the actual position detected by the optical sensor device corresponds to the intended setpoint position. The control unit may also perform closed-loop control of the advancing movement of the cable, optionally also in a manner dependent on the actual position and/or the detected pressing force, for example may slow the advancing movement as the actual position approaches the setpoint position.

In one embodiment of the press-in module, it may be provided that the press-in module has a fixing device for fixing the housing assembly at an assembly position along the advancing direction or the feed direction.

The fixing device may in particular be capable of being fed to the housing assembly. In this way, the housing assembly can be placed into the press-in module before the cable or cables are pressed in, and can be removed from the press-in module again after the cable or cables have been pressed in.

The fixing device may have one or more pressing jaws.

In one embodiment of the press-in module, it may be provided that the press-in module has an alignment aid with a receptacle and/or with a stop for the front end of the cable. The alignment aid may be configured to align the cable in the correct position at a starting position along the advancing direction and/or the feed direction before said cable is pressed in.

The alignment aid may furthermore be designed to be removed from the displacement path of the cable, in particular orthogonally with respect to the advancing direction and/or the feed direction, after the alignment of the cable.

The receptacle or the stop of the alignment aid may in particular be designed in the manner of a fork. Thus, the alignment aid can advantageously be removed in a rectilinear movement laterally or orthogonally with respect to the advancing direction or feed direction.

In one advantageous embodiment of the press-in module, it may be provided that the press-in module has a preloading device which is configured to mechanically preload a latching means, which is provided for the latching of the inner conductor contact element, within the housing assembly orthogonally with respect to the feed direction.

This can simplify the insertion of the inner conductor contact element into the housing assembly.

The preloading device preferably has a telescopic ram that is movable orthogonally with respect to the advancing direction and/or feed device. The telescopic ram can be inserted into a plug-in region, which is provided for the connection of the plug connector to a mating plug connector, of the housing assembly in order to preload the latching means.

The preloading device, in particular a front end of the telescopic ram, may have a button element, a proximity switch or an electrical contact in order to identify contact of the inner conductor contact element or an impending collision of the inner conductor contact element with the preloading device or with the telescopic ram. If a collision is identified or a collision is impending, the preloading device, in particular the telescopic ram, can ultimately be removed from the displacement path of the inner conductor contact element.

In one embodiment of the press-in module, it may be provided that the advancing device and/or the feed device are designed to press a front end, which has been prefabricated with an inner conductor contact element, of a second electrical cable along the advancing direction and/or the feed direction into a corresponding second slot of the housing assembly.

This is preferably performed after the first cable has been pressed into its setpoint position.

It may however also be provided that a second advancing device presses in the second cable while the first cable is being pressed in or after the first cable has been pressed in.

It may also be provided that two advancing devices are provided with a common drive, wherein the drive firstly drives the first advancing device in order to press in the first cable and subsequently drives the second advancing device to press in the second cable.

In the context of an automatic plug connector assembly process, it is in particular also the case that the transport of the cable proves to be complex. Particularly problematic here is the feed of the cable into a processing module for fitting the cable sheath of the cable with plug connector components (for example into one of the abovementioned fitting modules), because a relatively high force is sometimes required to push the cable into the plug connector components. At the same time, there is the problem of removing the cable fitted with the plug connector components from the fitting module again without colliding with the transport units of a transport module, and subsequently inserting said cable into and removing it from further processing modules.

In one advantageous refinement of the invention, it may therefore be provided that the feed device has a first transport module and a second transport module, wherein the first transport module is designed to transport the cable end along the feed direction into one of the processing modules for processing the cable end or to transport said cable end counter to the feed direction out of the processing module.

The feed device may in particular also have any features that are described in German patent application DE 10 2019 128 918.1, the disclosure content of which is fully integrated into this patent application by the present reference.

The transport modules may each be designed to transport exactly one electrical cable. However, the transport modules may also be designed to transport exactly two electrical cables (or even more cables). In particular, if the plug connector has multiple electrical cables, the transport modules may then be designed to transport a corresponding number of electrical cables.

If more than one electrical cable is provided or is to be processed by a respective processing module, it may be provided that the transport modules transport the cables adjacent to one another simultaneously. However, simultaneous transport may also be provided in the case of which the cables are axially offset from one another at the end side. The cables may furthermore optionally also be transported successively, but this is less preferred.

Where "the" electrical cable or "an" electrical cable is referred to above or below in the context of the feed device, this is not to be understood as limiting, but is intended merely to improve readability. In principle, all refinements and variants of the invention described below may relate to exactly one electrical cable, to exactly two electrical cables or to even more electrical cables, even if this is not explicitly stated.

The second transport module is preferably arranged at a position spaced apart from the first transport module in the feed direction and designed to transport the cable end along or counter to the feed direction.

The second transport module may preferably be driven independently of the first transport module. However, the second transport module may optionally also be movable in a synchronized manner with the first transport module.

Advantageously, owing to the use according to the invention of two drivable transport modules, the flexibility in the transport of the electrical cable or in the feed of the cable section to be processed into a respective processing module can be improved. Here, the electrical cable may be transported by both transport modules simultaneously, but preferably by the first transport module or the second transport module selectively. Here, the transport of the cable can be ideally matched to the type of processing of the cable section or to the processing module.

The first transport module has transport units which can be fed to the cable, which transport units are repositionable such that plug connector components applied to the cable end, which is to be processed, of the plug connector can pass through the first transport module while the second transport module is transporting the cable.

The transport units of the first transport module may be capable of being fed in the direction of the central axis of the cable.

In particular, the second transport module may impart the transport of the cable if onward transport by the first transport module is no longer possible owing to an impending collision of the first transport module with a plug connector component. The transport units of the first transport module can then be repositioned and thus removed from the displacement path of the plug connector component.

In one advantageous embodiment of the feed device, it may be provided that the transport units are opened radially in relation to the central axis of the cable in order to allow the plug connector components to pass.

Preferably, exactly two transport units are provided, which can each be fed towards one another in the direction of the central axis of the cable. In the case of the transport units having been closed or having performed the feed movement, the cable can thus run between the transport units.

In principle, yet further transport units may also be provided, for example a total of three transport units, four transport units or even more transport units.

In one embodiment of the feed device, it may be provided that the transport units are designed as drivable transport rollers which are able to guide the cable tangentially between them.

Preferably, exactly two transport rollers are provided, between which the cable runs.

The transport rollers may have a roughened surface in order to increase the friction between the transport roller and the cable. The transport rollers may furthermore, along the circumference, comprise notches or a negative form of a cable sheath section in order to improve the guidance of the cable.

If the first transport module is provided for the joint transport of more than one cable, for example for the transport of two cables, the cables can run axially offset through the transport rollers along the axis of rotation of the transport rollers. The transport rollers may optionally have a notch or a negative form of the cable sheath for each of the cables, in particular also in order to prevent axial slippage of the cables and in order to specify a defined spacing between the cables.

If the first transport module is provided for the joint transport of more than one cable, for example for the transport of two cables, it is also possible for dedicated transport units, for example transport rollers, to be provided for each of the cables (in particular two transport rollers per cable). The transport rollers may be arranged coaxially with respect to one another, wherein the spacing and the axial length of the transport rollers may be determined such that a defined spacing between the cables is specified. The transport rollers of the various cables may be designed to transport the cables synchronously or in each case individually.

The transport rollers are preferably drivable, whereby the cable can be moved linearly along or counter to the feed direction by a rotational drive movement of the first transport module. The transport module can thus be designed as a roller conveyor device.

The transport module may however also be designed as a belt conveyor device with one or more transport units designed as transport belts, or as a gripper device with one or more transport units designed as grippers. However, a roller conveyor device with exactly two transport rollers is preferably provided.

In one embodiment of the feed device, it may be provided that the second transport module has a linear drive in order to transport the cable section to be processed along or counter to the feed direction.

The linear drive of the second transport module may for example have a rail system.

In one embodiment of the feed device, it may be provided that the second transport module has clamping bodies that can be fed in the direction of the central axis of the cable.

Preferably, two clamping bodies are provided which can be fed towards one another in the direction of the central axis of the cable. The clamping bodies can thus receive the cable between them.

It can thus be provided that the second transport module is able to transport the cable together with the clamping bodies fed to the cable linearly in the direction of the first transport module or to the processing module (or in the opposite direction).

In principle, however, any number of clamping bodies may be provided, for example also three clamping bodies, four clamping bodies or even more clamping bodies.

In one embodiment of the advancing device, it may be provided that the clamping bodies are designed as roller bodies which are able to guide the cable tangentially between them.

Preferably, exactly two roller bodies are provided, between which the cable runs tangentially.

The roller bodies may have a roughened surface in order to increase the friction between the roller body and the cable. The roller bodies may furthermore, along the circumference, comprise notches or a negative form of a cable sheath section in order to improve the guidance of the cable.

If the second transport module is provided for the joint transport of more than one cable, for example for the transport of two cables, the cables can run axially offset through the roller bodies along the axis of rotation of the roller bodies. The roller bodies may optionally have a notch or a negative form of the cable sheath for each of the cables, in particular also in order to prevent axial slippage of the cables and in order to specify a defined spacing between the cables.

If the second transport module is provided for the joint transport of more than one cable, for example for the transport of two cables, it is also possible for dedicated clamping bodies, for example roller bodies, to be provided for each of the cables (in particular two roller bodies per cable). The roller bodies may be arranged coaxially with respect to one another, wherein the spacing and the axial length of the roller bodies may be determined such that a defined spacing between the cables is specified.

In one advantageous embodiment of the feed device, it may be provided that the roller bodies can be blocked by a brake unit in order to selectively fix the cable in the feed direction between the roller bodies in a blocked state or mount said cable so as to be movable in the feed direction in a released state.

The roller bodies or clamping bodies of the second transport module can thus be used selectively for the fixing or for the—as far as possible force-free—tangential guidance of the cable.

The roller bodies of the second transport module are preferably not drivable.

If the roller bodies are blocked by the brake unit, it is possible to transport the cable using the linear drive of the second transport module along or counter to the feed direction. If the roller bodies are not blocked, or are released, by the brake unit and can therefore rotate freely, transport through the first transport module is however possible.

Multiple roller bodies may be capable of being blocked jointly or in each case individually by the brake unit. Preferably, all roller bodies are capable of being blocked jointly. In principle, any number of brake units may be provided, for example one brake unit for each roller body. However, one common brake unit for all roller bodies may also be provided.

In one embodiment of the feed device, it may be provided that the first transport module is arranged closer to the processing module (in particular on a processing tool of the processing module) in the feed direction than the second transport module, wherein the first transport module is preferably arranged directly adjacent to the processing module (in particular on a processing tool of the processing module).

The first transport module may preferably be arranged as close to the processing module in the feed direction as is technically practicable.

By virtue of the fact that the first transport module is arranged closer to the processing module, preferably as close as possible or directly adjacent to the processing module, in the feed direction, the first transport module can—if necessary—insert the cable into the processing module (or move said cable out of the processing module again) even with very high forces, without for example causing a kink in the cable. In particular, it may thus be advantageous to shorten the spacing or the cable length between the first transport module and one or more tools of the processing module.

In one advantageous embodiment of the feed device, it may be provided that at least one guide device, which is spaced apart from the first transport module and from the second transport module in the feed direction, is provided for guiding the cable.

For example, a first guide device may be provided which, in the feed direction, is arranged in front of the second transport module (that is to say is spaced apart further from the processing module than the second transport module) in order to support the cable, for example in an insertion region of the feed device.

For example, a second guide device may also be provided between the first transport module and the second transport module. This allows the cable to be advantageously supported between the two transport modules.

For example, a third guide device may furthermore be provided between the first transport module and the processing module in order to additionally support the cable as it is inserted into or moved out of the processing module. Preferably, however, no guide device is provided between the first transport module and the processing module, in order to further reduce the spacing between the first transport module and the processing module.

The guide device may have freely rotatable rollers or spherical bodies in order to mount the cable in as far as possible force-free or friction-free fashion.

The use of a feed device with the described two transport modules together with a fitting module (in particular with the multiple fitting module and/or the single fitting module) is very particularly suitable because the fitting of the cable with one or more plug connector components generally requires relatively exact guidance of the cable with simultaneously high insertion forces for pushing the cable into the plug connector components.

Owing to the high flexibility through the use of two mutually independently configured transport modules, it is possible in particular for the first transport module to be highly suitable for guiding the cable with the cable section to be processed or with the corresponding cable end through plug connector components that are to be applied to the cable sheath, for which high forces may be necessary, in particular if the passage bores are small in relation to the diameter of the cable sheath (as is naturally the case with seals, for example). By dividing the transport task between two transport modules, it is possible to arrange the first transport module as close as possible to the assembly module, whereby kinking and incorrect positioning while the cable is being inserted into the plug connector components can be prevented.

The feed device with the two transport modules is also advantageously suitable for fitting the cable with a sheath clamp that is preferably independent of the plug connector, for example by means of a fitting unit to be described below.

The fitting unit may in particular also have any features that are described in German patent application DE 10 2019 119 726.0, the disclosure content of which is fully integrated into this patent application by the present reference.

In one refinement of the invention, it may be provided that the apparatus has a fitting unit which is provided and designed to fasten a sheath clamp, which is independent of the plug connector to be assembled on the cable during the assembly process, to the cable (in particular to the cable sheath of the cable) in non-positively locking fashion at a defined axial position along the central axis or longitudinal axis of the cable.

In the context of the invention, the fitting unit may also be referred to as a processing module, and may preferably be encompassed by the first module group.

The sheath clamp is independent of the plug connector that is to be assembled on the cable in the course of the plug connector assembly process. In particular, the sheath clamp is therefore not a plug connector component that is later part of the plug connector.

In principle, any number of sheath clamps may be provided, for example one sheath clamp at each cable end, in order to be able to advantageously identify the cable at both cable ends. However, even more sheath clamps may be provided, which are distributed along the longitudinal axis or central axis of the cable on the cable sheath. The sheath clamps may also serve to block, in non-positively locking fashion, the displacement path of plug connector components that have been applied to the cable sheath of the cable.

The sheath clamp may preferably be a clamp for holding objects together in non-positively locking fashion.

The sheath clamp may have a clamping region for fastening to the cable sheath. The clamping region may for example have two or more clamping jaws, for example clamping jaws composed of a plastic, for example rubber. The clamping region may optionally also have one or more claws in order to further strengthen the fastening to the cable sheath. However, the use of claws is not preferred owing to the associated impairment of the cable sheath.

The sheath clamp may also have an actuation region. The actuation region can in particular be actuated by a user or by a module for handling and/or fastening the sheath clamp. In particular, the actuation region may serve to at least partially open the sheath clamp—preferably counter to a spring force for closing the sheath clamp—for the purposes of fastening to the cable sheath of the cable.

The sheath clamp may preferably have two clamping limbs which are connected to one another in a central section, wherein the first ends of the clamping limbs form the actuation region and the second ends of the clamping limbs form the clamping region. At the connection region of the two clamping limbs, there may be arranged a spring which presses the two clamping limbs with their respective second ends together.

In principle, the sheath clamp may have any structure. The sheath clamp may for example also have one or more elastic fastening rings or be composed of one or more elastic fastening rings. For example, an elastic fastening ring may be formed from a plastic, preferably rubber (in the manner of a rubber seal), in order to be clamped in non-positively locking fashion on the cable sheath. Resilient, part-ring-shaped fastening rings, for example composed of a metal, may also be provided.

Furthermore, the sheath clamp may for example also be of magnetic form. For this purpose, the sheath clamp may for example have two half-shells that are magnetically connectable to one another.

If at least one sheath clamp is fastened to the cable sheath of the cable, there are various resulting advantages in the plug connector assembly process, in particular in the handling and identification of the cable during the processing by the mutually independent processing modules.

The fitting unit may additionally be designed to remove the sheath clamp(s) from the cable again after the processing by at least one of the processing modules. However, a separate processing module may also be provided for this purpose.

If the sheath clamp has one or more fastening rings or irreversibly closed lashing elements, these can be cut open where necessary. However, the sheath clamp is preferably removed from the cable in a non-destructive manner.

In principle, however, provision may also be made for at least one of the sheath clamps not to be removed and, for example, to be delivered together with the fabricated electrical cable.

The at least one sheath clamp is preferably assigned to the cable throughout the entire fabrication process.

In one embodiment of the invention, it may be provided that one of the processing modules is designed as a sensor module for measuring and/or checking the cable, the cable components, the plug connector and/or the plug connector components. The sensor module may preferably be encompassed by the first module group and/or by the fifth module group.

In the course of the plug connector assembly process, an inner conductor or multiple inner conductors of the cable is or are generally connected to corresponding inner conductor contact elements, for example socket contacts. Subsequently, the electrical inner conductors provided with inner conductor contact elements are inserted into corresponding receptacles of a housing component of what will later be the plug connector (for example into the already mentioned contact part carrier) and latched into the receptacles. A so-called primary latching means (also referred to as "primary securing means") is generally provided for this purpose. Before the electrical cable is subsequently processed further, it is important to ensure that the inner conductor contact elements have been inserted into the receptacles or into the housing component as far as their intended axial end position and that they have been properly primarily latched.

In the course of the conventional manual plug connector assembly process, this check is generally performed by attempting to close a so-called secondary securing means. A secondary securing means is generally designed such that it can be closed only when the inner conductor contact elements are situated in their axial end position and/or have been properly latched by the primary latching means. Thus, if the secondary securing means can be operated properly, it is demonstrated to the technician that the inner conductor contact elements are situated in their axial end position.

However, this type of check of the axial end position of the inner conductor contact elements has only limited suitability for fully automated cable fabrication.

The proposed sensor module may preferably have the features to be described below. In principle, the sensor module may however also have alternative features and/or additional features.

The sensor module may in particular also have any features that are described in German patent application DE 10 2019 108 322.2, the disclosure content of which is fully integrated into this patent application by the present reference.

In one refinement of the invention, it may be provided that a sensor module is provided and configured to detect an axial actual position of at least one inner conductor contact element, which is fastened to one of the inner conductors of the cable, within a contact part carrier of the plug connector relative to an intended axial end position.

In the context of the invention, any number of inner conductor contact elements may be provided, which are connected to a corresponding number of electrical conductors or inner conductors of the electrical cable. Correspondingly, the sensor module may be designed to detect an axial actual position of an inner conductor contact element, two inner conductor contact elements or even more inner conductor contact elements.

A detection of the actual position relative to the end position may, in the context of the sensor module, relate to the detection of an (analogue or digital) numerical value. The detection of the actual position relative to the end position may however also relate to the binary states "actual position corresponds to the end position" and "actual position does not correspond to the end position".

In one advantageous embodiment of the sensor module, it may be provided that the sensor module has an actuation means in order to actuate a secondary securing means which is provided for securing a primary latching means of the inner conductor contact element.

A secondary securing means, in particular also known by the term "Terminal Position Assurance" (TPA), is generally a blocking element, which is displaceable in the radial direction through the plug connector housing or through the contact part carrier, for the primary latching means. In the case of a latched primary latching means, the secondary securing device can be displaced through a recess of the contact part carrier in the direction of the longitudinal or central axis of the contact part carrier in order to block the closed primary latching means in positively locking fashion.

The actuation means may be designed to perform a linear stroke for the actuation of the secondary securing means. An eccentric solution may also be provided.

In one embodiment of the sensor module, it may be provided that the sensor module is connected to the actuation means via a signal path and is configured to transmit an actuation signal to the actuation means when the sensor module has detected a correspondence between the actual position and the end position, and wherein the actuation means is configured to operate the secondary securing means when the actuation signal is received.

Further processing of the electrical cable can thus advantageously be performed if the sensor module has determined that the inner conductor contact elements have been pushed into the contact part carrier to a sufficiently great depth.

If the sensor module detects that the actual position does not correspond to the end position, provision may be made for the corresponding electrical cable to be sorted out, for example for (manual or automatic) reworking.

In one embodiment of the sensor module, it may be provided that the sensor module is configured to detect the position of a front, free end of the at least one inner conductor contact element within the contact part carrier.

In particular, the front position of the at least one inner conductor contact element can be easily detected by measurement. Alternatively, however, provision may also be made for a rear end, facing away from the front end, of the inner conductor contact element to be detected, or a region situated between the two ends, for example a region for latching with the primary latching means (for example a groove or a recess in the inner conductor contact element).

In one variant, it may be provided that the axial end position corresponds to the position of the front, free end of the inner conductor contact element when the inner conductor contact element has been fully latched with the primary latching means.

In general, the primary latching means is positioned or aligned such that it latches with the at least one inner conductor contact element when this is situated in the axial end position. It is however also possible for an axial position of the inner conductor contact element that differs from this within the contact part carrier to be provided in the context of the sensor module as the intended axial end position.

In one embodiment of the sensor module, it may be provided that the sensor module is configured to separately detect the actual position of at least two inner conductor contact elements.

It is preferable for the position of each inner conductor contact element within the contact part carrier to be detected by means of the sensor module. It may however also be provided that only some of the inner conductor contact elements are checked by means of the sensor module with regard to whether the axial end position has been reached.

To detect the actual position of the at least one inner conductor contact element, the sensor module may have one or more sensors. A respective sensor is preferably provided for detecting the actual position of each inner conductor contact element.

In this context, it should be pointed out that the term "sensor" is not limited to sensors, but rather encompasses all elements and means that can contribute to the detection of the axial actual position.

In one embodiment of the sensor module, it may be provided that the sensor module has a tactile sensor, preferably a measuring probe or a force transducer, which is insertable through a front opening of the contact part carrier, which front opening is provided for the insertion of a mating contact element.

Since the inner conductor contact elements are provided for making contact with what will later be a mating plug connector, they are generally conveniently accessible via a front opening in the contact part carrier, which can be advantageously utilized for the detection of the actual position by the sensor module. In particular, the front end, facing toward the front opening of the contact part carrier, of the inner conductor contact element can be advantageously detected in this way.

For example, through the use of a measuring probe, a front end face of the inner conductor contact element can be detected in a tactile and damage-free manner.

Provision may also be made to carry out a compressive check or tensile check by means of a force transducer in order to ascertain whether the primary latching means has sufficiently latched with the respective inner conductor contact element. Correct latching of the primary latching means with the respective inner conductor contact element allows conclusions to be drawn indirectly regarding the axial actual position or, in particular, whether the actual position corresponds to the intended end position. If the inner conductor contact element can be pushed out of the contact part carrier, then the latching was not sufficient, and the inner conductor contact element was not situated in its axial end position. If a force transducer is used, or in the course of a compressive or tensile check, it should however be ensured that the inner conductor contact element is not damaged.

In one embodiment of the sensor module, it may be provided that the sensor module has an optical, inductive or capacitive sensor in order to contactlessly detect the actual position of the at least one inner conductor contact element within the contact part carrier.

For example, a detection of the axial actual position of the inner conductor contact element may be performed by means of a camera and/or a laser system for distance measurement through the front opening of the contact part carrier. Optical detection through one or more recesses in the contact part carrier or through corresponding vision windows in the contact part carrier may also be provided.

In principle, it is also possible for different types of sensors to be combined for the detection of a single inner conductor contact element or for the detection of multiple inner conductor contact elements. Tactile, optical, inductive and/or capacitive sensors may be provided in any combinations.

The feed device may preferably be designed to feed the contact part carrier to the at least one inner conductor contact element.

The sensor module may preferably be integrated in the assembly module for assembling the contact part carrier or be arranged directly downstream of the assembly module for assembling the contact part carrier along the transport direction.

In one embodiment of the invention, it may be provided that one of the processing modules is designed as a quality monitoring module for quality monitoring of the processing of the cable end. The quality monitoring module may preferably be encompassed by the fifth module group.

The quality monitoring module may have the features to be described below. In principle, the quality monitoring module may however also have alternative features and/or additional features.

The quality monitoring module may in particular also have any features that are described in German patent application DE 10 2019 119 725.2, the disclosure content of which is fully integrated into this patent application by the present reference.

In one refinement of the invention, it may be provided that a quality monitoring module for quality monitoring of the processing of the cable end is provided, having at least one optical sensor which is designed to detect the state of the cable end before and/or after the processing by at least one of the processing modules.

By virtue of the fact that optical quality monitoring is provided to detect the quality state or the processing state of the cable optically, in particular by capturing and evaluating one or more optical images of the cable end to be processed, the quality monitoring module can advantageously be used to monitor various quality features. An adaptation of the quality monitoring module may be advantageously possible in particular in the context of a modular apparatus in which, for example, the processing modules are also of modular construction.

In one embodiment of the quality monitoring module, a first optical sensor and/or a second optical sensor may be provided, the lines of sight of which are aligned with the cable end.

The optical sensors are preferably designed as cameras, preferably as electronic cameras.

In one advantageous embodiment of the quality monitoring module, a first lighting unit may be provided, which is arranged behind the cable end along the line of sight of the first sensor in order to generate transmitted light for the detection of the state of the cable end, and/or a second lighting unit may be provided, which is arranged in front of the cable end along the line of sight of the second sensor in order to generate incident light for the detection of the state of the cable end.

In one embodiment of the quality monitoring module, it may be provided that the second optical sensor is arranged so as to be offset by a defined angle, preferably is arranged so as to be offset by 10° to 170°, particularly preferably is arranged so as to be offset by 45° to 135°, furthermore preferably is arranged so as to be offset by 80° to 100°, and very particularly preferably is arranged so as to be offset by 90°, with respect to the first optical sensor.

In one embodiment of the quality monitoring module, it may be provided that the quality monitoring module has a rotation device which is designed to rotate the first optical sensor, the second optical sensor, the first lighting unit and/or the second lighting unit about a central axis of the cable during the detection of the state of the cable end and/or to rotate the cable about the central axis while the first optical sensor and/or the second optical sensor detects the state of the cable end.

The rotation device may for example have an electric motor, in particular a servomotor or a stepper motor, in order to generate the relative rotational movement between the cable end and the sensor or sensors.

In one embodiment of the quality monitoring module, the control unit of the quality monitoring module may be configured to evaluate the state of the cable end on the basis of the captured optical data.

The quality monitoring module may also have yet further sensors in order to monitor the quality of the at least one cable end, for example tactile, inductive and/or capacitive sensors. Furthermore, an electronic function check of plug connector components and/or of the fully assembled plug connector may also be provided in the context of the quality monitoring.

In one refinement of the invention, it may be provided that the cable, a sheath clamp fastened to the cable, and/or a workpiece carrier assigned to the cable during the processing thereof, has an information carrier for identification purposes, and wherein documentation of the assembly of the plug connector for processing by at least one of the processing modules is assigned to the cable by means of the information carrier.

The documentation of the processing of the cable is preferably assigned taking into consideration information imprinted onto or into the information carrier.

The documentation may in particular be performed in the context of a documentation module. The documentation module may preferably be encompassed by the first module group.

The documentation module may in particular also have any features that are described in German patent application DE 10 2019 119 723.6, the disclosure content of which is fully integrated into this patent application by the present reference.

One or more of the control units and/or the control device may be provided for the assignment of the documentation.

In one embodiment of the invention, it may be provided that one of the processing modules is designed as a cleaning module. The cleaning module may preferably be encompassed by the fifth module group.

It is known that contaminants, in particular particles in a wide variety of forms, arise during the processing of electrical cables in the course of the plug connector assembly process, which contaminants ultimately remain to a certain degree on the cable, on the plug connector components and/or in the production installation. In order to ensure sufficiently high quality of the plug connectors and to be able to exclude sources of defects in the finished product (for example short circuits owing to metallic particles, mechanical blockages and leaks, etc.), it is necessary to reduce the ingress of particles and to use the so-called technical cleanliness as a quality feature in the course of the fabrication of electrical cables.

For this purpose, the cleaning module may preferably have the features to be described below. In principle, the cleaning module may however also have alternative features and/or additional features.

The cleaning module may in particular also have any features that are described in German patent application DE 10 2019 119 453.9, the disclosure content of which is fully integrated into this patent application by the present reference.

In one refinement of the invention, it may be provided that a cleaning module is positioned downstream of at least one of the processing modules, which cleaning module is designed to remove particles adhering in the region of the cable end.

In the context of the invention, particles may include inter alia metallic particles, nonmetallic particles, fibers (in particular plastics fibers), pieces of foil (of a metallic foil, of a non-metallic foil or of a composite foil) and dust particles. A powdered mineral, for example talc, can also be regarded as particles in the context of the invention. The cleaning module can in particular advantageously remove particles or fibers composed of metal chips, resins, plastics, minerals or dust.

The cleaning module can advantageously establish technical cleanliness in the course of the plug connector assembly process or the fabrication of an electrical cable, in particular in the course of an automated or fully automated plug connector assembly process.

If the cleaning process is performed after at least one processing operation, preferably a mechanical processing operation, by one of the processing modules, it is possible in particular for the direct contamination, which first arises during the manufacturing process, to be removed. However, the so-called indirect contamination from the environment, for example the ambient air or the transport and the handling of the cable or of the plug connector components, can also be removed.

In one advantageous embodiment of the cleaning module, it may be provided that the cleaning module comprises a nozzle, preferably a ring nozzle, which is designed to blow off the particles.

For example, a flat jet nozzle may also be provided.

It is also possible for multiple nozzles to be provided. For example, multiple ring nozzles may be aligned coaxially with one another and form an air channel for blowing off the particles.

The electrical cable may be capable of being fed to or into the nozzle, for example by means of an adjustable gripping device or the feed device. Alternatively, or in addition, the nozzle, for example the ring nozzle, may also be capable of performing a feed movement. The electrical cable may for example be capable of being guided through the ring nozzle during the blowing-off process in order to guide the air jet axially over the surface of the cable in order to remove as far as possible all particles.

In one embodiment of the cleaning module, it may be provided that the cleaning module has a suction-extraction device.

A suction-extraction device with one or more suction-extraction channels may be provided. A suction-extraction device with a ring-shaped suction-extraction nozzle may also be provided.

In one embodiment of the cleaning module, it may be provided that the cleaning module has one brush or more brushes, preferably two brushes or more brushes, particularly preferably three brushes or more brushes, and very particularly preferably four brushes or even more brushes, which are arranged so as to be distributed radially around that end of the electrical cable which is to be processed, in order to brush off the particles.

The brushes are preferably drivable.

In one embodiment of the cleaning module, provision may be made, irrespective of the type of cleaning process performed by the cleaning module, to rotate the electrical cable, in particular about the central axis of the electrical cable, during the processing or during the cleaning process. Provision may also be made for the cleaning module or components of the cleaning module, for example a nozzle, suction-extraction device or brush, to be rotated about the electrical cable.

In one embodiment of the cleaning module, it may be provided that the cleaning module has an ionizer in order to supply ionized air to the cable end.

The ionizer may be advantageous in particular in conjunction with a nozzle for blowing off the particles. The ionizer may for example be arranged such that the generated ionized air is entrained by the air flow generated by the nozzle for the blowing-off action, and is thus conducted onto the cable. For example, an ionizer combined with a nozzle may also be provided.

In one embodiment of the cleaning module, it may be provided that the cleaning module has a vibrator in order to set the cable end in vibration in a defined manner.

The vibrator may lie directly against the electrical cable or grip the electrical cable by means of a gripping device connected to the vibrator in order to transmit the vibrations to the cable.

The invention furthermore also relates to a method for assembling an electrical plug connector on a first cable end and/or on a second cable end of an electrical cable which has one or more inner conductors, in which method the cable is processed by at least two processing modules of at least one common module group. A feed device feeds the cable end along a feed direction to a processing station in the module group. A module transport device of the module group feeds in each case one of the processing modules for processing the cable end to the processing station. After the processing, the cable end is removed from the module group again counter to the feed direction.

It may be provided that the method described above and below is performed using the apparatus already described.

In one refinement of the invention, it may be provided that at least one control unit controls and/or monitors the processing of the cable by at least one module group and/or one of the processing modules.

In one refinement of the invention, it may be provided that the feed direction deviates from a module transport direction along which the module transport device feeds the processing modules of the module group to the processing station, preferably runs substantially orthogonally and particularly preferably orthogonally with respect to the module transport direction.

In one advantageous refinement of the invention, it may be provided that the module transport device feeds the processing modules of the module group successively to the processing station.

In one refinement of the invention, it may be provided that the module transport device moves the processing modules of the module group simultaneously in a coupled movement.

In one refinement of the invention, it may be provided that one of the processing modules of the module group is firstly fed to the processing station before the cable end is fed to the processing station.

In one refinement of the invention, it may be provided that at least one of the processing modules of the module group has a processing tool that is fed to the cable end after the processing module and the cable end have been fed to the processing station.

In one refinement of the invention, it may be provided that a common transport device transports the cable along a transport direction between multiple module groups or between at least one module group and at least one individual processing module.

In one refinement of the invention, it may be provided that the at least two processing modules and/or the module groups are clocked in a synchronized manner.

It is preferable for all processing modules to be clocked in a synchronized manner.

In one advantageous refinement of the invention, it may be provided that the control unit, for the processing of the single-core cable, determines an actual alignment and a setpoint alignment of a plug connector component, which has been assembled on the second cable end, of a second plug connector, and wherein the first cable end is aligned in order to approximate the actual alignment to the setpoint alignment.

In one advantageous embodiment, it may be provided that, for the processing of the single-core cable, the setpoint alignment of the plug connector component of the second plug connector is determined by the control unit taking into consideration an assembly alignment of a plug connector component, which is to be assembled on the first cable end, of a first plug connector and an intended setpoint twist between the first plug connector and the second plug connector.

The assembly alignment is preferably identical for all electrical cables of a cable series to be fabricated.

The setpoint twist between the first plug connector and the second plug connector is preferably identical for all electrical cables of a cable series to be fabricated.

In the context of the invention, an assembly alignment is to be understood in particular to mean a radial alignment of the plug connector component along the central axis or longitudinal axis of the cable.

In general, the assembly alignment of plug connector components to be assembled and/or of a plug connector to be assembled is technically specified or at least known in the context of an automated fabrication process or of an apparatus for fabricating an electrical cable. In general, the plug connector components or the plug connector are for example firmly clamped, in particular fixed in twist-proof fashion, in the assembly alignment. This applies in particular in the case of asymmetrical plug connector components, the alignment of which is relevant for the fastening on the cable, for example to the inner conductor(s) or in the course of the fastening to further plug connector components.

The above definitions of the assembly alignment apply equally to the fabrication of the single-core cable and to the fabrication of the multicore cable.

A process-related orientation or determination of the setpoint alignment in accordance with the assembly alignment can thus be provided in an advantageous manner. Since the assembly alignment of plug connector components to be assembled on the cable ends generally also determines the alignment of what will later be the plug connector, it may be advantageous to take the assembly alignment into consideration in the determination of the setpoint alignment.

Through the alignment of the first cable end (in particular by the alignment module) and the twisting, associated therewith in the course of the single-core cable fabrication process, of the plug connector component of the second plug connector that has been assembled on the second cable end, it is possible, in the case of a known or defined assembly alignment of the plug connector component of the first plug connector that is to be assembled on the first cable end, for a desired and specified setpoint twist between what will later be the plug connectors to be advantageously specified.

The setpoint alignment for the fabrication of the single-core cable can thus be determined by the control unit such that said setpoint alignment results from the assembly alignment plus (or minus) the intended setpoint twist between the two plug connectors.

In the course of the processing of the single-core cable, it may be provided in particular that an inner conductor contact element of the second plug connector is fastened in twist-proof fashion in a first orientation to the second cable end, following which the first cable end is then processed in order to fasten an inner conductor contact element of the first plug connector in twist-proof fashion. After the fastening of the inner conductor contact element to the second cable end and before the fastening of the inner conductor contact element to the first cable end, the control unit may preferably firstly detect or determine the actual alignment of the second inner conductor contact element of the second cable end, and determine the setpoint alignment thereof on the basis of the intended setpoint twist between the two inner conductor contact elements in order to align the first cable end accordingly (simultaneously taking into consideration the assembly alignment of the inner conductor contact element of the first plug connector).

In one advantageous embodiment, in the course of the processing of the single-core cable, it may be provided that the inner conductor contact element of the first plug connector is fastened in twist-proof fashion to the first cable end after the alignment of the first cable end. In this way, the setpoint twist between the two inner conductor contact elements with respect to one another can be advantageously fixedly specified.

The setpoint twist between the two inner conductor contact elements or plug connector components may in particular correspond to the special cases of 22.5°, 45°, 60°, 90°, 120°, 180°, 240° and 300°. In principle, however, the setpoint twist between the two inner conductor contact elements or plug connector components may assume any value.

In particular, for the single-core cable, it may be provided that the first inner conductor contact element and/or the second inner conductor contact element is cohesively fastened to the inner conductor end emerging from the associated cable end. In particular, a cohesive fastening of at least one of the inner conductor contact elements may be advantageous, for example if the electrical cable is intended to transmit high currents and has a relatively large cross section. Compression, for example crimping, may however also be provided.

In the course of the fabrication of the single-core cable, provision may also be made for the first inner conductor contact element and/or the second inner conductor contact element to be cohesively fastened to the inner conductor end emerging from the assigned cable end by means of an ultrasound welding process or a resistance welding process. An ultrasound welding process or a resistance welding process has proven to be particularly advantageous for a cohesive fastening.

In one refinement of the invention, it may be provided that the control unit, for the processing of the multicore cable, determines an actual alignment and a setpoint alignment of the inner conductors of the first cable end, and wherein the first cable end is aligned in order to approximate the actual alignment to the setpoint alignment.

In one embodiment of the invention, it may be provided that, for the fabrication of the multicore cable, the setpoint alignment of the inner conductors of the first cable end is determined by the control unit in accordance with the assembly alignment of a plug connector component of a first plug connector to be assembled on the first cable end.

In particular, also with regard to the processing of the multicore cable, the assembly alignment of plug connector components to be assembled on the first cable end is generally specified or at least known. It may accordingly be advantageous to align the first cable end in accordance with the assembly alignment of the plug connector component or of the plug connector components in order to simplify subsequent fabrication steps. Complicated twisting or alignment of the plug connector component(s) in the course of the later assembly steps can hereby optionally be avoided, which can reduce the technical complexity of an apparatus for plug connector assembly and its susceptibility to faults.

For the processing of the multicore cable, the first cable end may thus preferably be aligned in order that the inner conductors can, for example by an axial feed movement of a contact part carrier situated in the assembly alignment, be inserted without the need for the contact part carrier or the cable end to be separately newly oriented in an inter-coordinated manner for this purpose.

In one embodiment of the invention, it may be provided that, for the processing of the multicore cable, the setpoint alignment of the inner conductors of the first cable end is determined by the control unit taking into consideration a color coding of the inner conductors.

In general, the pin assignment of a multicore plug connector is fixedly specified in accordance with a standard, for which reason, in the context of the fabrication of a multicore electrical cable, it is generally the case that defined contacting of the individual inner conductors of the cable with the contacts of the plug connector is of importance. In order to ensure the correct wiring of the plug connector, the inner conductors of a multicore cable are often color-coded, for example by means of differently colored insulations.

It may accordingly be advantageous to align the first cable end such that the color coding of the inner conductors in the setpoint alignment corresponds to a specification (for example red/black from left to right), in particular taking into consideration the assembly alignment of the plug connector component that is subsequently to be assembled on the cable end.

In one embodiment of the invention, it may be provided that, for the processing of the multicore cable, the setpoint alignment of the inner conductors of the first cable end is determined by the control unit taking into consideration an alignment of the inner conductors of the second cable end.

In the course of the processing of the multicore cable, provision may also be made for the alignment of the inner conductors of the second cable end to be taken into consideration in the determination of the setpoint alignment.

For example, in the course of the plug connector assembly process, an approximation, to be described below, of an actual twist to a setpoint twist between inner conductor ends of the inner conductor that emerge from the respective cable ends may be provided. As a result of this subsequent twisting—which is optional in the context of the invention—of the first cable end and/or of the second cable end, it is consequently also the case that the radial alignment of the inner conductors with respect to the longitudinal axis or central axis of the cable also changes. This in turn can make it more difficult to assemble subsequent plug connector components, which may have to be assembled in a defined assembly alignment. Thus, it may optionally be provided that the setpoint alignment is determined already taking into consideration a later twisting of the inner conductor ends of the inner conductors of the two cable ends relative to one another, in order that the alignment of the inner conductors of the first cable end after the twisting corresponds to the assembly alignment of at least one plug connector component that is to be assembled on the first cable end.

For example, it may be provided that the setpoint alignment for the processing of the multicore cable is determined on the basis of the assembly alignment minus (or plus) the intended later twisting of the first cable end and/or of the second cable end, optionally also taking into consideration an elasticity-induced backward twist and/or tolerances.

In one advantageous refinement of the invention, it may be provided that the control unit detects an actual twist and a setpoint twist between ends of the inner conductors that emerge from the respective cable end, wherein the actual twist is approximated to the setpoint twist by virtue of the inner conductors being twisted at at least one of the cable ends, and wherein the twist is fixed by virtue of a contact part carrier of the electrical plug connector that is to be assembled on the associated cable end, which contact part carrier receives the ends of the inner conductors, being fixed to the cable in twist-proof fashion.

In one advantageous embodiment of the invention, it may be provided that the contact part carrier is fixed in twist-proof fashion by virtue of the contact part carrier being pressed onto the corresponding cable end and/or by virtue of a shielding sleeve being assembled in twist-proof fashion on the contact part carrier and subsequently pressed onto the corresponding cable end.

The contact part carrier may thus for example be pressed, preferably crimped, directly onto the corresponding cable end. It may however also be provided that the contact part carrier is only indirectly fastened to the corresponding cable end, for example by virtue of a shielding sleeve being assembled on the contact part carrier, for example pushed on in a specified orientation, and the shielding sleeve subsequently being pressed, preferably crimped, together with the corresponding cable end.

In one embodiment of the invention, it may be provided that the inner conductors are twisted at at least one of the cable ends by virtue of the cable end being rotated.

For example, the cable sheath may be twisted in the region of the cable end by means of an actuator module. Preferably, the contact part carrier may in this case be held in twist-proof fashion, whereby the inner conductors, starting from the respective cable end from which they emerge, twist as far as the region in which they are inserted into the contact part carrier. This changes the relative orientation of the inner conductor ends received in the contact part carrier relative to the inner conductor ends of the opposite cable end, whereby the actual twist can be approximated to the setpoint twist. Twisting of the inner conductors can thus be performed using simple means.

The rotation of the cable end whilst simultaneously fixing the contact part carrier can be advantageous because then the absolute orientation of the contact part carrier in the apparatus for fabricating the cable does not change, which can be advantageous for the (subsequent) plug connector assembly process, for example the pushing-on of a shielding sleeve, in particular in the course of an automated plug connector assembly process. Subsequent method steps or apparatuses/modules can thus be of simpler construction, because they can proceed from a defined, specified orientation of the contact part carrier.

In one embodiment of the invention, it may also be provided that the inner conductors are twisted at at least one of the cable ends by virtue of the contact part carrier being rotated together with the inner conductor ends received in the contact part carrier.

Since the inner conductor ends are received in the contact part carrier, twisting of the inner conductor ends, and an approximation of the actual twist to the setpoint twist, is also advantageously possible by rotation of the contact part carrier. Preferably, the cable sheath may simultaneously be held in twist-proof fashion in the region of the corresponding cable end.

In one embodiment of the invention, it may furthermore be provided that the inner conductors are twisted at at least one of the cable ends by virtue of the shielding sleeve being assembled in twist-proof fashion on the contact part carrier and being rotated together with the contact part carrier and the inner conductor ends received in the contact part carrier.

It may be advantageous to firstly assemble the shielding sleeve on the contact part carrier and subsequently rotate it together with the contact part carrier in order to indirectly also twist the inner conductor ends in order to approximate the actual twist to the setpoint twist. Preferably, the cable sheath may simultaneously be held in twist-proof fashion in the region of the corresponding cable end.

In particular, if the shield sleeve can be assembled on the contact part carrier only in one or two defined orientations, it may be advantageous to initially not rotate the contact part carrier relative to the shielding sleeve, because automated pushing-on of the shielding sleeve in the correct orientation can then be made more difficult. The problem can be avoided by joint rotation of the shielding sleeve and contact part carrier (or twisting of the cable end).

In one variant of the invention, provision may optionally also be made for the shielding sleeve to firstly be fastened to, for example pressed onto, preferably crimped to, the cable end in twist-proof fashion and to subsequently be rotated, and in turn for the contact part carrier to be pushed in a defined orientation into the shielding sleeve proceeding from the front, free end of the shielding sleeve, and at the same time for the inner conductor ends to be inserted into the corresponding receptacles of the contact part carrier. In general, however, this procedure is rather complex to implement and is therefore not preferred. However, the principle may be suitable in special cases.

In one embodiment of the invention, it may be provided that the control unit determines a twist of the two cable ends only if the actual twist of the inner conductor ends at the two cable ends deviates from the setpoint twist by more than 90°.

In general, it can reduce the effort in the cable processing if the actual twist is approximated to the setpoint twist by virtue of only one of the cable ends being twisted in the course of the fabrication of the electrical cable. Since only the relative orientation of the inner conductor ends emerging from the respective cable ends is of importance, a twist of the inner conductor ends at only one cable end may in principle also be sufficient.

However, provision may also be made for the mechanical load on the electrical cable, for example mechanical distortion, resulting from the twisting to be reduced by virtue of the twist being divided between the two cable ends, in particular if a relatively large twist (for example by more than 90°) is necessary.

In one embodiment of the invention, it may be provided that the control unit controls the actuator unit in order to effect the previously determined twist. The actuator unit may be communicatively connected to the control unit.

In one advantageous embodiment of the invention, it may be provided that the control unit takes into consideration an elasticity-related backward twist of the inner conductor ends in the approximation of the actual twist to the setpoint twist.

By virtue of the fact that the electrical cable generally has various elastic components, for example a cable sheath composed of a soft plastic, the twist may possibly at least partially turn back after the twist-proof fixing of the contact part carrier to the cable sheath. In order to ensure that the actual twist still corresponds—optionally within a possible tolerance range—to the setpoint twist even after the twist-proof fixing of the contact part carrier, provision may be made for the inner conductor ends to be twisted further than is specified in principle by the setpoint twist. The actual twist can thus be approximated to the setpoint twist by virtue of the actual twist initially being "overcompensated".

In one embodiment of the invention, it may be provided that the inner conductors run in twisted fashion through the cable and the control unit takes a lay of the inner conductors into consideration for determining the actual twist.

The significant dimension in electrical cables with inner conductors running in twisted or "stranded" fashion through the cable is the so-called "lay" (also referred to as lay length, twist pitch or pitch length). This is the lead or pitch of the helical line that results from the twisting of the inner conductors.

In the case of a known cable length, the actual twist of the inner conductor ends between the two cable ends can be detected, taking into consideration the lay of the inner conductors, if the orientation of the inner conductors at one of the cable ends is known, for example detected by measurement or specified by targeted alignment of the inner conductor ends at one of the cable ends.

In one advantageous embodiment of the invention, it may be provided that the lay is ascertained by measurement or experiment.

It may be advantageous to ascertain the lay by measurement or experiment in order to detect any tolerances in the cable production process that lead to a deviation in the lay (locally or globally). For example, provision may be made for the lay of the "endless cable" wound on a cable reel, from which the cables to be fabricated are unrolled and cut to length, to be detected beforehand, because it can generally be assumed that the lay remains approximately constant within a production unit wound on the cable reel. However, provision may also be made for the lay of the endless cable wound on the cable reel to be detected multiple times or for the lay to be detected separately for each electrical cable that is cut to length.

Optical, inductive, capacitive or other measurement-based detection of the lay may be provided. In particular, test cuts may be made through the endless cable rolled up on the cable reel.

In one advantageous refinement of the invention, it may be provided that a first inner conductor contact element is fastened in twist-proof fashion in a first orientation to the first cable end, following which the second cable end is then processed in order to fasten a second inner conductor contact element in twist-proof fashion, wherein the control unit detects the first orientation and a setpoint twist between the two inner conductor contact elements, and from this ascertains a second orientation for the fastening of the second inner conductor contact element.

In one advantageous embodiment of the invention, in particular in the context of the processing of the single-core cable, it may be provided that the second inner conductor contact element is fastened in twist-proof fashion in the second orientation to the second cable end. In this way, the relative orientation of the two inner conductor contact elements with respect to one another can advantageously be fixedly specified.

Provision may be made for the second inner conductor contact element to be fastened to the second cable end in a specified or defined absolute alignment with respect to the apparatus or the assembly module and for the electrical cable to be correspondingly twisted beforehand in order to achieve the setpoint twist between the two inner conductor contact elements.

Provision may however also be made for the second inner conductor contact element to be fastened already in the corresponding orientation to the second cable end in order to achieve the setpoint twist. For this purpose, it is however necessary for the assembly module to be designed in order to be able to fasten the inner conductor contact element even in the correspondingly twisted alignment. In general, twisting of the electrical cable is easier to realize for this reason.

In one embodiment of the invention, it may be provided that the first inner conductor contact element and/or the second inner conductor contact element are cohesively fastened to an inner conductor end emerging from the associated cable end.

In particular, a cohesive fastening of at least one of the inner conductor contact elements may be advantageous, for example if the electrical cable is intended to transmit high currents and has a relatively large cross section. Compression, for example crimping, may however also be provided.

The first inner conductor contact element and/or the second inner conductor contact element may also be fastened in non-positively locking and/or positively locking fashion to an inner conductor end emerging from the associated cable end. For example, the first inner conductor contact element and/or the second inner conductor contact element may be crimped onto the corresponding inner conductor end, preferably by means of a cable lug or a core sleeve.

In one embodiment of the invention, provision may also be made for the first inner conductor contact element and/or the second inner conductor contact element to be cohesively fastened to the inner conductor end emerging from the assigned cable end by means of an ultrasound welding process or a resistance welding process.

An ultrasound welding process has proven to be particularly advantageous for a cohesive fastening. A resistance welding process may however also be highly suitable for the cohesive fastening.

In one refinement of the invention, it may be provided that the cable is stripped by virtue of the cable being inserted along a central axis into a stripping module in which a rotary head rotates about the central axis, on which rotary head a blade and a counterholder for the cable are arranged opposite one another and so as to be aligned with the central axis, wherein the blade is fed in the direction of the central axis to the cable in order to generate a radial incision in a cable component of the cable at a defined axial position.

In one advantageous refinement, it may be provided in particular that at least one pulling-off tool arranged on the rotary head is fed in the direction of the central axis to the cable in order to engage into the incision generated by the blade, following which a part of the cable component is at least partially pulled off the cable by the pulling-off tool.

According to a particularly preferred embodiment of the invention, it may be provided that the at least one pulling-off tool engages into the incision generated by the blade without the cable being repositioned in the axial direction.

In one embodiment, it may be provided that the part is not completely cut off by the radial incision.

In principle, it may be provided that the blade does not cut radially fully through the cable component, so as not to damage the underlying components of the cable. It may be sufficient to generate merely a specified breaking point, for example an encircling groove, and subsequently to "tear off" the part by means of the at least one pulling-off tool.

In one embodiment of the invention, it may be provided that the rotary head rotates while the blade generates the incision, in order to generate a radially encircling incision.

A radially encircling incision is to be understood in particular to mean that the cable component is incised in encircling fashion such that a ring-shaped section of the cable component or the part can subsequently be pulled off the cable in the longitudinal direction.

In principle, it may be provided that the rotary head rotates continuously during the entire stripping process. It may however also be provided that the rotary head rotates only when the blade is positioned to incise the cable.

It may be provided that the blade is rotated through at least one complete revolution around the cable in order to generate a fully encircling incision. In order to further improve the result, provision may however also be made for the blade to be rotated by more than 360 degrees about the cable. At the same time, the blade may optionally also be fed radially ever further, or fed radially continuously during the rotation of the rotary head.

It is however also possible for only a partially encircling incising operation to be provided, wherein, for example, one or more webs may remain between the individual part-ring-shaped incisions.

In one embodiment of the invention, it may be provided that the rotary head is stationary while the part is pulled off by the pulling-off tool.

In principle, it may however also be provided that the rotary head rotates (further) while the part is pulled off by the at least one pulling-off tool. However, the rotation of the rotary head during the pulling-off is not necessary, arid may possibly also lead to a "misalignment" of the at least one pulling-off tool and thus impart undesired forces and vibrations to the apparatus and/or the cable. For this reason, it is generally provided that the rotary head is stationary during the pulling-off.

In one advantageous embodiment of the invention, it may be provided that the cable is fed linearly along the central axis by the feed device, preferably along the feed direction, before the generation of the incision into the stripping module.

The rotary head may have a central bore through which the cable can advantageously be led. In this way, the length of the part can be set more flexibly, because the front end of the cable can then protrude through the bore. Furthermore, the blade, the counterholder and the at least one pulling-off tool can then be fastened axially closer to the rotary head, which can further reduce the susceptibility of the stripping module to tolerances.

In one advantageous embodiment of the invention, it may be provided that, after the feed movement of the at least one pulling-off tool, the cable is at least partially pulled out of the stripping module again along the central axis counter to the feed direction in order to at least partially pull the part off the cable (partial pulling-off) or completely pull the part off the cable (full pulling-off).

The feed device can thus advantageously also be used for pulling off the part after the at least one pulling-off tool has been fed into the incision or engages into the incision.

In one advantageous refinement of the invention, it may be provided that the control unit detects an actual twist and a setpoint twist between the ends of the inner conductors of the cable at the respective cable ends, wherein an axial length reduction, caused by later approximation of the actual twist to the setpoint twist, of the total length of the cable is calculated by the control unit, and wherein a specified stripping length, along which the inner conductors are to be exposed starting from their ends, at at least one of the cable ends is increased taking into consideration the calculated length reduction in order to at least partially compensate the length reduction.

In one advantageous embodiment of the invention, it may be provided that the specified stripping length along which the inner conductors are to be exposed is increased proportionally for the respective cable end, taking into consideration a defined tolerance.

The stripping length can thus result from the specified stripping length plus a proportional length reduction, +/− the defined tolerance, for the cable end.

It may be provided that the specified stripping length and/or the adapted stripping length of the exposed inner conductors are identical at both cable ends. The specified stripping length and/or the adapted stripping length may however also differ from one another at the two cable ends.

Provision may be made for the length reduction to be taken into consideration by lengthening the specified stripping length at one of the cable ends or at both cable ends. Even if the length reduction is only caused by the twist at one of the cable ends, the required lengthening may optionally be distributed across both cable ends. In general, however, a length reduction is corrected (proportionally) at that end of the cable at which it is (proportionally) caused by the twisting.

The lengthening of the specified stripping length at one of the cable ends may in particular be performed in direct dependence on the respectively intended twist.

The defined tolerance may be decided upon in particular with regard to the cable type to be fabricated and/or the respective plug connector.

In one embodiment of the invention, it may be provided that the length reduction is taken into consideration in order to specify the axial setpoint position of a cable-side end of a housing component, which receives the inner conductors within it, of an electrical plug connector along the central axis of the cable. In other words, the length reduction is taken into consideration for the determination of an axial setpoint position along the central axis of the cable of a cable-side end of a housing component, which receives the inner conductors within it, of an electrical plug connector.

In principle, through the adaptation of the specified stripping length, in addition to the change in length caused by the twisting, other sources of defects or tolerances can also be taken into consideration in order to specify the axial setpoint position for a housing component of the plug connector as exactly as possible.

In one embodiment of the invention, it may be provided that only the intended stripping length of the inner conductors to be exposed at the first cable end is increased if only a twist of the first cable end is intended, or only the intended stripping length of the inner conductors to be exposed at the second cable end is increased if only a twist of the second cable end is intended.

In general, it may be advantageous to compensate for the length reduction directly at the causal cable end, in particular if the axial setpoint position of housing components on the cable is to be corrected. If, by contrast, only the length reduction of the total length of the cable is of importance, it is however also possible for a length reduction caused by twisting of the first cable end to be compensated in the region of the second cable end—and vice versa. However, the respective cable ends are preferably considered individually or separately.

In one embodiment of the invention, it may be provided that both the intended stripping length of the inner conductors to be exposed at the first cable end and the intended stripping length of the inner conductors to be exposed at the second cable end are increased if twisting of both cable ends is intended.

In principle, it may however also be provided that a length reduction caused by twisting both cable ends is taken into consideration by adaptation of the intended stripping length at only one of the two cable ends.

In one refinement of the invention, it may be provided that the cable is fitted with two or more plug connector components of the plug connector starting from one of the cable ends. For this purpose, the plug connector components are preferably arranged individually in chambers such that they form a common channel with a common central axis, following which the cable end of the cable is led with its front end along the central axis through the plug connector components in order to push the plug connector components onto the cable.

Plug connector components can thus advantageously be applied to the electrical cable before the electrical cable is processed further in the course of the plug connector assembly process.

In one embodiment of the invention, it may be provided that the plug connector components are arranged in the chambers such that passage bores, which run through the plug connector components, for receiving the cable are aligned coaxially with one another.

In particular, if the plug connector components are aligned coaxially, the electrical cable can be advantageously led through all of the plug connector components in one continuous movement sequence.

In one advantageous embodiment of the invention, it may be provided that at least one of the plug connector components is pushed onto the cable sheath using a lubricant, preferably an alcohol or a silicone oil.

For example, 2-propanol (also known as isopropyl alcohol or isopropanol) may be used as a lubricant.

However, it is very particularly preferable to use a silicone oil, that is to say a synthetic, silicon-based oil, as the lubricant. For example, a polydimethylsiloxane with a high content of phenyl groups may be used, in particular a silicone oil known under the trade name WACKER® AP 150 from Wacker Chemie AG.

Provision may be made to use a lubricant for the pushing-on of a plug connector component that is already contained in the cable. For example, to form the cable sheath, for example, use is sometimes made of self-lubricating silicones which, after the vulcanization process, exude the oil on the surface. The use of the lubricants, in particular silicone oils, that are already used in any case in the cable for self-exudation is generally harmless in terms of safety.

In principle, any desired lubricant or any desired lubricating substance may be provided for lubrication and thus for reducing the friction during the fitting of the cable sheath with the plug connector components.

For example, liquid lubricants, lubricating greases, solid lubricants or gaseous lubricants may be provided in order to advantageously influence wear, frictional heat and chemical interactions during the leadthrough of the electrical cable through the plug connector components.

Provision may also be made to generate a compressed-air film between the cable sheath and the plug connector component in order to improve the sliding characteristics during the pushing-on of the plug connector components.

It is thus possible, for example, to dispense with an additional lubricant.

In order to generate the compressed-air film, provision may be made to partially enclose the plug connector component with a mould part and to optionally support said plug connector component on the cable sheath. The compressed air can thus preferably flow exclusively (or at least substantially) through the gap between the plug connector component and the cable sheath and thereby widen the cap or generate said gap in the first place. The compressed air can thus advantageously and extremely gently widen a passage bore of the plug connector component. At the same time, an axial displacement of the plug connector component on the cable sheath of the cable can be additionally improved by the air film.

In one advantageous embodiment of the invention, it may be provided that the cable fitted with the plug connector components is removed from the fitting module laterally with respect to the feed direction of the cable or counter to the feed direction of the cable.

For example, it may be provided that the plug connector components are fed to the chambers of the multiple fitting module from above using gravitational force. After the cable has been led through the plug connector components, the electrical cable, together with the plug connector components, can then be pulled out of the multiple fitting module again counter to the feed direction of the cable. Lateral removal or pivoting of the fitted cable out of the multiple fitting module may also be provided.

In principle, provision may be made for the electrical cable to be removed from the fitting module in any desired manner, for example also by means of a predefined movement sequence (for example first upwards and finally further in the feed direction, etc.).

In one embodiment of the invention, it may be provided that a) a retaining cap or an angle cap, followed by a line seal, followed by a socket housing, followed by a shielding sleeve (in particular in the case of a two-core or multicore cable); or b) a retaining cap or an angle cap, followed by a cable retainer, followed by a line seal (in particular in the case of a single-core cable)

are pushed successively onto the cable sheath starting from the front end or the respective cable end of the cable.

The above-stated sequence has proven to be particularly suitable for the fabrication of a single-core or two-core cable.

In one advantageous embodiment of the invention, it may be provided that the correct fitting of the cable sheath is checked after the plug connector components have been pushed on. Provision may also be made to check the integrity of the plug connector components that have been pushed onto the cable.

The check may in particular include a check with regard to the basic presence of one or more plug connector components, the correct sequence of the pushed-on plug connector components, and/or the correct orientation and/or alignment of the plug connector components. An incorrectly fitted cable may for example be excluded from the subsequent plug connector assembly process, labelled or marked as faulty, and/or reprocessed.

It may also be provided, in the context of the fitting by means of the multiple fitting module, to only optionally provide individual chambers of the multiple fitting module with plug connector components, in order to be able to adapt the fitting process to the assembly of different plug connectors and/or to different cable diameters.

It may be provided that an expansion of the plug connector components does not take place during the fitting process. For example, in the context of the invention, provision may be made to omit an expansion gripper for expanding the passage bores of the plug connector components.

In one refinement of the invention, it may be provided that the cable is fitted with an elastic ring body at a defined axial position by virtue of an inclined tube with an end face which is inclined relative to a tube cross section of the inclined tube by an inclination angle being inserted into a passage bore of the ring body, wherein the cable is positioned in the inclined tube such that the ring body is situated at the defined axial position on the cable when the ring body is slipped off from the inclined tube onto the cable.

In one advantageous embodiment of the invention, it may be provided that the ring body is a plug connector component of a plug connector that is to be assembled on the cable, preferably a line seal, or a sheath clamp, which is independent of the plug connector, for fastening to the cable.

The plug connector components may in principle be any elastic components of the electrical plug connector that is to be assembled on the corresponding cable end, which components preferably have a respective passage bore for receiving the cable. The cable can thus be led through the plug connector component.

The elastic ring body is particularly preferably designed as a line seal. In particular, the assembly of a line seal proves to be relatively difficult in the context of the known prior art. According to the known method, provision can for example be made to spread the line seal open at certain points, for example by means of a three-point gripper, but this can damage the line seal.

It may be provided that, in the context of the invention, no expansion of the ring body by an expansion gripper for the purposes of expanding the passage bores of the ring body is performed.

In one advantageous embodiment of the invention, it may be provided that the ring body for the fabrication of a second electrical cable has at least one second passage bore for receiving at least one of the second electrical cables.

In the course of the plug connector assembly process, it is thus also possible to use ring bodies, in particular line seals, which can be pushed onto multiple electrical cables, for example onto a second electrical cable. Such a ring body may be suitable in particular for the assembly of a plug connector which has two or more electrical cables.

The ring body preferably has only a single passage bore for the fabrication of only a single electrical cable or for the assembly of a plug connector which has a single electrical cable. In a likewise preferred variant of the invention, the ring body however has exactly two passage bores for fabricating exactly two electrical cables or for assembling a plug connector which has exactly two electrical cables. In principle, the ring body may however have even more than two passage bores in order to fabricate further electrical cables (or in order to assemble a plug connector which has more than two electrical cables), for example three passage bores or more, four passage bores or more, five passage bores or more, six passage bores or more, seven passage bores or more, eight passage bores or more, nine passage bores or more, ten passage bores or even more passage bores.

The fitting of the cable described above and below may be performed multiple times, for example sequentially or in parallel, if more than one electrical cable is to be fitted with the ring body, in particular with a common ring body. The fitting is preferably performed in parallel, wherein, for example, a corresponding number of inclined tubes are used, which may be of multi-part but optionally also single-part form.

In one embodiment of the invention, it may be provided that the ring body is slipped onto a cable sheath of the cable.

In principle, it may however also be provided that the ring body is slipped onto some other cable component, for example onto a cable shielding braid running under the cable sheath, on a cable foil running on or under the cable shielding braid, onto a filler layer (also referred to as "filler") which guides multiple inner conductors within it, onto an insulation of an inner conductor, and/or onto an inner conductor. In general, however, the ring body is slipped onto the cable sheath of the cable, in particular if the ring body is a line seal or a sheath clamp.

A slipping-off means may advantageously be provided in order to slip the ring body off the inclined tube.

It may however also be provided that the ring body is slipped off onto the cable without the use of a slipping-off means, for example manually by a technician. Slipping off by means of compressed air may optionally also be provided.

In one embodiment of the invention, it may be provided that the ring body is slipped off the inclined tube by axial displacement of a slipping-off means, which runs in part-ring-shaped or ring-shaped encircling fashion around the inclined tube, in the direction of the inclined end face (or the end section) of the inclined tube, wherein the slipping-off means and/or the inclined tube is moved.

If a ring body with multiple passage bores is to be slipped off onto multiple electrical cables simultaneously, provision may be made to use a suitable slipping-off means in order to slip the ring body off onto the multiple cables simultaneously.

The slipping-off means may be, for example, a metallic ring or a plastics ring. The slipping-off means may however also be a wall with a recess for the leadthrough of the inclined tube, whereby the ring body can be slipped off by virtue of the inclined tube being pulled out of the receptacle.

In one embodiment of the invention, it may be provided that the slipping-off means has, at its end facing towards the ring body, a section which tapers in the direction of the ring body, preferably a section which tapers conically in the direction of the ring body.

A (conically) tapering section can assist the slipping-off process, for example by virtue of the section being inserted at least partially between the ring body and the inclined tube and the ring body thus being spread apart yet further slightly, and it is at the same time possible to avoid the ring body being regionally turned inside out and/or misaligned on the surface of the inclined tube.

In one embodiment of the invention, it may be provided that the inclination angle between the tube cross section and the end face of the inclined tube is 10° to 80°, preferably 20° to 70°, particularly preferably 30° to 60° and very particularly preferably 40° to 50°, for example 45°.

The smaller or more acute the inclination angle between the tube cross section and the end face (or the beveled end section) of the inclined tube, the more easily the inclined tube can generally be inserted into the ring body. At the same time, however, provision may however be made to ensure that the inclined tube does not incise the ring body. For this reason, an average inclination angle, for example of 45°, may be preferred.

In one advantageous embodiment of the invention, it may be provided that the end face has a linear or curved profile, preferably a concave profile.

In particular, a concavely curved end face can further assist the pushing-in of the inclined tube into the ring body. In principle, any curved profile of the end face may be provided.

In one embodiment of the invention, it may be provided that the cable is positioned in the inclined tube such that the cable is situated with the defined axial position at the inclined end side of the inclined tube or at one end side of the slipping-off means.

In particular, if the cable and the inclined tube are held unchanged relative to one another while the ring body is being slipped off, the positioning of the cable with the defined axial position at the end side of the inclined tube (in particular at a front end of the inclined tube) can be suitable in order for the ring body to be slipped off in an accurately positioned manner. However, if the position of the cable relative to the inclined tube changes during the slipping-off process, for example by virtue of the cable being held in its position and the inclined tube being moved away from the cable for the slipping-off of the ring body by the slipping-off means, positioning of the cable with respect to the end side of the slipping-off means can be suitable.

In one advantageous embodiment of the invention, it may be provided that the inclined tube is positioned so as to be axially offset with respect to the ring body before and at least at times during the insertion of the inclined tube into the ring body.

Axially offset positioning can further reduce the force required for the insertion of the inclined tube into the ring body. In principle, however, a coaxial alignment of the inclined tube and the ring body is also possible.

In one advantageous embodiment of the invention, it may be provided that the ring body and/or the inclined tube are aligned so as to be tilted relative to one another before and at least at times during the insertion of the inclined tube into the ring body, such that the ring body tilts towards its side facing away from the inclined tube.

A tilted alignment between the ring body and the inclined tube can likewise lead to an energy-saving insertion of the inclined tube into the ring body. For example, the central axis of the ring body may be tilted relative to the central axis of the inclined tube by an angle of up to 80°, preferably by an angle of up to 60°, particularly preferably by an angle of up to 45°, very particularly preferably by an angle of up to 30°, more preferably by an angle of up to 20°, and even more preferably by an angle of up to 10°, for example also by an angle of up to 5° or less.

Advantageously, a support body may be used on which, during the insertion of the inclined tube, the ring body can be supported with its side facing away from the inclined tube.

In one embodiment of the invention, it may for example be provided that a support body with a passage bore is used on which, during the insertion of the inclined tube, the ring body can be supported with its side facing away from the inclined tube.

In particular, a support body with a passage bore through which the cable can be led from an end of the support body situated opposite the inclined tube, in order to finally also insert the cable into the inclined tube, may be suitable.

The use of a support body may in particular also be suitable for specifying the tilting between the ring body and the inclined tube in a targeted manner.

In one embodiment of the invention, it may be provided that the support body has two half-shells which are opened after the inclined tube has been inserted into the ring body. The half-shells are preferably opened after the cable has been positioned in the inclined tube. The half-shells are particularly preferably opened after the ring body has been slipped off onto the cable, in order to allow the fully fitted cable to be removed.

The support body may however also be of single-part form.

It may also be provided that the support body has three shell elements, four shell elements or even more shell elements, which can be opened after the inclined tube has been inserted.

The use of a multi-part support body, in particular the use of a support body composed of two half-shells, may be suitable for advantageously allowing the cable fitted with the at least one ring body to be advantageously removed from the single fitting module after the fitting process.

However, provision may also be made to remove the support body in some other way such that the cable is removable together with the ring body from the single fitting module. For example, provision may also be made to remove the cable laterally from the single fitting module if the support body has a corresponding lateral opening for this purpose.

In one embodiment of the invention, it may be provided that a lubricant, preferably an alcohol or an oil, in particular a silicone oil, is applied to the inclined tube and/or to the ring body.

In principle, any desired lubricant may be provided, in particular the lubricants already mentioned above. Provision may also be made to generate a compressed-air film between the inclined tube and the ring body in order to improve the sliding characteristics during the insertion of the inclined tube into the ring body, which has likewise already been mentioned above.

If necessary, provision may also be made to heat the ring body and/or the inclined tube in order to positively influence the elasticity of the ring body for an insertion of the inclined tube into the ring body.

In one advantageous embodiment of the invention, it may be provided that a magazine is used to hold further ring bodies ready for the fitting of further cables. It is thus advantageously possible for storage of the ring bodies in magazines to be provided. In principle, any type of magazine may be provided, for example the types of magazine already mentioned above.

Provision may be made for the presence and/or the integrity of the ring body that has been pushed onto the cable to be checked after the ring body has been slipped off onto the cable. For example, an optical quality check using one or more cameras may be provided. An incorrectly fitted cable may for example be excluded from the subsequent fabrication process, labelled or marked as faulty, and/or reprocessed.

The fitting processes described above may also be used multiple times in order to fit multiple electrical cables with common plug connector components.

For the fitting of multiple cables, for example two cables, with a common elastic ring body, it may be provided that, for each of the cables, an inclined tube which is assigned to the cable and which has an end face inclined relative to a tube cross section of the inclined tube by an inclination angle is inserted into a passage bore of the ring body, wherein the cables are positioned in the respectively assigned inclined tube such that the ring body is situated at the defined axial position on the respective cable when the ring body is slipped off from the inclined tubes onto the cables.

In one embodiment of the invention, it may be provided that the inclined tubes are aligned and/or positioned in a defined manner with respect to one another, preferably fastened to a common holding frame or connected to one another via a connecting web.

The inclined tubes may be of single-part or multi-part form. In particular, in the case of multi-part inclined tubes, the individual inclined tubes may be fastened to one another in order to simplify handling and alignment.

In one refinement of the invention, it may be provided that the cable, which has been prefabricated with an inner conductor contact element, is pressed along an advancing direction into a corresponding slot of a housing assembly of the plug connector until the inner conductor contact element has reached a setpoint position within the housing assembly, wherein an optical sensor unit detects the actual position of the inner conductor contact element within the housing assembly while the cable is being pressed in.

Particularly exact assembly, which is reliable in process terms, of the plug connector is thus possible.

In one advantageous embodiment of the invention, it may be provided that, before the pressing-in into the housing assembly, the front end or the cable end of the cable is initially aligned in the correct position in an initial position along the advancing direction and/or the feed direction by virtue of the front end of the cable being at least partially inserted into a receptacle of an alignment aid and/or being caused to abut against a stop of the alignment aid.

A technician, the transport device and/or the feed device can thus advantageously position and/or align the cable by means of the alignment aid.

Thus, before the pressing-in, the cable is situated in a known starting position and furthermore also already in a defined orientation.

In one advantageous embodiment of the invention, it may be provided that the alignment aid is removed from the displacement path of the cable after the front end of the cable has been aligned in the correct position.

The alignment aid may preferably be removed in a linear movement orthogonally with respect to the advancing direction and/or the feed direction. The alignment aid may however also be moved out of the displacement path by way of a pivoting movement.

The alignment aid is preferably moved out of the displacement path automatically.

In one embodiment of the invention, it may be provided that the housing assembly is fixed in an assembly position by a fixing device before the pressing-in of the cable.

In this way, the housing assembly is advantageously situated in a known assembly position, which can simplify the monitoring of the actual position of the inner conductor contact element.

In one embodiment of the invention, it may be provided that a preloading device mechanically preloads a latching means, which is provided for the latching of the inner conductor contact element within the housing assembly, in the housing assembly orthogonally with respect to the advancing direction and/or to the feed direction.

In this way, the latching means can in particular be moved out of the displacement path of the inner conductor contact element in order to avoid a collision of the inner conductor contact element with the latching means. A collision of the inner conductor contact element with the latching means can for example lead to a falsified result in the measurement or monitoring of the pressing force.

Instead of a latching means, any elastic or spring-loaded components of the housing assembly can in principle be preloaded, and moved out of the displacement path of the inner conductor contact element, by the preloading device.

In one advantageous embodiment, it may be provided in particular that the preloading device preloads the latching means by means of the extension of a telescopic ram.

In principle, however, any means for preloading the latching means may be provided instead of a telescopic ram.

In one advantageous embodiment of the invention, it may be provided that the preloading device is removed from the displacement path of the inner conductor contact element when contact with the inner conductor contact element of the electrical cable occurs.

Preferably, the preloading device, in particular the telescopic ram of the preloading device, is removed from the displacement path of the cable or the inner conductor contact element as soon as the inner conductor contact element has been pushed into the housing assembly to a depth sufficient to preload the latching means itself (or as soon as the inner conductor contact element has been moved at least partially "over" the latching means). A further pressing-in of the cable can ultimately lead to the latching means latching into a corresponding receptacle in the inner conductor contact element and relaxing again here.

In one embodiment of the invention, it may be provided that the advancing device stops the advancing of the cable as soon as the actual position of the inner conductor contact element detected by the optical sensor device corresponds to the setpoint position.

The advancing of the advancing device may be controlled in closed-loop fashion in a manner dependent on the actual position and/or the detected pressing force.

In one advantageous embodiment of the invention, it may be provided that the control unit (for example the press-in module) and/or the control device evaluates the pressing force detected by the force transducer during the pressing-in process and compares it with a specification for the pressing force in order to classify the cable in the context of quality assurance.

The plug connector may in particular be rejected if the pressing force does not correspond to the specification or does not sufficiently correspond to the specification.

In one advantageous embodiment of the invention, it may be provided that, after the setpoint position of the inner conductor contact element of the cable has been reached, a front end, which has been prefabricated with an inner conductor contact element, of a second electrical cable is pressed into a corresponding second slot of the housing assembly along the advancing direction and/or the feed direction.

In principle, however, the second cable may also be pressed in at the same time as the first cable. Sequential pressing-in of the cables may however be advantageous for the monitoring of the assembly process, in particular of the pressing forces that occur.

In one advantageous refinement of the invention, it may be provided that the cable end is transported by means of a first transport module along a feed direction into one of the processing modules for processing the cable end, wherein the cable end is furthermore transported by means of a second transport module, which is arranged at a position spaced apart from the first transport module in the feed direction, along or counter to the feed direction, wherein transport units, which can be fed to the cable, of the first transport module are repositioned such that plug connector components applied to the cable end, which is to be processed, of the plug connector can pass through the first transport module while the second transport module is transporting the cable.

The cable can thus be transported extremely flexibly in the course of a plug connector assembly process.

In particular, it may be provided that the transport units of the first transport module are opened in order to allow plug connector components that have been applied to the cable section to be processed to pass through the first transport module while the second transport module is transporting the cable.

In particular, the second transport module may impart the transport of the cable if onward transport by the first transport module is no longer possible owing to a collision of the first transport module with the plug connector component.

In one advantageous embodiment of the invention, it may be provided that the cable is held in the second transport module by virtue of at least two clamping bodies being fed in the direction of the central axis of the cable after a user has placed the cable into the second transport module.

Optionally, a multi-stage clamping force, in particular a two-stage clamping force, may be provided for holding the cable in the second transport module. For example, a first clamping force for the clamping bodies may be provided by means of one or more mechanical spring elements, and a second clamping force, which is increased in relation to the first clamping force, may be provided by means of a pneumatic or hydraulic actuator.

The first clamping force may then for example advantageously be applied to the clamping bodies for as long as the user who is placing the cable in is still within reach of the clamping bodies or has not yet moved to a sufficient safety distance from the clamping bodies. Monitoring of the user or of their hands may be performed, for example by means of a light curtain. Only when the user has moved to a sufficient safety distance from the clamping bodies can the clamping bodies be acted upon with the higher, second clamping force. Injury to the user can thus be ruled out, while at the same time accessibility and user-friendliness for the placing-in of the cable are particularly high.

In one advantageous embodiment of the invention, it may be provided that the cable is inserted from the second transport module linearly along the feed direction into the first transport module, following which at least two transport units of the first transport module are then fed in the direction of the central axis of the cable.

A first transport movement of the cable can thus preferably be performed by means of the second transport module, which thereby transfers the cable to the first transport module for onward transport.

In one embodiment of the invention, it may be provided that the transport of the cable is imparted selectively by the first transport module or by the second transport module.

The transport modules may thus preferably be controllable independently of one another. However, the transport modules may also be controlled simultaneously, preferably in synchronized fashion, and thereby transport the cable synchronously—this is however not preferred owing to the increased complexity and the load on the cable sheath in the event of insufficient synchronization.

In one advantageous embodiment of the invention, it may be provided that the clamping bodies of the second transport module are designed as roller bodies, which are blocked by means of a brake unit, while the second transport module is linearly feeding the cable section to be processed, and which are released by the brake unit, so as to be freely rotatable, while the first transport module is feeding the cable section.

It can thus be provided that the second transport module performs the function of realizing the most force-free possible mounting of the cable while the cable is being fed by the first transport module.

In one advantageous embodiment of the invention, it may be provided that the feed of the cable section to be processed into the respective processing module is performed by the first transport module while the second transport module is stationary in the feed direction.

The brake unit of the clamping bodies of the second transport module is preferably released while the second transport module is stationary in the feed direction. This allows the cable to move freely through the second transport module while the first transport module is, for example, inserting the cable into the processing module.

In one refinement of the invention, it may be provided that a sheath clamp, which is independent of the plug connector to be assembled on the cable during the assembly process, is fastened to the cable in non-positively locking fashion at a defined axial position along the central axis or longitudinal axis of the cable.

In one advantageous embodiment of the invention, it may be provided that the sheath clamp is pushed onto the cable sheath of the cable starting from a front, free end of the cable until the defined axial position is reached.

For the pushing-on of the at least one sheath clamp onto the cable sheath of the cable, the cable may be fed to the sheath clamp and/or the sheath clamp may be fed to the cable.

In order to be able advantageously to push the sheath clamp onto the cable sheath, the clamping region of the sheath clamp, for example two or more clamping jaws of the sheath clamp or an elastic fastening ring of the sheath clamp, may be at least partially spread apart beforehand.

In order to assist the pushing-on process, the use of a lubricant may also be provided, said lubricant being applied to the sheath clamp and/or to the cable sheath of the cable. The lubricant may for example he one of the lubricants already mentioned above.

Provision may also be made to generate a compressed-air film between the cable sheath and the sheath clamp in order to improve the sliding characteristics during the pushing-on of the sheath clamp. It is thus possible, for example, to dispense with an additional lubricant.

In one embodiment of the invention, it may be provided that the sheath clamp is applied to the cable sheath of the cable radially in the direction of the central axis of the cable at the defined axial position.

It can therefore also be provided that the sheath clamp is firstly spread apart such that it can be applied radially to the cable sheath. In particular, it is thus possible to avoid an axial pushing-on process over a relatively long section of the cable sheath, and the associated complexity.

Radial pushing-on of the sheath clamp may be suitable in particular for sheath clamps that are part-ring-shaped or designed in the manner of a clamp.

In one embodiment of the invention, it may be provided that the sheath clamp is made identifiable by means of an information carrier in order to be able to uniquely identify the cable during the processing thereof. This will be discussed in more detail below.

In one embodiment of the invention, it may be provided that the at least one sheath clamp is arranged axially adjacent to at least one plug connector component, which has been pushed onto the cable, in order to block the displacement path of the plug connector component on the cable sheath in positively locking fashion.

Sometimes, plug connector components are loose or axially displaceable on the cable sheath until they are joined together with other plug connector components during the plug connector assembly process and are fastened to the cable sheath or to some other component of the cable. In order, after the fitting of the cable sheath in the course of the further processing and/or in the course of the transport of the cable between individual processing modules, to prevent plug connector components from moving in an uncontrolled manner on the cable sheath (for example move too close to one another for the subsequent processing or even sliding into one another) or even falling off the cable sheath, the sheath clamps may advantageously be suitable for securing the axial positions of the plug connector components.

The sheath clamps are accordingly suitable in particular if the cable is to be processed successively in mutually independent processing modules, because the cable then has to be moved between the individual processing modules. Thus, by means of the at least one sheath clamp, plug connector components can be advantageously held in position on the cable sheath of the cable.

In one refinement of the invention, it may be provided that an axial actual position of at least one inner conductor contact element, which is fastened to one of the inner conductors of the cable, within a contact part carrier of the plug connector relative to an intended axial end position is checked before a secondary securing means, which is provided for securing a primary latching means of the inner conductor contact element, is actuated.

In one embodiment of the invention, it may be provided that the secondary securing means is actuated to secure the primary latching means after the axial actual position has been checked.

By virtue of the fact that the position of the inner conductor contact elements within the contact part carrier has previously been ensured, the secondary securing means can subsequently be closed reliably in process terms.

In one embodiment of the invention, it may be provided that, in order to check the actual position, a compressive check or a tensile check is performed in order to determine whether the at least one inner conductor contact element has been latched by the primary latching means.

A compressive or tensile check may be used to check whether the at least one inner conductor contact element is situated in its axial end position in which the inner conductor contact element is latched by the primary latching means. In this case, an axial movement of the inner conductor contact element in the contact part carrier is prevented by the primary latching means. Sufficient latching can thus be determined in a technically advantageous manner by means of a compressive or tensile check. However, it may be necessary to ensure that the pressure or force applied to the inner conductor contact element is dimensioned such that the inner conductor contact element and/or the contact part carrier is not damaged.

In one embodiment of the invention, it may be provided that, in order to check the actual position, a distance measurement of a front, free end of the at least one inner conductor contact element is performed through a front opening, provided for the insertion of a mating contact element, of the contact part carrier.

The mating contact element may be an inner conductor contact element of what will later be a mating plug connector that is to be connected to the plug connector assembled on the electrical cable in the course of the present cable fabrication process.

The front opening may in particular be a recess for the insertion of the inner conductor contact elements into the contact part carrier, which recess runs all the way through the contact part carrier or is at least accessible from the front side and the rear side of the contact part carrier.

The distance measurement may advantageously be performed by means of a measuring probe.

The use of a measuring probe can allow technically advantageous detection of a front end face of an inner conductor contact element through the front opening that is provided in the contact part carrier in any case.

In one advantageous embodiment of the invention, it may be provided that an optical sensor, an inductive sensor or a capacitive sensor is used to check the actual position. Other sensors may also be used to check the actual position.

In one embodiment of the invention, it may be provided that the at least one inner conductor contact element is assembled in a respective receptacle of the contact part carrier, in particular by means of the assembly module described above, before the actual position is checked.

The assembly of the inner conductor contact elements in the contact part carrier may advantageously be performed immediately before the actual position of the at least one inner conductor contact element is checked.

In one refinement of the invention, it may be provided that the state of the cable end before and/or after processing by at least one of the processing modules is detected by means of an optical sensor for optical quality monitoring.

In one advantageous embodiment of the invention, it may be provided that the line of sight of a first optical sensor is aligned with the cable end, wherein a first lighting unit is arranged behind the cable end along the line of sight of the first sensor in order to generate transmitted light for the detection of the state of the cable end.

In the context of the invention, the line of sight of the optical sensor is preferably a central axis of the optical detection region or detection cone by which the sensor detects or perceives its surroundings.

The line of sight of the first optical sensor, of the second optical sensor to be mentioned below and/or of any further optical sensors that may be present may preferably be aligned orthogonally with respect to a central axis or longitudinal axis of the electrical cable. The line of sight may however also be aligned at an angle other than 90° with respect to the central axis of the cable, for example at an angle of 0° (coaxial alignment) and 90° (orthogonal alignment), for example at an angle of 10° to 80°, 20° to 70°, 30° to 60°, 40° to 50°, or 45°. In principle, the alignment angle of the line of sight relative to the central axis of the cable is not of absolute importance, but an orthogonal alignment in particular may be advantageous.

The line of sight of the first optical sensor, of the second optical sensor and/or of any further optical sensors that may be present may for example be aligned with the front, free end of the electrical cable. The point of intersection of the line of sight with the central axis of the cable may however also deviate from this and, for example, be axially displaced along the elongation of the electrical cable or displaced along the central axis of the cable in the direction of the opposite cable end.

A lighting unit in the context of the invention may for example be a light source with a single illuminant or a light source with multiple illuminants. If the lighting unit has multiple illuminants, these may for example be arranged adjacent to one another in a row, wherein it is also furthermore possible for multiple rows to be arranged one under the other (matrix arrangement).

A lighting means may preferably be an electrical lighting means, for example an incandescent lamp, gas discharge lamp and/or a light-emitting diode. The brightness and/or light color of the illuminant may be adjustable in stepped or continuously variable fashion.

The first lighting unit may preferably be aligned coaxially with respect to the line of sight of the first sensor and arranged behind the cable end. The first lighting unit may however also be arranged offset, in parallel with respect to the first line of sight of the first optical sensor, behind the cable end. It may also be provided that the first lighting unit is tilted relative to the line of sight of the first optical sensor, for example in an angle range between 1° and 45°, in order to generate a certain amount of grazing light or side light in addition to the generation of transmitted light or back light.

In one embodiment of the invention, it may be provided that the line of sight of a second optical sensor is aligned with the cable end, wherein a second lighting unit is arranged in front of the cable end along the line of sight of the second sensor in order to generate incident light for the detection of the state of the cable end.

The second lighting unit may be aligned coaxially with respect to the line of sight of the second optical sensor and arranged in front of the cable end, wherein the lighting unit then preferably has a recess and/or a transparent or partially transparent central region to provide the optical sensor with a clear view of the cable end through the lighting unit.

It may also be provided that the second lighting unit is arranged offset in parallel with respect to the line of sight of the second optical sensor. A recess or a transparent/partially transparent region can then optionally be omitted. It may furthermore be provided that the second lighting unit is arranged so as to be tilted relative to the line of sight of the second optical sensor, for example by an angle between 1° and 45°, in order to generate a certain amount of grazing light or side light in addition to the generation of incident light.

In principle, further optical sensors may also be provided, for example a third optical sensor, a fourth optical sensor, a fifth optical sensor or even more optical sensors. Where reference is made below to the first optical sensor and/or the second optical sensor, the reference can also be extended to further optical sensors if appropriate.

It can also be provided that, in addition to the first lighting unit and/or the second lighting unit, further lighting units, for example a third lighting unit, a fourth lighting unit, a fifth lighting unit or even more lighting units, are provided, which in combination with the first optical sensor, the second optical sensor and/or optionally existing further optical sensors, or also independently of the optical sensors, are provided in order to generate transmitted light, incident light and/or grazing light in order to illuminate the cable end to be processed.

In one embodiment of the invention, it may be provided that the first optical sensor and/or the second optical sensor are designed as a camera (preferably as an electronic camera) or have a camera.

The optical sensors, in particular the cameras, may for example be designed and configured to capture at least one individual image, preferably multiple individual images, or a video sequence. The individual images or the video sequence may subsequently be evaluated by a control unit.

The optical sensors or cameras may have a data interface in order to transmit the captured optical information to the control unit or to some other device.

In one embodiment of the invention, it may be provided that the second optical sensor is arranged so as to be offset by a defined angle, preferably is arranged so as to be offset by 10° to 170°, particularly preferably is arranged so as to be offset by 45° to 135°, furthermore preferably is arranged so as to be offset by 80° to 100°, and very particularly preferably is arranged so as to be offset by 90°, with respect to the first optical sensor.

It is very particularly preferable if the first optical sensor and the second optical sensor are each aligned orthogonally with respect to the central axis or longitudinal axis of the electrical cable and are arranged offset with respect to one another by approximately 90° or exactly 90°. In particular, a simultaneous detection of the cable by both optical sensors can hereby be performed in relatively interference-free or mutually independent fashion.

In one embodiment of the invention, it may be provided that the first lighting unit emits light in a first light color and/or in a first light polarization which is predominantly perceptible, or is exclusively perceptible, by the first optical sensor and is predominantly not perceptible, or is not perceptible, by the second optical sensor.

By virtue of the fact that the light of the first lighting unit is predominantly or exclusively perceptible by the first optical sensor, the quality monitoring by the first optical sensor and the first lighting unit preferably does not influence the quality monitoring by the second optical sensor.

For example, the second optical sensor may have an optical color filter that filters out the light color of the first lighting unit. It may be provided that the first lighting unit emits light in one of the spectral colors red, orange, yellow, green, blue, violet or a combination of the spectral colors, and the second optical sensor has a corresponding color filter.

Furthermore, it may be provided that the first lighting unit emits light with a first linear polarization, which is filtered out by the second optical sensor by means of a polarization filter. It may also be provided that the first lighting unit emits light with a specific circular or elliptical polarization, which is filtered out by the second optical sensor.

In one advantageous embodiment of the invention, it may be provided that the second lighting unit emits light in a second light color and/or in a second light polarization which is predominantly perceptible, or is exclusively perceptible, by the second optical sensor and is predominantly not perceptible, or is not perceptible, by the first optical sensor.

By virtue of the fact that the light of the second lighting unit is predominantly or exclusively perceptible by the second optical sensor, the quality monitoring by the second optical sensor and the second lighting unit preferably does not influence the quality monitoring by the first optical sensor.

For example, the first optical sensor may have an optical color filter that filters out the light color of the second lighting unit. It may be provided that the second lighting unit emits light in one of the spectral colors red, orange, yellow, green, blue, violet or a combination of the spectral colors, and the first optical sensor has a corresponding color filter.

Furthermore, it may be provided that the second lighting unit emits light with a second linear polarization, which is filtered out by the first optical sensor by means of a polarization filter. It may also be provided that the second lighting unit emits light with a specific circular or elliptical polarization, which is filtered out by the first optical sensor.

In particular, it may be provided that the first lighting unit emits light in a first linear polarization and the second lighting unit emits light in a second linear polarization which is aligned orthogonally with respect to the first polarization, whereby the first optical sensor and the second optical sensor are, through the positioning of correspondingly aligned polarization filters in front, able to perceive only the respectively intended light component of the lighting unit assigned thereto.

In one embodiment of the invention, it may be provided that the first optical sensor and the second optical sensor perform time-shifted measurements, wherein the first lighting unit illuminates the cable end only in time intervals in which the first optical sensor is performing the measurement, and wherein the second lighting unit illuminates the cable end only in time intervals in which the second optical sensor is performing the measurement.

The lighting by the lighting unit and detection by the optical sensors may be provided for example in the manner of the shutter 3D systems known from 3D technology. A specific filter in front of the respective optical sensors may optionally be omitted if the image capturing by the optical sensors is time-controlled such that capturing is performed only in the time intervals in which the lighting unit assigned to the optical sensor is illuminating the cable end.

In one advantageous embodiment of the invention, it may be provided that the first optical sensor and/or the second optical sensor is rotated about a central axis of the cable during the detection of the state of the cable end and/or that the cable is rotated about the central axis while the first optical sensor and/or the second optical sensor detects the state of the cable end.

A particularly exact detection of the processing state of the corresponding cable end is possible in this way.

In one advantageous embodiment of the invention, it may be provided that the first optical sensor and/or the second optical sensor record one or more individual images of the cable end, preferably during the rotation thereof about the central axis of the cable and/or during the rotation of the cable about the central axis.

Preferably, the first optical sensor and/or the second optical sensor and/or any further optical sensors that may be present each record multiple individual images of the electrical cable.

In particular, individual images can possibly be subsequently evaluated in a more advantageous and resource-saving manner than a video sequence.

In principle, the optical sensors may capture any number of individual images during the relative rotation between the cable end and the sensor, for example 2 individual images to 24 individual images (in particular one individual image every 15° to) 180°), 3 individual images to 12 individual images (in particular one individual image every 30° to 120°), 4 individual images to 8 individual images (in particular one individual image every 45° to 90°) or, for example, also 6 individual images (in particular one individual image every 60°). It is particularly preferable if 8 individual images are captured, in particular one individual image every 45°.

In one advantageous embodiment of the invention, it may be provided that the first lighting unit is rotated synchronously with the first optical sensor and/or that the second lighting unit is rotated synchronously with the second optical sensor.

The first lighting unit may for example be fastened on a common frame with the first optical sensor and/or the second lighting unit may be fastened on a common frame with the second optical sensor, wherein a rotation of the frame leads to a synchronous rotation of the respective lighting unit and the assigned sensor.

In principle, it may however also be provided that the lighting unit assigned to the respective optical sensor is not rotated, or is at least not rotated synchronously, with the optical sensor.

The first sensor may furthermore also be rotated synchronously with the second sensor. For example, both sensors and both lighting units may be fastened to a common frame.

In the context of quality monitoring, provision may also be made for multiple lighting units to be arranged in ring-shaped fashion around the cable end, preferably coaxially with the central axis of the cable, and, if necessary, to be electrically controlled or activated in order to generate transmitted light for the first optical sensor and/or to generate incident light and/or some other light for the second optical sensor. In the context of the invention, a ring-shaped lighting unit may be segmented into individual lighting units (for example the first lighting unit and the second lighting unit). One section of the ring-shaped lighting unit can thus be referred to as the first lighting unit, and a further section can be referred to as the second lighting unit. In particular, a rotation of the lighting unit can thus be omitted.

In one embodiment of the invention, it may be provided that the control unit, in particular the control unit of the quality monitoring module, and/or the control device is used for evaluating the state of the cable on the basis of data captured by means of the optical sensors.

The control unit and/or the control device may in particular be configured for optical signal processing and may be communicatively connected to the optical sensors in order to capture the optical data signals via the communication connection.

The control unit and/or the control device may be configured to control the detection of the optical quality monitoring through activation of the sensors and/or lighting units.

The control unit and/or the control device may also be configured to cause the relative rotation between the cable end and the sensors through activation of a corresponding rotation device.

In one embodiment of the invention, it may be provided that the optical quality monitoring includes a check for the presence of certain plug connector components of a plug connector that is to be assembled on the cable end.

A fitting check can thus advantageously be provided. The optical quality monitoring can thus preferably be performed after the fitting process of a fitting module.

In one advantageous embodiment of the invention, it may be provided that the optical quality monitoring comprises a check for individual wires protruding from the cable end.

The check for protruding individual wires may be performed in particular after a processing process of a processing module for the processing of a cable shielding braid and/or of an inner conductor. The check for protruding individual wires may for example also take place before a fabric tape or a plug connector component is applied, in order to firstly ensure that no individual wire is protruding in an undesirable manner. Protruding individual wires may possibly later lead to a short circuit or to leakage currents, which adversely affect the proper functioning of the cable and/or plug connector.

In one advantageous embodiment of the invention, it may be provided that the optical quality monitoring includes the checking of an axial position of a plug connector component of a plug connector that is to be assembled on the cable end.

For example, the spacing between the front end of an inner conductor contact element applied to an inner conductor of the cable and a support sleeve may be detected.

In the course of the fabrication of an electrical cable, there is sometimes a need for defined axial positions of plug connector components relative to other plug connector components, or relative to certain cable sections, within specified tolerances. In particular, in the context of quality management, provision may therefore be made for the axial position of at least one plug connector component to be detected.

In one embodiment of the invention, it may be provided that the optical quality monitoring includes the checking of a diameter of a cable section adjoining the cable end.

Through the checking of the diameter of the cable section, it can be ensured that a subsequent plug connector component, for example a support sleeve, can actually also be assembled.

For example, the diameter of a cable section to which a fabric tape is applied may be checked.

The quality of solder joints or crimping processes, for example, may also be checked in the context of the optical quality monitoring.

The profile of seams or edges may also be checked.

In the context of the optical quality monitoring, damage to cable components of the cable and/or to plug connector components of the plug connector that is to be assembled on the cable may also be checked, for example by virtue of the cable components and/or plug connector components being checked for cracks or fissures.

The identification of colored markings that indicate position, rotational position, rotation, latching, etc. may also be provided in the context of the optical quality monitoring. For example, provision may be made to check or monitor the correct alignment of color-coded inner conductors.

In one advantageous embodiment of the invention, it may be provided that the state of the cable end is detected after a cleaning process for removing particles adhering to the cable end.

This can improve the accuracy of the optical quality monitoring.

It may furthermore be advantageous to reduce vibrations as far as possible during the optical quality monitoring. For example, moving components of a fabrication apparatus or of a fabrication system, in particular moving components of adjacent processing modules, may be temporarily stopped.

In one advantageous embodiment of the invention, it may be provided that the state of the cable end before and/or after the assembly of a plug connector component, in particular the assembly of an inner conductor contact element on an inner conductor of the cable or the assembly of a contact part carrier, is detected.

In particular, the specific monitoring of a crimping process, for example for individual wires that protrude in an undesired manner after the crimping process, may be advantageous.

Furthermore, it may be advantageous to subject the prefabricated electrical cable to the optical quality monitoring before the assembly of the contact part carrier. This may be advantageous in particular because major parts of the cable end are no longer visible subsequently, which can make a later check more difficult. Furthermore, in particular, checking for correct positions and diameters, and optionally checking for protruding individual wires, may be expedient before the assembly of the contact part carrier in order to be able to ensure that the contact part carrier can also be correctly assembled.

In one embodiment of the invention, it may be provided that the state of the cable end before and/or after the fitting of the cable end with a plug connector component of an electrical plug connector that is to be assembled on the cable end is checked.

In particular, the checking of correct and/or complete fitting of the cable or of the cable sheath with the components of what will later be the plug connector may be advantageous before the further processing of the cable in the course of the plug connector assembly process.

In one embodiment of the invention, it may be provided that the state of the cable end is detected in the context of quality management, wherein the cable is sorted or reprocessed in a manner dependent on the state of the cable end. Quality assurance or quality control to ensure the defined quality requirements is particularly relevant in the context of the fabrication of an electrical cable for the automotive industry.

Optional documentation may be particularly advantageous for this. For example, it may be provided that the cable is sorted into different quality classes in a manner dependent on the information contained in the documentation. Provision may also be made for the cable to be sorted out, and removed from the production chain, in a manner dependent on the information contained in the documentation.

In one refinement of the invention, it may be provided that the cable, a sheath clamp fastened to the cable, and/or a workpiece carrier assigned to the cable during the processing thereof, is made identifiable by means of an information carrier, wherein documentation of the assembly of the plug connector for processing by at least one of the processing modules is compiled and assigned to the cable.

In one advantageous embodiment of the invention, it may be provided that a unique identifier for the cable is imprinted into the information carrier.

The cable can thus be clearly identifiable on the basis of the identifier in the course of the cable fabrication process—and preferably also later.

In one embodiment of the invention, it may be provided that a unique identifier imprinted on the information carrier is assigned to the cable temporarily for the fabrication thereof.

In particular, if the information carrier already has an identifier, the need for imprinting an identifier may optionally be omitted. The existing identifier, for example a consecutive master number of workpiece carriers or sheath clamps, can thus be used to uniquely identify the cable (at least in the course of the plug connector assembly process). A serial number already printed on the cable, for example, or a similar identifier, may also be suitable as a unique identifier.

In one embodiment of the invention, it may be provided that the documentation is at least partially imprinted into the information carrier.

If the information carrier is suitable for storing supplementary data, the documentation may advantageously already be imprinted (in full or in part) into or onto the information carrier. This may optionally eliminate the need for a separate database or a separate data memory.

In a particularly preferred embodiment of the invention, it may be provided that a global database is used in which documentation compiled in the course of the cable fabrication process is assigned to individual cables, preferably on the basis of the unique identifier.

Through the use of a global database, the possible flexibility in the storage and assignment of the documentation is particularly advantageous. The information carrier, in particular an identifier contained in the information carrier, may be usable in the database as a designation of the dataset which has the documentation of a specific cable.

In one embodiment of the invention, it may be provided that the cable, the sheath clamp and/or the workpiece carrier are made identifiable by application and/or modification of the information carrier.

Provision may thus be made for the information carrier (and optionally the identifier) to be applied to the cable, the sheath clamp and/or the workpiece carrier for the first time for example at the beginning of the plug connector assembly process. The information carrier may for example be printed or adhesively bonded on, for example in the manner of a label in the course of a labelling process.

An existing information carrier may however optionally also be modified in order to make the cable or the sheath clamp or the workpiece carrier identifiable. For example, information may be added to the information carrier or information on the information carrier may be revised.

In one advantageous embodiment of the invention, it may be provided that the information carrier is of optical and/or electronic form.

An information carrier of optical or electronic form has proven to be particularly suitable. In principle, however, it is also possible in the context of the invention for a magnetic, haptic and/or some other information carrier to be provided.

In one embodiment of the invention, it may be provided that the optical information carrier is designed as a barcode, numerical code and/or 2D code, for example a data matrix code or QR code.

The codes mentioned have proven to be particularly suitable for forming an optical information carrier.

It may be advantageous to equip the information carrier with an error correction method, for example to provide redundant information. In particular, an optical information carrier can sometimes be susceptible to errors during the reading-out of the information.

An optical information carrier may be highly suitable in particular for direct identification of the cable, for example if the information carrier is applied directly to the cable.

The information carrier (and optionally the identifier) may also be applied to the same cable multiple times. In particular, provision may be made to apply and/or modify an information carrier on both cable ends.

In one advantageous embodiment of the invention, it may be provided that the electronic information carrier comprises at least one programmable memory module, for example an RFID transponder, which is modified or configured/programmed to identify the cable and/or to document the processing of the cable.

In the context of the invention, an electronic information carrier, for example an RFID transponder, may particularly advantageously be used, for example also to store the documentation or at least parts of the documentation electronically and to link said documentation or parts of the documentation directly to the cable, the sheath clamp and/or the workpiece carrier.

An electronic information carrier, in particular an RFID transponder, may be particularly highly suitable for indirect identification of the cable by way of the sheath clamp fastened to the cable sheath or the workpiece carrier assigned to the cable, if the information carrier is applied to the sheath clamp or to the workpiece carrier.

In one advantageous embodiment of the invention, it may be provided that the documentration is used in the context of quality management.

In one advantageous embodiment of the invention, it may be provided that the cable is sorted or reprocessed in a manner dependent on the information contained in the documentation.

In one embodiment of the invention, it may be provided that information relating to a successful processing process, an incorrect processing process, a failed processing process and/or at least one process parameter of the processing process is included in the documentation.

For example, the successful processing, incorrect processing, failed processing and/or at least one process parameter may be included in the documentation for each of the independent processing processes or for each of the independent processing modules.

The process parameter may for example be a parameter that specially characterizes the processing process. The process parameter may for example be a force, a moment and/or a pressure. For example, the intended pressing force, and/or actual pressing force detected by measurement, of a crimping process may be included in the documentation.

If failed and/or incorrect processing has been documented, provision may be made to terminate the cable fabrication of the corresponding cable. A subsequent processing module may for example read out the documentation of the cable to be processed prior to the commencement of the cable processing, and check whether the cable is approved for processing. The cable may optionally be transferred onward by the individual processing modules in each case without being processed, until said cable has left the production line.

In one embodiment of the invention, it may be provided that the documentation includes information relating to waste and/or particle monitoring and/or a check for an absence of damage of a cable component of the cable and/or a check for an absence of damage of a plug connector component of a plug connector that is to be assembled on the cable and/or a check of a radial alignment of the plug connector component and/or a check of an axial position of the plug connector component and/or a check for the presence of certain plug connector components after a fitting process and/or a check of a diameter of a cable section of the cable and/or a check for protruding individual wires and/or a check for sufficient fastening, for example latching, of the plug connector component and/or a check of electrical properties of the partially assembled or fully assembled plug connector.

It is very particularly preferable if the documentation includes information relating to a check of an axial position of the plug connector component, for example of the spacing between the front end of an inner conductor contact element applied to an inner conductor of the cable and a support sleeve.

Furthermore, it is particularly preferred if the documentation includes information relating to the check of a diameter of a cable section of the cable, in particular of the diameter of a section onto which a plug connector component is to be pushed in a subsequent processing process. For example, the diameter of a fabric tape that has been applied to a cable shielding braid folded back over the cable sheath may be detected by measurement, and the result of the measurement may be recorded in the documentation.

In addition, it is particularly preferred if the documentation includes information relating to the check for protruding individual wires or strands, for example of a cable shielding braid.

In one advantageous embodiment of the invention, it may be provided that the information for the documentation is detected by the control unit (in particular of the documentation module) and/or the control device using a communication interface and/or a sensor device.

That information of the individual processing processes which is relevant for the documentation may for example be read out by a controller or a control unit of a respective processing module (for example specified process parameters and/or process parameters actually detected by measurement during the processing). The respective processing modules may have dedicated sensors in order to detect the relevant information.

In particular, for checking of the processing processes performed on the cable in the context of quality management, it is also possible for a separately formed sensor device to be provided which is communicatively connected to the control unit of the documentation module and/or to the control device and which transmits results of the check, for example of the checks listed above, to the control unit of the documentation module for the compiling of the documentation.

In one refinement of the invention, it may be provided that, after the processing of the cable end by at least one of the processing modules, a cleaning process is executed, in which particles adhering to the cable end are removed.

In one advantageous embodiment of the invention, it may be provided that the cleaning process is executed after the mechanical processing operation of cutting the electrical cable to length. In this case, it is advantageously possible in particular for metallic chips, plastics fibers and/or pieces of foil to be removed.

In one advantageous embodiment of the invention, the cleaning process can furthermore be executed after the mechanical processing operation of stripping a cable sheath of the electrical cable (for example after the processing of the cable by the stripping module). In this case, it is advantageously possible in particular for plastics fibers, to be removed.

In one advantageous embodiment of the invention, the cleaning process may furthermore be executed after the mechanical processing operation of removing a cable foil from the electrical cable. In electrical cables, cable foils are sometimes used for electromagnetic shielding, for mechanical protection and/or for moisture protection of other components of the cable, for example for protection of electrical conductors, cable shielding braids and insulators or dielectrics. Depending on the application, the cable foils may also be referred to as "shielding foils", "insulating foils" or "protective foils". In this case, it is advantageously possible in particular for metallic chips and/or pieces of foil to be removed.

In one advantageous embodiment of the invention, the cleaning process may furthermore be executed after the mechanical processing operation for processing a cable shielding braid of the electrical cable. The cable shielding braid may in particular be an outer conductor shield or an outer conductor shielding braid composed of individual wires that have been interwoven with one another. In this case, it is advantageously possible in particular for metallic chips to be removed. The processing of the cable shielding braid may include inter alia cutting to length, brushing out, arranging, folding back onto a support sleeve, and/or fixing of the cable shielding braid on the support sleeve, for example by means of an adhesive tape. The individual steps mentioned may, in various combinations, jointly form one or more mechanical processing operations within the meaning of the invention, or they may each form individual mechanical processing operations.

In one advantageous embodiment of the invention, the cleaning process may furthermore be executed after the mechanical processing operation of removing a filler layer (also referred to as intermediate sheath or "filler") that is arranged under the cable shielding braid of the electrical cable, In this case, it is advantageously possible in particular for plastics fibers to be removed.

In one advantageous embodiment of the invention, the cleaning process may furthermore be executed after the mechanical processing operation of removing an insulation or an insulator (also referred to as "primary insulation") from an electrical conductor of the electrical cable. In this case, it is advantageously possible in particular for plastics fibers to be removed.

Provision may also be made for the cleaning process to be executed in order to remove a sheet silicate, in particular to remove talc. Talc is often contained between the filler layer and the insulation of a cable. For example, provision may be made for the talc to be removed mechanically, for example rubbed off the insulation using a textile after the filler layer has been removed.

In one advantageous embodiment of the invention, the cleaning process may furthermore be executed after the mechanical processing operation of crimping a component of what will later be a plug connector on the electrical cable. In this case, it is advantageously possible in particular for metallic chips and/or dust particles to be removed.

For example, it may be provided that a cleaning process is executed after each one of the abovementioned processing operations (or further processing operations that are not listed). Provision may however also be made for some processing operations to initially be performed in succession, or combined, in the course of the fabrication of the electrical cable, and for the particles formed to subsequently be removed by means of a joint cleaning process. The number of cleaning processes may therefore be lower than the number of mechanical processing operations. In particular, mechanical processing operations in which prior contamination with particles is not disruptive or detrimental may be performed in direct succession before a cleaning process is executed.

The removal of the particles may advantageously be provided in particular before the application of components of what will later be the plug connector and/or after an abrasive treatment of the electrical cable or of the components of the plug connector that have already been fastened to the cable. For example, the cleaning process may be provided before the application of an adhesive or fabric tape for fixing an exposed cable shielding braid that has been folded over a support sleeve. The cleaning process may furthermore advantageously be provided before the crimping-on of electrical inner conductor contact elements and/or of other components or assemblies of the electrical plug connector. The cleaning process may furthermore advantageously be provided prior to a measurement and/or documentation of the prefabricated or fully fabricated electrical cable. Finally, the cleaning process may in particular also be provided after the cable fabrication has been completed, or may be performed as a final method step.

In principle, the cleaning process may be realized or implemented in various ways, of which some particularly advantageous examples are listed below. Any combinations of the following variants, but optionally also individual solutions, are suitable.

In one embodiment of the invention, it may be provided that the cleaning process includes blowing off the particles.

For example, particles may be blown off with a strong jet of air. For this purpose, use may for example be made of a compressed-air pistol, in particular because compressed air is generally readily available in industrial settings, and a compressed-air pistol can be used in a sufficiently flexible manner.

The particles may be blown off with a supply pressure of between 1.5 bar and 10.0 bar, preferably between 2.0 bar and 8.0 bar. The supply pressure may however also be less than 1.5 bar or higher than 10.0 bar. Depending on the particles to be removed, the supply pressure may be determined experimentally by a person skilled in the art within the scope of the above specifications.

In one embodiment of the invention, it may be provided that the electrical cable is inserted into a ring nozzle, following which the particles are blown off by means of the ring nozzle.

The ring nozzle may have a diameter matched to the electrical cable and/or the plug connector. The ring nozzle may for example have a diameter of 5 mm to 100 mm, preferably 10 mm to 75 mm and particularly preferably 13 mm to 50 mm. The ring nozzle may however also have a diameter that is smaller than 5 mm or larger than 100 mm.

The ring nozzle may have one or more inflows for the air supply. For example, a single inflow or two inflows may be provided.

It may be provided that the ring nozzle has multiple individual air outlets/nozzles or one air outlet, which runs in fully or at least partially ring-shaped encircling fashion, in the manner of an annular gap.

Although a ring nozzle is particularly preferred, it is also possible for a conventional air nozzle or multiple air nozzles to be provided in order to be able to remove the particles in possibly more targeted fashion and with greater flexibility. For example, a flat jet nozzle may be provided.

A nozzle used in the course of the cleaning process may be designed to utilize the so-called Venturi effect (Venturi nozzle). By means of a targeted increase in the flow speed of the compressed air used, in particular by means of a constriction in a tube, it is possible, if an adjacent access point to the ambient air is provided, for the adjacent ambient air to be sucked in and for the total air quantity supplied to thus be increased. A Venturi nozzle can reduce the demand for compressed air.

A nozzle used in the course of the cleaning process may be aligned with the electrical cable such that the Coandă effect, that is to say the tendency of a gas jet to run along a surface, can be utilized to discharge the particles.

In one embodiment of the invention, it may be provided that the particles are targetedly blown off onto a collecting container, a filter unit and/or a suction-extraction device in order to collect the blown-off particles.

In order to prevent the particles from being flung away in an uncontrolled manner and thus, for example, carried to another point on the production line, it may be advantageous to targetedly blow off the particles onto a collecting con-tainer and/or a filter unit. In order to be able to catch the particles even more effectively, a suction-extraction device may also be suitable for actively catching the blown-off particles.

In one embodiment of the invention, it may be provided that the cleaning process comprises a compressed air blasting process, in particular a dry ice blasting process or a $CO_2$ blasting process.

The cleaning power can be further increased by means of a compressed air blasting process. A compressed air blasting process is however correspondingly more complex to implement.

A dry ice blasting process or a $CO_2$ blasting process may be particularly suitable. The dirt or the particles can become brittle from the cold as they are bombarded with the dry ice particles. Furthermore, the $CO_2$ particles or dry ice particles impinging on the surface of the particles can increase the volume of the particles by sublimation, which facilitates the attack surface thereof for a detachment from the surface of the cable. Finally, the particles can also be removed more easily owing to the stresses that occur owing to different coefficients of thermal expansion. By means of a compressed air blasting process, in particular a dry ice blasting process or a $CO_2$ blasting process, it is thus possible to satisfy extremely high cleaning requirements in a gentle and efficient manner.

In one advantageous embodiment of the invention, it may be provided that the cleaning process includes extraction of the particles by suction.

In particular, a negative pressure may be generated for the extraction of the particles by suction, and the particles may be sucked in by means of a suction nozzle and deposited on a filter. Extraction purely by suction for the purposes of removing the particles is however generally suitable only to a limited extent, or has only limited ability to detach the particles from the surface of the cable. Extraction by suction is accordingly suitable primarily in combination with other measures.

A round nozzle, a flat jet nozzle or some other nozzle may be provided for the extraction by suction.

In one embodiment of the invention, it may be provided that an air flow generated in the course of the cleaning process is pulse-controlled.

In particular, a pulsed air jet can achieve an intense cleaning action in the present field of application. A pulse-controlled air flow may be suitable, for example, for blowing off the particles and/or extracting the particles by suction.

For the pulse control, it is for example possible for a solenoid valve to be provided which is controlled in a correspondingly pulsed manner by a control unit. For example, one of the elementary waveforms (sine, rectangle, triangle, sawtooth) may be provided for this. In principle, however, the type of waveform is not of absolute importance.

By means of the pulsed air jet, the particles can be removed from the surface more effectively, because said particles are initially loosened. The pulsing can furthermore result in a turbulent air flow, which assists the detachment of the particles from the electrical cable or from the components applied to the cable in the course of the fabrication process.

For example, a pulse frequency of 1 Hz to 100 Hz, preferably 5 Hz to 75 Hz, particularly preferably 10 Hz to 60 Hz and more preferably 20 Hz to 50 Hz may be provided. If necessary, higher or lower frequencies may also be provided. A person skilled in the art is able to determine the required frequency experimentally, taking into consideration the abovementioned specifications in a manner dependent on the particles to be removed.

In one advantageous embodiment of the invention, it may be provided that ionized air is fed to the cable end during the cleaning process in order to reduce the electrostatic attraction force of the particles.

The targeted reduction of the electrostatics can be advantageous in particular for the removal of particles from a plastic.

In order to dissipate the charges from the particles and/or from the cable, it is for example possible for those components of the cleaning module which come into direct contact with the particles during the cleaning process to be designed to be conductive and grounded (for example the brushes to be described below).

It is however in particular also possible, as proposed, for ionized air to be supplied. The ions in the air can likewise dissipate the charges of the particles, wherein the use of ionized air, or the supply thereof to the cable, are possible in an extremely flexible manner.

Corresponding ionizers are known and are widely used. The ionizers can generally be operated with alternating current in order to alternately positively and negatively charge the air molecules between their electrodes. For this purpose, it is for example possible for a voltage in the range of 5 kV to be provided.

Provision may be made for the electrical cable to be rotated while the ionized air is being supplied. It may thus correspondingly be possible for discharged particles to fall off the cable owing to gravitational force alone.

The supply of the ionized air may for example advantageously be provided in combination with blowing-off of the particles or extraction of the particles by suction. For example, an ionizer may be arranged upstream of, adjacent to or downstream of a nozzle. The use of multiple ionizers may also be advantageous. In particular, a combination of an ionizer with a ring nozzle has proven to be suitable.

In one advantageous embodiment of the invention, it may be provided that the cleaning process includes brushing off the particles.

The brushing can exert strong mechanical forces on the dirt or on the particles. It should however be noted here that the electrical cable, or those components of the plug connector which, at the time of the cleaning process, have already been applied to the electrical cable in the course of the fabrication process, are likewise influenced by the brushes. The bristles may therefore have to be adapted to the application and may vary with regard to their material, their thickness, their length, their hardness and/or their density.

It may be provided that the brushes have nylon bristles. In principle, however, any brush bristles may be suitable, for example also brush bristles composed of natural fibers, synthetic fibers or wire. A person skilled in the art may select bristles suitable for brushing the cable shielding braid in a manner dependent on the application.

Preferably, the brushes are driven or rotate during the brushing process.

The brushes may be designed such that they can be fed radially to the end of the electrical cable to be processed. The radial feed may be imparted for example by means of a linear stepper motor.

It may be provided that the brushes are designed as round brushes. A round brush may be understood to mean any brush that can be driven about a central axis, for example so-called pot brushes and conical brushes. The round brushes need not be completely round, but may for example also be oval.

The round brushes can be cleaned on a side facing away from the electrical cable during the brushing process in order to remove the particles in a defined manner.

In principle, any brushes may be provided, for example also brushes that perform a linear movement, or also rotating brushes.

The speed and/or the pressure of the brushes on the electrical cable can likewise be adapted to the specific application.

It is possible for one brush, but also two brushes or more, three brushes or more, preferably four brushes, for example five, six, seven, eight or even more brushes, to be provided.

In principle, the use of a large number of brushes may be advantageous for uniform processing of the cable along the circumference of the cable. The available space within the apparatus may however possibly be limited. For many applications, it may accordingly be the case that four brushes, which are distributed uniformly along the circumference of the cable, are particularly suitable as an optimal solution.

In one embodiment of the invention, it may also be provided that the cleaning process includes wiping off the particles.

For example, the particles may be wiped off using a cloth. The fibers of the cloth may be designed such that they absorb the particles or that the particles become caught in the cloth. The cloth can subsequently be cleaned or disposed of. The cloth may be guided over the electrical cable in automated fashion.

In one advantageous embodiment of the invention, it may be provided that the cleaning process comprises an adhesion process for the particles, in which the particles are removed by means of a foil or an adhesive strip.

In the context of an adhesion process, it is possible to effect an attraction to the particles that is even stronger than that of the surface of the electrical cable. This may be achieved by means of an adhesive and/or electrostatically charged foil. The contaminated foil can subsequently be cleaned or disposed of.

An adhesion process using a foil and/or an adhesive strip may be particularly suitable for small particles and fibers.

For example, two foils may be clamped into a respective half-shell and, together with the half-shells, fed radially to the cable in order to receive the particles. Provision may be made for the half-shells to be fed successively, in particular in order for a first half shell to be removed from the cable again radially before a second half shell is fed radially all the way to the cable.

In one embodiment of the invention, it may be provided that the cable end is subjected to defined vibrations during the cleaning process in order to loosen the particles.

It may be advantageous to cause the electrical cable to vibrate. By means of the vibrations, micro-entanglements can be loosened and the particles can subsequently be removed more easily. For example, a vibration method may be particularly suitable in combination with a blowing-off of the particles or an extraction of the particles by suction.

It may be advantageous to introduce the vibrations as close as possible to the contamination.

In a variant, provision may optionally also be made for the particles to be washed off. For the washing-off process, use is preferably made of a liquid which does not have a corrosive effect on the constituent parts of the electrical cable and/or of the plug connector.

In one variant, it may also be provided that, using one or more magnets (permanent magnets and/or electromagnets), magnetic particles are removed by the magnetic attraction force.

In one variant, it may furthermore be provided that the particles, after being removed, are examined with regard to their type, for example material, size and/or weight of the individual particles, composition or ratio of the different particles/materials to one another, and/or the total amount. In this way, analysis and monitoring of the working operations being carried out are possible, and faulty processes can be identified from deviations in the particle separation that is normally to be expected.

The invention also relates to a computer program product with program code means in order to carry out a method according to the statements above and below when the program is executed on a control unit of at least one of the processing modules and/or on a control device of an apparatus for assembling an electrical plug connector (in particular on an apparatus according to the statements above and below).

Features that have been described in conjunction with the apparatus according to the invention can self-evidently also be advantageously implemented for the method and the computer program product—and vice versa. Furthermore, advantages that have already been mentioned in conjunction with the apparatus according to the invention can also be understood as relating to the method and the computer program product—and vice versa.

In addition, it should be noted that expressions such as "comprising", "having" or "with" do not exclude any other features or steps. Furthermore, expressions such as "a" or "the" that refer in the singular to steps or features do not exclude multiple features or steps—and vice versa.

It is furthermore emphasized that the values and parameters described in the present case also encompass deviations or fluctuations of ±10% or less, preferably ±5% or less, more preferably ±1% or less, and very particularly preferably ±0.1% or less, of the respectively stated value or parameter, if such deviations are not ruled out in practice in the implementation of the invention. The specification of ranges by way of start and end values also encompasses all values and fractions encompassed by the respectively stated range, in particular the start and end values and a respective mean value.

At this juncture, it is pointed out that the specific combinations of features mentioned in the dependent claims can also constitute independent inventions in themselves within the scope of the claimed overall concept according to the invention.

The applicant in particular—but not exclusively—reserves the right to claim the following subjects as independent inventions:

a) an alignment module for the assembly of an electrical plug connector and a processing method;
b) an alignment module for the assembly of an electrical plug connector and a processing method;
c) an assembly module for the assembly of an electrical plug connector and a processing method;
d) an assembly module for the assembly of an electrical plug connector and a processing method;
e) a stripping module for the assembly of an electrical plug connector and a processing method;
f) a control unit for the assembly of an electrical plug connector and a method;
g) a multiple fitting module for the assembly of an electrical plug connector and a processing method;
h) a single fitting module for the assembly of an electrical plug connector and a processing method;
i) a press-in module for the assembly of an electrical plug connector and a processing method;
j) a feed device for feeding a cable to a processing module in the course of the assembly of an electrical plug connector and a method;
k) a fitting unit for the assembly of an electrical plug connector and a method;
l) a sensor module for the assembly of an electrical plug connector and a method;
m) a quality monitoring module for the assembly of an electrical plug connector and a method;
n) an apparatus for the assembly of an electrical plug connector and a method; and
o) a cleaning module for the assembly of an electrical plug connector and a cleaning method.

The further claims, claim features and the features disclosed in the description in its entirety and the drawing relate to advantageous embodiments and variants of the above-mentioned independent inventions.

Exemplary embodiments of the invention will be described in more detail below with reference to the drawing.

The figures each show preferred exemplary embodiments in which individual features of the present invention are illustrated in combination with one another. Features of one exemplary embodiment may also be implemented separately from the other features of the same exemplary embodiment, and may accordingly be readily combined by an expert to form further useful combinations and sub-combinations with features of other exemplary embodiments.

Elements of identical function are denoted by the same reference designations in the figures.

SUMMARY

A principal aspect of the present invention is an apparatus (131) for assembling an electrical plug connector (12) on a first cable end (3) and/or on a second cable end (4) of an electrical cable (1a, 1b) which has one or more inner conductors (2), having at least one module group (M1, M2, M3, M4, M5, M34) with at least two processing modules (18, 19, 29, 35, 50, 59, 69, 93, 103, 109, 117, 134, 135, 137, 138, 139, 140, 141, 142, 143, 144, 145, 146, 147) for processing the cable (1a, 1b), furthermore having a feed device (54) for feeding the cable end (3, 4) along a feed direction (X) to a processing station (B) in the module group (M1, M2, M3, M4, M5, M34), wherein the module group (M1, M2, M3, M4, M5, M34) has a module transport device (134) for feeding in each case one of the processing modules (18, 19, 29, 35, 50, 59, 69, 93, 103, 109, 117, 134, 135, 137, 138, 139, 140, 141, 142, 143, 144, 145, 146, 147) of the module group (M1, M2, M3, M4, M5, M34) to the processing station (B), and wherein the feed device (54) is configured to remove the cable end (3, 4) from the module group (M1, M2, M3, M4, M5, M34) again counter to the feed direction (X) after the processing.

A further aspect of the present invention is an apparatus (131) characterized in that at least one of the module groups (M1, M2, M3, M4, M5, M34) and/or one of the processing modules (18, 19, 29, 35, 50, 59, 69, 93, 103, 109, 117, 134, 135, 137, 138, 139, 140, 141, 142, 143, 144, 145, 146, 147) has a control unit (10) in order to control and/or monitor the processing of the cable (1a, 1b).

A further aspect of the present invention is an apparatus (131) characterized in that the module transport device (134)

is designed to feed the processing modules (18, 19, 29, 35, 50, 59, 69, 93, 103, 109, 117, 134, 135, 137, 138, 139, 140, 141, 142, 143, 144, 145, 146, 147) of the module group (M1, M2, M3, M4, M5, M34) along a module transport direction (M) to the processing station (B).

A further aspect of the present invention is an apparatus (131) characterized in that the feed direction (X) deviates from the module transport direction (M), preferably runs substantially orthogonally and particularly preferably orthogonally with respect to the module transport direction (M).

A further aspect of the present invention is an apparatus (131) characterized in that the module transport device (134) is designed to feed in each case only a single one of the processing modules (18, 19, 29, 35, 50, 59, 69, 93, 103, 109, 117, 134, 135, 137, 138, 139, 140, 141, 142, 143, 144, 145, 146, 147) of the module group (M1, M2, M3, M4, M5, M34) to the processing station (B).

A further aspect of the present invention is an apparatus (131) characterized in that the module transport device (134) is designed to move all processing modules (18, 19, 29, 35, 50, 59, 69, 93, 103, 109, 117, 134, 135, 137, 138, 139, 140, 141, 142, 143, 144, 145, 146, 147) of the module group (M1, M2, M3, M4, M5, M34) simultaneously in a coupled movement.

A further aspect of the present invention is an apparatus (131) characterized in that at least one of the processing modules (18, 19, 29, 35, 50, 59, 69, 93, 103, 109, 117, 134, 135, 137, 138, 139, 140, 141, 142, 143, 144, 145, 146, 147) of the module group (M1, M2, M3, M4, M5, M34) has a processing tool that can be fed to the cable end (3, 4) when the processing module (18, 19, 29, 35, 50, 59, 69, 93, 103, 109, 117, 134, 135, 137, 138, 139, 140, 141, 142, 143, 144, 145, 146, 147) and the cable end (3, 4) are situated at the processing station (B).

A further aspect of the present invention is an apparatus (131) characterized in that the module group (M1, M2, M3, M4, M5, M34) has at least one storage location (L) in order to store at least one of the processing modules (18, 19, 29, 35, 50, 59, 69, 93, 103, 109, 117, 134, 135, 137, 138, 139, 140, 141, 142, 143, 144, 145, 146, 147) of the module group (M1, M2, M3, M4, M5, M34).

A further aspect of the present invention is an apparatus (131) characterized in that the number of storage locations (L) of the module group (M1, M2, M3, M4, M5, M34) corresponds to twice the number of processing modules (18, 19, 29, 35, 50, 59, 69, 93, 103, 109, 117, 134, 136, 137, 138, 139, 140, 141, 142, 143, 144, 145, 146, 147) of the module group (M1, M2, M3, M4, M5, M34) minus one storage location (L).

A further aspect of the present invention is an apparatus (131) characterized in that at least one single processing module (18, 19, 29, 35, 50, 59, 69, 93, 103, 109, 117, 134, 135, 137, 138, 139, 140, 141, 142, 143, 144, 145, 146, 147) is provided that is not part of a module group (M1, M2, M3, M4, M5, M34) of processing modules (18, 19, 29, 35, 50, 59, 69, 93, 103, 109, 117, 134, 135, 137, 138, 139, 140, 141, 142, 143, 144, 145, 146, 147).

A further aspect of the present invention is an apparatus (131) characterized in that the module group (M1, M2, M3, M4, M5, M34) has exactly two processing modules (18, 19, 29, 35, 50, 59, 69, 93, 103, 109, 117, 134, 135, 137, 138, 139, 140, 141, 142, 143, 144, 145, 146, 147) or more processing modules (18, 19, 29, 35, 50, 59, 69, 93, 103, 109, 117, 134, 135, 137, 138, 139, 140, 141, 142, 143, 144, 145, 146, 147), three processing modules (18, 19, 29, 35, 50, 59, 69, 93, 103, 109, 117, 134, 136, 137, 138, 139, 140, 141, 142, 143, 144, 145, 146, 147) or more processing modules (18, 19, 29, 35, 50, 59, 69, 93, 103, 109, 117, 134, 135, 137, 138, 139, 140, 141, 142, 143, 144, 145, 146, 147), four processing modules (18, 19, 29, 35, 50, 59, 69, 93, 103, 109, 117, 134, 135, 137, 138, 139, 140, 141, 142, 143, 144, 145, 146, 147) or more processing modules (18, 19, 29, 35, 50, 59, 69, 93, 103, 109, 117, 134, 135, 137, 138, 139, 140, 141, 142, 143, 144, 145, 146, 147) or five processing modules (18, 19, 29, 35, 50, 59, 69, 93, 103, 109, 117, 134, 135, 137, 138, 139, 140, 141, 142, 143, 144, 145, 146, 147) or even more processing modules (18, 19, 29, 35, 50, 59, 69, 93, 103, 109, 117, 134, 135, 137, 138, 139, 140, 141, 142, 143, 144, 145, 146, 147).

A further aspect of the present invention is an apparatus (131) characterized in that exactly one module group (M1, M2, M3, M4, M5, M34) or more module groups (M1, M2, M3, M4, M5, M34), two module groups (M1, M2, M3, M4, M5, M34) or more module groups (M1, M2, M3, M4, M5, M34), three module groups (M1, M2, M3, M4, M5, M34) or more module groups (M1, M2, M3, M4, M5, M34), four module groups (M1, M2, M3, M4, M5, M34) or more module groups (M1, M2, M3, M4, M5, M34), five module groups (M1, M2, M3, M4, M5, M34) or more module groups (M1, M2, M3, M4, M5, M34), six module groups (M1, M2, M3, M4, M5, M34) or more module groups (M1, M2, M3, M4, M5, M34), seven module groups (M1, M2, M3, M4, M5, M34) or more module groups (M1, M2, M3, M4, M5, M34), eight module groups (M1, M2, M3, M4, M5, M34) or even more module groups (M1, M2, M3, M4, M5, M34) are provided.

A further aspect of the present invention is an apparatus (131) characterized in that a common transport device (72) for transporting the cable (1a, 1b) along a transport direction (T) between multiple module groups (M1, M2, M3, M4, M5, M34) or between at least one module group (M1, M2, M3, M4, M5, M34) and at least one single processing module (18, 19, 29, 35, 50, 59, 69, 93, 103, 109, 117, 134, 135, 137, 138, 139, 140, 141, 142, 143, 144, 145, 146, 147) is provided.

A further aspect of the present invention is an apparatus (131) characterized in that the feed direction (X) deviates from the transport direction (T), preferably runs substantially orthogonally and particularly preferably orthogonally with respect to the transport direction (T).

A further aspect of the present invention is an apparatus (131) characterized in that the module transport direction (M) corresponds to the transport direction (T), preferably runs parallel to the transport direction (T).

A further aspect of the present invention is an apparatus (131) characterized in that the transport device (72) has a workpiece carrier system (94) with at least one workpiece carrier (11) for the cable (1a, 1b) in order to transport the cable (1a, 1b) along the transport direction (T).

A further aspect of the present invention is an apparatus (131) characterized in that the transport device (72) has a gripper device with at least one gripper (132) in order to transport the cable (1a, 1b) along the transport direction (T).

A further aspect of the present invention is an apparatus (131) characterized in that the at least two processing modules (18, 19, 29, 35, 50, 59, 69, 93, 103, 109, 117, 134, 135, 137, 138, 139, 140, 141, 142, 143, 144, 145, 146, 147) and/or the module groups (M1, M2, M3, M4, M5, M34) are clocked in a synchronized manner.

A further aspect of the present invention is an apparatus (131) characterized in that a control device (96) is provided in order to control and/or monitor the assembly of the plug connector (12) by the module groups (M1, M2, M3, M4, M5, M34).

A further aspect of the present invention is an apparatus (131) characterized in that at least one of the following module groups is provided:
a) a first module group (M1), comprising processing modules for aligning, orienting, measuring and/or marking the cable (1a, 1b);
b) a second module group (M2), comprising processing modules for pre-fitting the cable (1a, 1b) with plug connector components (26, 44, 45, 46, 47, 56) of the plug connector (12);
c) a third module group (M3), comprising processing modules for stripping and processing cable components of the cable (1a, 1b);
d) a fourth module group (M4), comprising processing modules for assembling plug connector components (26, 44, 45, 46, 47, 56) on the cable (1a, 1b);
e) a combined module group (M34), comprising processing modules for stripping and processing cable components of the cable (1a, 1b) and for assembling plug connector components (26, 44, 45, 46, 47, 56) on the cable (1a, 1b) and optionally for cleaning the cable end (3, 4);
f) a fifth module group (M5), comprising processing modules for inspecting and/or cleaning the cable end (3, 4).

A further aspect of the present invention is an apparatus (131) characterized in that one of the processing modules is designed as an alignment module (134) for aligning the electrical cable (1b) which has exactly one inner conductor (2), wherein the control unit (10) is configured to, for the processing of the first cable end (3), initially determine an actual alignment ($A_{IST}$) and a setpoint alignment ($A_{SOLL}$) of a plug connector component (26, 44, 45, 46, 47, 56), which has been assembled on the second cable end (4), of a second plug connector (12).

A further aspect of the present invention is an apparatus (131) characterized in that one of the processing modules is designed as an alignment module (134) for aligning the electrical cable (1a) which has multiple inner conductors (2), wherein the control unit (10) is configured to, for the processing of the multicore cable (1a), determine an actual alignment ($A_{IST}$) and a setpoint alignment ($A_{SOLL}$) of the inner conductors (2) of the first cable end (3).

A further aspect of the present invention is an apparatus (131) characterized in that the alignment module (134) has an actuator device (16) which is communicatively connected to the control unit (10) and which is configured to align the first cable end (3) in order to approximate the actual alignment ($A_{IST}$) to the setpoint alignment ($A_{SOLL}$).

A further aspect of the present invention is an apparatus (131) characterized in that one of the processing modules is designed as an assembly module (29) for processing the electrical cable (1a) which has multiple inner conductors (2), wherein the control unit (10) is configured to detect an actual twist ($V_{IST}$) and a setpoint twist ($V_{SOLL}$) between ends (2.3) of the inner conductors (2) that emerge from the first cable end (3) and from the second cable end (4), and wherein an actuator module (30) is communicatively connected to the control unit (10) and is configured to twist the inner conductors (2) at at least one of the cable ends (3, 4) in order to approximate the actual twist ($V_{IST}$) to the setpoint twist ($V_{SOLL}$) in accordance with the specification of the control unit (10), and wherein the assembly module (29) has a pressing tool (33) which, in order to fix the twist, is designed to fix a contact part carrier (13) of the electrical plug connector (12) that is to be assembled on the cable end (3, 4), which contact part carrier receives the ends (2.3) of the inner conductors (2), to the cable (1a) in twist-proof fashion.

A further aspect of the present invention is an apparatus (131) characterized in that one of the processing modules is designed as an assembly module (29) for processing the electrical cable (1b) which has exactly one inner conductor (2), having a first means for twist-proof fastening of a first inner conductor contact element (8) in a first orientation to the first cable end (3) and a second means for twist-proof fastening of a second inner conductor contact element (8) to the second cable end (4), wherein the control unit (10) is configured to detect the first orientation and a setpoint twist ($V_{SOLL}$) between the two inner conductor contact elements (8) and from this to ascertain a second orientation for the fastening of the second inner conductor contact element (8).

A further aspect of the present invention is an apparatus (131) characterized in that one of the processing modules is designed as a stripping module (35) for incising and pulling off a part (5a, 2.2a) of a cable component of the cable (1a, 1b), having a rotary head (36) which is rotatable about a central axis (M) and on which a blade (39) and a counter-holder (40) for the cable (1a, 1b) are arranged opposite one another and so as to be aligned with the central axis (M), wherein the cable (1a, 1b) is guided in the stripping module (35) along the central axis (M), and wherein the blade (39) can be fed in the direction of the central axis (M) to the cable (1a, 1b) in order to generate a radial incision in the cable component of the cable (1a, 1b) at a defined axial position.

A further aspect of the present invention is an apparatus (131) characterized in that the stripping module (35) has at least one pulling-off tool (41) which is arranged on the rotary head (36) and which can be fed in the direction of the central axis (M) to the cable (1a, 1b), wherein the pulling-off tool (41) is positioned relative to the blade (39) such that, in order to pull off the section (5a, 2.2a) of the cable component, the pulling-off tool (41) engages into the incision generated by the blade (39) when the pulling-off tool (41) has been fed to the cable (1a, 1b).

A further aspect of the present invention is an apparatus (131) characterized in that the control unit (10) is configured to detect an actual twist ($V_{IST}$) and a setpoint twist ($V_{SOLL}$) between the ends (2.3) of the inner conductors (2) at the respective cable ends (3, 4), and wherein the control unit (10) is configured to calculate an axial length reduction ($\Delta L$), caused by later approximation of the actual twist ($V_{IST}$) to the setpoint twist ($V_{SOLL}$), of the total length of the cable (1a, 1b), wherein the control unit (10) is furthermore configured to increase a specified stripping length ($L_A$), along which a stripping device or a stripping module (35) is able to expose the inner conductors (2) starting from their ends (2.3), at at least one of the cable ends (3, 4) taking into consideration the calculated length reduction ($\Delta L$) in order to at least partially compensate the length reduction ($\Delta L$).

A further aspect of the present invention is an apparatus (131) characterized in that one of the processing modules is designed as a multiple fitting module (50) and is configured to fit the cable (1a, 1b) starting from one of the cable ends (3, 4) with two or more plug connector components (26, 44, 45, 46, 47, 56) of the plug connector (12), wherein the multiple fitting module (50) has chambers (51) for receiving the individual plug connector components (26, 44, 45, 46, 47, 56), wherein the chambers (51) are arranged such that the plug connector components (26, 44, 45, 46, 47, 56) accommodated in the chambers (51) form a common channel (K) with a common central axis (M).

A further aspect of the present invention is an apparatus (131) characterized in that one of the processing modules is designed as a single fitting module (59) and is designed and configured to fit the cable (1a, 1b) with an elastic ring body (45) at a defined axial position (P), wherein the single fitting module (59) has an inclined tube (60) with an end face (S) which is inclined relative to a tube cross section (Q) of the inclined tube (60) by an inclination angle (α), which end face can be inserted into a passage bore (57) of the ring body (45), and wherein the cable (1a, 1b) can be positioned in the inclined tube (60) by the feed device (54) such that the ring body (45) is situated at the defined axial position (P) on the cable (1a, 1b) when the ring body (45) is slipped off from the inclined tube (60) onto the cable (1a, 1b).

A further aspect of the present invention is an apparatus (131) characterized in that one of the processing modules is designed as a press-in module (69), having an advancing device (74), which is designed to press the cable end (3, 4), which has been prefabricated with an inner conductor contact element (8), of the cable (1a, 1b) along an advancing direction (X) into a corresponding slot (75) of a housing assembly (44) of the plug connector (12) until the inner conductor contact element (8) has reached a setpoint position ($P_S$) within the housing assembly (44), and an optical sensor unit (80) for detecting the actual position ($P_I$) of the inner conductor contact element (8) within the housing assembly (44) while the cable (1a, 1b) is being pressed in.

A further aspect of the present invention is an apparatus (131) characterized in that the feed device (54) has a first transport module (85) and a second transport module (86), wherein the first transport module (85) is designed to transport the cable end (3, 4) along the feed direction (X) into one of the processing modules (18, 19, 29, 35, 50, 59, 69, 93, 103, 109, 117, 134, 135, 137, 138, 139, 140, 141, 142, 143) for processing the cable end (3, 4) or to transport said cable end counter to the feed direction (X) out of the processing module (18, 19, 29, 35, 50, 59, 69, 93, 103, 109, 117, 134, 136, 137, 138, 139, 140, 141, 142, 143, 144, 145, 146, 147), and wherein the second transport module (86) is arranged at a position spaced apart from the first transport module (85) in the feed direction (X) and is designed to transport the cable end (3, 4) along or counter to the feed direction (X), wherein the first transport module (85) has transport units (87) which can be fed to the cable (1a, 1b), which transport units are repositionable such that plug connector components (26, 44, 45, 46, 47, 56) applied to the cable end (3, 4), which is to be processed, of the plug connector (12) can pass through the first transport module (85) while the second transport module (86) is transporting the cable (1a, 1b).

A further aspect of the present invention is an apparatus (131) characterized in that a fitting unit is provided and designed to fasten a sheath clamp (48a, 48b, 48c, 48d), which is independent of the plug connector (12) to be assembled on the cable (1a, 1b) during the assembly process, to the cable (1a, 1b) in non-positively locking fashion at a defined axial position along the central axis (M) of the cable (1a, 1b).

A further aspect of the present invention is an apparatus (131) characterized in that a sensor module (103) is provided and configured to detect an axial actual position ($P_{IST}$) of at least one inner conductor contact element (8), which is fastened to one of the inner conductors (2) of the cable (1a, 1b), within a contact part carrier (13) of the plug connector (12) relative to an intended axial end position ($P_{END}$).

A further aspect of the present invention is an apparatus (131) characterized in that a quality monitoring module (109) for quality monitoring of the processing of the cable end (3, 4) is provided, having at least one optical sensor (110, 112) which is designed to detect the state of the cable end (3, 4) before and/or after the processing by at least one of the processing modules (18, 19, 29, 35, 50, 59, 69, 93, 103, 109, 117, 134, 135, 137, 138, 139, 140, 141, 142, 143, 144, 145, 146, 147).

A further aspect of the present invention is an apparatus (131) characterized in that the cable (1a, 1b), a sheath clamp (48a, 48b, 48c, 48d) fastened to the cable (1a, 1b), and/or a workpiece carrier (11) assigned to the cable (1a, 1b) during the processing thereof, has an information carrier for identification purposes, and wherein documentation (96) of the assembly of the plug connector (12) for processing by at least one of the processing modules (18, 19, 29, 35, 60, 59, 69, 93, 103, 109, 117, 134, 135, 137, 138, 139, 140, 141, 142, 143, 144, 145, 146, 147) is assigned to the cable (1a, 1b) by means of the information carrier.

A further aspect of the present invention is an apparatus (131) characterized in that a cleaning module (117) is positioned downstream of at least one of the processing modules (18, 19, 29, 35, 50, 59, 69, 93, 103, 109, 117, 134, 135, 137, 138, 139, 140, 141, 142, 143, 144, 145, 146, 147), which cleaning module is designed to remove particles (118) adhering in the region of the cable end (3, 4).

A further aspect of the present invention is a method for assembling an electrical plug connector (12) on a first cable end (3) and/or on a second cable end (4) of an electrical cable (1a, 1b) which has one or more inner conductors (2), according to which method the cable (1a, 1b) is processed by at least two processing modules (18, 19, 29, 35, 50, 59, 69, 93, 103, 109, 117, 134, 135, 137, 138, 139, 140, 141, 142, 143, 144, 145, 146, 147) of at least one common module group (M1, M2, M3, M4, M5, M34), wherein a feed device (54) feeds the cable end (3, 4) along a feed direction (X) to a processing station (B) in the module group (M1, M2, M3, M4, M5, M34), and wherein a module transport device (134) of the module group (M1, M2, M3, M4, M5, M34) feeds in each case one of the processing modules (18, 19, 29, 35, 50, 59, 69, 93, 103, 109, 117, 134, 135, 137, 138, 139, 140, 141, 142, 143, 144, 145, 146, 147) for processing the cable end (3, 4) to the processing station (B), wherein the cable end (3, 4) is removed from the module group (M1, M2, M3, M4, M5, M34) again counter to the feed direction (X) after the processing.

A further aspect of the present invention is a method characterized in that at least one control unit (10) controls and/or monitors the processing of the cable (1a, 1b) by at least one module group (M1, M2, M3, M4, M5, M34) and/or one of the processing modules (18, 19, 29, 35, 50, 59, 69, 93, 103, 109, 117, 134, 135, 137, 138, 139, 140, 141, 142, 143, 144, 145, 146, 147).

A further aspect of the present invention is a method characterized in that the feed direction (X) deviates from a module transport direction (M) along which the module transport device (134) feeds the processing modules (18, 19, 29, 35, 50, 59, 69, 93, 103, 109, 117, 134, 135, 137, 138, 139, 140, 141, 142, 143, 144, 145, 146, 147) of the module group (M1, M2, M3, M4, M5, M34) to the processing station (B), preferably runs substantially orthogonally and particularly preferably orthogonally with respect to the module transport direction (M).

A further aspect of the present invention is a method characterized in that the module transport device (134) feeds the processing modules (18, 19, 29, 35, 50, 59, 69, 93, 103, 109, 117, 134, 135, 137, 138, 139, 140, 141, 142, 143, 144, 145, 146, 147) of the module group (M1, M2, M3, M4, M5, M34) successively to the processing station (B).

A further aspect of the present invention is a method characterized in that the module transport device (134) moves the processing modules (18, 19, 29, 35, 50, 59, 69, 93, 103, 109, 117, 134, 135, 137, 138, 139, 140, 141, 142, 143, 144, 145, 146, 147) of the module group (M1, M2, M3, M4, M5, M34) simultaneously in a coupled movement.

A further aspect of the present invention is a method characterized in that one of the processing modules (18, 19, 29, 35, 50, 59, 69, 93, 103, 109, 117, 134, 136, 137, 138, 139, 140, 141, 142, 143, 144, 145, 146, 147) of the module group (M1, M2, M3, M4, M5, M34) is firstly fed to the processing station (B) before the cable end (3, 4) is fed to the processing station (B).

A further aspect of the present invention is a method characterized in that at least one of the processing modules (18, 19, 29, 35, 50, 59, 69, 93, 103, 109, 117, 134, 135, 137, 138, 139, 140, 141, 142, 143, 144, 145, 146, 147) of the module group (M1, M2, M3, M4, M5, M34) has a processing tool that is fed to the cable end (3, 4) after the processing module (18, 19, 29, 35, 50, 59, 69, 93, 103, 109, 117, 134, 136, 137, 138, 139, 140, 141, 142, 143, 144, 145, 146, 147) and the cable end (3, 4) have been fed to the processing station (B).

A further aspect of the present invention is a method characterized in that a common transport device (72) transports the cable (1a, 1b) along a transport direction (T) between multiple module groups (M1, M2, M3, M4, M5, M34) or between at least one module group (M1, M2, M3, M4, M5, M34) and at least one single processing module (18, 19, 29, 35, 50, 59, 69, 93, 103, 109, 117, 134, 135, 137, 138, 139, 140, 141, 142, 143, 144, 145, 146, 147)

A further aspect of the present invention is a method characterized in that the at least two processing modules (18, 19, 29, 35, 50, 59, 69, 93, 103, 109, 117, 134, 135, 137, 138, 139, 140, 141, 142, 143, 144, 145, 146, 147) and/or the module groups (M1, M2, M3, M4, M5, M34) are clocked in a synchronized manner.

A further aspect of the present invention is a method characterized in that the control unit (10), for the processing of the electrical cable (1b) which has exactly one inner conductor (2), determines an actual alignment ($A_{IST}$) and a setpoint alignment ($A_{SOLL}$) of a plug connector component (26, 44, 45, 46, 47, 56), which has been assembled on the second cable end (4), of a second plug connector (12), and wherein the first cable end (3) is aligned in order to approximate the actual alignment ($A_{IST}$) to the setpoint alignment ($A_{SOLL}$).

A further aspect of the present invention is a method characterized in that the control unit (10), for the processing of the electrical cable (1a) which has multiple inner conductors (2), determines an actual alignment ($A_{IST}$) and a setpoint alignment ($A_{SOLL}$) of the inner conductors (2) of the first cable end (3), and wherein the first cable end (3) is aligned in order to approximate the actual alignment ($A_{IST}$) to the setpoint alignment ($A_{SOLL}$).

A further aspect of the present invention is a method characterized in that the control unit (10) detects an actual twist ($V_{IST}$) and a setpoint twist ($V_{SOLL}$) between ends (2.3) of the inner conductors (2) that emerge from the respective cable end (3, 4), wherein the actual twist ($V_{IST}$) is approximated to the setpoint twist ($V_{SOLL}$) by virtue of the inner conductors (2) being twisted at at least one of the cable ends (3, 4), and wherein the twist is fixed by virtue of a contact part carrier (13) of the electrical plug connector (12) that is to be assembled on the associated cable end (3, 4), which contact part carrier receives the ends (2.3) of the inner conductors (2), being fixed to the cable (1a, 1b) in twist-proof fashion.

A further aspect of the present invention is a method characterized in that a first inner conductor contact element (8) is fastened in twist-proof fashion in a first orientation to the first cable end (3), following which the second cable end (4) is then processed in order to fasten a second inner conductor contact element (8) in twist-proof fashion, wherein the control unit (10) detects the first orientation and a setpoint twist ($V_{SOLL}$) between the two inner conductor contact elements (8), and from this ascertains a second orientation for the fastening of the second inner conductor contact element (8).

A further aspect of the present invention is a method characterized in that the cable (1a, 1b) is stripped by virtue of the cable (1a, 1b) being inserted along a central axis (M) into a stripping module (35) in which a rotary head (36) rotates about the central axis (M), on which rotary head a blade (39) and a counterholder (40) for the cable (1a, 1b) are arranged opposite one another and so as to be aligned with the central axis (M), wherein the blade (39) is fed in the direction of the central axis (M) to the cable (1a, 1b) in order to generate a radial incision in a cable component of the cable (1a, 1b) at a defined axial position.

A further aspect of the present invention is a method characterized in that at least one pulling-off tool (41) arranged on the rotary head (36) is fed in the direction of the central axis (M) to the cable (1a, 1b) in order to engage into the incision generated by the blade (39), following which a part (5a, 2.2a) of the cable component is at least partially pulled off the cable (1a, 1b) by the pulling-off tool (41).

A further aspect of the present invention is a method characterized in that the control unit (10) detects an actual twist ($V_{IST}$) and a setpoint twist ($V_{SOLL}$) between the ends (2.3) of the inner conductors (2) of the cable (1a, 1b) at the respective cable ends (3, 4), wherein an axial length reduction ($\Delta L$), caused by later approximation of the actual twist ($V_{IST}$) to the setpoint twist ($V_{SOLL}$), of the total length of the cable (1a, 1b) is calculated by the control unit (10), and wherein a specified stripping length ($L_A$), along which the inner conductors (2) are to be exposed starting from their ends (2.3), at at least one of the cable ends (3, 4) is increased taking into consideration the calculated length reduction ($\Delta L$) in order to at least partially compensate the length reduction ($\Delta L$).

A further aspect of the present invention is a method characterized in that the cable (1a, 1b) is, starting from one of the cable ends (3, 4), fitted with two or more plug connector components (26, 44, 46, 46, 47, 56) of the plug connector (12), wherein the plug connector components (26, 44, 45, 46, 47, 56) are arranged individually in chambers (51) such that they form a common channel (K) with a common central axis (M), following which the cable end (3, 4) of the cable (1a, 1b) is led with its front end along the central axis (M) through the plug connector components (26, 44, 46, 46, 47, 56) in order to push the plug connector components (26, 44, 45, 46, 47, 56) onto the cable (1a, 1b).

A further aspect of the present invention is a method characterized in that the cable (1a, 1b) is fitted with an elastic ring body (45) at a defined axial position (P) by virtue of an inclined tube (60) with an end face (S) which is inclined relative to a tube cross section (Q) of the inclined tube (60) by an inclination angle ($\alpha$) being inserted into a passage bore (57) of the ring body (45), wherein the cable (1a, 1b) is positioned in the inclined tube (60) such that the ring body (45) is situated at the defined axial position (P) on the cable (1a, 1b) when the ring body (45) is slipped off from the inclined tube (60) onto the cable (1a, 1b).

A further aspect of the present invention is a method characterized in that the cable end (3, 4), which has been prefabricated with an inner conductor contact element (8), is pressed along an advancing direction (X) into a corresponding slot (75) of a housing assembly (44) of the plug connector (12) until the inner conductor contact element (8) has reached a setpoint position ($P_S$) within the housing assembly (44), wherein an optical sensor unit (80) detects the actual position ($P_I$) of the inner conductor contact element (8) within the housing assembly (44) while the cable (1a, 1b) is being pressed in.

A further aspect of the present invention is a method characterized in that the cable end (3, 4) is transported by means of a first transport module (85) along a feed direction (X) into one of the processing modules (18, 19, 29, 35, 50, 59, 69, 93, 103, 109, 117, 134, 135, 137, 138, 139, 140, 141, 142, 143, 144, 145, 146, 147) for processing the cable end (3, 4), wherein the cable end (3, 4) is furthermore transported by means of a second transport module (86), which is arranged at a position spaced apart from the first transport module (85) in the feed direction (X), along or counter to the feed direction (X), wherein transport units (87), which can be fed to the cable (1a, 1b), of the first transport module (85) are repositioned such that plug connector components (26, 44, 45, 46, 47, 56) applied to the cable end (3, 4), which is to be processed, of the plug connector (12) can pass through the first transport module (85) while the second transport module (86) is transporting the cable (1a, 1b).

A further aspect of the present invention is a method characterized in that at least one sheath clamp (48a, 48b, 48c, 48d), which is independent of the plug connector (12) to be assembled on the cable (1a, 1b) during the assembly process, is fastened in non-positively locking fashion at a defined axial position along the central axis (M) of the cable (1a, 1b).

A further aspect of the present invention is a method characterized in that an axial actual position ($P_{IST}$) of at least one inner conductor contact element (8), which is fastened to one of the inner conductors (2) of the cable (1a, 1b), within a contact part carrier (13) of the plug connector (12) relative to an intended axial end position ($P_{END}$) is checked before a secondary securing means (107), which is provided for securing a primary latching means (104) of the inner conductor contact element (8), is actuated.

A further aspect of the present invention is a method characterized in that the state of the cable end (3, 4) before and/or after the processing by at least one of the processing modules (18, 19, 29, 35, 50, 59, 69, 93, 103, 109, 117, 134, 135, 137, 138, 139, 140, 141, 142, 143, 144, 145, 146, 147) is detected by means of at least one optical sensor (110, 112) for optical quality monitoring.

A further aspect of the present invention is a method characterized in that the cable (1a, 1b), a sheath clamp (48a, 48b, 48c, 48d) fastened to the cable (1a, 1b), and/or a workpiece carrier (11) assigned to the cable (1a, 1b) during the processing thereof, is made identifiable by means of an information carrier, wherein documentation (96) of the assembly of the plug connector (12) for processing by at least one of the processing modules (18, 19, 29, 35, 50, 59, 69, 93, 103, 109, 117, 134, 135, 137, 138, 139, 140, 141, 142, 143, 144, 145, 146, 147) is compiled and assigned to the cable (1a, 1b).

A still further aspect of the present invention is a method characterized in that after the processing the cable end (3, 4) by at least one of the processing modules (18, 19, 29, 35, 50, 59, 69, 93, 103, 109, 117, 134, 135, 137, 138, 139, 140, 141, 142, 143, 144, 145, 146, 147), a cleaning process is executed, in which particles (118) adhering to the cable end (3, 4) are removed.

These and other aspects of the present invention are disclosed herein.

BRIEF DESCRIPTIONS OF THE DRAWINGS

In the figures, in each case schematically:

DETAILED WRITTEN DESCRIPTION OF THE PREFERRED EMBODIMENTS

This disclosure of the invention is submitted in furtherance of the Constitutional purposes of the US Patent Laws, "to promote the progress of science and useful arts" (Article 1, Section 8).

Figure 1:
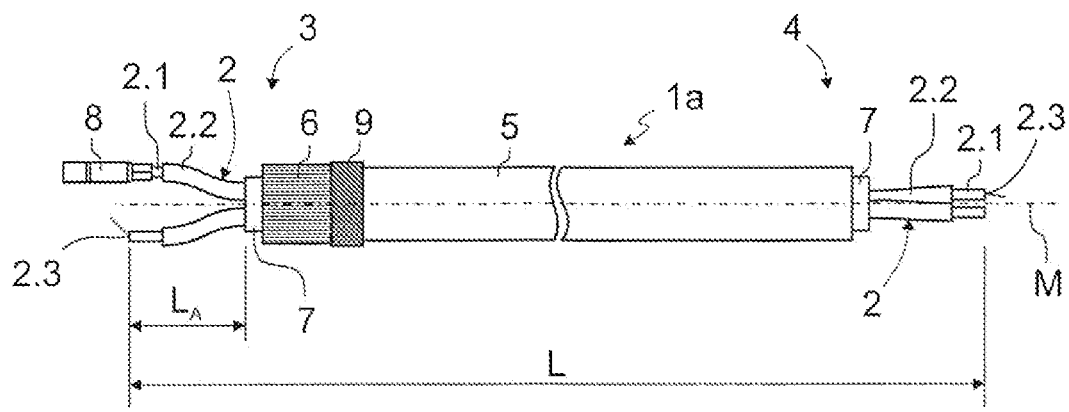
FIG. 1 shows an exemplary two-core electrical cable in a side view.
Figure 2:
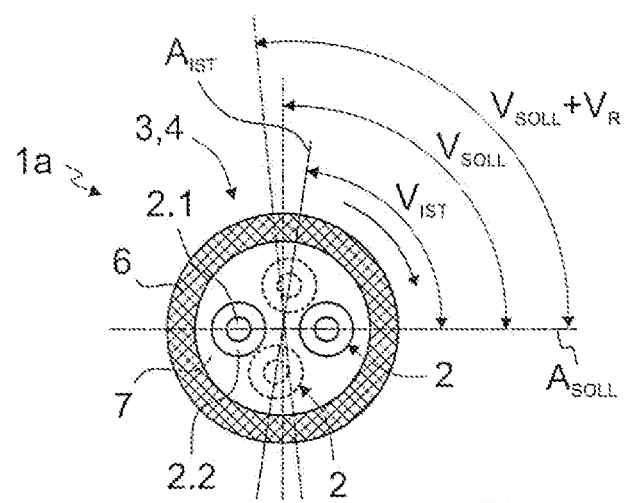
FIG. 2 shows the electrical cable of FIG. 1 in a front view.

In FIG. 1, by way of example, a multicore cable $1a$ is illustrated in enlarged form in a side view. FIG. 2 shows a front view of the multicore cable $1a$.

As illustrated in FIG. 1, the inner conductors 2 each extend from a first cable end 3 to a second cable end 4. The multicore electrical cable $1a$ illustrated has already been partially prefabricated. The multicore cable $1a$ has a cable sheath 5 and a cable shielding braid 6 running under the cable sheath 5. A shielding foil may optionally run above the cable shielding braid 6 (not illustrated). The inner conductors 2 run below the cable shielding braid 6 within a filler layer 7. The two inner conductors 2 each have an electrical conductor 2.1 or a care which is encased by an insulation 2.2. In the course of the preceding fabrication steps, the electrical conductors 2.1 of the inner conductors 2 have already been exposed in the region of the inner conductor ends 2.3 at both cable ends 3, 4.

The inner conductor contact elements 8 are subsequently fastened to the exposed conductors 2.1, in particular by crimping (illustrated by way of example for the upper inner conductor 2 of the first cable end 3 illustrated in FIG. 1). Furthermore, the cable shielding braid 6 has, at the first cable end 3, been folded back over the cable sheath 5, preferably over a metal sleeve or support sleeve (not illustrated), and optionally fixed with a fabric tape 9. The right-hand cable end illustrated in FIG. 1 (in this case the second cable end 4) is still unprocessed, except for the exposure of the inner conductors 2 and the stripping of the conductors 2.1 in the region of the inner conductor ends 2.3.

The two-core cable $1a$ illustrated in the exemplary embodiment is to be understood merely as an example for use with the invention. In principle, the invention is suitable for use with any cable type, for example also for use with a multicore cable $1a$ with more than two inner conductors 2. However, the invention is also suitable for use with a single-core cable $1b$, as will be shown below.

In the present case, the inner conductors 2 run in twisted fashion through the cable $1a$, for which reason, in the unprocessed state, in a manner dependent on the cable length (referred to here as the fabrication length L), there is an actual twist $V_{IST}$ between the inner conductor ends 2.3 emerging from the respective cable end 3, 4. The actual twist $V_{IST}$ is optionally detected for example by a control unit 10 (cf. for example FIG. 7). Furthermore, the control unit 10 can also detect the setpoint twist $V_{SOLL}$ for the inner conductor ends 2.3 emerging from the respective cable end 3, 4.

Figure 6:
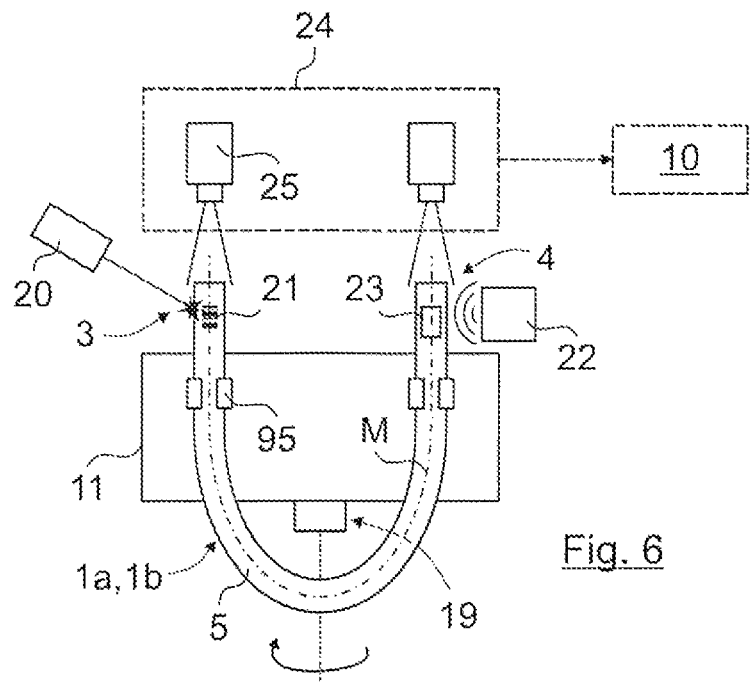
FIG. 6 shows a cable fixed with both cable ends on a workplace carrier, a laser for generating a marking on the cable sheath of the cable, an electronic assembly for configuring an electronic component on the cable sheath of the cable, and sensors for detecting the actual alignment.

It may be provided in the course of the plug connector assembly process according to the invention that the control unit 10 determines an actual alignment $A_{IST}$ and a setpoint alignment $A_{SOLL}$ of the inner conductors 2 of the first cable end 3, wherein the first cable end 3 is aligned in order to approximate the actual alignment $A_{IST}$ to the setpoint alignment $A_{SOLL}$, and wherein the aligned first cable end 3 is fixed on a workpiece carrier 11 (cf. for example FIG. 6).

FIG. 2 illustrates, by way of example, an actual alignment $A_{IST}$ and a setpoint alignment $A_{SOLL}$ of the inner conductors 2 of the multicore cable $1a$, wherein the state or the actual alignment $A_{IST}$ of the first cable end 3 before its alignment is illustrated by dashed lines. The alignments $A_{IST}$, $A_{SOLL}$ relate to a radial alignment in relation to the longitudinal or central axis M of the cable 1. By twisting the multicore cable 1 along its central axis M, the actual alignment $A_{IST}$ can thus be approximated to the setpoint alignment $A_{SOLL}$, as indicated in FIG. 2.

In particular, it may be provided that, for the fabrication of the multicore cable $1a$, the setpoint alignment $A_{SOLL}$ of the inner conductors 2 of the first cable end 3 is determined by the control unit 10 in accordance with an assembly alignment of a plug connector component of a first plug connector 12 to be assembled on the first cable end 3. The plug connector component may for example be a contact part carrier 13 (cf. for example FIG. 7, FIG. 8 or FIG. 57) which, owing to the process, can be pushed onto the inner conductor 2 of the multicore cable $1a$ only in one specified assembly alignment, for which reason an alignment of the first cable end 3 taking into consideration the assembly alignment may be advantageous.

In particular, for the fabrication of the multicore cable $1a$, the setpoint alignment $A_{SOLL}$ of the inner conductors 2 of the first cable end 3 may be determined by the control unit 10 also taking into consideration a color coding of the inner conductors 2 (for example black and red for defining the pin assignments ground or "minus" and "plus").

Also taking into consideration the alignment of the inner conductors 2 of the second cable end 4 in the determination of the setpoint alignment $A_{SOLL}$ can be advantageous with regard to the multicore cable 1a, for example also in order to take into consideration a twist, to be described below, of the inner conductor ends 2.3 of the respective cable ends 3, 4.

As already mentioned, the invention is also suitable for the use or fabrication of a single-core cable 1b with only one inner conductor 2, for example in a coaxial design. A corresponding single-core cable 1b is illustrated by way of example in FIG. 3 in a side view.

In the course of the cable fabrication process or plug connector assembly process, it may be provided that a plug connector component of a second plug connector (not illustrated) is fastened, preferably fastened in twist-proof fashion, to the second cable end 4. By way of example, FIG. 3 illustrates an inner conductor contact element 8 which is cohesively connected to the inner conductor 2 of the single-core cable 1b.

Figure 3:
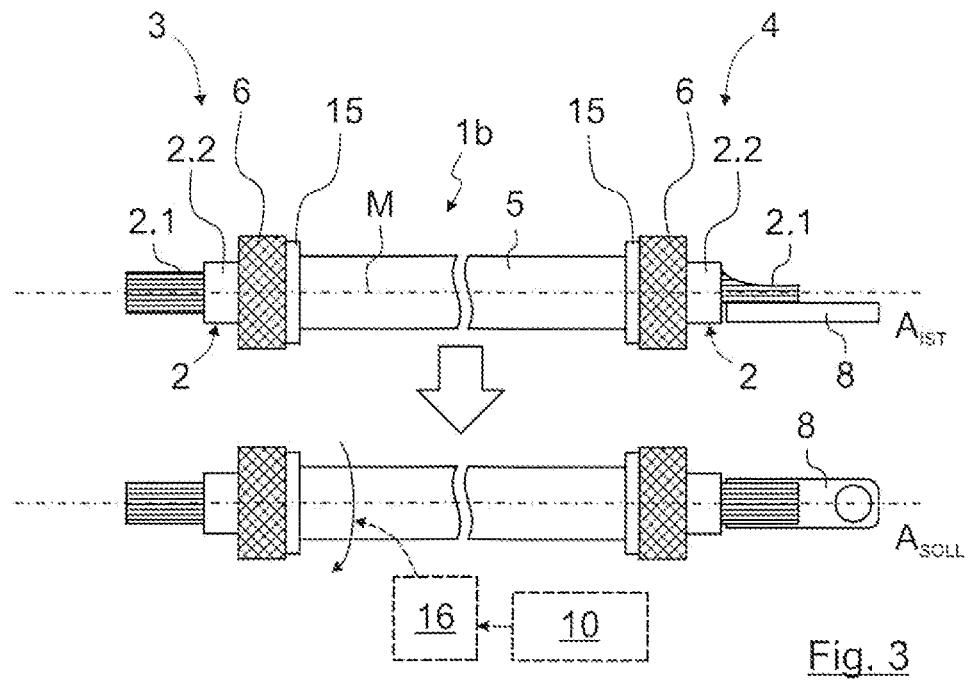
FIG. 3 shows an exemplary single-core electrical cable in a side view before and after an alignment of the first cable end.

The single-core cable 1b illustrated in FIG. 3 is to be understood purely as an example. The single-core cable 1b likewise has a cable sheath 5 and a cable shielding braid 6 running under the cable sheath 5. The cable shielding braid 6 is folded over onto a support sleeve 15. The insulation 2.2 or the primary insulation of the inner conductor 2 runs under the cable shielding braid 6. The inner conductor 2 may for example be formed as a strand of multiple individual wires; in principle, however, the exact structure of the single-core cable 1b is not of importance.

In the course of the fabrication of the single-core cable 1b, it may be provided that, for example, the control unit 10 determines an actual alignment $A_{IST}$ and a setpoint alignment $A_{SOLL}$ of the plug connector component assembled on the second cable end 4 (in this case of the inner conductor contact element 8) of the second plug connector, wherein the first cable end 3 is subsequently aligned in order to approximate the actual alignment $A_{IST}$ to the setpoint alignment $A_{SOLL}$, and wherein the aligned first cable end 3 is fixed on the workpiece carrier 11.

The method step of aligning the first cable end 3 is indicated by way of example in FIG. 3, wherein the upper part of FIG. 3 shows the plug connector component or the inner conductor contact element 8 in the actual alignment $A_{IST}$ and the lower part of FIG. 3 shows the plug connector component or the inner conductor contact element 8 in the setpoint alignment $A_{SOLL}$. A twist of approximately 90° is provided as an example.

In principle, for the fabrication of the single-core cable 1b, it may be provided that the setpoint alignment $A_{SOLL}$ of the plug connector component or of the inner conductor contact element 8 of the second plug connector is determined by the control unit 10 taking into consideration an assembly alignment (for example a process-related assembly alignment) of a plug connector component, which is to be assembled on the first cable end 3, of a first plug connector and an intended setpoint twist $V_{SOLL}$ between the first plug connector 12 and the second plug connector.

Here, it may for example be taken into consideration that, in the course of the later ultrasound welding process or of a resistance welding process, the plug connector component or the inner conductor contact element 8 of the first plug connector 12 can be fastened to the inner conductor end 2.3 of the first cable end 3 only at one defined angle. The first cable end 3 can thus advantageously already be aligned in order to ensure an intended setpoint twist $V_{SOLL}$ between the plug connectors or their plug connector components.

An actuator device 16, which is communicatively connected to the control unit 10, may be provided for twisting or aligning the first cable end 3. The actuator device 16 is indicated in FIG. 3 as a black box together with the control unit 10. A corresponding actuator device 16 may also be provided for aligning the first cable end 3 of the multicore cable 1a.

In the course of the plug connector assembly process according to the invention, it may be provided that the electrical cable 1a, 1b is unrolled from a cable drum and cut to the defined fabrication length L. For this purpose, a conveying device 17 indicated in FIG. 4 may be provided. Furthermore, a cutting module 18, likewise indicated in FIG. 4, may be provided and configured to cut the electrical cable 1a, 1b to length in accordance with the fabrication length L.

In the course of the fabrication of the multicore cable 1a, provision may be made for the actual twist $V_{IST}$ of the inner conductor ends 2.3 emerging from the respective cable end 3, 4 to be approximated to a specified setpoint twist by twisting the inner conductors 2 at at least one of the cable ends 3, 4. The twist can subsequently be fixed, for example by virtue of a contact part carrier 13 applied to the inner conductor ends 2.3 being fixed in twist-proof fashion to the cable sheath 5.

Figure 5:
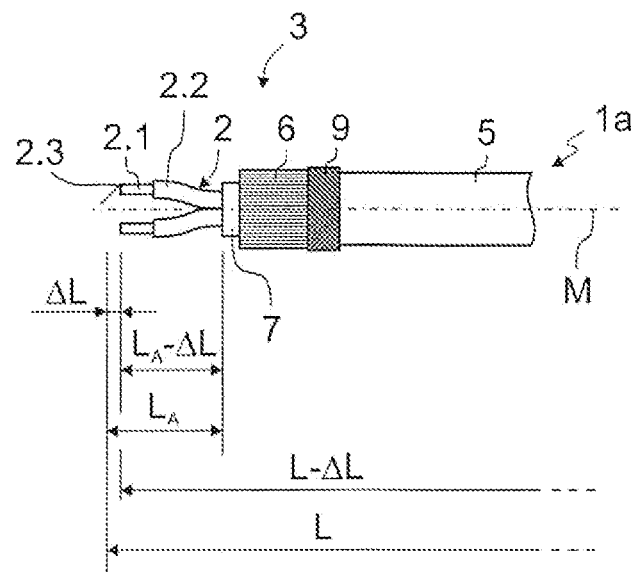
FIG. 5 shows the first end of the electrical cable of FIG. 1 after a twisting of the inner conductors and a resulting length reduction.

The approximation of the actual twist $V_{IST}$ to the setpoint twist $V_{SOLL}$ however results in a reduction of the total length or fabrication length L of the cable 1a, as can be seen for example from a comparison of FIGS. 5 and 1.

FIG. 5 illustrates, by way of example, a length reduction ΔL caused by the twisting of the first cable end 3, which on the one hand affects and correspondingly shortens the fabrication length L of the cable 1a, and on the other hand also affects the lengths of individual sections of the cable 1a, for example specified stripping lengths $L_A$ along which the inner conductors 2 and/or their cores or electrical conductors 2.1 have been exposed starting from their inner conductor ends 2.3.

In order to take the length reduction ΔL into consideration in the cutting of the electrical cable 1a to length, it may for example be provided that the length reduction ΔL caused by the later approximation of the actual twist $V_{IST}$ to the setpoint twist $V_{SOLL}$ is calculated already in advance by the control unit 10 before the cable 1a is actually cut to length. The length reduction ΔL can thus be taken into consideration, and the fabrication length L increased (for example by the length reduction ΔL), in order to at least partially compensate the length reduction ΔL.

Figure 4:
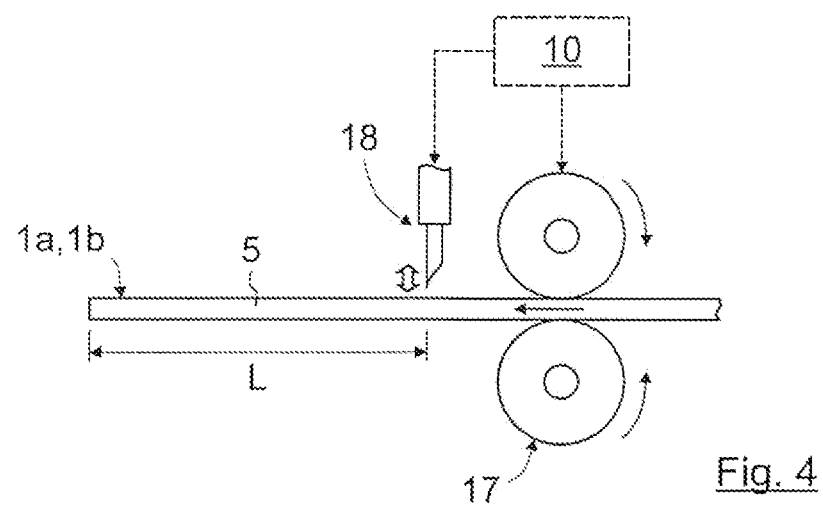
FIG. 4 shows a feed device and a cutting device for unrolling the cable from a cable drum and cutting it to length in accordance with a fabrication length.

The control of the conveying device 17 and of the cutting device 18 by the control unit 10 is indicated by way of example in FIG. 4.

In FIG. 6, a workpiece carrier 11 for fixing the cable 1a, 1b is indicated by way of example. It may be provided that the second cable end 4 is also fixed on the workpiece carrier 11. Depending on the fabrication length L or the cable length, the cable 1a, 1b may preferably be fixed such that the cable 1a, 1b forms a U-shaped profile between the two cable ends 3, 4, as illustrated in FIG. 6. In this way, it is for example advantageously possible for processing of both cable ends 3, 4 to be provided in a sequential sequence.

Provision may be made whereby, after the fabrication of the first cable end 3, the cable 1a, 1b is turned over in order, by swapping the two cable ends 3, 4 on the workpiece carrier 11, to process the second cable end 4 in a second pass of the plug connector assembly process.

It is correspondingly then possible, in particular for the fabrication of the multicore cable 1A, for the control unit 10 to determine an actual alignment $A_{IST}$ and a setpoint alignment $A_{SOLL}$ of the inner conductors 2 of the second cable end 4, wherein the second cable end 4 is aligned in order to approximate the actual alignment $A_{IST}$ to the setpoint alignment $A_{SOLL}$.

A turning-over module 19 may be provided for turning the cable 1*a*, 1*b* over. For example, the turning-over module 19 may effect a rotation of the workpiece carrier 11 through 180°. Any other turning-over of the cable 1*a*, 1*b*, and even manual turning-over of the cable 1*a*, 1*b*, may also be provided.

In the course of the plug connector assembly process, it may be provided, for example for quality assurance, that the first cable end 3 and/or the second cable end 4 is marked for documentation of the plug connector assembly process. FIG. 6 illustrates, by way of example, a laser 20 for applying an optical marking 21 (for example a barcode, a QR code or some other marking) to the first cable end 3.

A further example of a marking may be an electronic marking that is applied and/or configured on the cable 1*a*, 1*b*, as is likewise illustrated in FIG. 6. For this purpose, by way of example, an electronic assembly 22 may be provided which is able to configure a transponder 23 of an RFID system.

To detect the actual alignment $A_{IST}$ of the second plug connector assembled on the second cable end 4 and/or the actual alignment $A_{IST}$ of the inner conductors 2 of the first cable end 3, various sensors 24 may be provided and communicatively connected to the control unit 10. By way of example, FIG. 6 illustrates two cameras 25. In principle, however, any sensors 24 may be provided.

As already indicated above, it may also be provided in the course of the process of plug connector assembly on the multicore cable 1*a* that the control unit 10 detects the actual twist $V_{IST}$ and the setpoint twist $V_{SOLL}$ of inner conductor ends 2.3 emerging from the respective cable end 3, 4. The actual twist $V_{IST}$ can be approximated to the setpoint twist $V_{SOLL}$ by twisting the inner conductors 2 at at least one of the cable ends 3, 4. The twist can subsequently be fixed by virtue of a contact part carrier 13 applied to the inner conductor ends 2.3 being fixed in twist-proof fashion to the cable 1*a* or to its cable sheath 5.

The contact part carrier 13 may for example be fixed in twist-proof fashion by being pressed directly onto the corresponding cable end 3, 4, for example indirectly or directly onto the cable sheath 5, preferably onto a support sleeve fastened to the cable sheath 5 or onto a cable shielding braid 6 folded back over the cable sheath 5.

It is particularly preferably provided that the contact part carrier 13 is fixed indirectly to the cable sheath 5 of the associated cable end 3, 4 by virtue of a shielding sleeve 26 (cf. for example FIG. 7 or FIG. 16) being assembled in twist-proof fashion on the contact part carrier 13 and being pressed, preferably crimped, on the corresponding cable end 3, 4, for example on the support sleeve (not illustrated) or on the folded-over cable shielding braid 6.

With regard to the approximation of the actual twist $V_{IST}$ to the setpoint twist $V_{SOLL}$, it may be provided that the cable end 3, 4 is twisted, wherein the contact part carrier 13 is held in twist-proof fashion. Alternatively, or in addition, it may also be provided that the contact part carrier 13 is rotated together with the inner conductor ends 2.3 received in the contact part carrier 13 and/or that the shielding sleeve 26 is assembled in twist-proof fashion on the contact part carrier 13 and is rotated together with the contact part carrier 13 and the inner conductor ends 2.3 received in the contact part carrier 13.

The shielding sleeve 26 and contact part carrier 13 preferably have a mechanical coding so as to be connectable to one another only in one or in two defined orientations. For example, a latching lug and a latching groove, as indicated in the following FIG. 7, may be provided.

In order to reduce the mechanical load on the multicore cable 1*a*, it may be provided that the control unit 10 determines a twist of both cable ends 3, 4, in particular if the actual twist $V_{IST}$ of the inner conductor ends 2.3 at the two cable ends 3, 4 deviates by more than 90° from the setpoint twist $V_{SOLL}$. The control unit 10 can furthermore take an elasticity-induced backward twist $V_R$ of the inner conductor ends 2.3 into consideration in the approximation of the actual twist $V_{IST}$ to the setpoint twist $V_{SOLL}$. The actual twist $V_{IST}$ can thus be approximated to the setpoint twist $V_{SOLL}$ by initially being overcompensated up to a twist composed of setpoint twist $V_{SOLL}$ plus a backward twist $V_R$.

To detect the actual twist $V_{IST}$, it may be advantageous if the control unit 10 takes into consideration a lay of the inner conductors 2 that has been determined in advance, for example by measurement or experiment. Taking into consideration the fabrication length L or the cable length of the multicore cable 1*a*, it is thus possible, after the detection of the orientation of the inner conductor ends 2.3 at one of the two cable ends 3, 4, for the orientation of the inner conductors 2 at the opposite cable end 4, 3 to be calculated.

Figure 7:
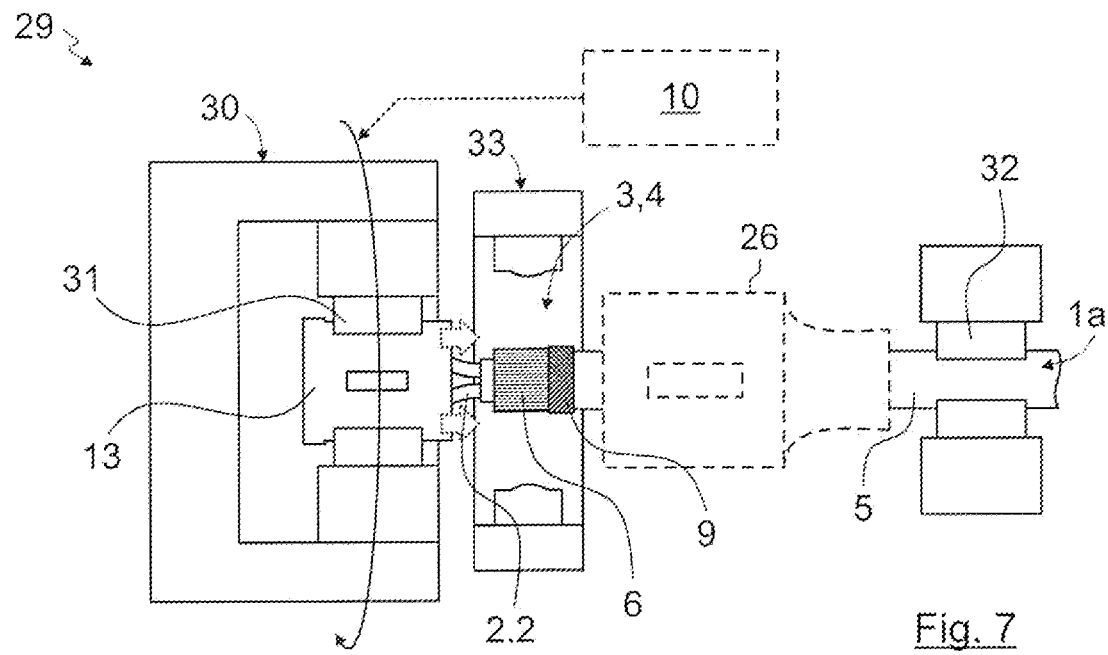
FIG. 7 shows an actuator module for approximating the actual twist of the inner conductors to the setpoint twist.

FIG. 7 shows, by way of example, a detail of an assembly module 29 for assembling the contact part carrier 13 on the inner conductor contact elements 8 of the multicore cable 1*a*, with some specific features shown only schematically.

The assembly module 29 has the said control unit 10 which, among other things, is also configured to detect the actual twist $V_{IST}$ and the setpoint twist $V_{SOLL}$ between the inner conductor ends 2.3 emerging from the cable ends 3, 4.

The assembly module 29 furthermore has an actuator module 30, which is communicatively connected to the control unit 10 and which is configured to twist the inner conductors 2 at at least one of the cable ends 3, 4 in order to approximate the actual twist $V_{IST}$ to the setpoint twist $V_{SOLL}$ in accordance with the specification of the control unit 10. A rotatable actuator module 30 with actuator clamping jaws 31 that can be fed to the contact part carrier 13 is illustrated by way of example. Also illustrated are cable clamping jaws 32 for fixing the multicore cable 1*a* at its cable sheath 5 in order to fix the multicore cable 1*a* in twist-proof fashion during the rotation of the contact part carrier 13. The actuator module 30 for rotating the contact part carrier 13 may also be an actuator module 30 which, in principle, is also used for linearly pushing the contact part carrier 13 onto the inner conductor contact elements 8 and/or for aligning the first cable end 3 for the purposes of approximating the actual alignment $A_{IST}$ to the setpoint alignment $A_{SOLL}$.

The assembly module 29 may furthermore have a pressing tool 33 which is designed to fix the contact part carrier 13 to the cable sheath 5 of the cable 1*a* in twist-proof fashion in order to fix the rotation. The pressing tool 33 illustrated in FIG. 7 is in particular designed to crimp the shielding sleeve 26 after it has been assembled on the contact part carrier 13 in the region of the folded-over cable shielding braid 6. The shielding sleeve 26 has already been pushed onto the cable sheath 5 (as illustrated by dashed lines) in the course of a pre-assembly process and, after the rotation of the contact part carrier 13, can be pushed from the rear over the contact part carrier 13 in the corresponding orientation.

In order for the abovementioned length reduction ΔL during the approximation of the actual twist $V_{IST}$ to the setpoint twist $V_{SOLL}$ of the inner conductor ends 2.3 to be taken into consideration already during the exposure of the inner conductors 2, it may be provided that the axial length reduction ΔL caused by the later approximation of the actual twist $V_{IST}$ to the setpoint twist $V_{SOLL}$ is calculated already in advance by the control unit 10 before the inner conductors 2 are actually exposed at the corresponding cable end 3, 4. It is thus possible for the length reduction ΔL to be taken into consideration and for the stripping length $L_A$, along which the inner conductors 2 are exposed starting from their inner conductor ends 2.3, to be increased (for example by the length reduction ΔL) in order to at least partially compensate the length reduction ΔL.

Here, the specified stripping length $L_A$ may be increased proportionally for the respective cable end 3, 4 by the calculated length reduction ΔL, if necessary with regard to defined tolerances. In principle, it may be desirable to fully compensate the length reduction ΔL. However, a partial compensation may also be sufficient if it is still within defined tolerance ranges.

It may be provided that only the specified stripping length $L_A$ of the inner conductors 2 to be exposed at the first cable end 3 is increased if only twisting of the first cable end 3 is provided. Accordingly, it may also be provided that only the specified stripping length $L_A$ of the exposed inner conductors 2 at the second cable end 4 is increased if only twisting of the second cable end 4 is provided. If both cable ends 3, 4 are twisted, provision may also be made for the specified stripping lengths $L_A$ to be increased at both cable ends 3, 4. In particular if only the total length or fabrication length L of the cable 1 is of importance, it is also possible, independently of the twisting, for the compensation of the length reduction ΔL to be provided at one of the cable ends 3, 4 or distributed across both cable ends 3, 4.

With regard to the length reduction ΔL, it can be a particular problem that this can influence the axial position, with respect to the central axis M of the cable 1a, of plug connector components or housing components that receive the inner conductors 2 (that is to say for example the contact part carrier 13) of what will later be the plug connector 12.

It is thus advantageously possible for the length reduction ΔL to be taken into consideration in the course of the plug connector assembly process in order to specify or correct an axial setpoint position $P_{SOLL}$ of a cable-side end 34 of a plug connector component that receives the inner conductors 2 within it, for example of the contact part carrier 13, along the central axis M of the cable 1a. The problem of the influencing the axial setpoint position $P_{SOLL}$ is illustrated by way of example in FIG. 8 for the contact part carrier 13.

Figure 8:
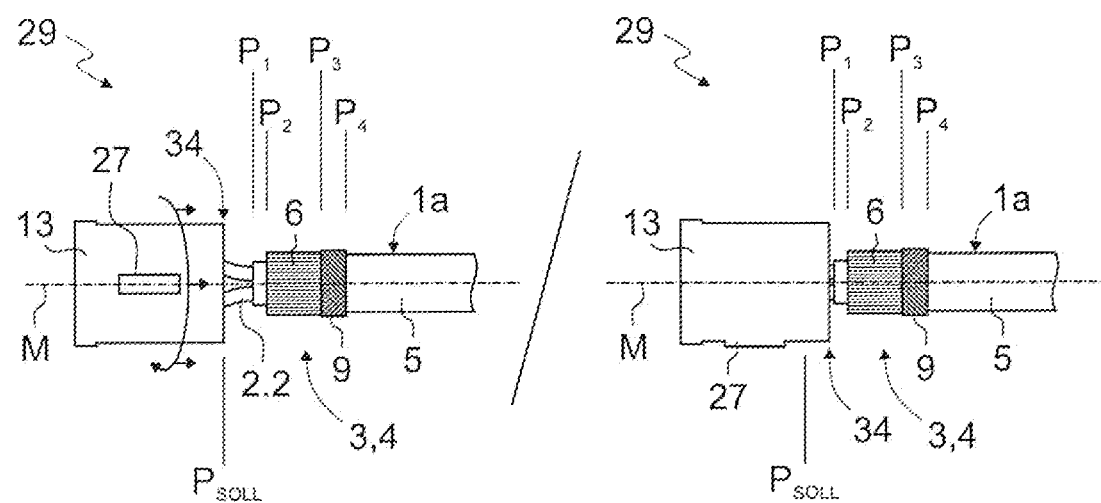
FIG. 8 shows an exemplary displacement of the axial position of a plug connector component along the central axis of the cable owing to the length reduction.

It can be seen that the position of the rear or cable-side end 34 of the contact part carrier 13 is moved closer to the opposite cable end 3, 4 owing to the twist or approximation of the actual twist $V_{IST}$ to the setpoint twist $V_{SOLL}$. The relative position of the cable-side end 34 of the contact part carrier 13 with respect to defined axial positions $P_{1-4}$ along the central axis M or along structures of the cable 1 may thus deviate from a specification. The four positions $P_{1-4}$ illustrated in FIG. 8 are to be understood merely as examples. It is often for example the case that the axial setpoint position $P_{SOLL}$ of the contact part carrier 13 relative to a support sleeve 15 applied to the cable sheath 5 of the cable 1a is relevant for the plug connector assembly process and must be adhered to within specified tolerances. This can be ensured by taking the length reduction ΔL into consideration.

Figure 11:
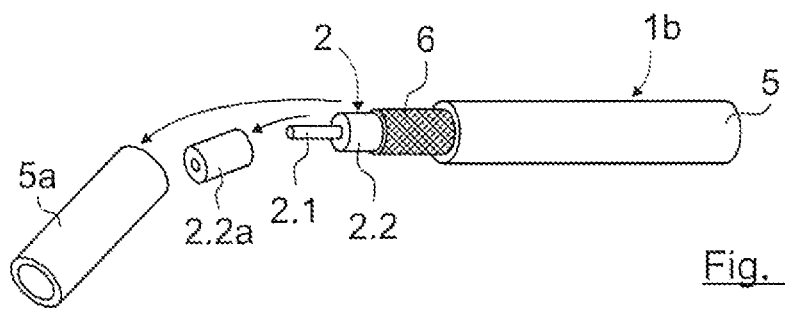
FIG. 11 shows an exemplary single-core electrical cable with two stripped parts.

The inner conductors 2 or their conductors 2.1 can be exposed in the course of the cable fabrication process by virtue of a part 5a, 2.2a, which encases the inner conductors 2 or the conductors 2.1, of at least one cable component of the cable 1a, 1b being removed (cf. FIG. 11). For example, a part 5a of the cable sheath 5 of the cable 1a, 1b may be stripped and/or a part of the outer conductor or the cable shielding braid 6 of the cable 1a, 1b may be stripped or folded back over the cable sheath 5 and/or a part of the dielectric filler layer 7 that jointly encases the inner conductors 2 may be stripped and/or a part 2.2a of the insulation 2.2 of the inner conductors 2 may be stripped.

Figure 9:
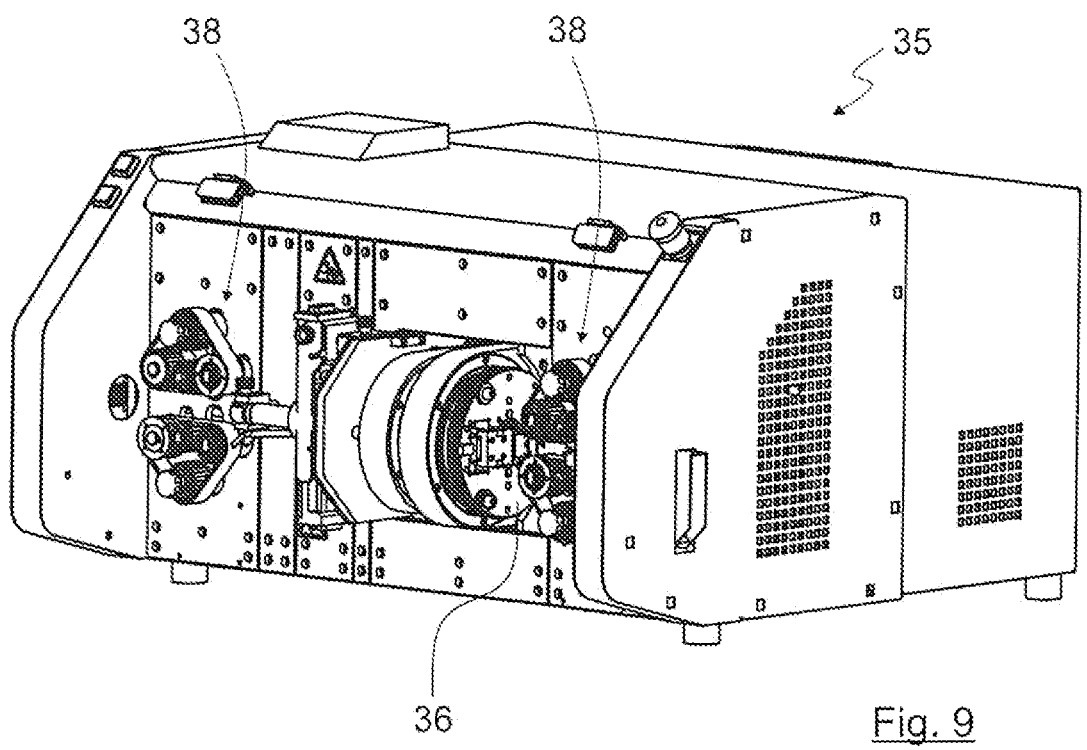
FIG. 9 shows a stripping module for incising and pulling off a part of a cable component in a perspective view.

To expose the inner conductor 2 or the conductor 2.1 or the inner conductors 2 or the conductors 2.1, a stripping module 35 may be provided, which is illustrated by way of example in FIG. 9.

In principle, the stripping module 35 may be of any desired construction. It is also possible for multiple stripping modules 35 of identical or different structure to be provided. For example, a respective stripping module 35 may be provided for each part 5a, 2.2a of the cable 1a, 1b to be removed. The structure described below is to be understood merely as an example.

Figure 10:
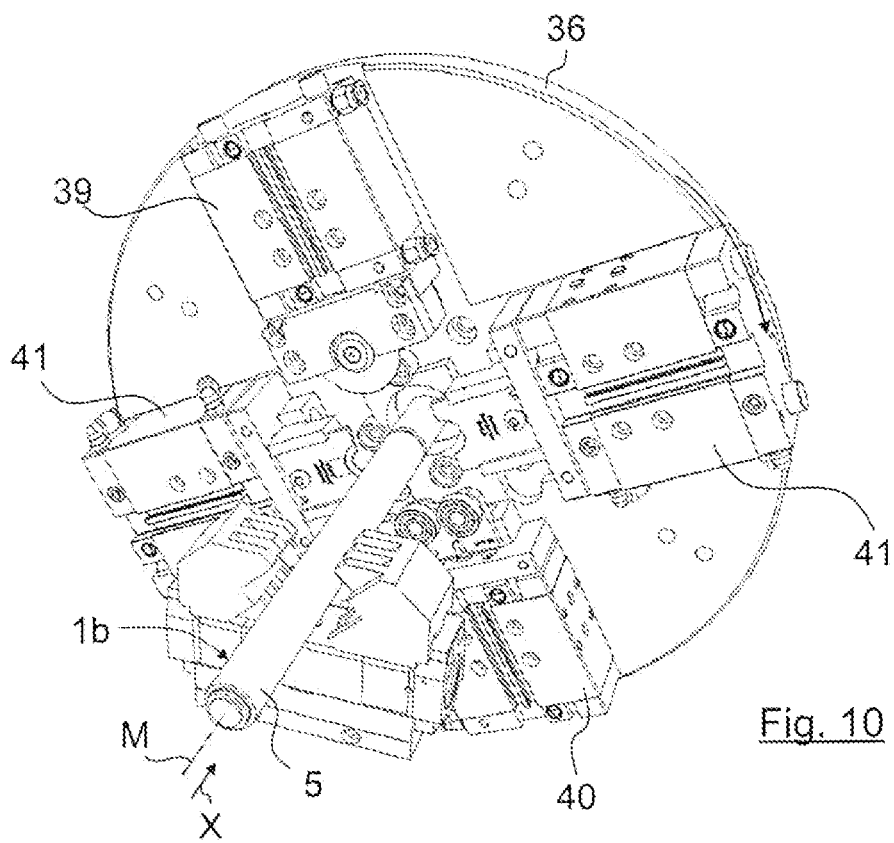
FIG. 10 shows the rotary head of the stripping module according to FIG. 9 in a perspective view.

The illustrated stripping module 35 has a rotary head 36 which is rotatable about a central axis M and a detail of which is illustrated in enlarged form in FIG. 10 for illustrative purposes. The rotary head 36 is designed as a disk, wherein a belt drive may be provided for rotating the rotary head 36.

In order to insert the cable 1a, 1b into the stripping module 35 along the central axis M, the stripping module 35 may have conveyor modules 38 for linearly conveying the cable 1a, 1b along a feed direction X. It may however also be provided that the feed device to be described below is used to feed the cable 1a, 1b into the stripping module 35. The rotary head 36 may preferably be arranged between two of the conveyor modules 38, as illustrated in FIG. 9. The cable 1a, 1b may preferably firstly be cut to length and subsequently stripped.

In particular, where reference is made below to components of the stripping module 35 that are arranged on the rotary head 36, said components may also be usable in the context of a stripping module 35 which has no rotary head 36 but, for example, merely a rigid fastening for the respective components.

To expose the inner conductors 2 along the specified or elongated stripping length $L_A$, at least one blade 39 may be used to generate a radial incision in the cable component of the cable 1a, 1b. Furthermore, a counterholder 40 positioned opposite the blade 39 may be used, which fixes the cable 1a, 1b during the incising process.

In the exemplary stripping module 35, a blade 39 and a counterholder 40 for the cable 1a, 1b are arranged opposite one another, and so as to be aligned with the central axis M, on the rotary head 36 (see in particular FIG. 10). FIG. 9 shows the rotary head 36 merely in a simplified illustration, in which only the blade 39 is illustrated as being assembled on the rotary head 36. The blade 39 is capable of being fed in the direction of the central axis M to the cable 1a, 1b in order to generate a radial incision in the cable component of the cable 1a, 1b, for example in the cable sheath 5, at a defined axial position.

Figure 12:
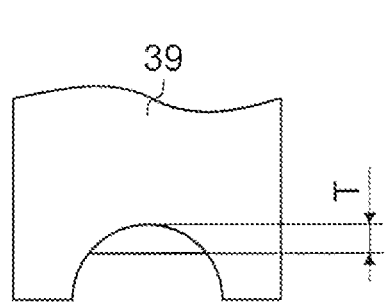
FIG. 12 shows a linear blade with a straight cutting edge and a stop for the cable.
Figure 13:
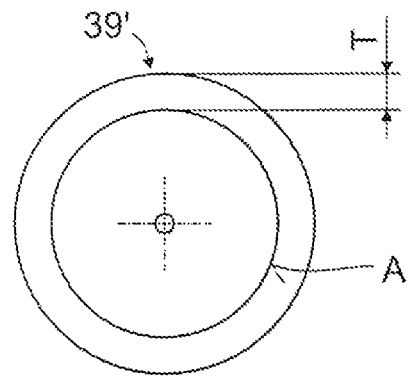
FIG. 13 shows a circular blade with a stop for the cable.

In the exemplary embodiment according to FIGS. 9 and 10, the blade 39 is designed as a shaped blade. The blade 39 may however in principle have any desired cutting edge. The blade 39 may for example also have a linear structure or a straight cutting edge, as illustrated in FIG. 12. Furthermore, a circular blade 39' may be provided (cf. FIG. 13). The circular blade 39' may in particular be mounted without a drive and so as to be freely rotatable in order to be able to roll on the cable 1a, 1b during a rotation about the cable 1a, 1b.

The counterholder 40 forms an abutment that is adapted to the outer diameter of the cable component. The counterholder 40 may in principle form any desired abutment, in particular a tapering abutment, for example a V-shaped abutment or an abutment formed by rollers. In the exemplary embodiment, the counterholder 40 is likewise capable of being fed in the direction of the central axis M to the cable 1a, 1b. In principle, however, the counterholder 40 may also be arranged so as to be immovable (on the rotary head 36).

In order to create a cutting depth limitation, the counterholder 40 may be designed such that it forms a stop for the blade 39. The maximum depth T (cf. FIGS. 12 and 13) of the radial incision in the cable component can thereby be limited, and damage to further components of the cable 1a, 1b that are situated under the cable component can be prevented. As an alternative or in addition, the blade 39 itself may also have or form a stop for the cable 1a, 1b for the purposes of cutting depth limitation. By way of example, a linear blade 39 is illustrated in FIG. 12, wherein the cutting edge is assembled in a blade receptacle such that the blade receptacle or the blade 39 forms a stop which positively specifies a maximum depth T for the incising process. The circular blade 39' may also have a stop, as illustrated by way of example in FIG. 13. For this purpose, the circular blade 39' according to FIG. 13 has a cylindrical stop A, the radius of which is smaller than the radius of the cutting edge, in order to specify the maximum depth T for the incising process.

In principle, it may be provided that the blade 39 does not cut off the cable component or the part 5a, 2.2a completely and, for example, leaves behind individual webs or a radial inner ring. The part 5a, 2.2a may therefore initially not be completely cut off by the radial incision.

The rotary head 36 preferably rotates (cf. FIG. 10) while the blade 39 generates the incision, in order to generate a radially fully encircling incision.

It may furthermore be provided that, to expose the inner conductors 2, the stripping module 35 has at least one pulling-off tool 41 which engages into the incision generated by the blade 39 in order to at least partially pull the stripped part 5a, 2.2a off the cable 1a, 1b.

In the exemplary embodiment, two pulling-off tools 41 are arranged on the rotary head 36, wherein the pulling-off tools 41 are positioned relative to the blade 39 such that, in order to pull off the part 5a, 2.2a of the cable component, said pulling-off tools engage into the incision generated by the blade 39 when the pulling-off tools 41 have been fed to the cable 1a, 1b. The pulling-off tools 41 are arranged opposite one another and are each aligned with the central axis M. As illustrated, the pulling-off tools 41 are preferably arranged offset by 90° with respect to the blade 39 and the counterholder 40. In principle, however, the two pulling-off tools 41 may be arranged at any desired angle relative to the alignment of the blade 39 and of the counterholder 40.

Similar to the blade 39, the pulling-off tools 41 may also be designed as shaped tools, in particular in order to be adapted to the inner diameter of the cable component. The pulling-off tools 41 may however also be of linear design.

The pulling-off tools 41, the blade 39 and the counterholder 40 are arranged adjacent to one another on the rotary head 36 and are each equally spaced apart from an end side of the rotary head 36 in order to converge in each case on the same axial point on the central axis M during a radial feed movement.

A respective slotted-guide device may be provided (not illustrated in any more detail) for the feed of the blade 39, of the counterholder 40 and/or of the at least one puffing-off tool 41 to the cable 1a, 1b. However, a rail system or some other system may also be provided (likewise not illustrated in more detail).

The rotary head 36 is preferably stationary while the part is being pulled off by the at least one pulling-off tool 41. To pull off the part, the cable 1a, 1b may, after the feed movement of the pulling-off tools 41, be at least partially pulled out of the stripping module 35 counter to the feed direction X along the central axis M in order to at least partially pull off the part 5a, 2.2a (partial pulling-off) or fully pull off the part 5a, 2.2a (full pulling-off) from the cable 1a, 1b.

Figure 14:
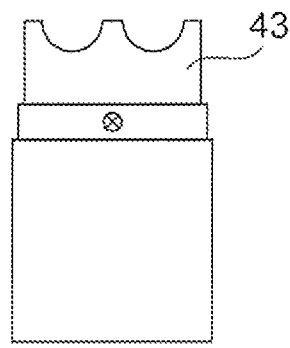
FIG. 14 shows an M-shaped shaped blade for stripping a filler layer which jointly encases the inner conductors.

As already mentioned, the stripping module 35 may however also be designed without a rotary head 36. For example, a rotary head 36 may not always be suitable for stripping a particular cable component. For example, a shaped blade 43 specially adapted to the geometry of the multicore cable is may be provided for stripping the filler layer 7, as indicated in FIG. 14.

The shaped blade 43 is approximately M-shaped or W-shaped so as not to damage the inner conductors 2 within the filler layer 7. Preferably, for the stripping of the filler layer 7, two mutually oppositely situated shaped blades 43 are provided in the manner shown in FIG. 14, which shaped blades are capable of being fed radially in the direction of the central axis M of the multicore cable 1a in order to cut into the filler layer 7.

The shaped blade 43 may have a respective semicircular recess for each inner conductor 2 of the cable 1a; in the exemplary embodiment, two semicircular recesses are provided, because the exemplary cable is has two inner conductors 2, as a result of which the cutting regions approximately follow an M or W shape.

Figure 15:
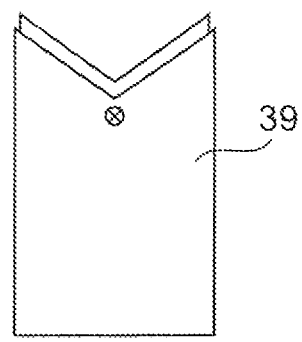
FIG. 15 shows a further advantageous blade for stripping a filler layer that jointly encases the inner conductors.

It is however also possible for any other blade 39, 43 to be provided for the stripping of the filler layer 7, for example a blade 39 illustrated in FIG. 15, which does not follow the negative form of the inner conductors 2 arranged in the filler layer 7. By way of example, the blade 39 has a V-shaped cutting edge. A second, identically or similarly designed blade 39 may incise the cable 1a from the opposite side. The filler layer 7 can subsequently be torn off at the incision points or at the remaining webs in order to completely separate that part 5a, 2.2a of the filler layer 7 which is to be stripped. In this variant, it may be a particular advantage that the orientation of the blade 39 does not need to be adapted to the alignment of the inner conductors 2 in the cable 1a.

In the course of the plug connector assembly process, provision may be made for the cable sheath 5 of the cable 1a, 1b to be fitted with two or more plug connector components 26, 44, 45, 46, 47 starting from one of the cable ends 3, 4. The plug connector components may for example be the shielding sleeve 26 already described (cf. for example FIG. 16), a housing assembly or a plug connector housing 44 (cf. for example FIGS. 16 and 45), a line seal 45 (cf. for example FIG. 16 or FIG. 17), a cable retainer 46 (cf. for example FIG. 17), a retaining cap or end cap 47 (cf. for example FIG. 16 or FIG. 17) or an angle cap. In principle, the form of the plug connector component is not of importance in the context of the invention.

Figure 16:
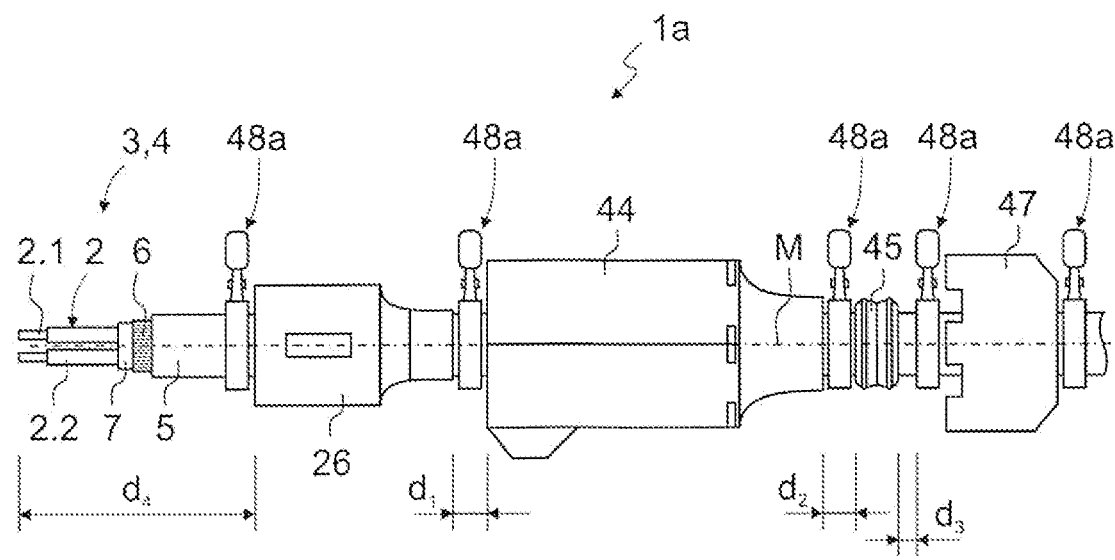
FIG. 16 shows an exemplary two-core electrical cable fitted with four plug connector components and multiple sheath clamps, in a side view.

In the course of the pre-fitting of a two-core or multicore electrical cable 1a, it may however be the case in particular that fitting in accordance with the sequence illustrated in FIG. 16, of a shielding sleeve 26, followed by a socket housing or a plug connector housing 44, followed by a line seal 45, followed by a retaining cap 47 (or an angle cap in the case of an angled connector), is highly suitable. In the case of pre-fitting a single-core electrical cable 1b, fitting in accordance with FIG. 17 may be particularly suitable, according to which a line seal 45, followed by a cable retainer 46, followed by a retaining cap 47, are pushed onto the cable sheath 5 starting from one of the cable ends 3, 4.

It may be advantageous to ensure that the plug connector components 26, 44, 45, 46, 47 applied in the course of the pre-fitting remain in the desired axial positions along the central axis or longitudinal axis M of the cable 1a, 1b. For this purpose, it may be advantageous to surround each of the plug connector components 26, 44, 45, 46, 47 with two sheath clamps 48a, 48b, 48c, 48d in order to prevent an undesired displacement of the plug connector component 26, 44, 45, 46, 47 in both directions along the central axis M of the cable 1a, 1b. Depending on the plug connector component 26, 44, 45, 46, 47, the need for this may however also be omitted, for example if the plug connector component 26, 44, 45, 46, 47 is a seal, for example the line seal 45, which is generally already clamped sufficiently firmly on the cable sheath 5 of the cable 1a, 1b.

The sheath clamps 48a, 48b, 48c, 48d may for example be fastened to the cable 1a, 1b by means of a fitting unit.

Figure 17:
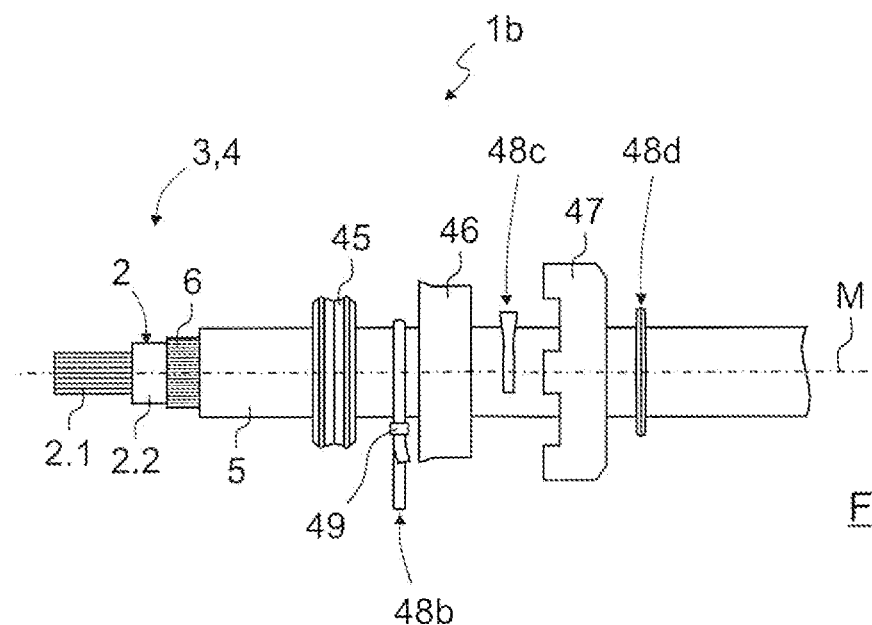
FIG. 17 shows an exemplary single-core electrical cable fitted with three plug connector components and multiple sheath clamps, in a side view.

In principle, different types of sheath clamps 48a, 48b, 48c, 48d may be provided. For example, the clamps 48a shown in FIG. 16 may be provided, which have an actuation region and a fastening region. By means of the actuation region, the clamps which are situated at the opposite end of two clamping limbs and which form the fastening region can be opened counter to the spring force of a resetting spring, and the clamp 48a can thus be applied radially to the cable 1a, 1b. Alternatively, however, sheath clamps 48b with lashing elements 49 in the manner of a cable tie (cf. FIG. 17) may also be provided. A further exemplary sheath clamp 48c, which has a metallic partial ring that can be clamped on the cable sheath 5, is likewise illustrated in FIG. 17. Furthermore, FIG. 17 shows a further exemplary sheath clamp 48d which has an elastic ring, for example a rubber ring, similar to a sealing ring. The exact design of the sheath clamp 48a, 48b, 48c, 48d is not of absolute importance in the context of the invention. Preferably, the sheath clamps 48a, 48b, 48c, 48d are fastened in non-positively locking and reversible fashion to the cable sheath 5 of the cable 1a, 1b.

The at least one sheath clamp 48a, 48b, 48c, 48d may optionally be removed again from the cable sheath 5 of the cable 1a, 1b after the plug connector assembly process.

Figure 18:
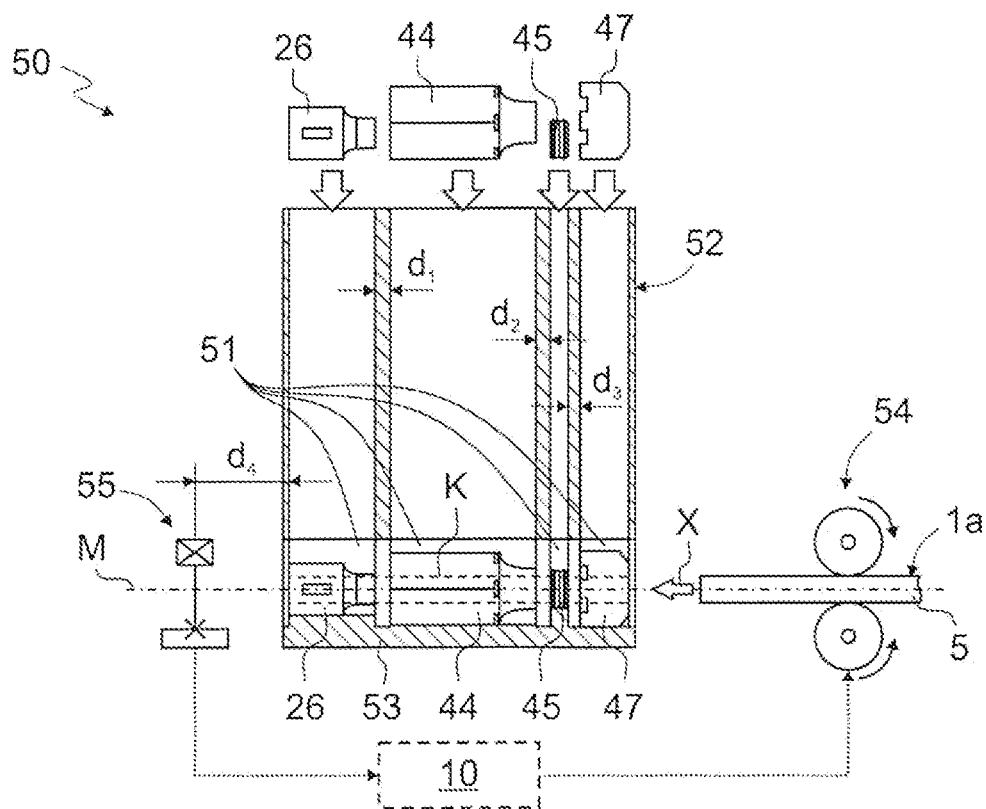
FIG. 18 shows a multiple fitting module in a sectional side view.

FIG. 18 schematically illustrates, in a sectional side view, a multiple fitting module 50 for use in the course of a plug connector assembly process. The multiple fitting module 50 is configured to, for the plug connector assembly process, fit a cable 1a, 1b with one or more plug connector components 26, 44, 45, 46, 47 starting from a front, free end or starting from one of the cable ends 3, 4 of the cable 1a, 1b. The multiple fitting module 50 for the fitting of the two-core cable 1a is illustrated merely by way of example.

The multiple fitting module 50 has chambers 51 for receiving the individual plug connector components 26, 44, 45, 46, 47, wherein the chambers 51 are arranged such that the plug connector components 26, 44, 45, 46, 47 received in the chambers 51 form a common channel K (cf. illustration using dashed lines in FIG. 18) with a common central axis M.

As illustrated in the exemplary embodiment, the multiple fitting module 50 may have a magazine 52 in order to hold the plug connector components 26, 44, 45, 46, 47 ready for the fitting of further cables 1a, 1b. In the exemplary embodiment, a shaft-type magazine is illustrated; in principle, however, any magazine may be provided.

The chambers 51 of the multiple fitting module 50 may be arranged such that the plug connector components 26, 44, 45, 46, 47 received in the chambers 51 are spaced apart from one another along the central axis M at defined spacings. Depending on the respective plug connector component 26, 44, 45, 46, 47 and the subsequent assembly process, it may be provided that different plug connector components 26, 44, 45, 46, 47 are spaced apart from one another by different spacings, which may be specified for example by a corresponding wall thickness of the chambers 51 and/or of the magazine 52.

For example, a first spacing $d_1$ may be provided between the foremost plug connector component (in the exemplary embodiment, the shielding sleeve 26) and the second plug connector component (in the exemplary embodiment, the plug connector housing 44), a second spacing $d_2$ may be provided between the second plug connector component or the plug connector housing 44 and a third plug connector component (in the exemplary embodiment, the line seal 45) and a third spacing $d_3$ may be provided between the third plug connector component or the line seal 45 and a fourth plug connector component (in the exemplary embodiment, the retaining cap 47). A defined spacing $d_4$ the first plug connector component or of the shielding sleeve 26 to the front cable end 1a, 1b may also be provided when the electrical cable 1a, 1b has been fully pushed into the multiple fitting module 50. The spacings $d_1$, $d_2$, $d_3$, $d_4$ are ultimately reproduced on the fitted cable 1a (cf. FIG. 16).

Advantageously, the chambers 51 of the multiple fitting module 50 may furthermore be designed such that passage bores which run through the plug connector components 26, 44, 45, 46, 47 and which serve for receiving the cable 1a, 1b are aligned coaxially with one another when the plug connector components 26, 44, 45, 46, 47 have been received in the chambers 51. For this purpose, for example, the support surface or a lower base 53 of the multiple fitting module 50 in the respective chambers 51 may have a depth respectively configured for the plug connector components 26, 44, 45, 46, 47, as illustrated in FIG. 18. In addition, it may be provided that the chambers 51 of the multiple fitting module 50 are designed to hold the plug connector components 26, 44, 45, 46, 47 in twist-proof fashion, in particular if a particular alignment or orientation of individual plug connector components 26, 44, 45, 46, 47 is provided in the course of the subsequent plug connector assembly process.

Figure 19:
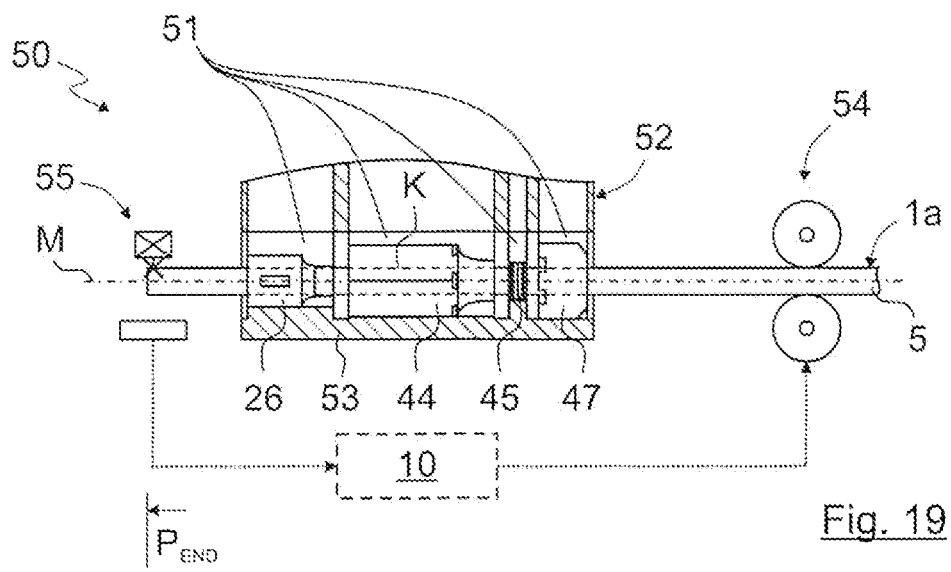
FIG. 19 shows a detail of the multiple fitting module according to FIG. 18 after the electrical cable has been led through the plug connector components.

A feed device 54 may be provided (which need not necessarily be part of the multiple fitting module 50) in order to lead the cable 1a, 1b with its cable end 3, 4 along the central axis M through the plug connector components 26, 44, 45, 46, 47 in order to push the plug connector components 26, 44, 45, 46, 47 onto the cable sheath 5 of the cable 1a, 1b. The cable 1a, 1b can thus be led with its cable end 3, 4 along the central axis M through the plug connector components 26, 44, 45, 46, 47 until it reaches a predetermined end position $P_{END}$, as illustrated in FIG. 19. In the exemplary embodiment, the feed device 54 has a roller conveyor device with two rollers, between which the cable 1a, 1b is guided in order to displace the latter linearly.

In order to monitor the position of the cable 1a, 1b along the central axis M, it is for example possible for a light barrier 55 or some other sensory device to be provided in order to identify when the electrical cable 1a, 1b has reached the end position $P_{END}$ in the multiple fitting module 50 and in order to stop the cable feed if necessary (cf. FIGS. 18 and 19). In principle, continuous detection of the position of the cable 1a, 1b may also be provided.

In particular, in order to prevent the plug connector components 26, 44, 45, 46, 47 from being displaced along the central axis M while the electrical cable 1a, 1b is being led through, it may be provided that the chambers 51 of the multiple fitting module 50 are designed to block the plug connector components 26, 44, 45, 46, 47 in the axial direction, in particular in the feed direction X (cf. arrow in FIG. 18) of the electrical cable 1a, 1b, along the central axis M in positively locking fashion. For this purpose, it is for example possible for the walls of the magazine 52 to be continued, wherein a corresponding cutout can allow the cable 1a, 1b to be led through.

In particular, if the passage bores of the plug connector components 26, 44, 45, 46, 47 correspond or at least approximately correspond to the diameter of the cable sheath 5, it may be advantageous for at least one of the plug connector components 26, 44, 45, 46, 47 to be pushed onto the cable sheath 5 using a lubricant, preferably an alcohol or a silicone oil. For this purpose, provision may for example be made to provide the cable sheath 5 and/or the plug connector component(s) 26, 44, 45, 46, 47 with a lubricant.

In the course of the fabrication of the electrical cable 1, the latter is generally cut to length from a so-called endless cable in accordance with the intended length.

A suitable fitting method may be carried out by means of a computer program product with program code means on the control unit 10 of the multiple fitting module 50, as indicated in FIGS. 18 and 19.

Figure 20:
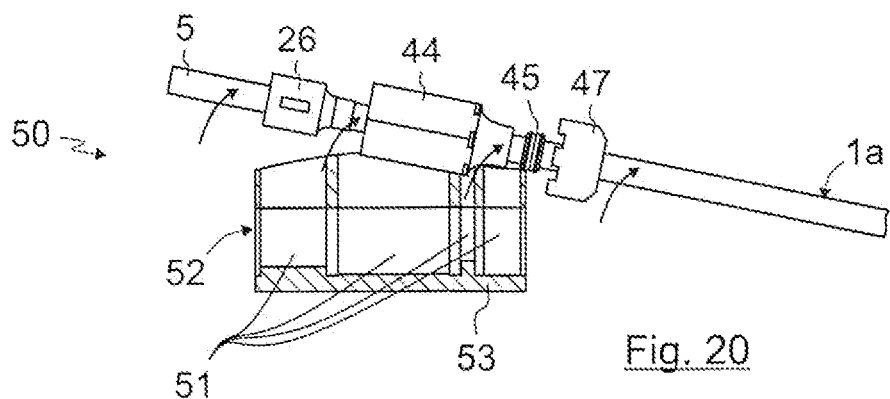
FIG. 20 shows a detail of the multiple fitting module according to FIG. 18 during the removal of the electrical cable.

The cable 1a, 1b fitted with the plug connector components 26, 44, 45, 46, 47 may, after the cable 1a, 1b has been led through the plug connector components 26, 44, 45, 46, 47, be removed from the multiple fitting module 50 for example laterally with respect to the feed direction X of the cable 1a, 1b or counter to the feed direction X of the cable 1a, 1b, as indicated in FIG. 20.

Figure 21:
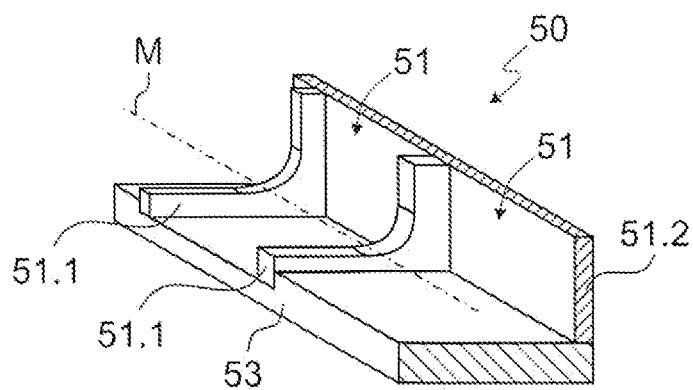
FIG. 21 shows two chambers of the multiple fitting module of FIG. 18 in a perspective sectional illustration.

In FIG. 21, a detail of the multiple fitting module 50 is illustrated in enlarged form in a perspective sectional illustration. The detail shows, by way of example, two chambers 51 of the multiple fitting module 50. The chambers 51 are separated from one another by partition walls 51.1, which may have different wall thicknesses in order to realize the spacings $d_1$, $d_2$, $d_3$, $d_4$. The partition walls 51.1 simultaneously serve as a stop for the plug connector components 26, 44, 45, 46, 47 that have been placed into the chambers 51 (said plug connector components have been omitted from FIG. 21). The partition walls 51.1 are furthermore designed to leave a recess around the central axis M, in the region of the channel K, for the leadthrough of cable 1a, 1b through the plug connector components 26, 44, 45, 46, 47. The base 53 of the multiple fitting module 50 has steps in order to provide different height levels for the respective plug connector components 26, 44, 45, 46, 47 within the chambers 51 in order to make possible a continuous channel K or coaxial positioning of the plug connector components 26, 44, 45, 46, 47. In order to prevent the plug connector components 26, 44, 45, 46, 47 from falling out laterally, side walls may also be provided. In the exemplary embodiment, only one rear side wall 51.2 is provided in order that the fitted cable 1a, 1b can still be removed laterally from the multiple fitting module 50, as indicated in FIG. 20. The magazine 52 (omitted in FIG. 21) arranged above the multiple fitting module 50 however preferably has side walls on both sides. The base 53, the side walls and/or the partition walls 51.1 may optionally be designed to hold the plug connector components 26, 44, 45, 46, 47 ready in a predefined alignment or orientation.

Figure 22:
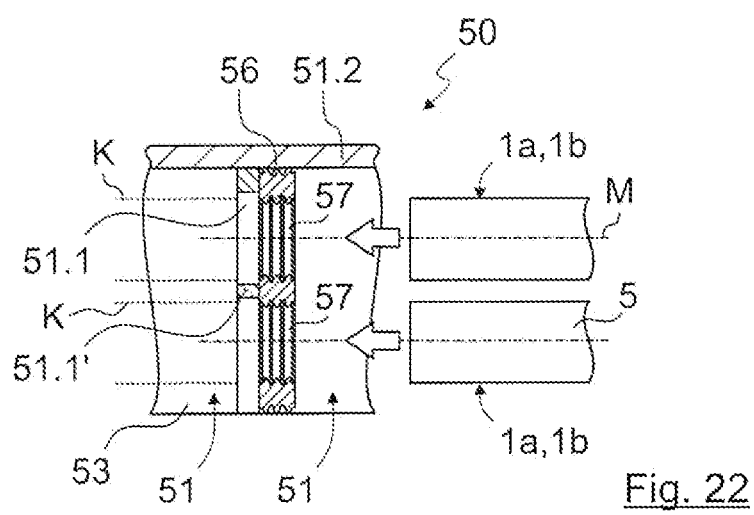
FIG. 22 shows a multiple fitting module for assembling an electrical plug connector which has multiple electrical cables.
Figure 45:
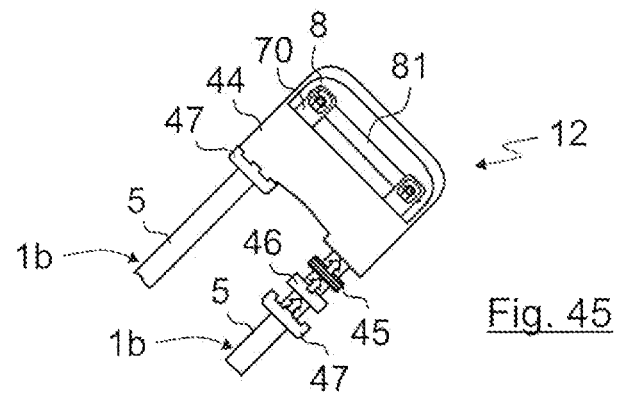
FIG. 45 shows an exemplary plug connector with two electrical cables after both cables have been pressed in during the final assembly process.
Figure 76:
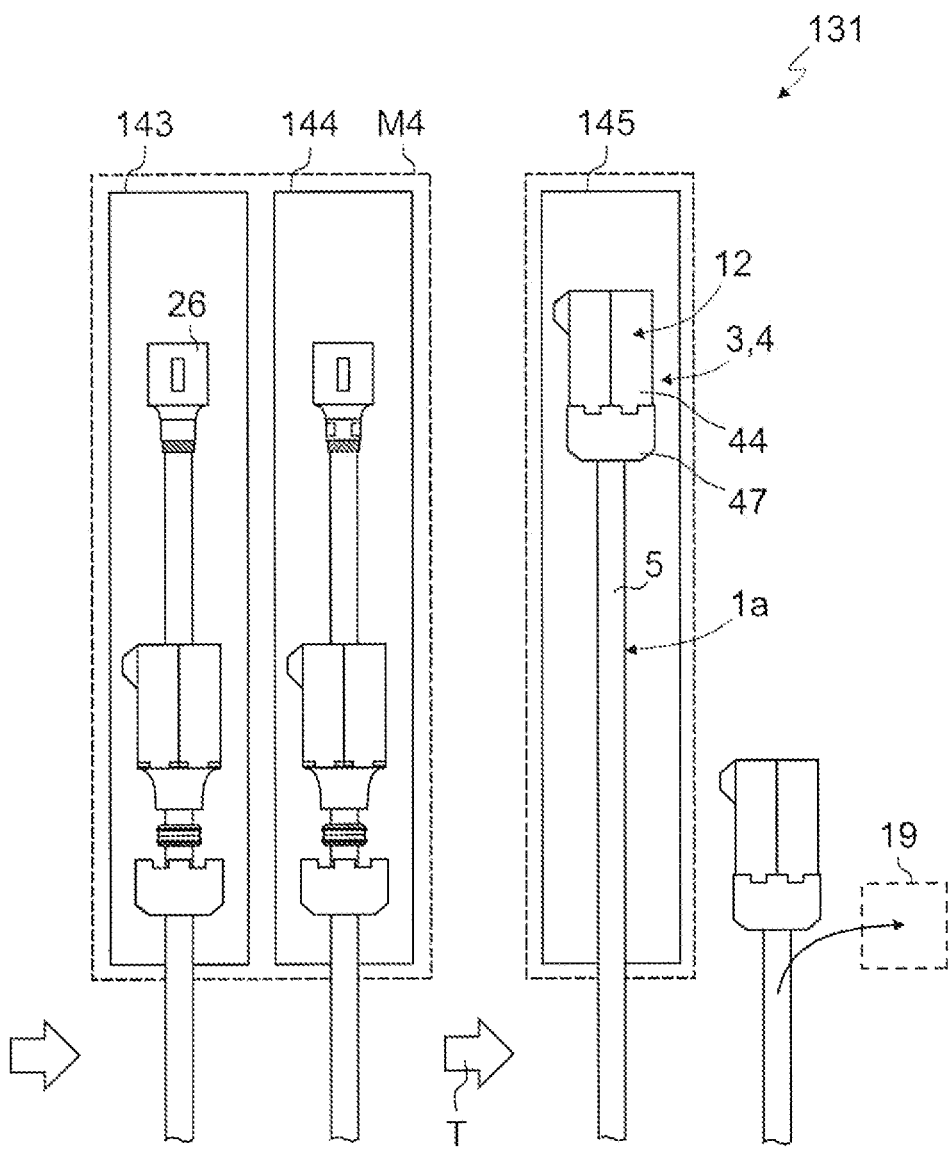
FIG. 76 shows a fourth detail, which adjoins the third detail along the transport direction, of the apparatus according to the invention of the first exemplary embodiment.

FIG. 22 shows, in a sectional illustration from above, a detail of a multiple fitting module 50 for assembling an electrical plug connector 12 which has multiple electrical cables 1a, 1b (cf. for example FIGS. 45 and 76). The multiple fitting module 50 is designed to fit a cable sheath 5 of the respective cable 1a, 1b with two or more common plug connector components 56. The principle is illustrated by way of example on the basis of a common line seal 56. A common plug connector component 56 may however in principle be any plug connector component, in particular one of the plug connector components 26, 44, 45, 46, 47 already described above. The common plug connector component or the common line seal 56 has a number of passage bores 57 corresponding to the number of cables 1a, 1b.

In the exemplary embodiment according to FIG. 22, the fitting of a first electrical cable 1a, 1b and of a second electrical cable 1a, 1b with a common line seal 56 is demonstrated merely schematically. The number of cables 1a, 1b and the number of passage bores 57 and also the geometry and design of the plug connector component or of the line seal 56 are not to be understood as limiting.

The common line seal 56 is arranged in the multiple fitting module 50 in the chamber 51 assigned thereto such that the line seal 56, together with further plug connector components (not illustrated), forms a common channel K with a common central axis M for each of the cables 1a, 1b. Correct orientation may be particularly important here in order to correctly align the passage bores 57.

The cables 1a, 1b may be led simultaneously or successively through the corresponding plug connector components 56 by the feed device 54 in order to push the plug connector components 56 onto the cables 1a, 1b or onto the cable sheaths 5 thereof. The cables 1a, 1b are preferably led simultaneously through the plug connector components 56, which can for example simplify the construction of the feed device 54. Provision may however also be made, in particular in the case of plug connector components 56 with very narrow passage bores 57 in relation to the cable diameter of the cable 1a, 1b (for example in the case of a common line seal 56), to lead the cables 1a, 1b through successively in order to reduce the forces that arise during the pressing-in of the cables 1a, 1b.

The multiple fitting module 50 can be constructed substantially as already described above. Corresponding partition walls 51.1 may be provided in order to support the line seal 56 or the plug connector components, as has likewise already been shown. In addition to lateral support regions, the partition walls 51.1 may also have a central support region 51.1' in order to provide even better support for the common line seal 56 or plug connector component for the insertion of the second cable 1a, 1b.

Figure 23:
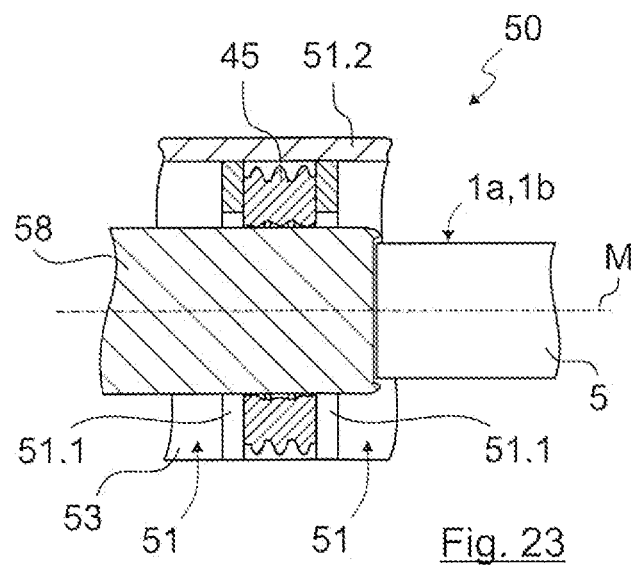
FIG. 23 shows an enhancement for a fitting module with a guide mandrel as an insertion aid for the cable.

Finally, FIG. 23 shows a variant of a fitting module, in particular of a multiple fitting module 50, in which a guide mandrel 58 is provided as an insertion aid for the cable 1a, 1b. This variant is suitable for use with any fitting module and for the fitting of one or more cables 1a, 1b with any plug connector components 26, 44, 45, 46, 47, 56, and is shown merely by way of example, and in the form of a detail, for the fitting of the cable 1a, 1b with a line seal 45.

The guide mandrel 58 may, before the cable 1a, 1b is inserted, be led, from the direction opposite to the feed direction X of the cable 1a, 1b, through the plug connector components 26, 44, 45, 46, 47 received in the chambers 51. Here, the guide mandrel 58 may be led through all or only through some of the plug connector components 26, 44, 45, 46, 47. The guide mandrel 58 is preferably led through all of the plug connector components 26, 44, 45, 46, 47.

In order to be led more easily through the plug connector components 26, 44, 45, 46, 47, the guide mandrel 58 may be beveled, or have a chamfer, at its front end.

The guide mandrel 58 may finally have a guide ring at its front end for the purposes of guiding the cable 1a, 1b. The guide ring may transition into the (optionally provided) chamfer, as illustrated in FIG. 23.

The cable 1a, 1b can finally be led through the plug connector components 26, 44, 45, 46, 47 while the guide mandrel 58 is simultaneously withdrawn and/or pushed back from the cable 1a, 1b. Here, the cable 1a, 1b is preferably in contact with the front end face of the guide mandrel 58.

The guide mandrel 58 is advantageously able to guide the cable 1a, 1b through the plug connector components 26, 44, 45, 46, 47. Furthermore, the guide mandrel 58 may already widen plug connector components 26, 44, 45, 46, 47 which have a very narrow passage bore 57, as a result of which the cable 1a, 1b can be led through these more easily.

A lubricant may be applied to the guide mandrel 58. The guide mandrel 58 is preferably formed from a metal or from a hard plastic.

Figure 24:
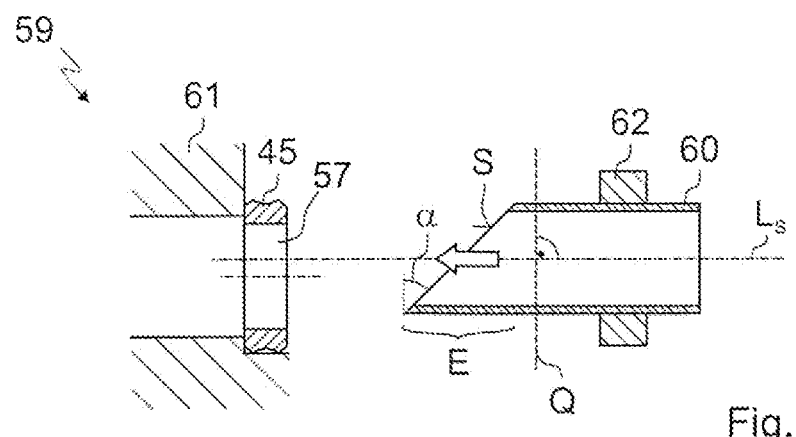
FIG. 24 shows a single fitting module according to a first exemplary embodiment with an inclined tube, a slipping-off means and a support body, before the inclined tube is inserted into the ring body.

FIG. 24 shows a single fitting module 59 for the pre-fitting of the cable 1a, 1b with one or more plug connector components 26, 44, 45, 46, 47 in the course of the plug connector assembly process according to a first exemplary embodiment in a sectional illustration. The single fitting module 59 may be used to fit the cable 1a, 1b with an elastic ring body 45, in the exemplary embodiment the line seal 45, of a plug connector 12 that is to be assembled on the cable 1a, 1b.

The elastic ring body 45 can in principle be any plug connector component 26, 44, 45, 46, 47 of the plug connector 12 or, for example, also one of the aforementioned sheath clamps 48a, 48b, 48c, 48d for fastening to the cable 1a, 1b. The sheath clamp 48a, 48b, 48c, 48d, which is generally independent of the plug connector 12, may for example be used in the course of the plug connector assembly process to mark the cable 1a, 1b and thereby identify it and/or to secure plug connector components 26, 44, 45, 46, 47 that have been applied to the cable 1a, 1b, in particular loosely preassembled plug connector components 26, 44, 45, 46, 47, against slipping (as already mentioned).

In a first method step of the single fitting process, provision may be made for an inclined tube 60 with a beveled end section E, or with an end face S which is inclined relative to a tube cross section Q of the inclined tube 60 by an inclination angle α, to be inserted into a passage bore 57 of the ring body 45. The tube cross section Q is aligned perpendicular to the longitudinal axis $L_S$ of the inclined tube 60. The end section E of the inclined tube 60 according to the first exemplary embodiment is, by way of example, beveled linearly. The inclination angle α between the tube cross section Q and the end face S of the inclined tube 60 is, by way of example, approximately 45° in the exemplary embodiments. The inclination angle α may however in principle assume any value, in particular 10° to 80°, preferably 20° to 70°, particularly preferably 30° to 60° and very particularly preferably 40° to 50°.

Provision may advantageously be made to position the inclined tube 60 so as to be axially offset with respect to the ring body 45 before and at least partially during the insertion of the inclined tube 60 into the ring body 45. A corresponding axial offset is provided in all of the illustrated embodiments. In principle, however, a coaxial alignment may also be provided.

In order to support the ring body 45 during the insertion of the inclined tube 60, a support body 61 may be provided which may have a passage bore in order to be able to lead the cable 1a, 1b through during the fitting process. The ring body 45 may thus be supported, by way of its side facing away from the inclined tube 60, on the support body 61 while the inclined tube 60 is being inserted into the ring body 45 counter to the feed direction X of the cable 1a, 1b (indicated by an arrow in FIG. 25).

In order to assist the insertion of the inclined tube 60 into the ring body 45, provision may optionally be made for a lubricant, preferably an alcohol or a silicone oil, to be applied to the inclined tube 60 and/or to the ring body 45.

Figure 25:
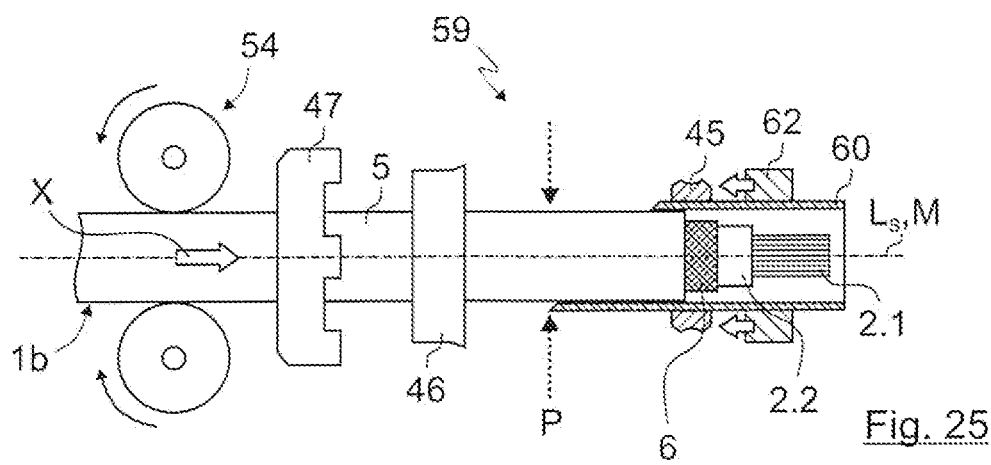
FIG. 25 shows the single fitting module of FIG. 24 after the inclined tube has been inserted into the ring body and after the cable has been positioned in the inclined tube.

FIG. 25 illustrates the single fitting module 59 of FIG. 24 after the inclined tube 60 has been inserted into the ring body 45. Furthermore, the feed device 54 (for example a roller conveyor with two rollers) is illustrated, in order to position the cable 1a, 1b in the inclined tube 60 such that the ring body 45 is situated at a defined axial position P on the cable 1a, 1b when the ring body 45 is slipped off from the inclined tube 60 onto the cable 1a, 1b. In order to position the cable 1a, 1b as exactly as possible, a sensor unit (not illustrated in any more detail) may for example be provided.

Figure 30:
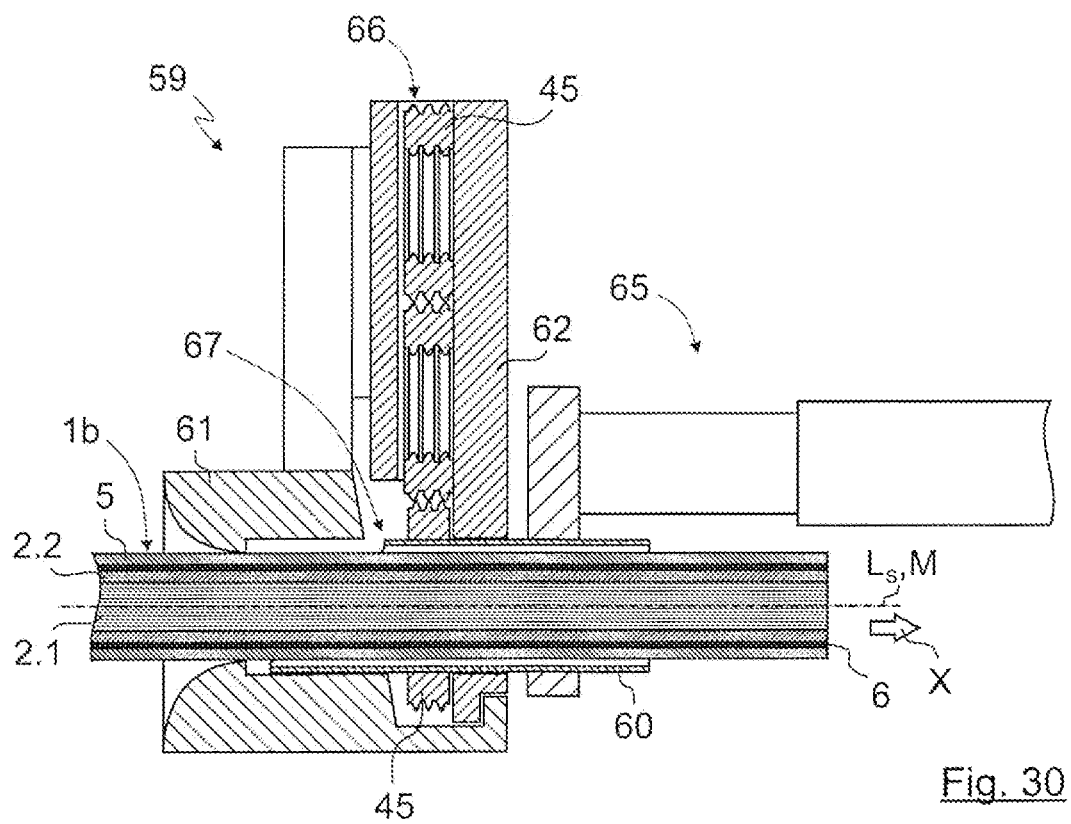
FIG. 30 shows the apparatus of FIG. 28 after the cable has been positioned in the inclined tube.
Figure 31:
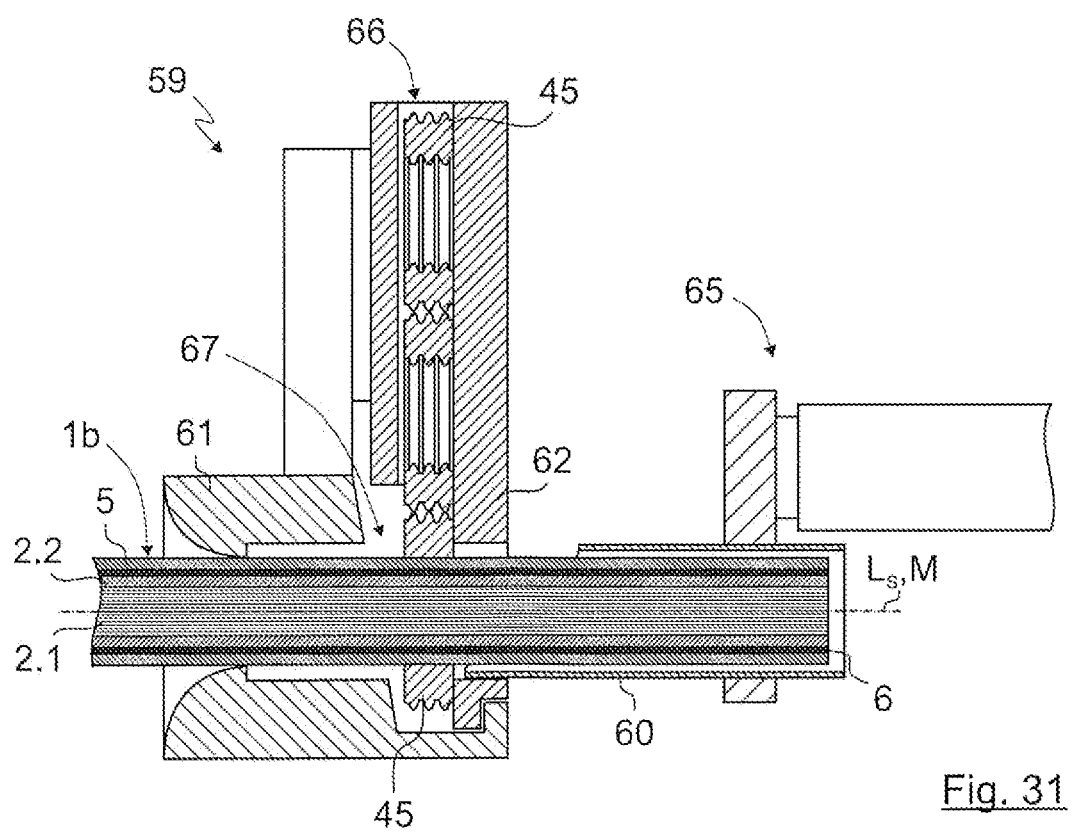
FIG. 31 shows the apparatus of FIG. 28 after the ring body has been slipped off onto the cable.

A single-core cable 1b is illustrated in FIGS. 25, 30 and 31 merely in order to illustrate the functional principle of the single fitting module 59. In principle, any cable 1a, 1b, in particular also the multicore cable 1a, may be pre-fitted with a plug connector component 26, 44, 45, 46, 47, 56 by means of the single fitting module 59. For the purposes of a better illustration, the cable 1b is shown in FIG. 25 in a non-sectional view and is shown in FIGS. 30 and 31 in section along its central axis M. In FIG. 25, the electrical cable 1b has been partially stripped. In principle, however, the cable 1a, 1b may also still be in completely unprocessed form during the fitting process, as shown in FIGS. 30 and 31. In principle, however, the exact structure and the processing state of the cable 1a, 1b are not of absolute importance.

The cable 1b illustrated in FIG. 25 has, by way of example, already been pre-fitted with the cable retainer 46 and with the end cap 47. In the course of the single fitting process, the line seal 45 may now also be applied to the cable sheath 5 of the cable 1b.

In FIG. 25, the cable 1b has been positioned in the inclined tube 60 with the defined axial position P at the end of the end face S or at the end section E of the inclined tube 60. After the positioning, the ring body 45 may be slipped off from the inclined tube 60 onto the cable 1b or onto the cable sheath 5.

Figure 26:
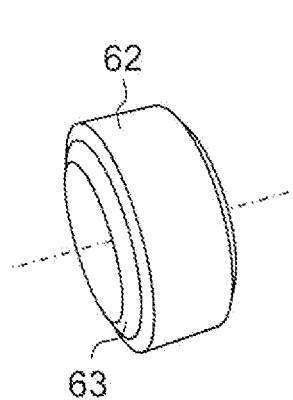
FIG. 26 shows an exemplary slipping-off means in a perspective illustration.

A slipping-off means 62 may be provided for the slipping-off of the ring body 45. In the exemplary embodiment of FIGS. 24 and 25, a slipping-off means 62 is provided which encircles the inclined tube 60 in ring-shaped fashion and which, for the slipping-off of the ring body 45, is moved in the direction of the end face S of the inclined tube 60 or in the insertion direction. The slipping-off means 62 may advantageously have already been assembled on the inclined tube 60 in advance, as illustrated in FIG. 24. The slipping-off means 62 may optionally have, at its end facing towards the ring body 45, a section 63 which tapers conically in the direction of the ring body 45, as illustrated in FIG. 26.

Figure 27:
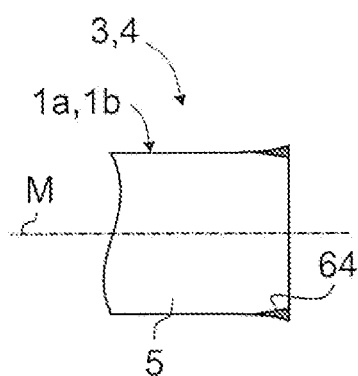
FIG. 27 shows a possibility for the pre-treatment of the cable before the fitting.

In the course of the fabrication of the electrical cable 1a, 1b or in the course of the plug connector assembly process, the cable 1a, 1b is generally cut to length from a so-called endless cable in accordance with the intended fabrication length L. The cutting of the cable 1a, 1b may in particular have the result that the cable sheath 5, owing to its elasticity, spreads apart or expands at the cable end 3, 4, which can make it difficult to insert the cable 1a, 1b into the inclined tube 60 with an accurate fit. In order to simplify the insertion of the cable 1a, 1b or the positioning of the cable 1a, 1b in the inclined tube 60, provision may be made for this reason for the cable 1a, 1b to be beveled or pointed, or provided with a chamfer 64, at its cable end 3, 4 in order to remove the radially protruding sections, as highlighted in FIG. 27.

Figure 28:
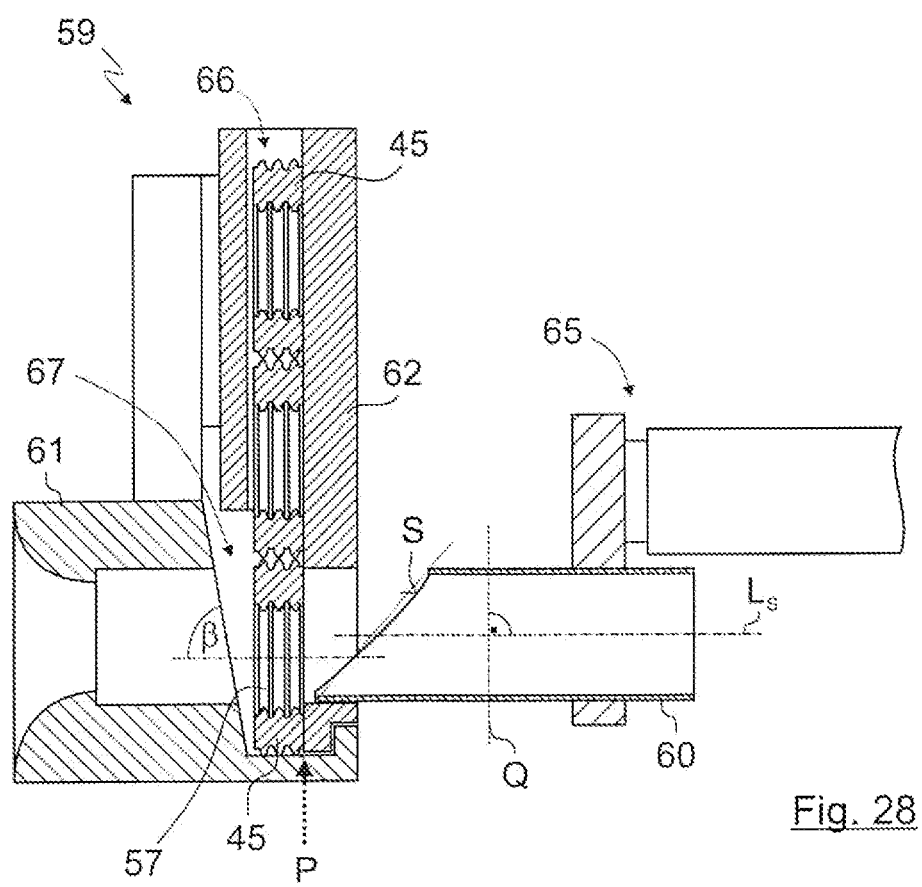
FIG. 28 shows a single fitting module according to a second exemplary embodiment with an actuator assembly for inserting the inclined tube into the ring body and with a single magazine for the ring bodies, before the inclined tube is inserted into the ring body.

FIG. 28 illustrates a particularly advantageous exemplary embodiment of the single fitting module 59. The functional principle will be explained on the basis of the fitting steps shown in FIGS. 28 to 32.

The inclined tube 60 has, for example, a concavely curved beveled end section E. The inclination angle α may, in the case of a non-linearly running end section E, be defined by a chord running through the end points of the curve (as indicated by dashed lines).

By contrast to the inclined end face S of the exemplary embodiment shown in FIGS. 24 and 25, the walls of the inclined tube 60 in the exemplary embodiment of FIGS. 28 to 32 are not beveled. In order to be inserted into the ring body 45, the inclined tube 60 is fastened to an actuator assembly 65, which has a telescopically extendable section for the linear feed of the inclined tube 60 along its central axis or longitudinal axis $L_S$.

The single fitting module 59 illustrated in FIGS. 28 to 32 has a single magazine 66 in order to hold further ring bodies 45 ready for the fitting of further cables 1a, 1b. The single magazine 66 opens into a fitting chamber 67 in which the fitting of the cable 1a, 1b primarily occurs. Again, a support body 61 is provided on which the ring body 45 may be supported with its side facing away from the inclined tube 60 during the insertion of the inclined tube 60. That wall of the support body 61 which is provided for support is of oblique form such that, during the insertion of the inclined tube 60, the ring body 45 can tilt in the direction of its side facing away from the inclined tube 60. In this way, the insertion of the inclined tube 60 can be further simplified. For this purpose, the support body 61 may fora a corresponding support angle β that defines the tilt. The support body 61 has a passage bore for the insertion of the cable 1a, 1b into the single fitting module 59. A funnel section is provided in the support body 61 for easier insertion.

In the exemplary embodiment of FIGS. 28 to 32, the slipping-off means 62 is formed as a wall with a recess through which the inclined tube 60 can be guided and by which the inclined tube 60 can be supported.

Figure 29:
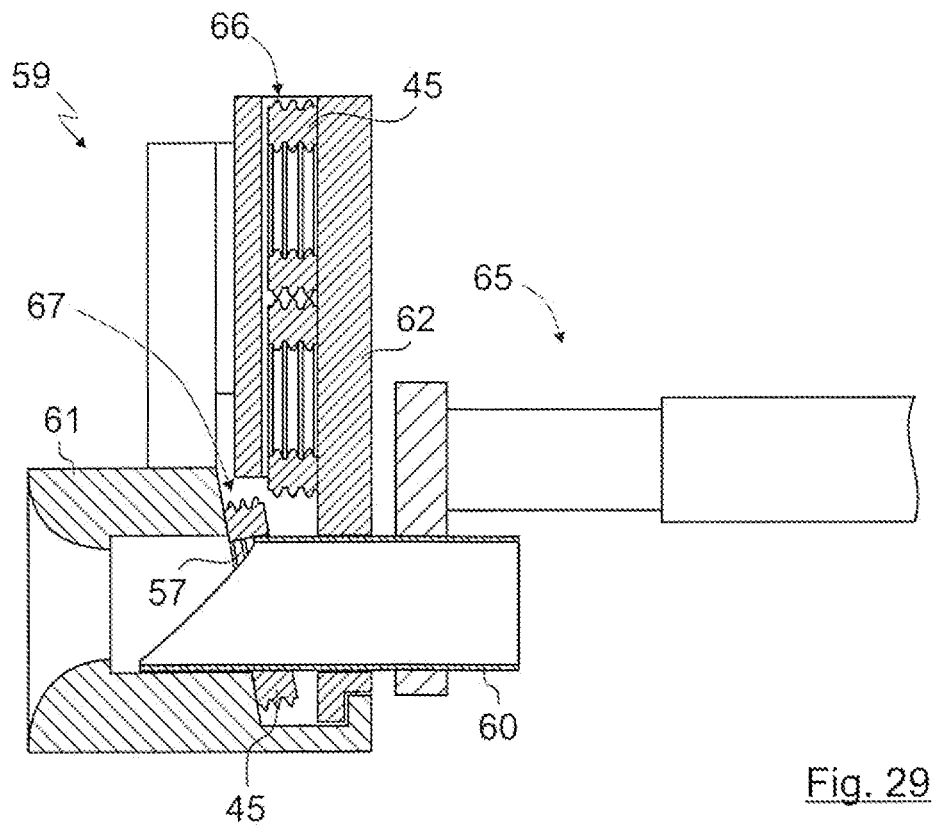
FIG. 29 shows the apparatus of FIG. 28 while the inclined tube is being inserted into the ring body.

FIG. 29 shows the state of the single fitting module 59 during the insertion of the inclined tube 60 into the ring body 45. FIG. 30 shows a state of the single fitting module 59 in which the cable 1a, 1b has already been positioned in the inclined tube 60. The defined axial position P of the cable 1a, 1b is in this case aligned with the end side of the slipping-off means 62.

In order to slip the ring body 45 off the inclined tube 60 onto the cable 1a, 1b or onto the cable sheath 5, the inclined tube 60 may be pulled out of the single fitting module 59 again by means of the actuator assembly 65 by retraction of the telescopically extendable section. Owing to the stop formed by the slipping-off means 62 or the end side of the slipping-off means 62, the ring body 45 remains in its axial position until it has been fully slipped off the inclined tube 60 onto the cable 1a, 1b.

Figure 32:
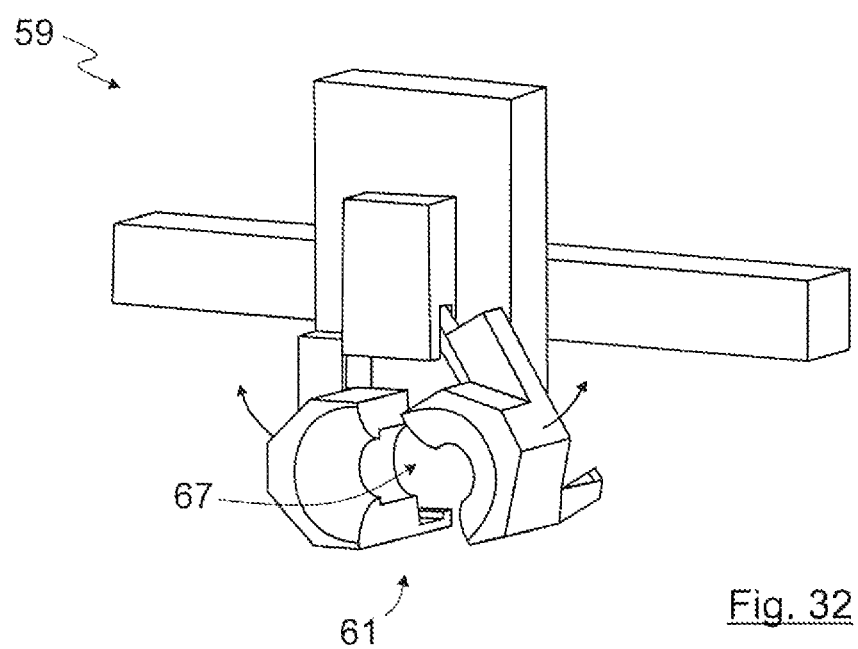
FIG. 32 shows the apparatus of FIG. 28 in a perspective illustration with a partially opened, two-part support body.

The cable 1a, 1b can subsequently be removed from the single fitting module 59. For this purpose, it may for example be provided that the support body 61 is formed from multiple shells, in particular two half-shells, which are opened after the fitting of the cable 1a, 1b in order to be able to remove the cable 1a, 1b together with the ring body 45. The principle is shown in FIG. 32.

It should be mentioned that provision may also be made to apply multiple ring bodies 45 to the same cable 1a, 1b. This may be performed sequentially through multiple use of, for example, one of the single fitting modules 59 described, wherein further fabrication steps optionally follow between the fitting of the individual ring bodies 45, such further fabrication steps for example also including fitting with other plug connector components 26, 44, 45, 46, 47, 56. However, provision may also be made for the cable 1a, 1b to be fitted with multiple ring bodies 45 in a single processing pass, for example by virtue of multiple chambers 51 as illustrated in FIGS. 18 to 22, and optionally also multiple magazines 52, being provided, which are arranged, together with respective slipping-off means 62, in offset fashion along the central axis M of the cable 1a, 1b.

Figure 33:
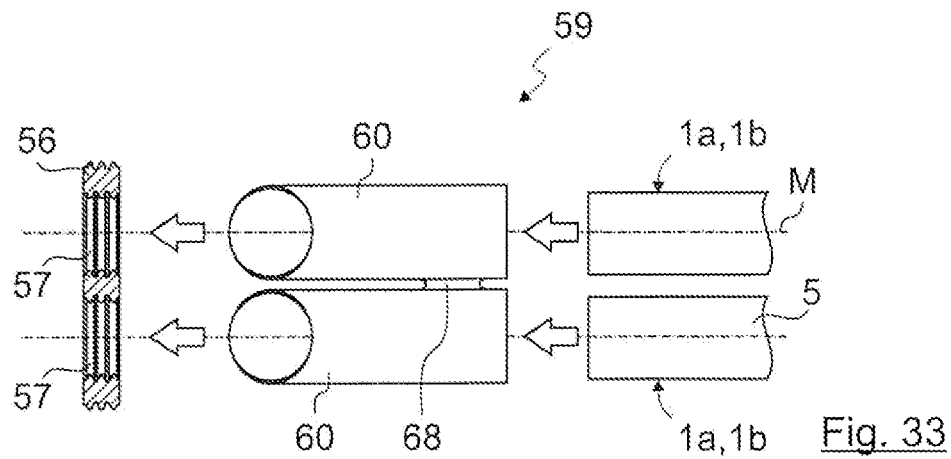
FIG. 33 shows a single fitting module for assembling an electrical plug connector which has multiple electrical cables, having two inclined tubes.

FIG. 33 shows a single fitting module 59 for assembling an electrical plug connector 12 which has multiple electrical cables 1a, 1b, in order to fit the cables 1a, 1b with a common elastic ring body 56 at a respective defined axial position P. For this purpose, the common elastic ring body 56 has a number of passage bores 57 corresponding to the number of cables 1a, 1b.

In the exemplary embodiment according to FIG. 33, the fitting of a first electrical cable 1a, 1b and of a second electrical cable 1a, 1b with a common ring body 56, which is in the form of a common line seal 56, is demonstrated merely schematically. The number of cables 1a, 1b and the number of passage bores 57 and also the geometry and design of the common ring body 56 are not to be understood as limiting.

According to FIG. 33, an inclined tube 60, in particular an inclined tube 60 as described above, is assigned to each cable 1a, 1b.

The inclined tubes 60 may optionally be fastened to one another, for example by means of a holding frame, for simplified alignment and positioning. A connecting web 68 is illustrated as an example for this.

In principle, the fitting may also be performed sequentially, following which the cables 1a, 1b are fitted successively with the common ring body 56 using only one inclined tube 60.

The process of fitting (inserting the inclined tube 60 into the passage bore 57/positioning the respective cable 1a, 1b in the inclined tube 60/slipping-off/etc.) may be performed as has already been described in detail above.

FIGS. 34 to 37 show a press-in module 69 for assembling an electrical plug connector 12 during various assembly steps. All illustrations are to be understood as examples and as being highly schematic, and are intended merely to impart understanding of the invention.

Figure 34:
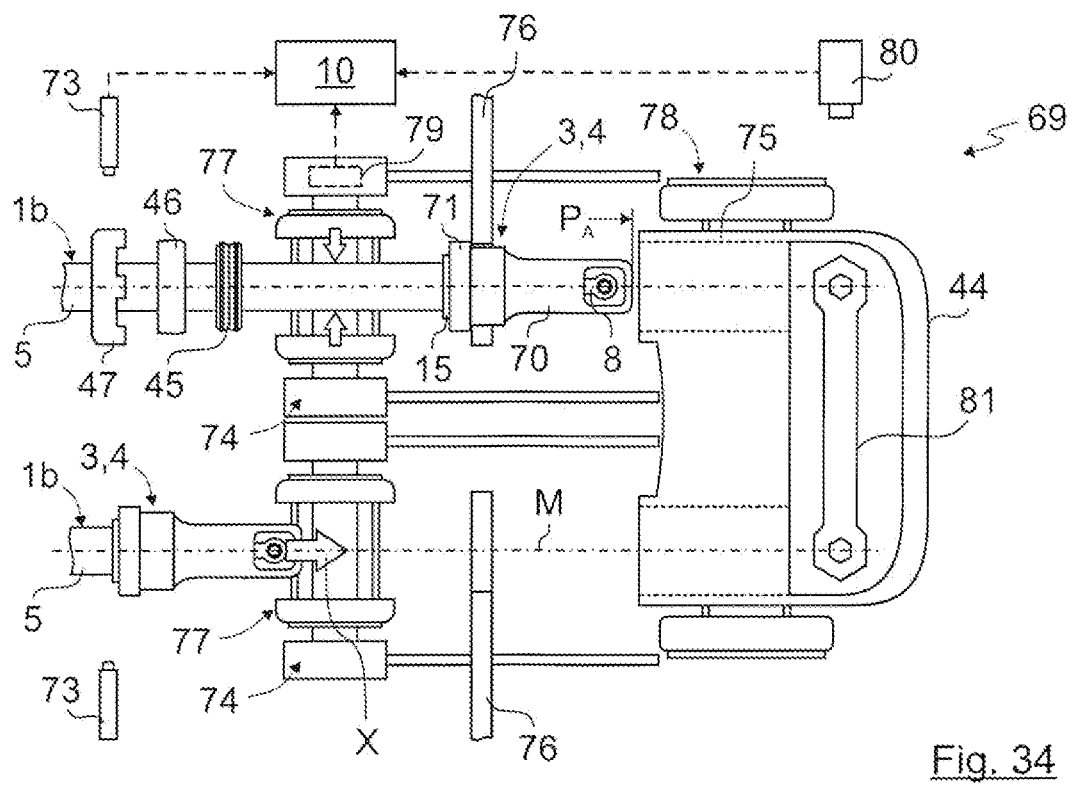
FIG. 34 shows a press-in module according to a first exemplary embodiment while two electrical cables are being inserted into respective advancing devices.
Figure 35:
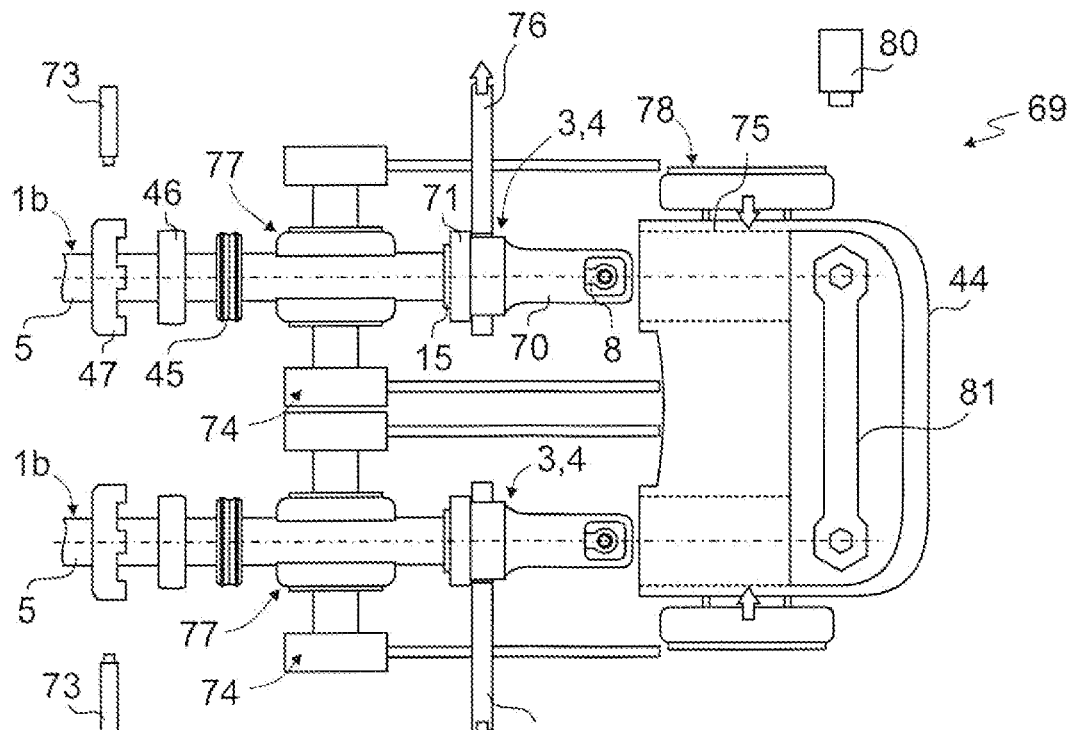
FIG. 35 shows the press-in module of FIG. 34 after the cables have been fixed in a respective holding device.
Figure 36:
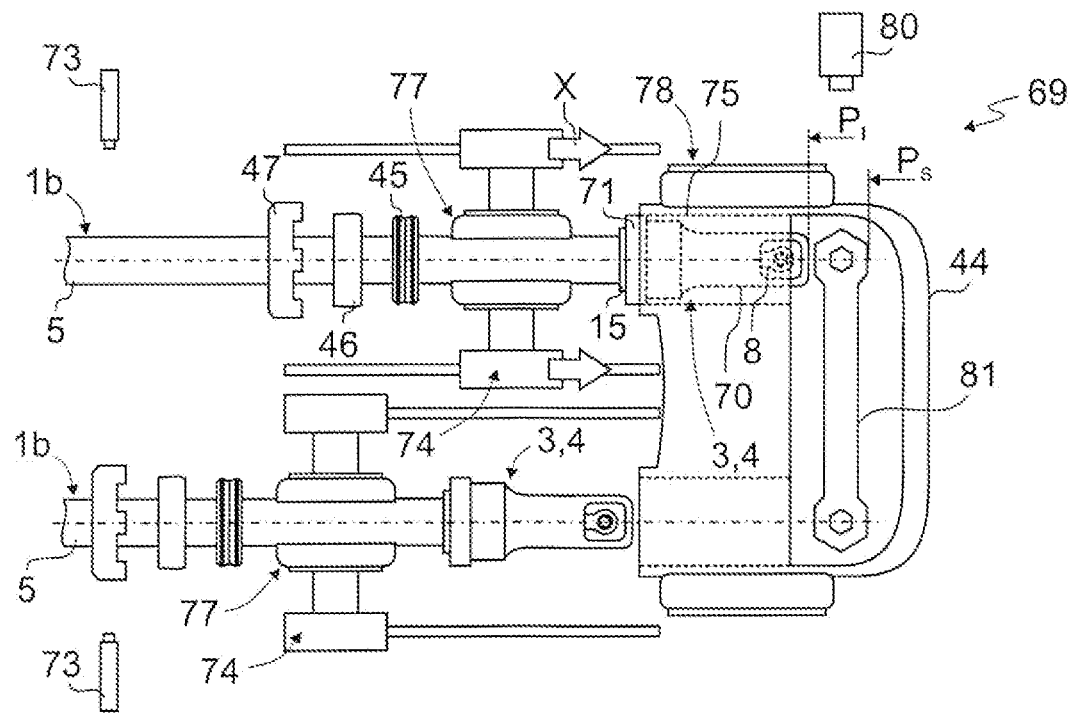
FIG. 36 shows the press-in module of FIG. 34 after the housing assembly has been fixed by a fixing device and while the front end of the first cable is being fed into the housing assembly by the first advancing device.
Figure 37:
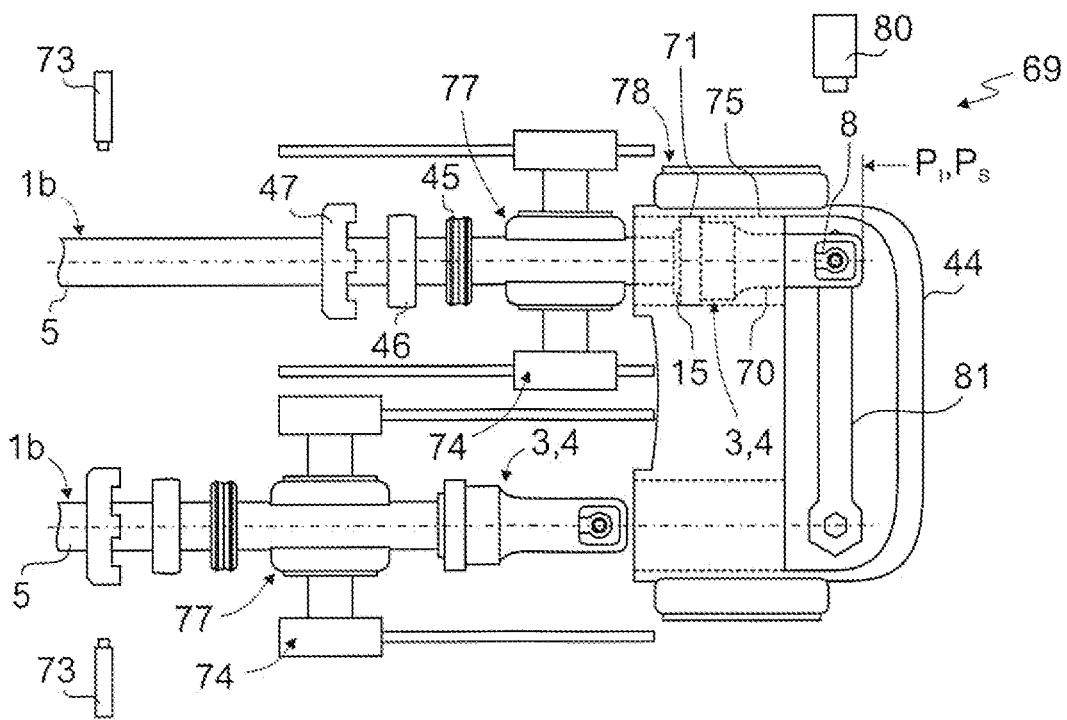
FIG. 37 shows the press-in module of FIG. 34 after the inner conductor contact element of the first cable has reached the setpoint position in the housing assembly.
Figure 38:
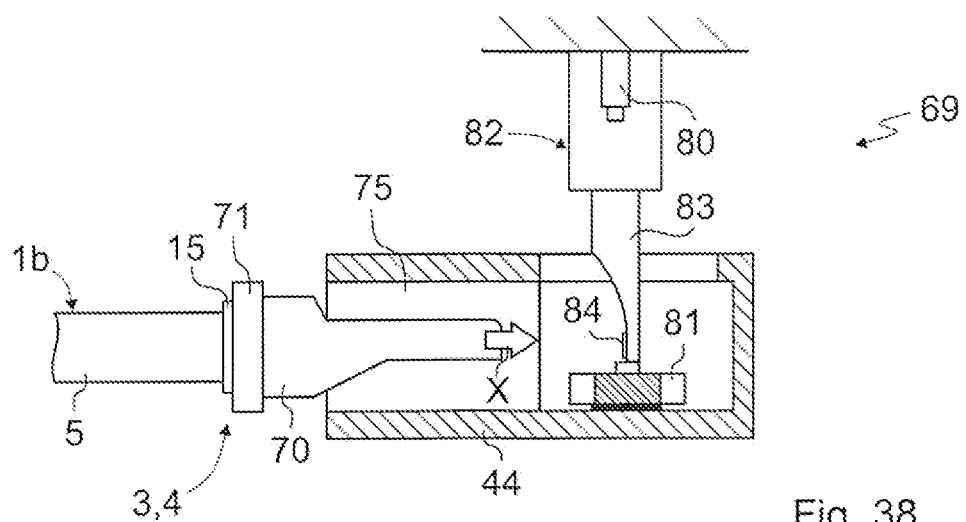
FIG. 38 shows a preloading device of the press-in module with a telescopic ram for mechanically preloading a latching means within the housing assembly.
Figure 39:
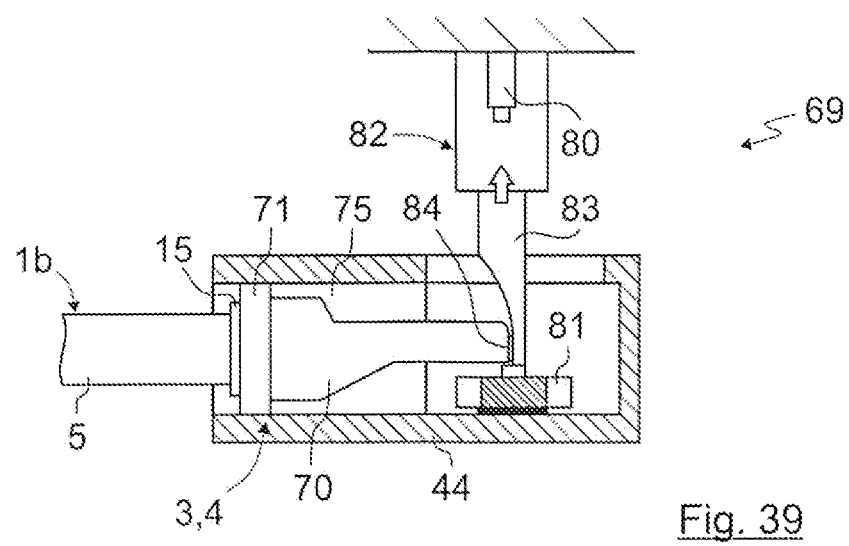
FIG. 39 shows the .reloading device of FIG. 38 while the inner conductor contact element, by making contact with a button element of the telescopic ram, is triggering a removal of the telescopic ram from the displacement path of the inner conductor contact element.
Figure 40:
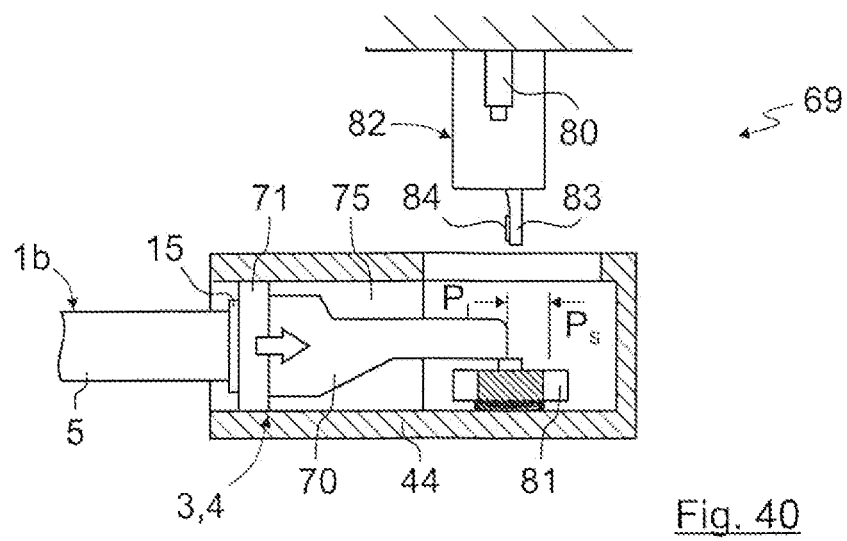
FIG. 40 shows the preloading device of FIG. 38 while the sensor unit is monitoring the actual position of the inner conductor contact element within the housing assembly in the course of the further pressing-in of the cable end.
Figure 41:
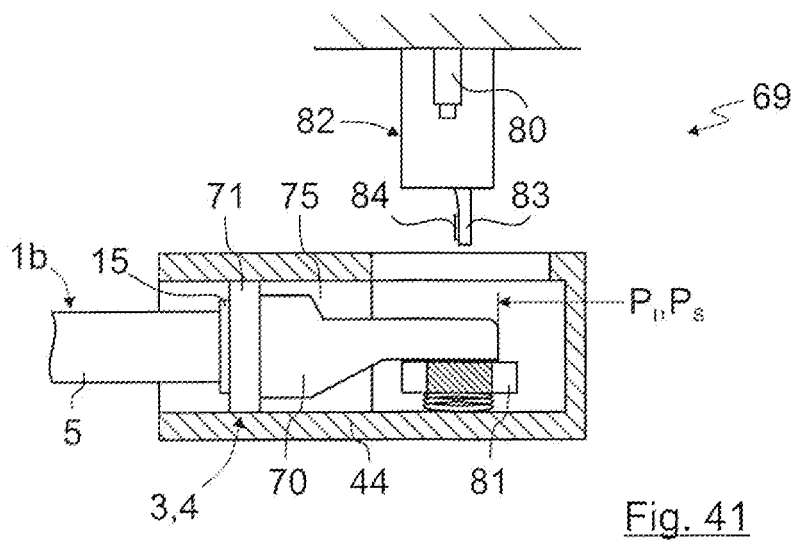
FIG. 41 shows the preloading device of FIG. 38 after the inner conductor contact element has reached the setpoint position within the housing assembly.

FIG. 34 shows a state of the press-in module 69 during the placing-in of prefabricated electrical cables 1b, which are to subsequently be assembled in a housing assembly or a plug connector housing 44 of the plug connector 12. The press-in module 69 will be described purely by way of example on the basis of a plug connector 12 which is able to receive two electrical cables 1b. In principle, the press-in module 69 may also be suitable for use with a plug connector of a different type, in particular for use with a plug connector that has only a single electrical cable 1b.

The electrical cables 1b illustrated are also to be understood merely as examples. In principle, the invention may be suitable for use with any electrical cable, for example also for use with a multicore cable 1a with multiple inner conductors 2.

The electrical cables 1b shown by way of example are prefabricated at their respective front cable ends 3, 4 with an inner conductor contact element 8, which is electrically and mechanically connected to an inner conductor 2 of the cable 1b. The inner conductor contact element 8 may for example be pressed together with or welded to, in particular ultrasound-welded to, the inner conductor 2 of the cable 1b. For this purpose, an ultrasound welding device may be provided (not illustrated). As illustrated in the exemplary embodiments, the inner conductor contact element 8 may be received in an insulating housing 70, for example an insulating housing 70 composed of two insulating shells. The cable 1b may furthermore be prefabricated with a support sleeve 15 that has been applied to the cable sheath 5 of the cable 1b and/or to the outer conductor of the cable 1b, in particular to a cable shielding braid 6. A crimp sleeve 71 may have been pushed onto the support sleeve 15 and crimped or pressed together with the support sleeve 15. The cable shielding braid 6 may run between the support sleeve 15 and the crimp sleeve 71, which cable shielding braid has been folded back over the support sleeve 15 prior to the application of the crimp sleeve 71.

Finally, yet further plug connector components 26, 44, 45, 46, 47, 46, for example the illustrated line seal 45, the cable retainer 46 and the retaining cap 47, may also have been pushed onto the cable sheath 5 of the cable 1b for the subsequent final assembly of the plug connector 12.

The cables 1b may be fed to the press-in module 69 by a transport device 72 to be described further below, by the feed device 54 and/or by a user. This process is illustrated in FIG. 34.

In particular, during the supply process, it may be provided that a checking device 73 checks correct pre-processing, in particular correct pre-fitting of the cable sheath 5 with the plug connector components 26, 44, 45, 46, 47, 56. The checking device 73 may in particular be designed as an optical checking device 73, for example as a camera or light strip. If the checking device 73 detects incorrect pre-processing of the cable 1b, in particular insufficient pre-fitting of the cable 1b, the assembly process may for example be interrupted and the cable 1b rejected.

While the cables 1b are being inserted, they may be pushed along an advancing direction, in particular along the feed direction X, into an advancing device 74. The advancing device 74 serves to press the cable end 3, 4 of the cable 1b into a corresponding slot 75 in the plug connector housing 44 of the plug connector 12 and will be described in more detail further below. Instead of the advancing device 74, the feed device 54 may optionally also be used for the pressing-in.

The cables 1b may preferably be caused to abut against a stop, and aligned in the correct position, at a starting position $P_A$ with the assistance of an alignment aid 76. For this purpose, the alignment aid 76 has, for example, a stop for the crimp sleeve 71.

The advancing device 74 has a holding device 77 for fixing the cable 1b. In the exemplary embodiment shown in FIGS. 34 to 37, the holding device 77 has two clamping jaws that are capable of being fed to the cable sheath 5 of the cable 1b. After the cable 1b has been placed in or supplied, the clamping jaws may be correspondingly closed, or the cable 1b may be fixed by the holding device 77.

Provision may subsequently be made for the advancing device 74 to feed the cables 1b in the advancing direction or in the feed direction X to the plug connector housing 44 and to press them into the latter.

In principle, the processing or pressing-in of the cables 1b by the two advancing devices 74 may be performed in parallel or else successively. The cables 1b are preferably pressed in successively in order to be able to better control and monitor the pressing-in process. In principle, a common advancing device 74 or at least a common drive for the advancing devices 74 may accordingly also be provided. In the exemplary embodiment in FIGS. 34 to 37, the advancing device 74 has a rail system in order to move the holding device 77 linearly along the advancing direction or feed direction X. By contrast, in the exemplary embodiment shown in FIGS. 42 to 44, a spindle drive is provided which selectively feeds only one of the two holding devices 77.

After the cable 1b has been fixed, the plug connector housing 44 may firstly be fixed in an assembly position by means of a fixing device 78 before the cable 1b is pressed in. Two pressing jaws for fixing the plug connector housing 44 are illustrated by way of example.

The advancing device 74 may subsequently press the cable end 3, 4 of the cable 1b into the corresponding slot 75 in the plug connector housing 44. In this case, the crimp sleeve 71 is preferably pressed into the slot 75, which results in the subsequent holding force of the cable 1b in the plug connector 12.

A force transducer 79 is provided for detecting the pressing force applied during the pressing-in of the cable 1b. In the exemplary embodiment, the force transducer 79 is part of the advancing device 74 and is merely indicated as a black box in FIG. 34. The advancing device 74 presses the cable end 3, 4 of the cable 1b into the plug connector housing 44 until the inner conductor contact element 8 has reached a setpoint position $P_S$ within the plug connector housing 44. An optical sensor unit 80 detects the actual position $P_I$ of the inner conductor contact element 8 within the plug connector housing 44 during the pressing-in of the cable 1b.

A control unit 10 of the press-in module 69 (likewise merely indicated as a black box in FIG. 34) may be provided for monitoring the pressing-in process, in particular for evaluating the detected actual position $P_I$ and the detected pressing force in the context of quality assurance. The control unit 10 is able to evaluate the pressing force detected by the force transducer 79 during the pressing-in and to compare it with a specification for the pressing force. If the pressing force does not correspond to the specification, the plug connector 12 may for example be correspondingly marked, and rejected if necessary.

FIGS. 38 to 41 show the pressing of the cable 1b into the plug connector housing 44 in a side view, wherein the plug connector housing 44 is illustrated in section and in highly simplified form.

The plug connector housing 44 may have a spring-loaded latching means 81 in order to fix the inner conductor contact element 8. In order to simplify the assembly of the cable 1b in the plug connector 12, a preloading device 82 may be provided in order to initially mechanically preload the latching means 81 within the plug connector housing 44 orthogonally with respect to the advancing direction or with respect to the feed direction X. For this purpose, the preloading device 82 may for example have an extendable telescopic ram 83 which preloads the latching means 81 out of the displacement path of the inner conductor contact element 8 counter to a spring force. In order to subsequently open up the displacement path for the inner conductor contact element 8 again, the preloading device 82 can be removed from the displacement path when contact with the inner conductor contact element 8 occurs or when contact with the inner conductor contact element 8 is impending. By way of example, a button element 84 is illustrated, which can be touched by the inner conductor contact element 8 and thereby triggers the retraction, for example also a mechanical snapping-in movement, of the telescopic ram 83 (cf. FIGS. 39 and 40). The cable end 3, 4 of the cable 1*b* can then be pressed further into the plug connector housing 44 until the inner conductor contact element 8 has reached its setpoint position $P_S$ in the plug connector housing 44 (cf. FIG. 41).

Figure 42:
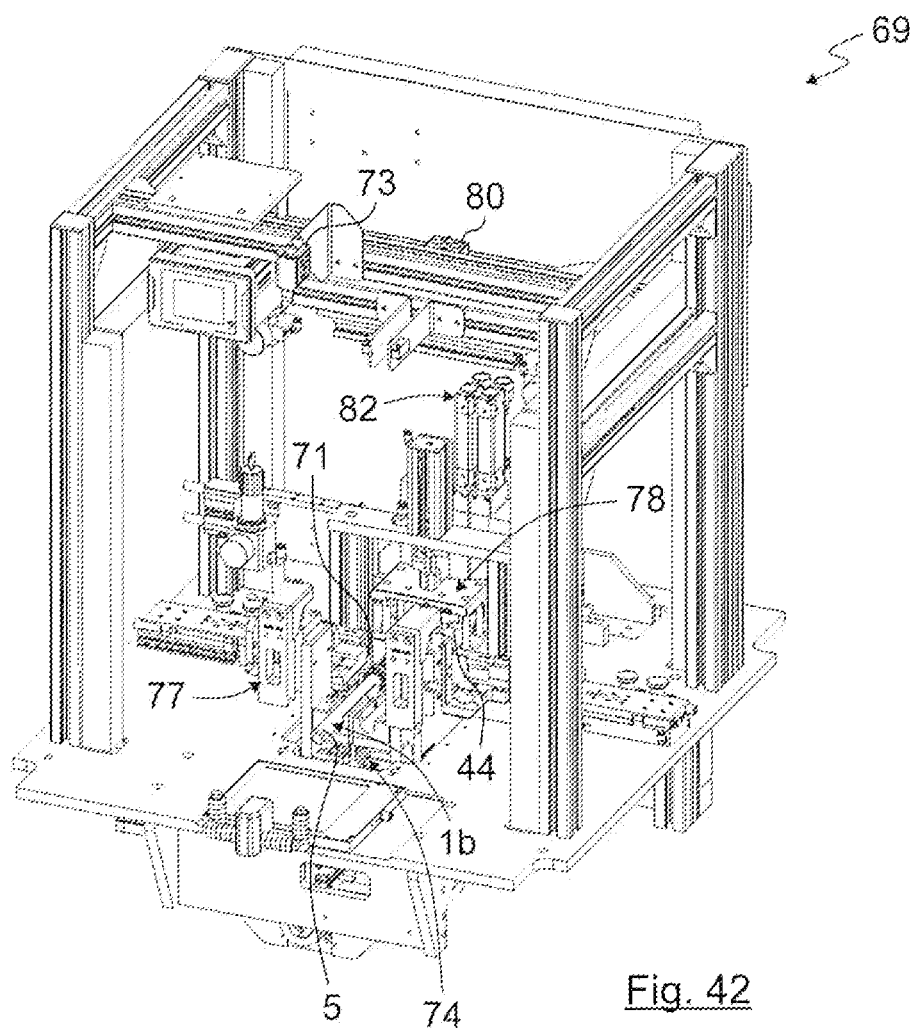
FIG. 42 shows a press-in module according to a second, preferred exemplary embodiment while the electrical cable is being inserted into the advancing device.
Figure 43:
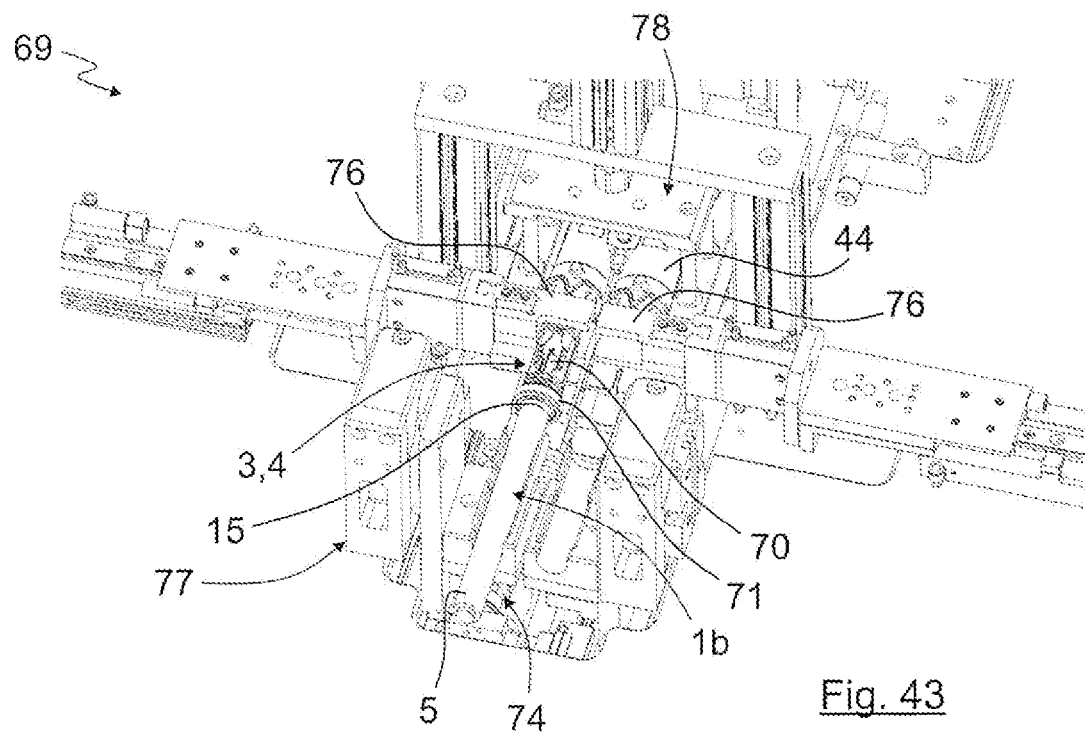
FIG. 43 shows the press-hi module of FIG. 42 after the correctly positioned alignment of the cable in the starting position using the alignment aid.
Figure 44:
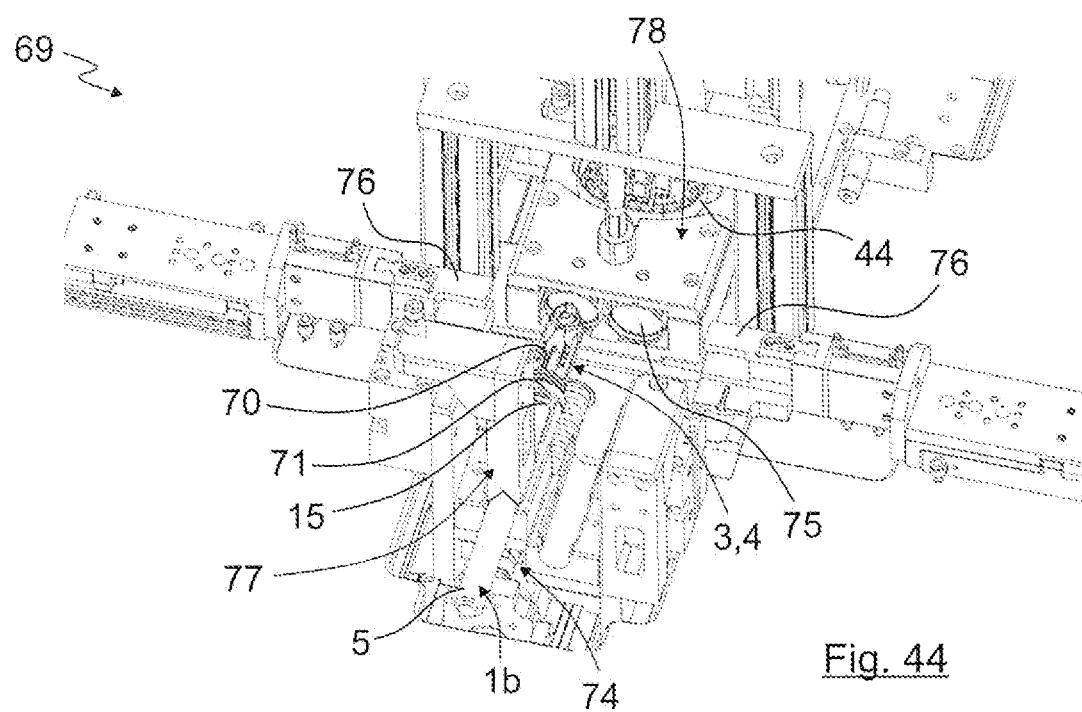
FIG. 44 shows the press-in module of FIG. 42 after the housing assembly has been fixed by the fixing device and after the cable has been fixed in the holding device.

FIGS. 42 to 44 show a preferred exemplary embodiment of the press-in module 69. FIG. 42 shows the state during the placement of a first cable 1*b* into the press-in module 69. FIG. 43 shows a state of the press-in module 69 in which the cable 1*b* has been aligned in the correct position in the starting position $P_A$ by means of the alignment aid 76. In FIG. 44, the cable 1*b* has been fixed by a single clamping jaw of the holding device 77 by virtue of the cable 1*b* being pressed by the clamping jaw against a support. In FIG. 44, the plug connector housing 44 is furthermore fixed, for the subsequent pressing-in operation, by a fixing device 78 with a single pressing jaw in the form of a plate having a negative form of the plug connector housing 44.

Figure 80:
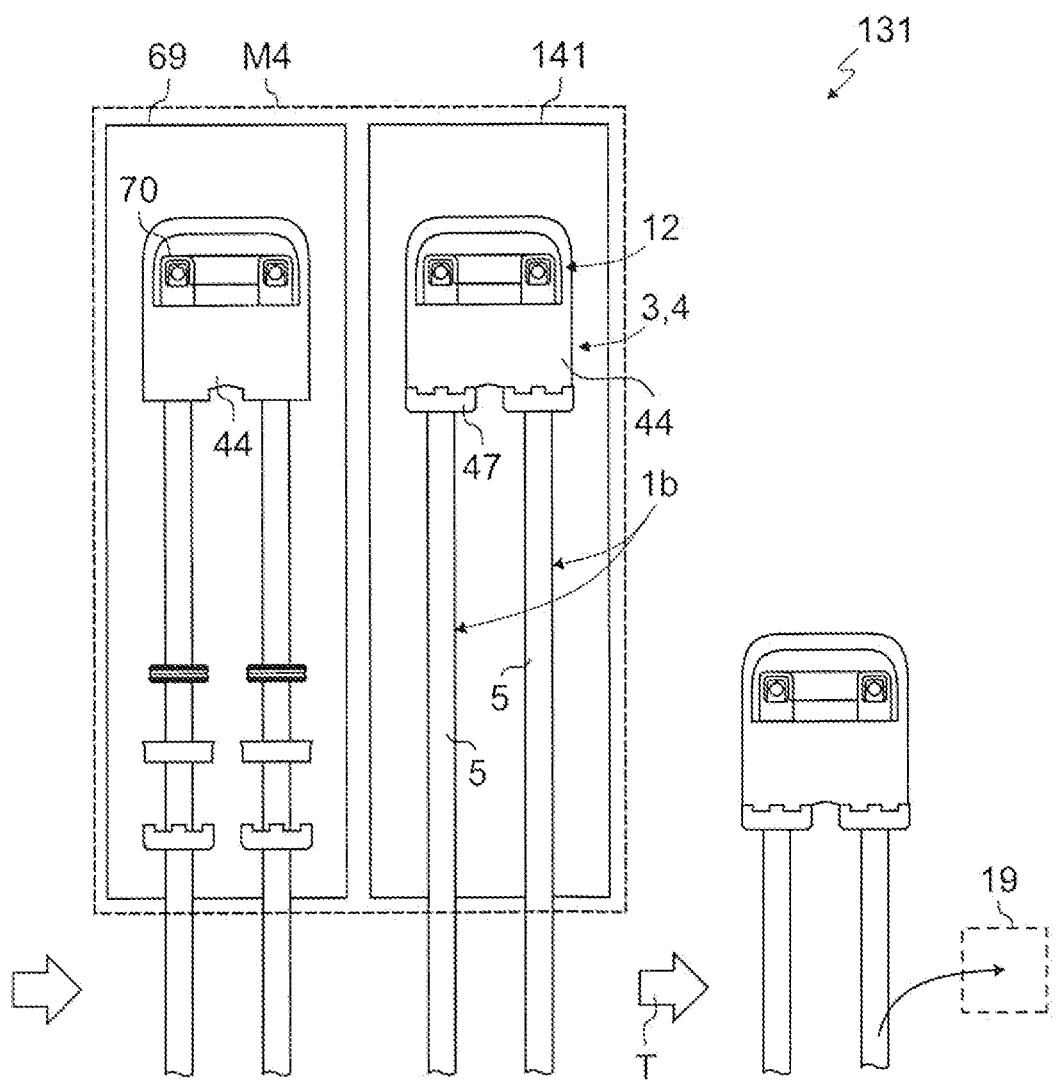
FIG. 80 shows a fourth detail, which adjoins the third detail along the transport direction, of the apparatus according to the invention of the second exemplary embodiment.

FIG. 45 shows the exemplary, schematically illustrated plug connector 12 during its final assembly process (cf. also FIG. 80). In the course of the final assembly process after the cables 1*b* have been pressed in, provision may be made to assemble the further plug connector components 45, 46, 47. For this purpose, the line seal 45 may firstly be pushed into the respective slot 75 of the plug connector housing 44 and fixed by the cable retainer 46. The retaining cap 47 may then be applied to the slot 75 from the outside and fixed.

FIGS. 46 to 52 show an advantageous feed device 54 for assembling the electrical plug connector 12 according to an exemplary embodiment during various method steps.

The feed device 54 has a first transport module 85 in order to feed a cable section to be processed, in particular a cable end 3, 4 of at least one electrical cable 1*a*, 1*b*, along a feed direction X (cf. FIG. 46) into a processing module for processing the cable 1*a*, 1*b* in the course of the plug connector assembly process, or in order to move said cable section out of the processing module counter to the feed direction X. By way of example, the above-described single fitting module 59 is illustrated as a black box as a processing module; it is however possible in principle for the feed device 54 to be used to feed the cable end 3, 4 into any processing module. The feed device 54 may also be present in a plurality for this purpose.

The feed device 54 furthermore has a second transport module 86, which is preferably independent of the first transport module 85 and which is arranged at a position spaced apart from the first transport module 85 in the feed direction X. The second transport module 86 is also able to transport the cable end 3, 4 along or counter to the feed direction X.

The first transport module 95 has transport units 87 which can be fed to the cable 1*a*, 1*b*, which transport units are repositionable such that plug connector components 26, 44, 45, 46, 47 applied to the cable end 3, 4 can pass through the first transport module 85, while the second transport module 86 is transporting the cable 1*a*, 1*b*. The principle will be illustrated in more detail below.

Figure 46:
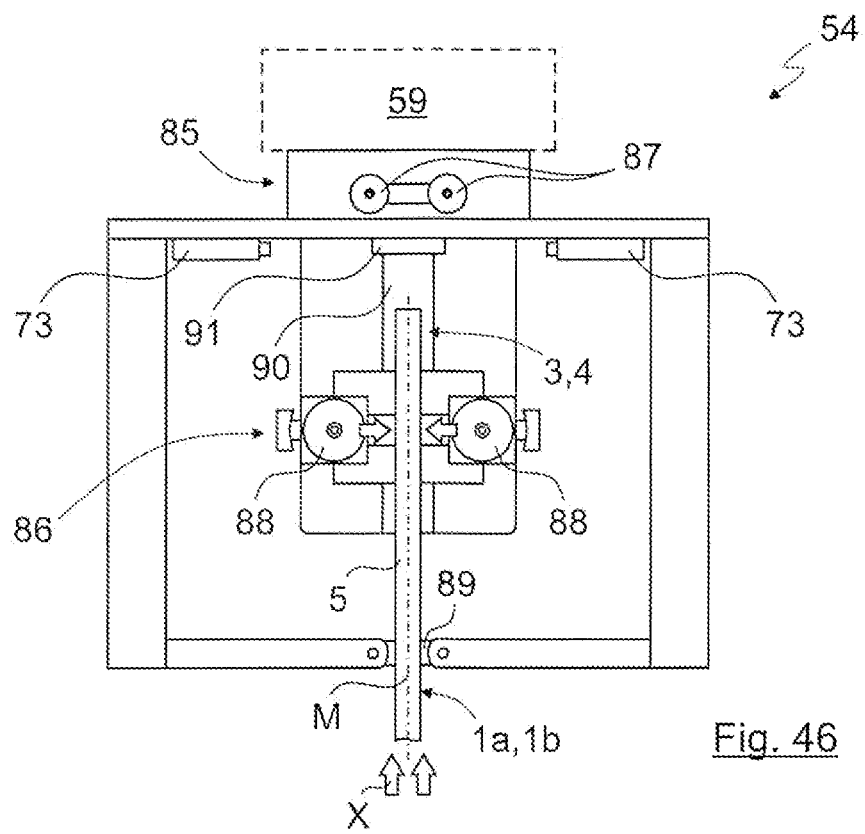
FIG. 46 shows a feed device of the apparatus according to the invention with two transport modules while an electrical cable is being placed into the second transport module.

FIG. 46 shows the feed device 54 while the electrical cable 1*a*, 1*b* is being placed in. The cable 1*a*, 1*b* may be placed (or inserted in some other way) into the second transport module 86, the clamping bodies 88 of which are for this purpose initially opened or sufficiently spaced apart from the central axis M of the cable 1*a*, 1*b*.

The cable 1*a*, 1*b* may optionally be placed on a first guide device 89 which is arranged upstream of the second transport module in the feed direction X and which serves for guiding the cable 1*a*, 1*b*.

After the cable 1*a*, 1*b* has been placed into the second transport module 86, provision may be made for the second transport module 86 to feed its clamping bodies 88 in the direction of the central axis M of the cable 1*a*, 1*b* (cf. arrows in FIG. 46). In the exemplary embodiment, the clamping bodies are for example in the form of roller bodies 88, which are able to guide the cable 1*a*, 1*b* tangentially between them.

For safety reasons, it may initially be provided that the second transport module 86 fixes the cable 1*a*, 1*b* by means of the clamping bodies or roller bodies 88 only with a force that does not pose a danger to the user, for example using one or more springs. It may be provided that the second transport module 86 increases the force of the clamping bodies or rolling bodies 88 against the cable 1*a*, 1*b*, for example using a pneumatic or hydraulic unit, only when the user has removed their hand or a tool from a defined danger area.

Figure 47:
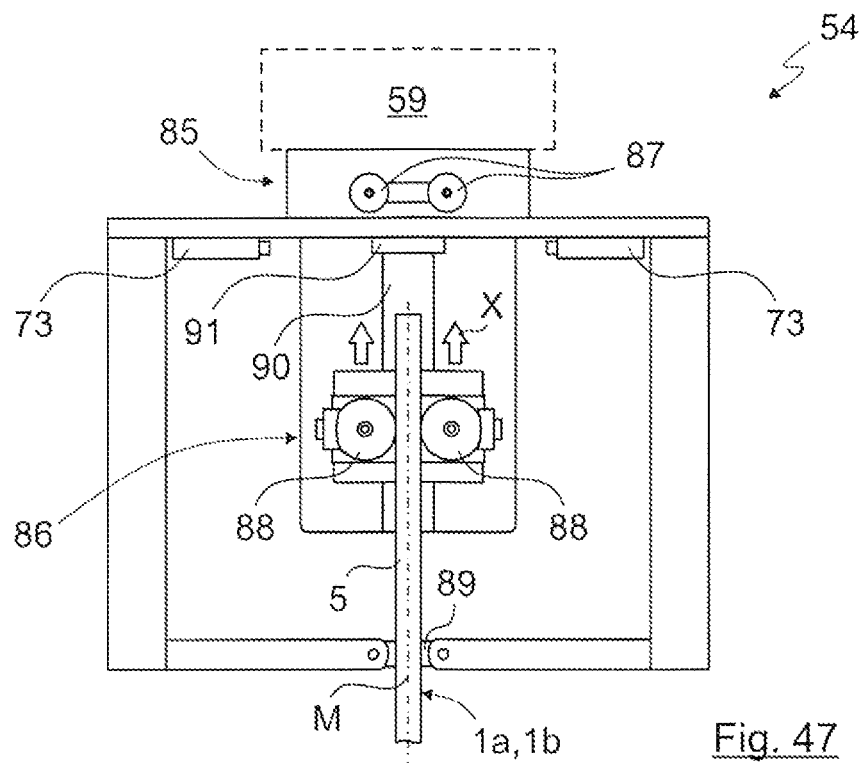
FIG. 47 shows the feed device of FIG. 46 while the electrical cable is being transported through the second transport module in the direction of the first transport module.

FIG. 47 illustrates how the second transport module 86 transports the cable 1*a*, 1*b* in the direction of the first transport module 85. For this purpose, the second transport module 86 has a linear drive in order to transport the cable 1*a*, 1*b* along or counter to the feed direction X. For this purpose, a guide rail 90 is provided, along which the second transport module 86 is able to move the clamping bodies or roller bodies 88 with the cables 1*a*, 1*b* held therein linearly in a specified range in or counter to the feed direction X. For the feed of the cable 1*a*, 1*b* by the second transport module 86, the roller bodies 88 are blocked by a brake unit. The brake unit is shown in the figures only schematically in the form of lateral brake shoes. In principle, however, the brake unit may be implemented in any desired form, and may in particular also act directly on the axis of the roller bodies 88.

Figure 48:
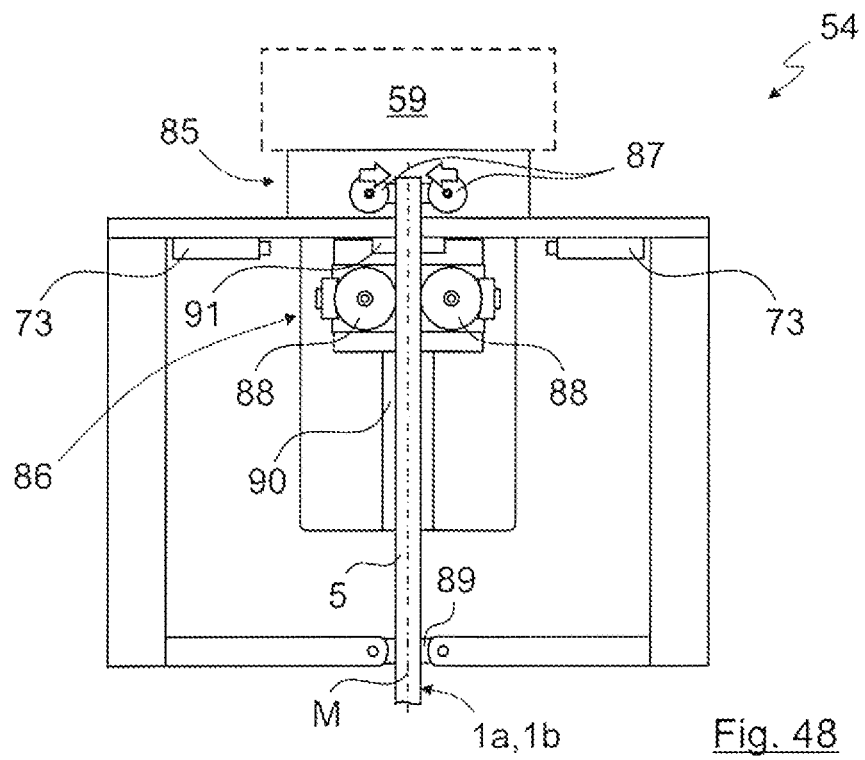
FIG. 48 shows the apparatus of FIG. 46 during the transfer of the cable to the first transport module for onward transport.

FIG. 48 shows the transfer of the cable 1*a*, 1*b* to the first transport module 45 for the onward transport of the cable 1*a*, 1*b* by the first transport module 45. For this purpose, the second transport module 46 has reached its end stop (this is however not imperatively the case). The first transport module 45 has transport units 87 which are capable of being fed in the direction of the central axis M of the cable 1*a*, 1*b* and which, in the exemplary embodiment, are designed as transport rollers 87 which are able to guide the cable 1*a*, 1*b* tangentially between them. In the method step in FIG. 48, the transport units or the transport rollers 87 are fed or closed in the direction of the central axis M of the cable 1*a*, 1*b* (cf. arrows in FIG. 48).

Figure 49:
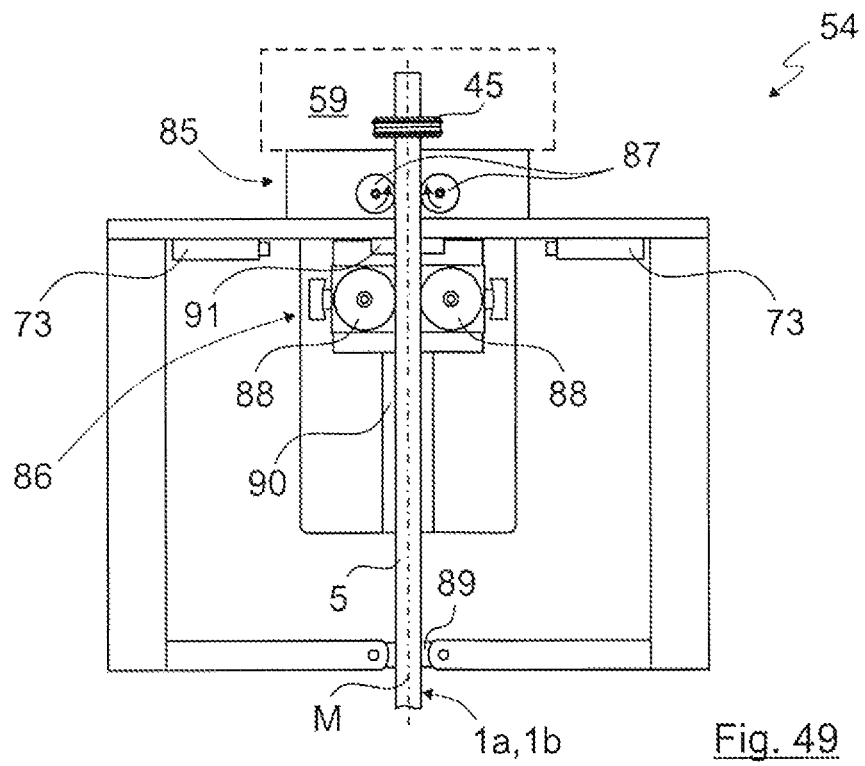
FIG. 49 shows the device of FIG. 46 during the feed of the cable into one of the processing modules by the first transport module.

FIG. 49 illustrates how the first transport module 45 feeds the cable 1*a*, 1*b* into the single fitting module 59 through the driving of the transport rollers 87. In order to enable the first transport module 85 to feed the cable 1*a*, 1*b*, it is provided that the roller bodies 88 of the second transport module 86 are released from the previously blocked state, such that they can rotate freely, by the brake unit. The roller bodies 88 of the second transport module 86 are thus able to roll freely on the cable sheath 5 of the cable 1*a*, 1*b* while the first transport module 85 feeds the cable 1*a*, 1*b* into the single fitting module 59. In accordance with this principle, the transport of the cable 1*a*, 1*b* can be imparted selectively by the first transport module 85 or by the second transport module 86. The second transport module 86 is preferably stationary in the feed direction X while the first transport module 86 feeds the cable 1a, 1b into the single fitting module 59.

As already mentioned, the processing module may be designed as any processing module in the context of a cable fabrication or plug connector assembly process. However, the processing module is preferably designed as a fitting module, in particular as a single fitting module 59, in order to fit the cable end 3, 4 with at least one plug connector component 26, 44, 45, 46, 47 starting from a front, free end for the plug connector assembly process. By way of example, the single fitting module 59 in FIGS. 46 to 52 is provided as a single fitting module 59 in order to fit the cable 1a, 1b with a line seal 45.

In order to advantageously support the cable 1a, 1b, a second guide device 91 may optionally be provided between the first transport module 85 and the second transport module 86.

By virtue of the fact that the first transport module 85 is arranged closer to the processing module or to the single fitting module 59 in the feed direction X than the second transport module 86, preferably directly adjacent to the processing module or to the single fitting module 59, the first transport module 85 can impart a relatively high force and a high degree of precision when inserting the cable 1a, 1b. Furthermore, kinking or bending of the cable 1a, 1b during the insertion into the line seal 45 (or the other plug connector component 26, 44, 46, 47) is avoided.

Figure 50:
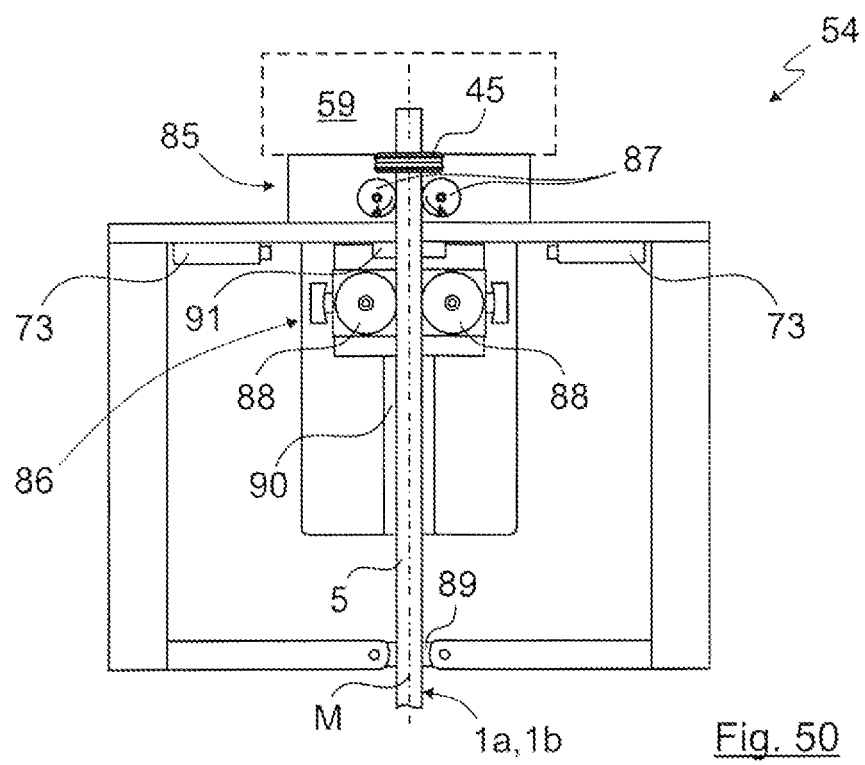
FIG. 50 shows the apparatus of FIG. 46 while the cable is being moved out of the processing module by the first transport module.

After the processing, for example fitting of the cable end 3, 4, the cable 1a, 1b is preferably removed again from the processing module or from the single fitting module 59. For this purpose, the first transport module 85 may move the cable 1a, 1b out of the single fitting module 59 counter to the feed direction X, as illustrated in FIG. 50. However, this can lead to a collision of the plug connector components 26, 44, 45, 46, 47 (or other components) with the transport rollers 87, which must be avoided.

Figure 51:
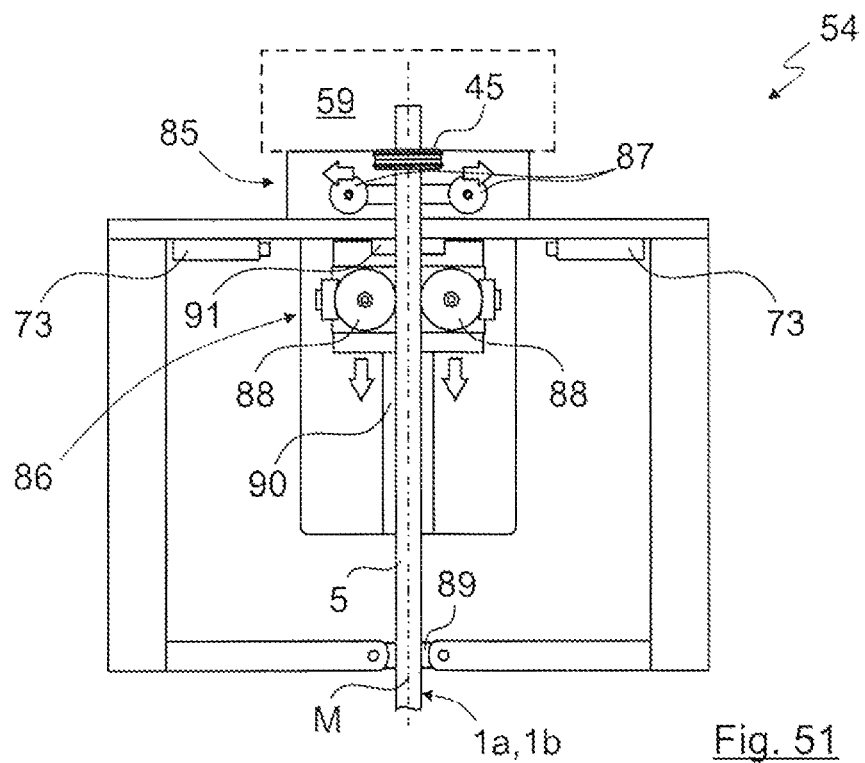
FIG. 51 shows the apparatus of FIG. 46 during the further movement of the cable out of the processing module by the second transport module, while the transport rollers of the first transport module are open in order to allow the plug connector component to pass through the first transport module.
Figure 52:
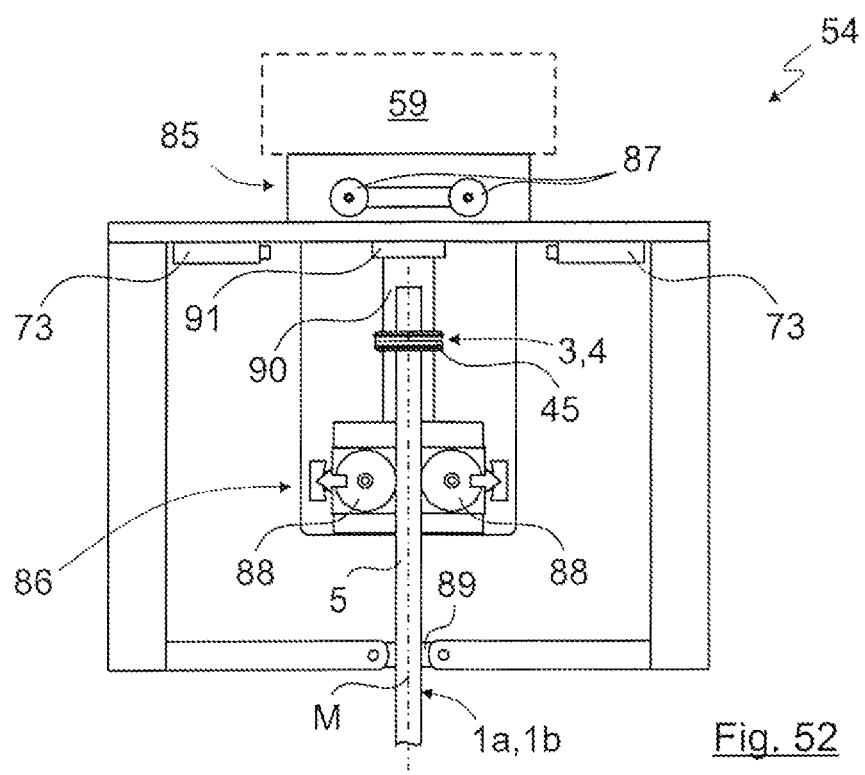
FIG. 52 shows the apparatus of FIG. 46 during the opening of the clamping bodies of the second transport module for the purposes of releasing the fitted cable.

As illustrated in FIG. 51, it may be provided that the transport units 87 of the first transport module 85 are opened in order to allow the plug connector components 26, 44, 45, 46, 47 (for example the illustrated line seal 45) applied to the cable sheath 5 of the cable 1a, 1b to pass through the first transport module 85 while the second transport module 86 transports the cable 1a, 1b onward. For this purpose, the clamping bodies 88 of the second transport module 86 may be blocked again by means of the brake unit. In this way, the fitted cable 1a, 1b can be moved through the first transport module 85, for example until it reaches the end position shown in FIG. 52, in which the clamping bodies 88 of the second transport module 86 may optionally be opened again.

Optionally, a checking device 73 may be provided and configured to check for correct processing of the cable 1a, 1b during the feed of the cable end 3, 4 into the processing module or into the single fitting module 59 or while the cable end 3, 4 is being moved out of the single fitting module 59, or to thoroughly check the cable 1a, 1b for processing defects or for material defects. By way of example, two cameras 73 are shown.

Figure 53:
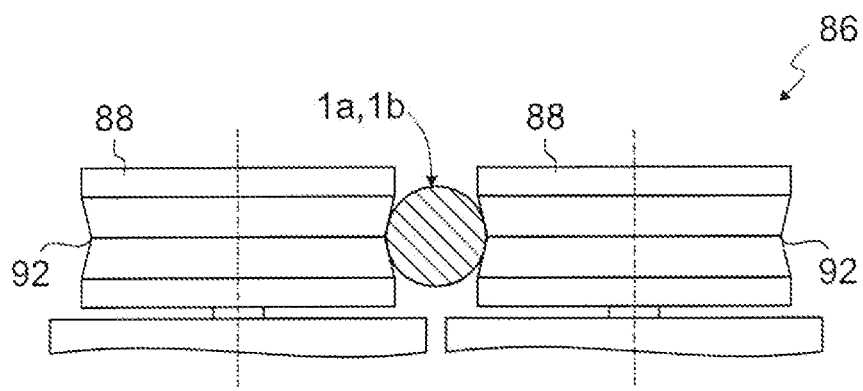
FIG. 53 shows an enlarged side view of roller bodies of the second transport module for the transporting or mounting of a single electrical cable.
Figure 54:
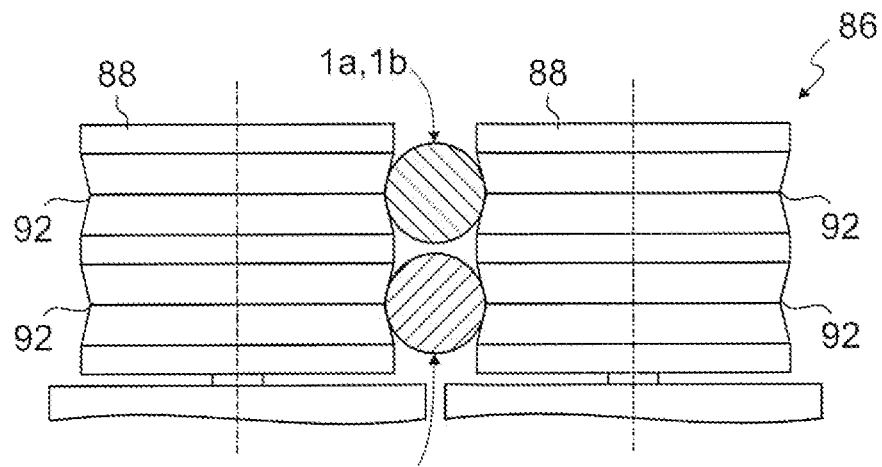
FIG. 54 shows an enlarged side view of roller bodies of the second transport module for the simultaneous transport or mounting of two electrical cables according to a first variant.
Figure 55:
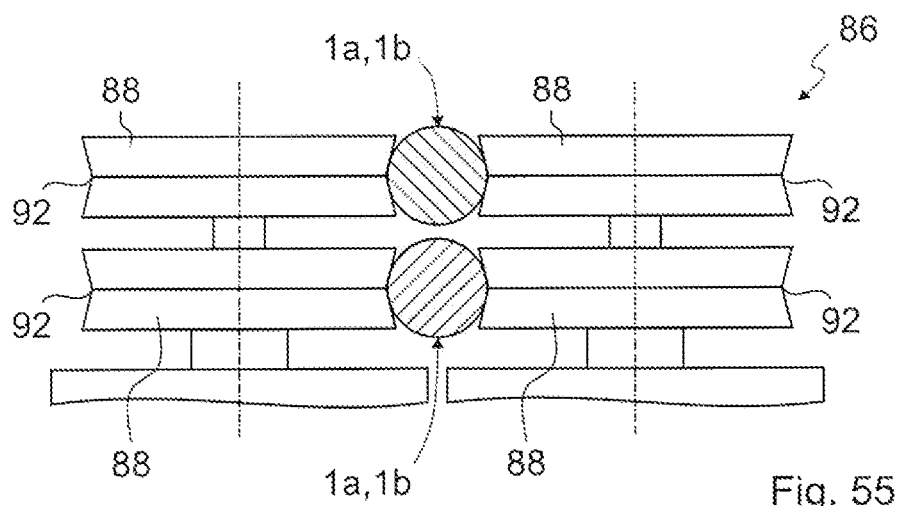
FIG. 55 shows an enlarged side view of roller bodies of the second transport module for the transport or mounting of two electrical cables according to a second variant.

FIGS. 53 to 55 show, by way of example, various roller bodies 88 that can be advantageously used in the second transport module 86. The cable 1a, 1b is shown merely in simplified form in FIGS. 53 to 55.

As illustrated in the Figures, the roller bodies 88 may, along the circumference, comprise notches 92 or even a negative form of the cable sheath 5 in order to improve the guidance of the cable 1a, 1b.

The feed device 54 is also suitable for assembling an electrical plug connector 12 which has multiple electrical cables 1a, 1b. In this case, it may be necessary for the transport modules 85, 86 to feed multiple cables 1a, 1b, for example two cables 1a, 1b.

FIGS. 54 and 55 show, by way of example on the basis of the second transport module 86, possible configurations of the roller bodies 88 if more than one cable 1a, 1b is to be transported.

In FIG. 54, the two roller bodies 88 have a number of notches 92 corresponding to the number of cables 1a, 1b, which notches are axially offset along the central axis of the roller bodies 88 in order to specify a defined spacing between the two cables 1a, 1b.

By contrast, in FIG. 55, two roller bodies 88 are used per cable 1a, 1b. Given a suitable actuator system, it is thus also possible, for example, for the cables 1a, 1b to be transported independently of one another.

Figure 56:
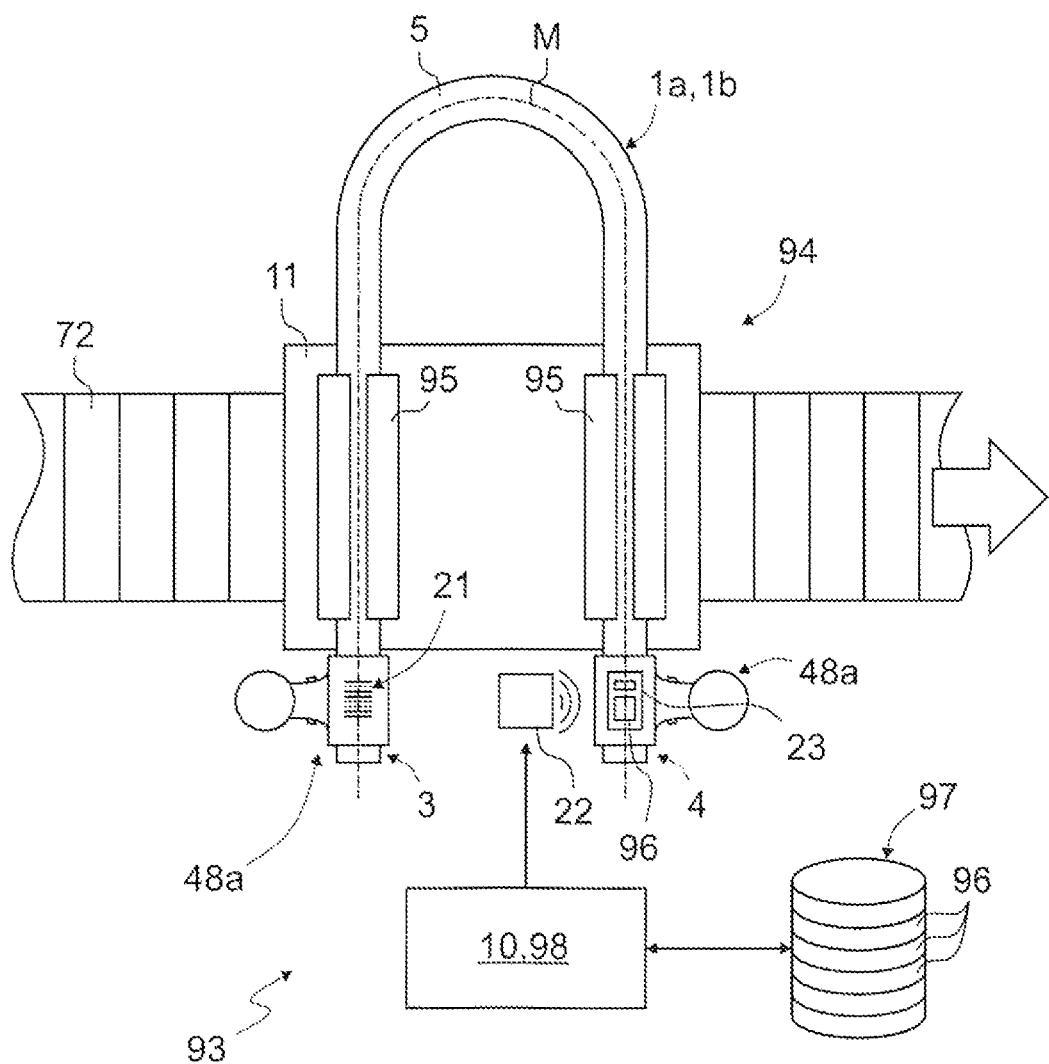
FIG. 56 shows an electrical cable fastened to a workpiece carrier, two exemplary information carriers and also a control device and a global database for assigning documentation of the plug connector assembly process.

FIG. 56 shows a documentation module 93 for the plug connector assembly process according to the invention.

In the course of the plug connector assembly process, various pieces of information may advantageously be recorded in documentation 96 of the processing of the cable 1a, 1b. For example, information from a check for an absence of damage of a cable component of the cable 1a, 1b (for example of the cable sheath 5, of the cable shielding braid 6 or of the insulation 2.2) may be taken into consideration. Furthermore, a check for an absence of damage of a plug connector component 26, 44, 45, 46, 47, 56 of the plug connector 12 to be assembled on the cable 1a, 1b may be performed, wherein the results of the check are finally recorded in the documentation 96. A check for radial alignment of plug connector components 26, 44, 45, 46, 47, 56 may also be performed, the results of which are in turn recorded in the documentation 96. In particular, the result of a check for the presence of certain plug connector components 26, 44, 45, 46, 47, 56 after the fitting of the cable sheath 5, for example of the line seal 45, may also be advantageous in the context of the documentation 96.

In principle, any process parameters of the processing processes may be recorded in the documentation 96.

In the context of the transport device 72, a workpiece carrier system 94 may be provided which has a workpiece carrier 11 on which the electrical cable 1a, 1b is fastened. The electrical cable 1a, 1b may thus be assigned to the workpiece carrier 11 during the processing thereof throughout the entire plug connector assembly process or during a section of the plug connector assembly process.

The workpiece carrier 11 has clamping units 95 in order to fix the first cable end 3 and/or the second cable end 4 of the cable 1a, 1b, in the exemplary embodiment both cable ends 3, 4. In the exemplary embodiment, the cable 1a, 1b is clamped into the workpiece carrier 11 such that a U-shaped profile is formed between the two cable ends 3, 4. In principle, a profile deviating from this may also be provided, for example a helical winding in the case of a relatively long cable 1a, 1b. It may also be provided that only one of the two cable ends 3, 4 is received in the workpiece carrier 11. The actual configuration of the workpiece carrier 11 and the type of fastening of the cable 1a, 1b on the workpiece carrier 11 are not of importance in the context of the invention.

In order to transport the cable 1a, 1b for the processing thereof, the workpiece carrier 11 is assembled, for example, on a transport device 72 in the form of a conveyor belt. In principle, however, the cable 1a, 1b may be transported in any desired manner, as will be discussed further below.

As already mentioned in connection with FIG. 6, it may be provided that the cable 1a, 1b and/or the workpiece carrier 11 has an information carrier for identification purposes. As an alternative or in addition to an information carrier on the cable 1a, 1b or on the workpiece carrier 11, it may also be provided that the cable 1a, 1b is made identifiable by means of at least one sheath clamp 48a, 48b, 48c, 48d fastened to the cable sheath 5. In FIG. 56, an exemplary sheath clamp 48a is fastened to both cable ends 3, 4 of the cable 1a, 1b. The sheath clamp 48a may likewise be provided with any desired information carrier. An optical marking 21 (barcode) on the sheath clamp 48a of the first cable end 3 and a transponder 23 (RFID) on the sheath clamp 48a of the second cable end 4 are illustrated by way of example. In principle, different types of sheath clamps 48a, 48b, 48c, 48d may be provided, as already stated.

In the context of the documentation module 93, it may be provided that documentation 96 of the plug connector assembly process or of type processing of the cable 1a, 1b is compiled for at least one processing operation and assigned to the cable 1a, 1b.

For this purpose, it is for example possible for a unique identifier for the cable 1a, 1b to be imprinted in the information carrier and/or for a unique identifier already imprinted on the information carrier to be assigned to the cable 1a, 1b temporarily for the fabrication thereof.

The identifier may for example be a binary, decimal or hexadecimal numerical value or a numerical sequence. The identifier may for example be encoded or imprinted in the barcode or some other code. The identifier may also be imprinted or stored in an electronic component, for example a memory module, for example in the RFID transponder 23.

For example, it may also be provided that different workpiece carriers 11 already have a respective information carrier with a respective unique identifier. Through the assignment of the cable 1a, 1b to the workpiece carrier 11 during the fabrication process or at least during a sub-process of the fabrication process, the documentation 96 can ultimately be assigned. It may however also be provided, for example, that the information carrier is provided in targeted fashion with an identifier for the identification of the cable 1a, 1b for the fabrication operation to be documented.

It may be provided that the documentation 96 is at least partially imprinted in the information carrier. This may be advantageous in particular if the information carrier is an electronic information carrier 23 on which sufficient storage space is available (indicated in FIG. 56). It is however also possible, for example, for a continuous numerical sequence or a similar code to be provided in order to record the documentation 96 continuously in the course of the plug connector assembly process, for example in optical form on the cable 1a, 1b.

For example, a read/write unit 22 and/or a scanner for reading out a barcode (or some other code) and/or a laser 20 or a printer may be provided in order to augment the documentation 96 or to evaluate it for the cable processing operation.

Preferably, however, a global database 97 may be used in which documentation 96 compiled in the course of the fabrication production line can be assigned to individual cables 1a, 1b, preferably on the basis of the respective unique identifier. The addressing in the database 97 may thus be implemented in a manner dependent on the identifier of the respective cable 1a, 1b.

The documentation module 93 may have a control unit 10 in order to carry out the described documentation method. It is however also possible, for example, for a global control device 96 (cf. FIG. 71) or some other control unit 10 to be provided for managing the documentation. The control unit 10 may for example be communicatively connected to the devices for imprinting and/or reading out and/or modifying the information carrier (indicated with regard to the read/write unit 22) and may furthermore be communicatively connected to the database 97.

For example, information relating to a successful processing process, an incorrect processing process, a failed processing process and/or at least one process parameter of the processing process may be included in the documentation 96. The documentation 96 may be used in the context of quality management. In the context of the quality management, provision may for example be made to sort the cable 1a, 1b, or to approve it for post-processing, in a manner dependent on the information contained in the documentation 96. In particular, removal of an incorrectly processed cable 1a, 1b in the course of the cable fabrication process may be provided in the context of the quality management.

The information for the documentation 96 may be recorded by the control unit 10 using a communication interface, for example.

Figure 57:
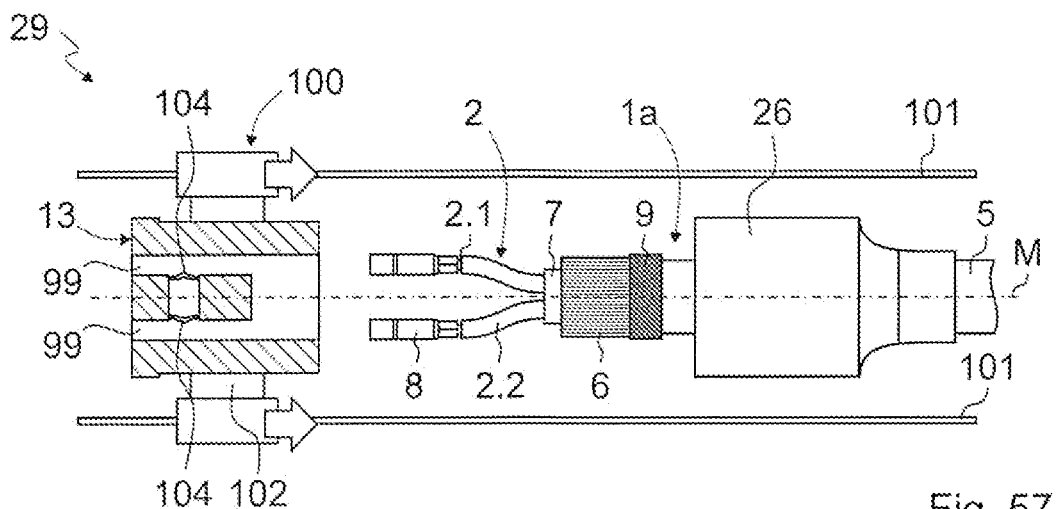
FIG. 57 shows an assembly module for assembling a contact part carrier while the contact part carrier is being pushed onto two inner conductor contact elements of the electrical cable.
Figure 58:
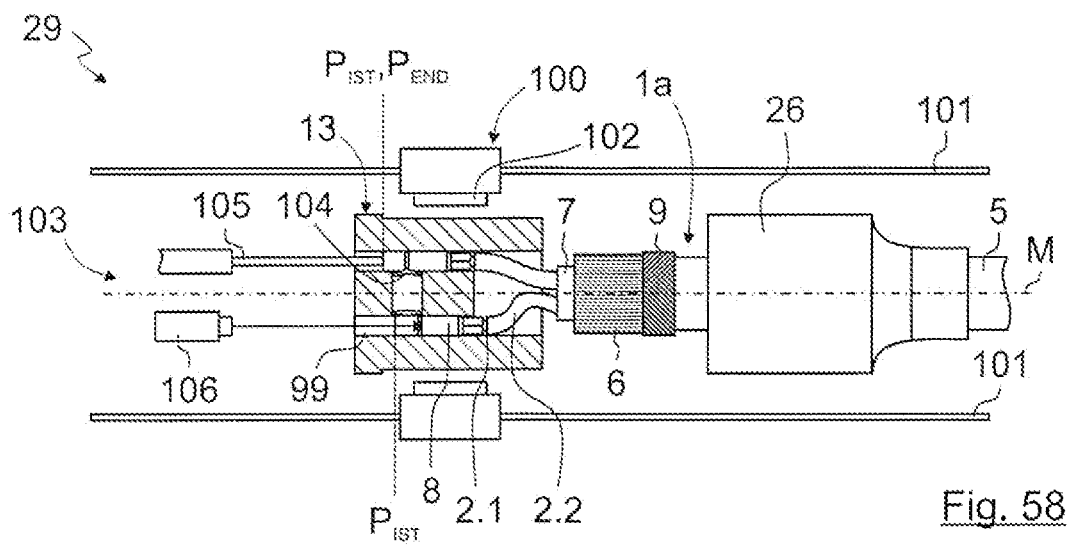
FIG. 58 shows the assembly module of FIG. 57 together with a sensor module for detecting an axial actual position of the inner conductor contact elements within the contact part carrier.
Figure 59:
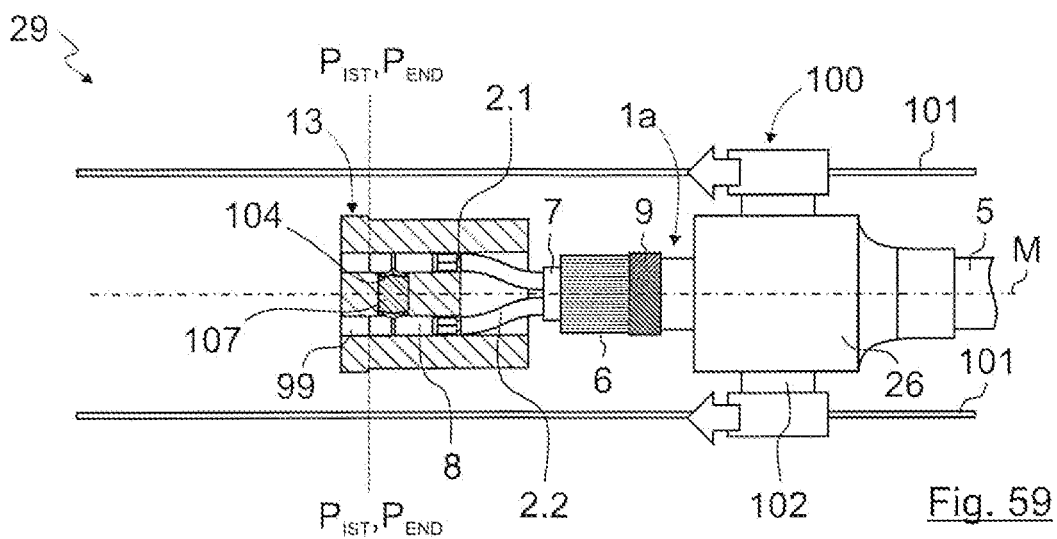
FIG. 59 shows the assembly module of FIG. 57 during the assembly of a shielding sleeve on the contact part carrier.

FIGS. 57 to 59 illustrate, by way of example, three successive assembly steps in the context of an assembly module 29 for a plug connector assembly process according to the invention. The principle is illustrated by way of example together with a two-core, shielded electrical cable 1a. In principle, however, the assembly module 29 is suitable for use with any cables 1a, 1b, in particular with any number of inner conductors 2. The illustrations, in particular the dimensions and geometrical designs, are likewise to be understood merely as examples.

The electrical cable 1a, which is being processed by way of example starting from FIG. 57, has already been partially prefabricated. In the course of the previous processing, the inner conductors 2 have been exposed at their ends. The inner conductor contact elements 8 have subsequently been fastened, in particular crimped, to the respective inner conductors 2. Furthermore, the cable shielding braid 6 has been folded back over the cable sheath 5, preferably over the support sleeve 15, and fixed with the fabric tape 9. In addition, further plug connector components 26, 44, 45, 46, 47 of the plug connector 12 (in the exemplary embodiment, only the shielding sleeve 26 is shown by way of example) have already been pushed onto the electrical cable 1a in order that these can be assembled in subsequent steps starting from the cable side.

In the method step illustrated in FIG. 57, the inner conductor contact elements 8 are firstly assembled in a respective receptacle 99 of the contact part carrier 13. The contact part carrier 13 is illustrated in section in FIGS. 57 to 59 for better clarity.

Before the inner conductor contact elements 8 are pushed into the respective receptacles 99, the spacing of the inner conductor contact elements 8 or of the inner conductors 2 of the electrical cable 1a to one another may be adapted to the spacing of the receptacles 99 of the contact part carrier 13 (so-called pitch change). To assemble the contact part carrier 13, the assembly module 29, to be described in more detail below, may optionally have an assembly device 100. The illustration shows, by way of example, two clamping jaws 102, which are guided on respective rails 101 and are capable of being fed to the contact part carrier 13, for pushing the contact part carrier 13 over the inner conductor contact elements 8 along the central axis M of the electrical cable 1a. As an alternative or in addition, the electrical cable 1a may also be moved. Instead of the assembly device 100, the abovementioned feed device 54 may also be used to assemble the inner conductor contact elements 8 in the contact part carrier 13.

For advantageous assembly of the contact part carrier 13 on the inner conductor contact elements 8, it is for example also possible for centering pins to be provided, which are led through a front opening, which faces towards what will later be a mating plug connector, of the contact part carrier 13 or through the receptacles 99 and which serve as a threading-in aid for the generally hollow cylindrical inner conductor contact elements 8 (not illustrated in the exemplary embodiment).

FIG. 58 shows a method step in the course of the plug connector assembly process in which an axial actual position $P_{IST}$ of at least one inner conductor contact element 8, which is fastened to an inner conductor 2 of the electrical cable 1a, within the contact part carrier 13 relative to an intended axial end position $P_{END}$ is checked by a sensor module 103. The sensor module 103 may be part of the assembly module 29. The sensor module 103 may however also be independent of the assembly module 29. At the time of assembly shown in FIG. 58, the inner conductor contact elements 8 have already been introduced into the contact part carrier 13. By way of example, the inner conductor contact element 8 illustrated at the top in FIG. 58 is illustrated in its end position $P_{END}$, and the inner conductor contact element 8 illustrated at the bottom in FIG. 58 has not yet been pushed sufficiently into the receptacle 99 of the contact part carrier 13.

In the exemplary embodiment, the axial end position $P_{END}$ corresponds to the position of the front, free end of the inner conductor contact element 8 when the inner conductor contact element 8 has been fully latched with a primary latching means 104.

In the case of the inner conductor contact element 8 situated in its axial end position $P_{END}$, the primary latching means 104, which is indicated purely by way of example, of the contact part carrier 13 has been latched with a complementary groove of the inner conductor contact element 8. In principle, any latching connection between the primary latching 104 and the inner conductor contact elements 8 may be provided.

The sensor module 103 is configured to detect the axial actual position $P_{IST}$ of the at least one inner conductor contact element 8 within the contact part carrier 13 relative to the intended axial end position $P_{END}$. In FIG. 58, various sensors of the sensor module 103 are illustrated in combination by way of example.

For example, it may be provided that the sensor module 103 is configured to detect the position of a front, free end of the at least one inner conductor contact element 8 within the contact part carrier 13.

The sensor module 103 may for example have a tactile sensor, preferably a measuring probe 105 or a force transducer, which is insertable through the front opening or a receptacle 99 of the contact part carrier 13. The illustration shows, by way of example, a measuring probe 105 for detecting the actual position $P_{IST}$ of a front end face of the upper inner conductor contact element 8. Instead of the measuring probe 105, it is however similarly also possible for a force transducer to be provided in order to check the actual position $P_{IST}$ by way a compressive or tensile check, in particular in order to determine whether the at least one inner conductor contact element 8 has been latched by the primary latching means 104. In this way, although it is generally not possible to detect the exact relative position of the inner conductor contact element 8, it is possible to determine whether the actual position $P_{IST}$ corresponds to the intended axial end position $P_{END}$.

For contactless detection of the actual position $P_{IST}$ of the inner conductor contact element 8 within the contact part carrier 13, an optical sensor may for example also be provided. A laser system 106 for distance measurement is illustrated by way of example in FIG. 58. Even a camera may however be sufficient. Furthermore, for contactless detection of the actual position $P_{IST}$, it is for example also possible for an inductive sensor or capacitive sensor to be provided, which preferably detects the actual position $P_{IST}$ of the inner conductor contact element 8 through the contact part carrier 13.

If the sensor module 103 has detected correspondence of the actual position $P_{IST}$ with the intended end position $P_{END}$, provision may be made to continue the plug connector assembly process. Alternatively, a repair or a rejection of the electrical cable 1a may be provided.

After correspondence between actual position $P_{IST}$ and end position $P_{END}$ has been determined, it may be provided that a secondary securing means 107 is actuated in order to secure the primary latching means 104. A secondary securing means 107 may be designed as a blocking element which, in its securing state, is situated in the displacement path of the primary latch 104 and can prevent an opening of the primary latching means 104 in positively locking fashion. An exemplary secondary securing means 107 or an exemplary blocking element is illustrated in FIG. 59.

Figure 60:
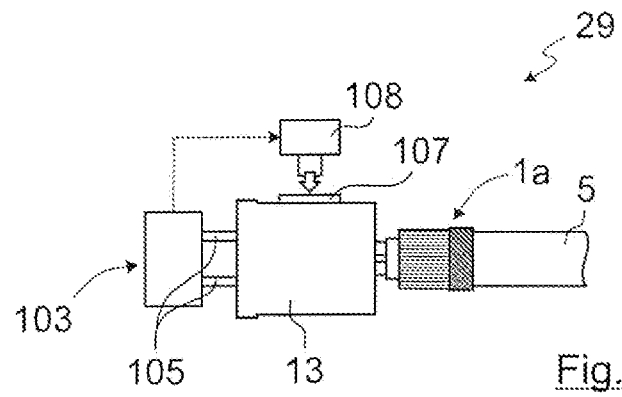
FIG. 60 shows an actuation means, controlled by the sensor module, for actuating a secondary securing means of the contact part carrier.

To actuate the secondary securing means 107, the assembly module 29 may optionally have an actuation means 108 (cf. FIG. 60), which may be connected to the sensor module 103 via a signal path and may be configured to actuate the secondary securing means 107 when the actuation means 108 receives an actuation signal from the sensor module 103. The actuation means 108 may for example, as illustrated in FIG. 60, be linearly adjustable in order for the actuation means 108 to be pushed into the contact part carrier 13. The sensor module 103 of FIG. 60 is for example designed to detect the axial actual position $P_{IST}$ of both inner conductor contact elements 8 separately by means of two measuring probes 105.

Figure 61:
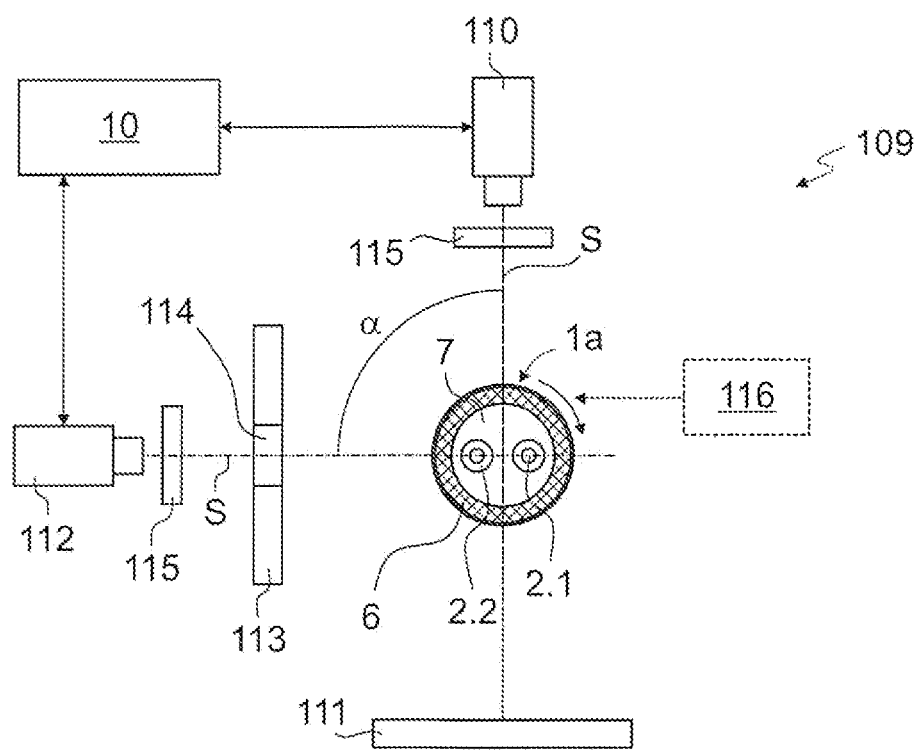
FIG. 61 shows a quality monitoring module with two optical sensors and two lighting units for optical quality monitoring of the plug connector assembly process.

FIG. 61 illustrates a quality monitoring module 109 for the quality monitoring of the plug connector assembly process according to the invention. Using the quality monitoring module 109 illustrated, the state of at least one of the two cable ends 3, 4 of the cable 1a, 1b can be detected before and/or after at least one processing operation.

It is provided here that the line of sight S of a first optical sensor 110 is aligned with the cable end 3, 4, wherein a first lighting unit 111 is arranged behind the cable end 3, 4 along the line of sight S of the first sensor 110 in order to generate transmitted light or back light for the optical detection of the cable end 3, 4.

Furthermore, the line of sight S of a second optical sensor 112 is likewise aligned with the cable end 3, 4, wherein a second lighting unit 113 is arranged in front of the cable end 3, 4 along the line of sight S of the second sensor 112 in order to generate incident light for the optical detection of the cable end 3, 4. The first sensor 110 and the second sensor 112 are each designed as a camera with a respective lens.

To illuminate the cable end 3, 4, the lighting units 111, 113 each have illuminants (not illustrated in any more detail). The illuminants may for example be arranged in a row arrangement and/or in a column arrangement. In principle, it is also possible for only a single illuminant to be provided in order to emit light from the respective lighting unit 111, 113.

So as not to block the view from the second sensor 112 to the cable end 3, 4, the second lighting unit 113 has a central recess 114.

The first lighting unit 111 and the second lighting unit 113 are arranged coaxially with the lines of sight S of the optical sensors 110, 112 respectively. In principle, however, an offset arrangement may also be provided.

The second sensor 112 is arranged so as to be offset with respect to the first sensor 110 by a defined angle α. In principle, the angle α may assume any value. Preferably, an offset of 10° to 170°, particularly preferably of 45° to 135°, more preferably of 80° to 100° and very particularly preferably of 90°, may be provided.

The lines of sight S of the sensors 110, 112 are preferably aligned orthogonally with respect to the central axis M of the cable 1a, 1b. However, a tilted alignment may also be provided.

It may be provided that the first lighting unit 111 emits light in a first light color and/or in a first light polarization which is predominantly perceptible, or is exclusively perceptible, by the first sensor 110 and is predominantly not perceptible, or is not perceptible, by the second sensor 112. Correspondingly, the second lighting unit 113 may be designed to emit light in a second light color and/or in a second light polarization which is predominantly perceptible, or is exclusively perceptible, by the second sensor 112 and is predominantly not perceptible, or is not perceptible, by the first sensor 110.

It can be ensured in this way that a measurement by means of the first sensor 110 does not adversely affect a measurement by the second sensor 112, and vice versa. For example, corresponding optical filters 115 may be provided in order to filter out the light color and/or light polarization of the lighting unit 111, 113 assigned to the respective other sensor.

In principle, it is also possible for the sensors 110, 112 to perform time-shifted measurements, wherein the first lighting unit 111 illuminates the cable end 3, 4 preferably only in time intervals in which the first sensor 110 is performing the measurement, and wherein the second lighting unit 113 illuminates the cable end 3, 4 preferably only in time intervals in which the second sensor 112 is performing the measurement.

A control unit 10 or the control device 98 can control the measurements or the sensors 110, 112 and the lighting units 111, 113 accordingly. The control unit 10 illustrated by way of example in FIG. 61 may in principle also be used to evaluate the state of the cable end 3, 4 on the basis of the data detected by means of the quality monitoring module 109.

Provision may furthermore be made to rotate the sensors 110, 112 radially around the central axis M of the cable 1a, 1b, and/or to rotate the cable 1a, 1b about its central axis M, while the sensors 110, 112 capture individual images and/or video information. The lighting units 111, 113 may preferably be rotated synchronously with the sensors 110, 112 assigned thereto, for example if said lighting units are arranged on a common frame with their assigned sensor 110, 112 and/or if the electrical cable 1a, 1b is rotated. To impart the rotational movement, a rotation device 116 may be provided, which is indicated by way of example in FIG. 61 as a black box. The rotation device 116 may preferably have a servo motor or be designed as a servo motor.

The following FIGS. 62 to 70 show advantageous embodiments of a cleaning module 117 for cleaning the cable 1a, 1b, in particular the cable end 3, 4 of the cable 1a, 1b, in the course of a plug connector assembly process according to the invention. In principle, it may be provided that, after at least one mechanical processing operation of the cable end 3, 4, a cleaning process is executed, in which particles 118 adhering to the cable end 3, 4 are removed.

The particles 118 may also be examined by a waste and/or particle monitoring system in order to be able to indirectly detect the processing success of a processing operation through a comparison of the waste or particles 118 formed in the course of the processing process with an expected amount of waste or particles and/or with an expected type of waste or particles.

For example, in the context of the cleaning module 117, provision may be made for the particles to be blown off, as indicated by way of example in FIGS. 62 to 65 and 70.

Figure 62:
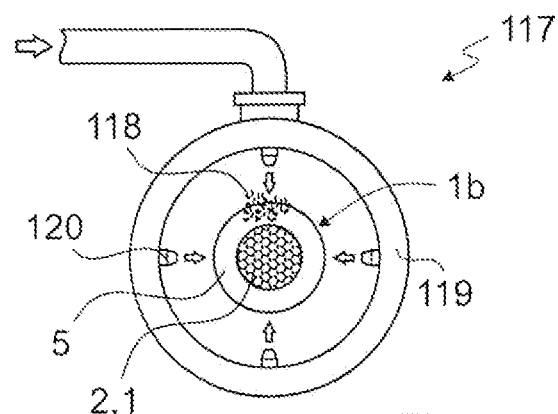
FIG. 62 shows a ring nozzle of a cleaning module in a plan view.

FIG. 62 illustrates, by way of example, the use of a ring nozzle 119 for blowing the particles 118 off the electrical cable 1a, 1b. The ring nozzle 119 has a channel for the supply of compressed air and multiple, for example four, individual nozzles 120 for the discharge of the compressed air. In principle, a ring nozzle 119 with only one, two, three or even more than four individual nozzles 120 may also be provided. It may also be provided that the ring nozzle 119 has a radially partially or fully encircling ring-shaped gap for the discharge of the compressed air.

Provision may be made for the electrical cable 1a, 1b and/or the ring nozzle 119 to be moved axially relative to one another, and/or rotated, for the processing or for the blowing-off operation.

Figure 63:
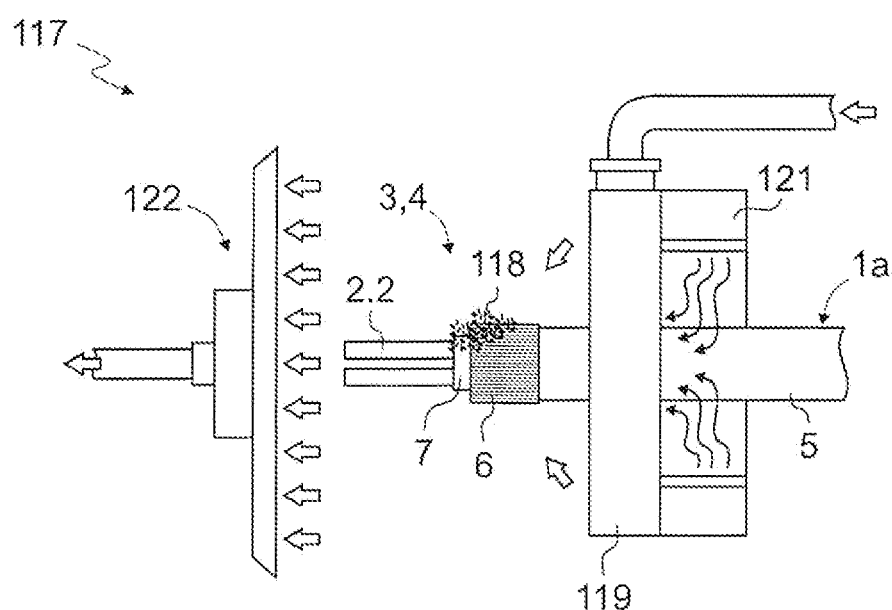
FIG. 63 shows a ring nozzle, provided with an ionizer, of a cleaning module in combination with a suction-extraction device in a side view.

FIG. 63 illustrates the use of a ring nozzle 119 in a side view, wherein the ring nozzle 119 has been enhanced to include an ionizer 121 in order to supply ionized air to the cable end 3, 4. In this way, the electrostatic attraction of the particles 118 can be reduced and the particles 118 can be blown off more easily. The ionizer 121 may be arranged upstream of, downstream of or adjacent to the ring nozzle 119.

A suction-extraction device 122 is additionally illustrated in FIG. 63, wherein the particles 118 are blown off by the ring nozzle 119 in targeted fashion onto the suction-extraction device 122 in order to collect the blown-off particles 118. As an alternative or in addition, provision may also be made, in the context of the blowing-off operation, to blow the particles 118 off in targeted fashion onto a collecting container and/or a filter unit.

Figure 64:
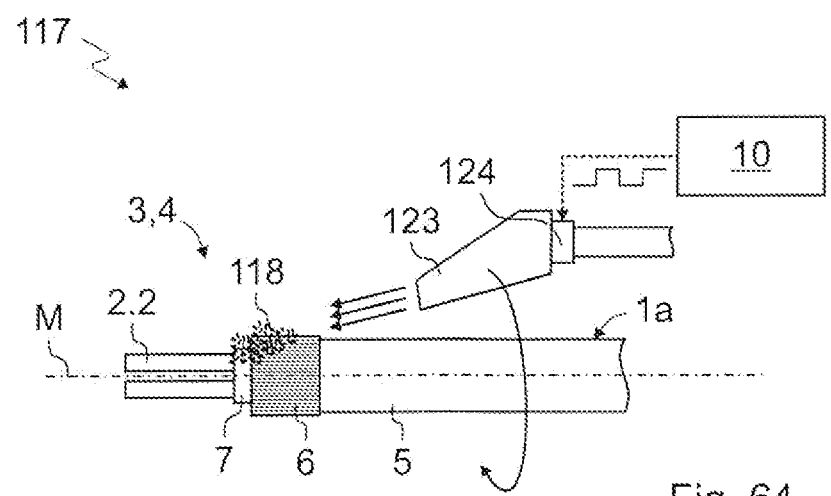
FIG. 64 shows a cleaning module with a pulse-controlled nozzle.

FIG. 64 shows the use of a cleaning module 117 with a flat nozzle 123 in order to be able to blow off particles 118 in an even more targeted manner. Provision may be made here to rotate the nozzle 123 about the cable 1a, 1b or to rotate the cable 1a, 1b along its central axis M.

In order to further improve the processing success, in particular in the course of the blowing-off operation, it may be provided that the air flow generated in the course of the cleaning process is pulse-controlled. The principle is likewise illustrated by way of example in FIG. 64. For example, the control unit 10 of the cleaning module 117 can correspondingly control a solenoid valve 124 of the nozzle 123 via a signal connection, as indicated. Owing to the pulsed air flow, the particles 118 can detach more easily from the electrical cable 1a, 1b, for example owing to turbulence.

It may also be provided that the cleaning process comprises a compressed air blasting process, in particular a dry ice blasting process or a $CO_2$ blasting process. For this purpose, a nozzle 123 of the type shown in FIG. 64 may for example be provided.

Figure 65:
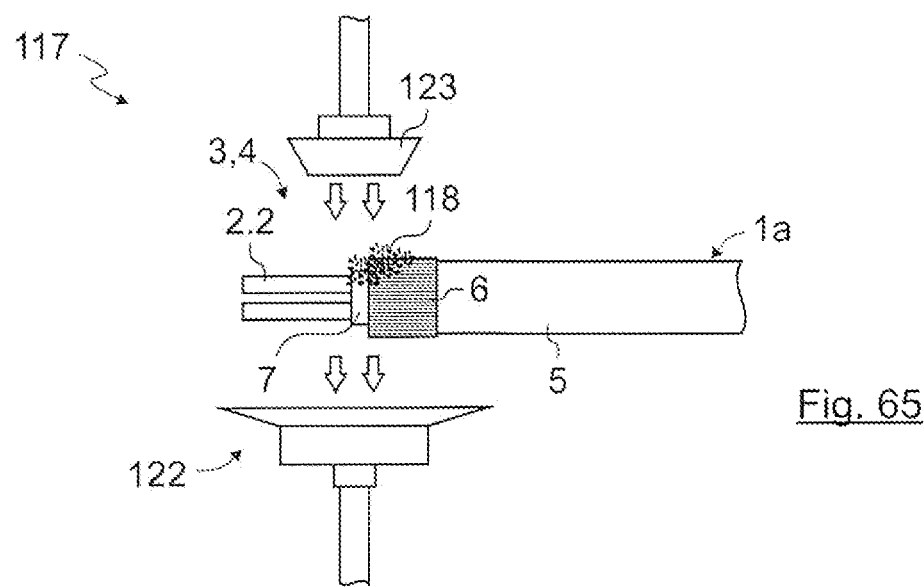
FIG. 65 shows a cleaning module with a further nozzle in combination with a further suction-extraction device.

FIG. 65 shows a further exemplary cleaning module 117. The cleaning module 117 illustrated in FIG. 65 shows a combination of a nozzle 123 for blowing the particles 118 off and a suction-extraction device 122 for the extraction of the particles 118 by suction. The suction-extraction device 122 is arranged opposite the nozzle 123, wherein the cable 1a, 1b is arranged between the nozzle 123 and the suction-extraction device 122. In this variant, too, provision may be made inter alia to rotate the electrical cable 1a, 1b and/or the cleaning module 117 in order to remove the particles 118 from the electrical cable 1a, 1b over the full circumference.

Figure 66:
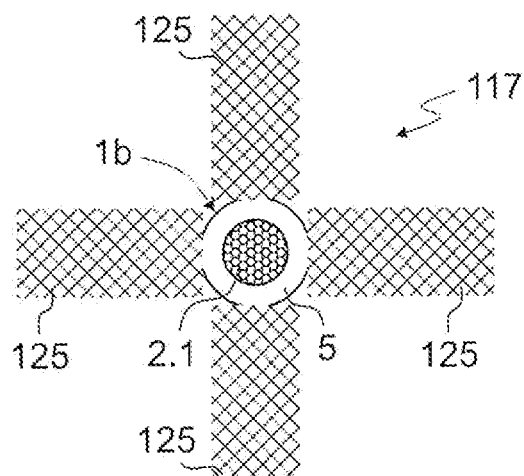
FIG. 66 shows a cleaning module with four drivable brushes.

FIG. 66 shows a cleaning module 117 in which the particles 118 are brushed off the electrical cable 1a, 1b. The cleaning module 117 has four driven brushes 125 which are distributed along the circumference of the electrical cable 1a, 1b. In principle, however, the cleaning module 117 may also have only one brush 125, two brushes 125, three brushes 125 or even more than four brushes 125. The cable 1a, 1b or the brushes 125 may optionally be rotatable radially about the central axis M of the cable 1a, 1b during the processing operation.

Figure 67:
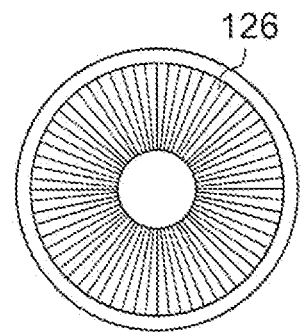
FIG. 67 shows a cleaning module with a spiral brush.

FIG. 67 illustrates a further variant for the brushing-off operation. FIG. 67 shows a spiral brush 126 through which the electrical cable 1a, 1b can be led axially in order to be brushed. The spiral brush 126 and/or the cable 1a, 1b may optionally also be rotated.

As an alternative or in addition to brushing-off operation, the particles 118 may also be wiped off, for example by means of a cloth (not illustrated in the figures). Furthermore, provision may be made for the particles 118 to be washed off, in particular with a non-corrosive liquid. Furthermore, provision may be made for one or more magnets to be used to remove particles 118 on which a magnet can impart a magnetic action.

Figure 68:
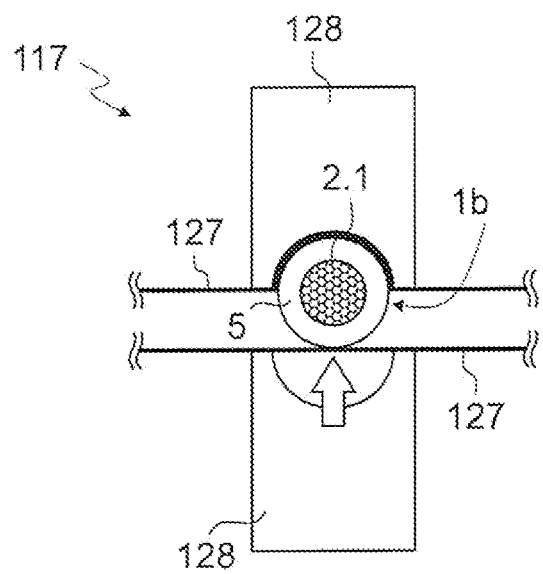
FIG. 68 shows a cleaning module with two half-shells and two foils for carrying out an adhesion process.

FIG. 68 shows a further cleaning module 117 in which the cleaning process is performed by means of an adhesion process, in which the particles 118 are removed by means of a foil 127 or an adhesive strip. For this purpose, a corresponding foil 127 may be fed to the electrical cable 1a, 1b for example by means of one or more half-shells 128. In the exemplary embodiment, two half-shells 128 are capable of being fed radially to the electrical cable 1a, 1b. In FIG. 68, the upper half-shell 128 has been fed to the electrical cable 1a, 1b and the lower half-shell 128 has not yet been fed to the electrical cable 1a, 1b. During the feed movement, the foil 127 may come to lie against the electrical cable 1a, 1b. Following the processing, the foil 127 may be exchanged or cleaned. It may be advantageous for the half-shells 128 to be fed successively or to be fed such that the foils 127 do not make contact with one another in the middle, because they may otherwise adhere to one another.

Figure 69:
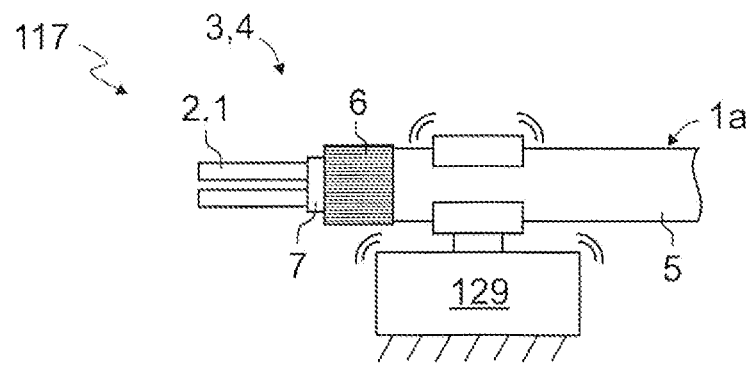
FIG. 69 shows a cleaning module with a vibrator.

FIG. 69 shows a cleaning module 117 in which the cable end 3, 4 is subjected to defined vibrations during the cleaning process in order to loosen the particles 118. For this purpose, a vibrator 129 is provided, which is fastened to an electrical cable 1a, 1b by means of a gripping device.

As already mentioned in the introduction, the individual variants may be combined with one another in virtually any desired manner.

Figure 70:
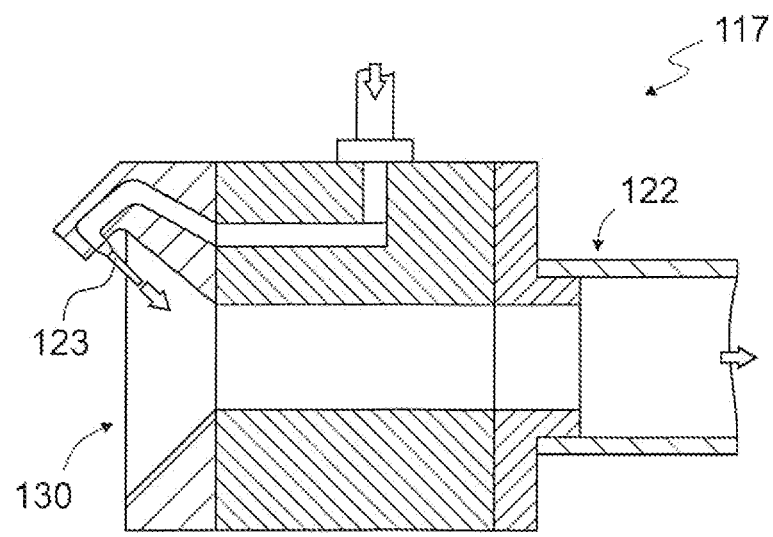
FIG. 70 shows a cleaning module with a nozzle in combination with a suction-extraction device in a closed housing.

FIG. 70 shows an example of a cleaning module 117 in which blowing off by means of an individual nozzle 123 and a suction-extraction device 122 have advantageously been combined. The electrical cable 1a, 1b can be inserted axially into a corresponding receptacle 130 of the cleaning module 117 (and/or the cleaning module 117 is pushed over the cable 1a, 1b). Here, the particles 118 can be blown off by the nozzle 123 in the direction of the suction-extraction device 122. The electrical cable 1a, 1b can then be led out of the receptacle 130 again. During the processing, the cable 1a, 1b and/or the cleaning module 117 may be rotated.

The cleaning module 117 shown in FIG. 70 may advantageously be combined with or supplemented by further variants mentioned above. In particular, a vibrator 129 and/or an ionizer 121 may likewise be provided. It is for example also possible for one or more brushes 125 to be positioned upstream of the receptacle 130.

Figure 71:
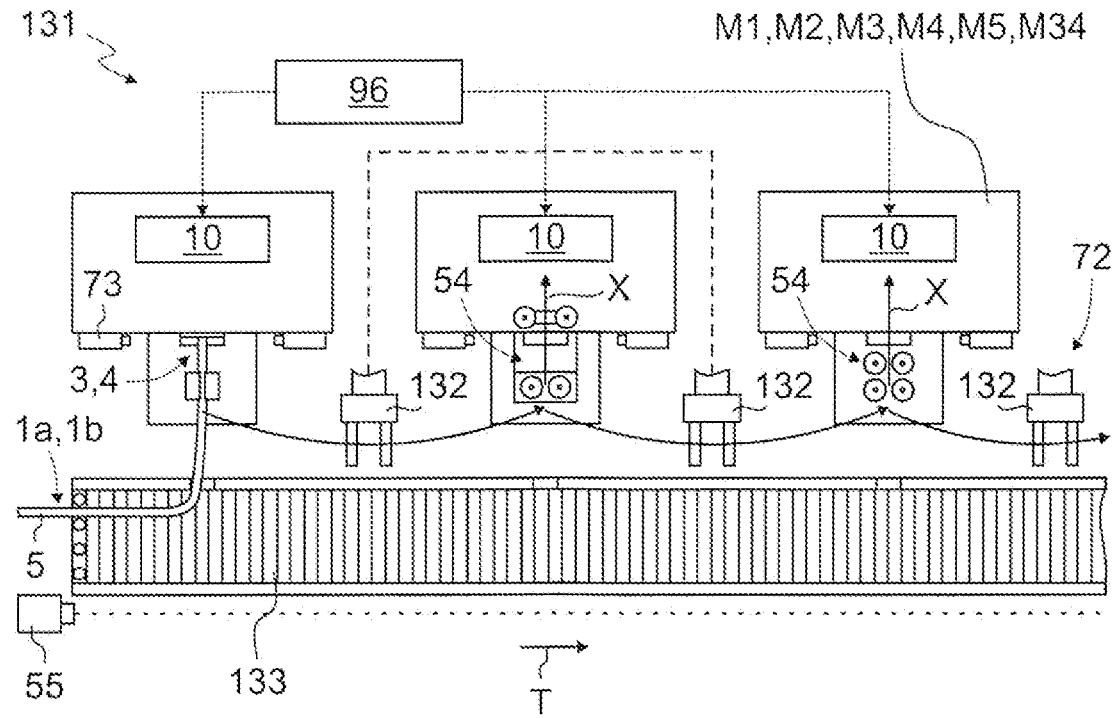
FIG. 71 shows an apparatus according to the invention with three module groups and with a common transport device for transporting the cables between the module groups.

FIG. 71 shows an apparatus 131 according to the invention for assembling an electrical plug connector 12 on a first cable end 3 and/or on a second cable end 4 of an electrical cable 1a, 1b which has one or more inner conductors 2. The apparatus 131 is illustrated merely in highly schematic form and by way of example.

In the example, the apparatus 131 has three module groups M1, M2, M3, M4, M5, M34, which are initially each shown only as black boxes in FIG. 71. The module groups M1, M2, M3, M4, M5, M34 each have at least two processing modules for processing the cable 1a, 1b, as will be discussed in more detail below.

The apparatus 131 furthermore has a feed device 54 for feeding the cable end 3, 4 along the feed direction X into the module group M1, M2, M3, M4, M5, M34. It is preferable for each of the module groups M1, M2, M3, M4, M5, M34 to have a dedicated feed device 54, but this is not imperatively necessary. For example, the module group M1, M2, M3, M4, M5, M34 arranged on the left in FIG. 71 has no feed device 54. A feed of the cable 1a, 1b to this module group M1, M2, M3, M4, M5, M34 may optionally be omitted or be performed by a production technician.

The feed devices 54 of the individual module groups M1, M2, M3, M4, M5, M34 may also be of different design, as illustrated. The feed devices 54 may then be specially adapted to the respective module groups M1, M2, M3, M4, M5, M34.

The module groups M1, M2, M3, M4, M5, M34 are preferably of modular construction and are for example operable autonomously. For example, each of the module groups M1, M2, M3, M4, M5, M34 may have a dedicated control unit 10 in order to autonomously or independently control and/or monitor the processing of the cable 1a, 1b.

The apparatus 131 may preferably have a control device 96 which is able to globally control and/or monitor the entire plug connector assembly process. The control device 96 may be communicatively connected to the individual control units 10 (merely indicated by way of example in FIG. 71).

The module groups M1, M2, M3, M4, M5, M34 may preferably be clocked in a synchronized manner in order to provide the most efficient possible production line for the plug connector assembly process.

Checking devices 73 may be assigned to the module groups M1, M2, M3, M4, M5, M34, in particular in order to detect the state of the cable processing operation or the state of the cable 1a, 1b before and/or after the processing by the respective module group M1, M2, M3, M4, M5, M34.

The module groups M1, M2, M3, M4, M5, M34 may be arranged adjacent to one another along a transport direction T. A transport device 72 for transporting the cable 1a, 1b may specify the transport direction T along which the cables 1a, 1b are transported between the module groups M1, M2, M3, M4, M5, M34.

The transport device 72 may in particular have a gripper device with at least one gripper 132, in particular in order to transport the cable 1a, 1b between the module groups M1, M2, M3, M4, M5, M34, for example between the feed devices 54 of the module groups M1, M2, M3, M4, M5, M34.

Furthermore, the transport device 72 may also have a roller conveyor 133, for example in order to ensure that even a long cable 1a, 1b is transported with the least possible friction.

For safety reasons, a light curtain or a light barrier 55 may be provided in order to operate the apparatus 131 only when no objects, persons or body parts are situated in the danger area of the apparatus 131. A production technician can thus also, without any risk, place the cable manually into the apparatus 131, for example supply said cable to the module group M1, M2, M3, M4, M5, M34 illustrated on the left in FIG. 71 as far as a defined stop, following which the cable 1a, 1b can be prepared, for example measured, marked and/or aligned, for the subsequent partially automated processing.

Figure 72:
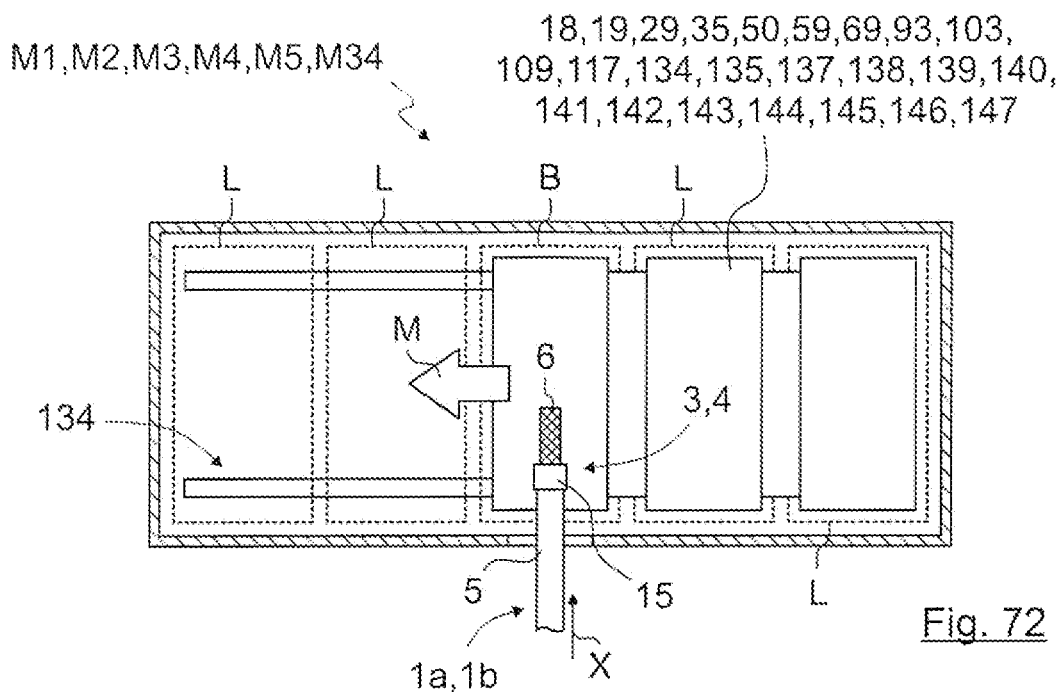
FIG. 72 shows one of the module groups in a simplified sectional illustration.

FIG. 72 shows an exemplary module group M1, M2, M3, M4, M5, M34 in a simplified sectional illustration. By way of example, a cable 1a, 1b has been inserted into the module group M1, M2, M3, M4, M5, M34. The module group M1, M2, M3, M4, M5, M34 shown has three processing modules that can be moved along a module transport direction M by a module transport device 134. The module transport device 134 has a rail guide along which the processing modules are jointly movable along the module transport direction M. The processing modules are fixedly assembled on one another, resulting in a coupled movement. This allows the processing modules to be moved between storage locations L and a processing station B. It is thus always possible for in each case exactly one of the processing modules to be fed to the processing station B for the processing of the cable 1a, 1b. Preferably after the intended processing module has been fed to the processing station B, the cable 1a, 1b can likewise be fed to the processing station B by the feed device 54 (along the feed direction X) in order to correspondingly process the cable end 3, 4.

After the cable 1a, 1b has been processed by one of the processing modules, the cable 1a, 1b may be pulled out of the module group M1, M2, M3, M4, M5, M34 at least to such an extent that another processing module can be fed to the processing station B. After the cable end 3, 4 has been processed by all processing modules of the module group M1, M2, M3, M4, M5, M34, the cable 1a, 1b may be fully removed again from the module group M1, M2, M3, M4, M5, M34 counter to the feed direction X.

FIGS. 73 to 76 show individual details of an apparatus 131 for assembling an electrical plug connector 12 on a first cable end 3 and/or on a second cable end 4 according to a first embodiment, in which a multicore plug connector 12 is assembled on a multicore cable 1a. FIGS. 77 to 80 show individual details of a corresponding apparatus 131 according to a second embodiment of the invention, in which a single-core plug connector 12 is assembled on a single-core cable 1b. FIGS. 73 to 80 are intended in particular to illustrate the distribution of processing modules across the various module groups M1, M2, M3, M4, M5, M34, for which reason the other components of the apparatus 131 have been omitted from the figures for the sake of simplicity.

FIGS. 73 to 80 show various processing modules for assembling the electrical plug connector 12, some of which have already been described above. In principle, the processing modules may be any processing modules for the fabrication of electrical cables 1a, 1b or for the assembly of plug connectors. Only two particularly advantageous combinations of processing modules and their distribution across respective module groups M1, M2, M3, M4, M5, M34 will be presented below. The arrangement of the processing modules and the distribution thereof may therefore also differ if necessary. Furthermore, further processing modules and/or module groups may be added or existing processing modules and/or module groups may be divided up or combined.

With regard to the assembly of a two-core plug connector 12, an arrangement and distribution of processing modules in accordance with the following sequence has proven to be particularly suitable. The processing modules mentioned below may in particular have features of the processing modules described above.

Figure 73:
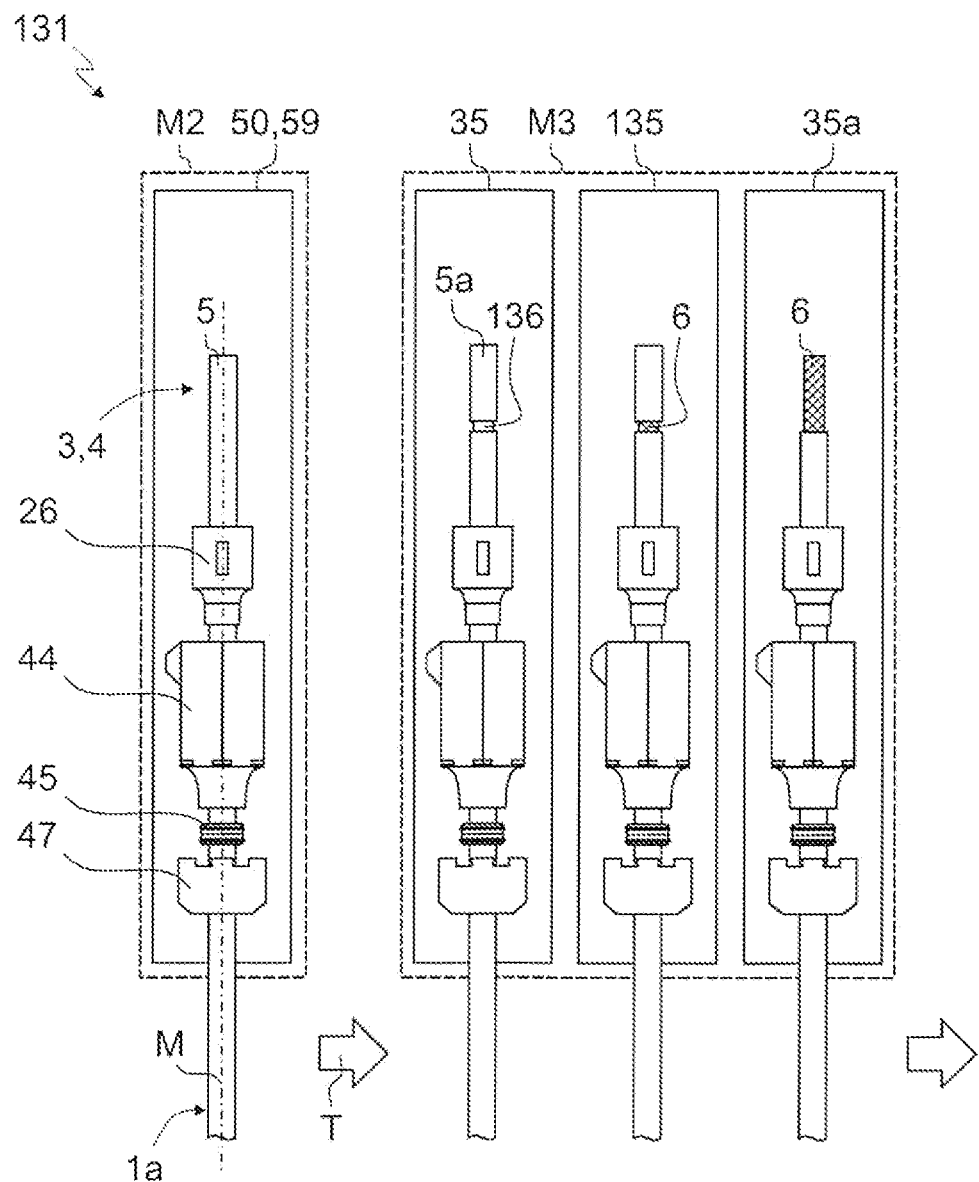
FIG. 73 shows a first detail of an apparatus according to the invention for assembling the electrical plug connector according to a first exemplary embodiment with an exemplary distribution of processing modules across respective module groups.
Figure 74:
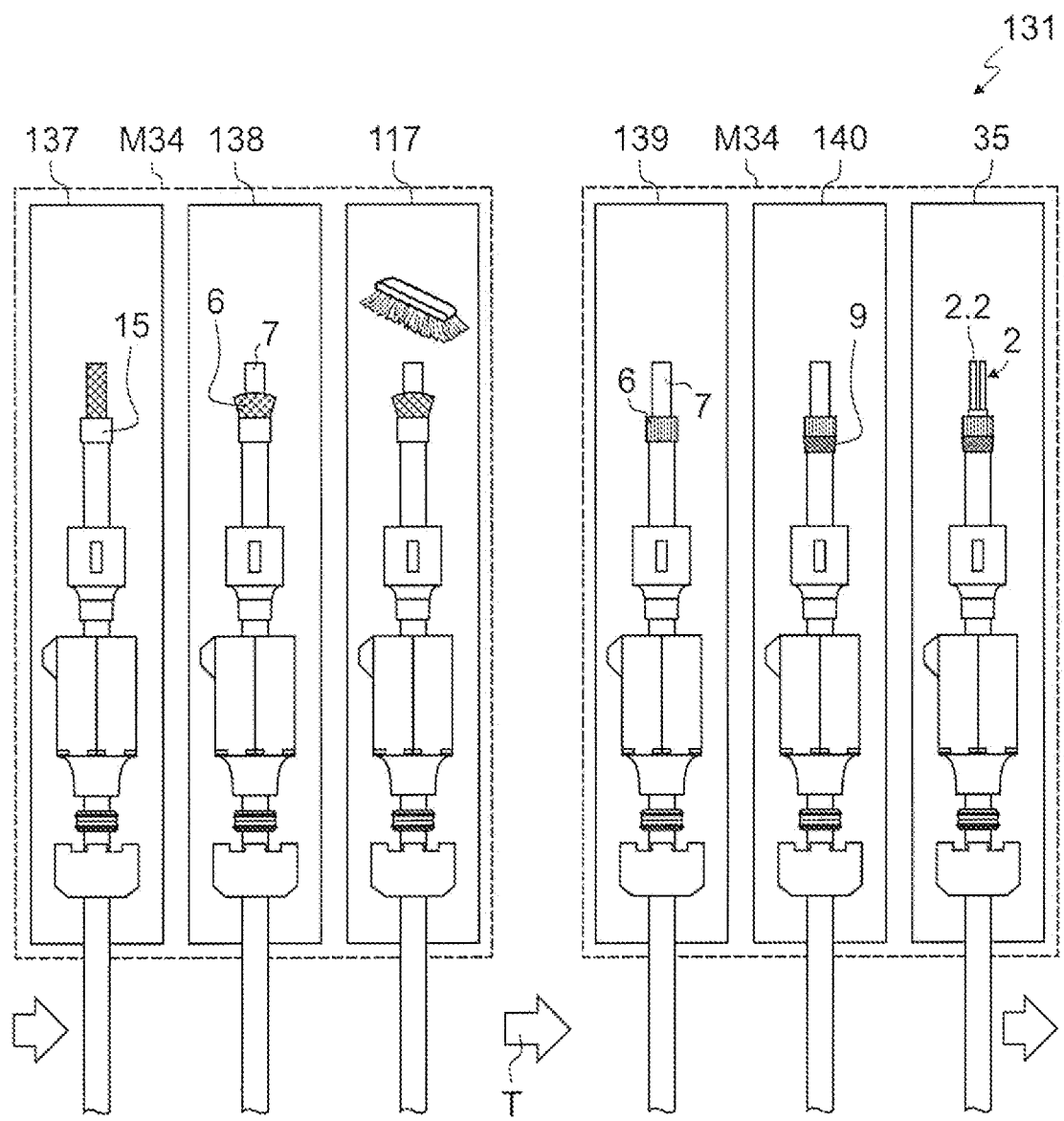
FIG. 74 shows a second detail, which adjoins the first detail along the transport direction, of the apparatus according to the invention of the first exemplary embodiment.
Figure 75:
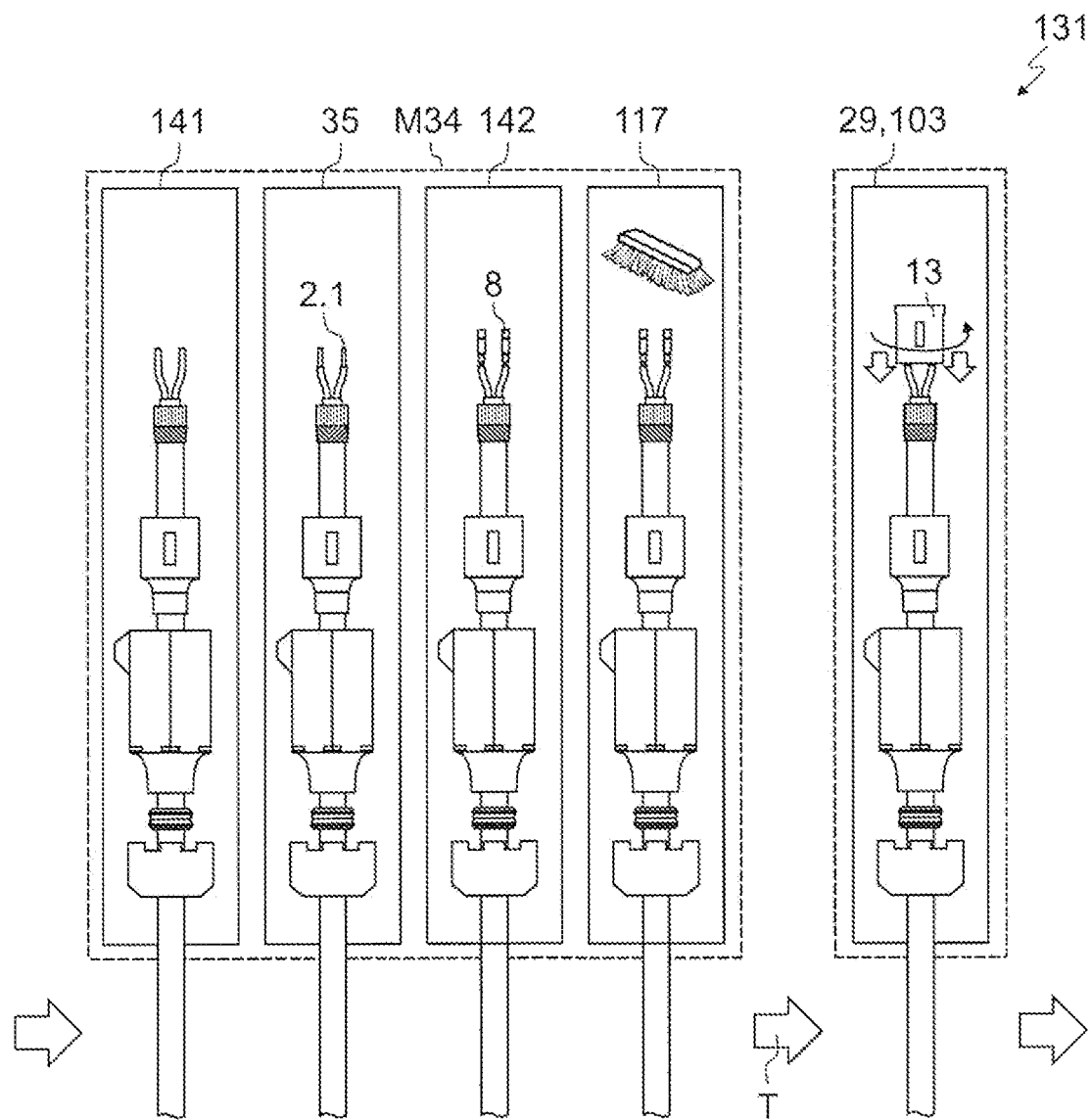
FIG. 75 shows a third detail, which adjoins the second detail along the transport direction, of the apparatus according to the invention of the first exemplary embodiment.

After, for example, a production technician has inserted the cable 1a into the apparatus 131 and the cable has optionally been measured, marked and aligned, it is firstly possible for one or more fitting modules, in particular at least one above-described multiple fitting module 50 and/or one above-described single fitting module 59, to be provided in order to push the later required plug connector components 26, 44, 45, 47 onto the cable 1a in the required sequence. By way of example, only a single fitting module is illustrated in FIG. 73. The fitting modules may together form a second module group M2 (shown using dashed lines). For example, a respective fitting module may be provided in order to push the end cap 47, the line seal 45, the plug connector housing 44 and the shielding sleeve 26 in the illustrated sequence onto the cable sheath 5 of the cable 1a. The four processing modules may be distributed in the second module group M2 in the manner illustrated in FIG. 72.

A stripping module 35 may be arranged downstream of the one or more fitting modules or of the second module group M2 in order to strip a part 5a of the cable sheath 5 of the cable 1a.

A cable foil processing module 135 may be arranged downstream of stripping module 35 for stripping the cable sheath 5 in order to remove a cable foil 136, which is situated under the cable sheath 5, of the cable 1a.

The cable foil processing module 135 may have at least one heating wire, at least one blade, at least one molding tool, at least one cold-supplying device, at least one pulling-off aid, at least one suction-extraction device and/or at least one supply device for chemical substances in order to treat at least an outer layer, which faces away from the cable central axis M, of the previously at least partially exposed cable foil 136 in order to remove the cable foil 136 or in order to at least to reduce its mechanical strength for the purposes of assisting the removal of the cable foil 136. The cable foil processing module 135 may also have means for twisting and/or bending the cable section that has the cable foil 136. Before the cable foil 136 is finally removed (for example is pulled off the cable end 3, 4 together with the part 5a of the cable sheath 5), the cable foil 136 may optionally be compressed in the axial direction along the central cable axis M.

A stripping module 35a for pulling off the part 5a may be arranged downstream of the cable foil processing module 135.

The stripping module 35, the cable foil processing module 135 and the stripping module 35a for pulling off the part 5a can form a third module group M3.

An assembly module 137 for assembling the support sleeve 15 may be arranged downstream of the stripping module 35a for pulling off the part 5a or of the third module group M3. A cable shielding braid processing module 138 arranged downstream of the assembly module 137 may be designed to process the cable shielding braid 6 of the cable 1a, in particular to cut it to a defined length and/or to brush it straight. Finally, a cleaning module 117 may be arranged downstream of the cable shielding braid processing module 138 in order to remove particles 118 from the cable end 3, 4 that have formed as a result of the previous mechanical processing operations. The processing modules mentioned in this paragraph may form a combined module group M34.

A further cable shielding braid processing module 139 may be arranged downstream of the cleaning module 117 or the combined module group M34 in order to fold the cable shielding braid 6 back over the support sleeve 15. Subsequently, a fabric tape assembly module 138 may be provided in order to adhesively apply the fabric tape 9 in order to safeguard the cable 1a against protruding individual strands of the cable shielding braid 6. A further stripping module 35, in particular a stripping module 35 for removing the filler layer 7, may be arranged downstream of the fabric tape assembly module 140. The processing modules mentioned in this paragraph may be part of a further combined module group M34.

A shaping module 141 for shaping the exposed inner conductors 2 may be arranged downstream of the stripping module 35 for removing the filler layer 7 or of the combined module group M34 in order to adapt the spacing between the front ends 2.3 of the inner conductors 2 and the plug connector 12. A further stripping module 35 may be arranged downstream of the shaping module 141 for the purposes of removing a part 2.2a of the insulation 2.2 of the inner conductor 2. An assembly module 142 for assembling inner conductor contact elements 8 on the inner conductors 2 of the cable 1a may be arranged downstream of the stripping module 35 for removing the part 2.2a of the insulation 2.2 of the inner conductor 2. In particular, provision may be made for the inner conductor contact elements 8 to be crimped to the inner conductors 2. A further cleaning module 117 may be arranged downstream of the assembly module 142 for assembling the inner conductor contact elements 8. The processing modules mentioned in this paragraph may in turn form a combined module group M34.

An assembly module 29 for assembling the contact part carrier 13 may be provided downstream of the cleaning module 117 or of the combined module group M34. In order to check for correct assembly of the contact part carrier 13, a sensor module 103 may be provided as part of the assembly module 29 or may be arranged downstream of the assembly module 29. The assembly module 29 for assembling the contact part carrier 13 is intended here to serve as an example for the fact that, in the context of the apparatus 131, individual processing modules that are not part of a module group M1, M2, M3, M4, M5, M34 may also be provided.

Furthermore, an assembly module 143 for pushing the shielding sleeve 26 onto the contact part carrier 13 may be arranged downstream of the assembly module 29 (and optionally of the sensor module 103). The shielding sleeve 26 may then advantageously be fixed to the cable 1a and to the contact part carrier 13 by a crimping module. Both processing modules may be part of a fourth module group M4.

Finally, a final assembly module 141 may be provided.

The grippers 132 of the transport device 72 preferably transport the cable 1a in each case between the module groups M1, M2, M3, M4, M5, M34 and the individual processing modules 18, 19, 29, 35, 50, 59, 69, 93, 103, 109, 117, 134, 135, 137, 138, 139, 140, 141, 142, 143, 144, 145, 146, 147. In principle, the cable 1a may be transported by the transport device 72 in any desired manner.

An advantageous variant of the apparatus 131 for assembling a single-core electrical plug connector 12, which by way of example has two single-core cables 1b, is shown in FIGS. 77 to 80, wherein, for the sake of a clearer illustration, the apparatus 131 once again shows only the processing modules and the distribution thereof across individual module groups M1, M2, M3, M4, M5, M34 and is illustrated in a manner distributed across multiple figures (along the transport direction T).

With regard to the assembly of a single-core plug connector 12, an arrangement of processing modules in accordance with the following sequence has proven to be particularly suitable. The processing modules mentioned below may in particular have features of the processing modules described above.

Figure 77:
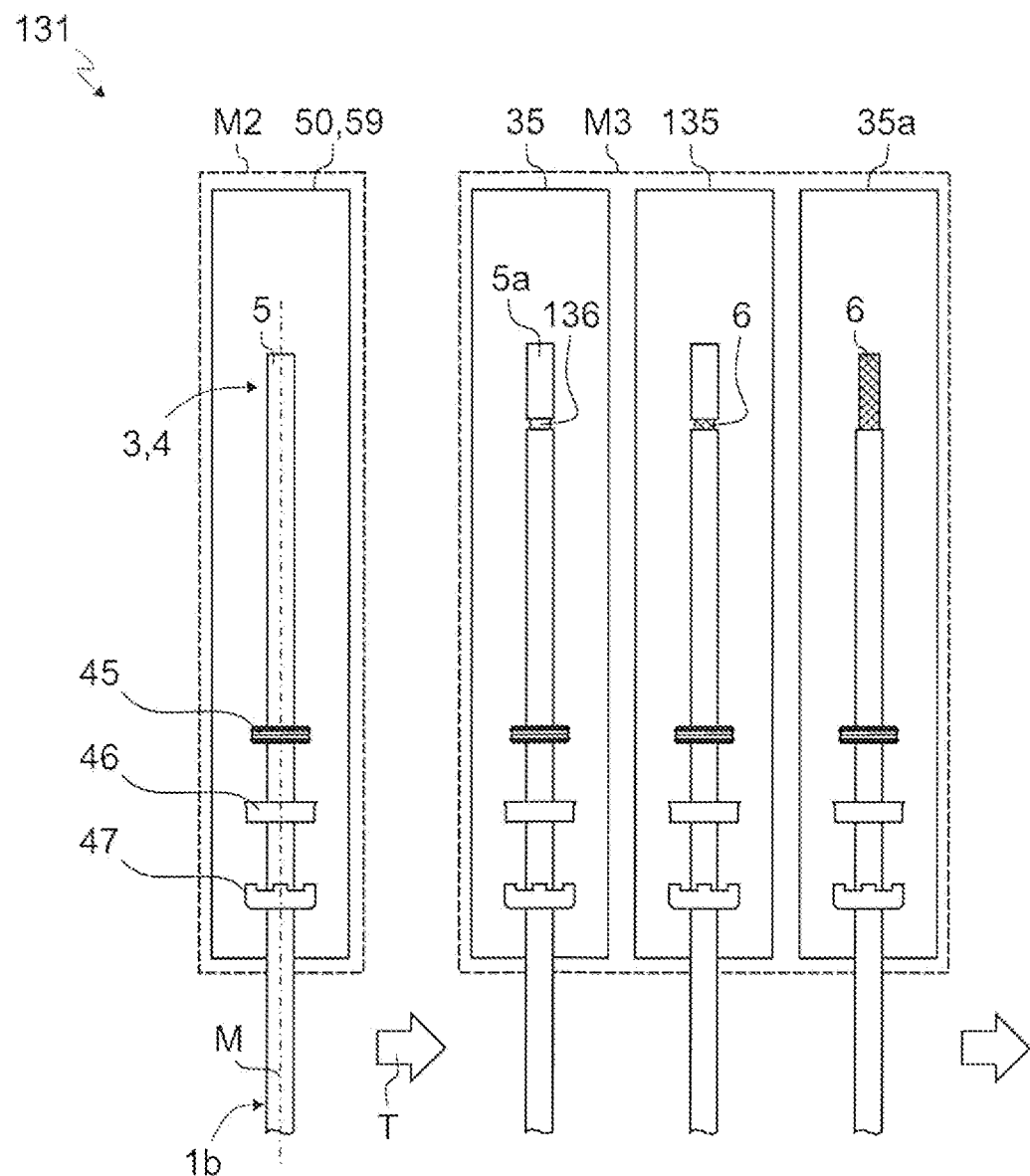
FIG. 77 shows a first detail of an apparatus according to the invention for assembling the electrical plug connector according to a second exemplary embodiment with an exemplary distribution of processing modules across respective module groups.
Figure 78:
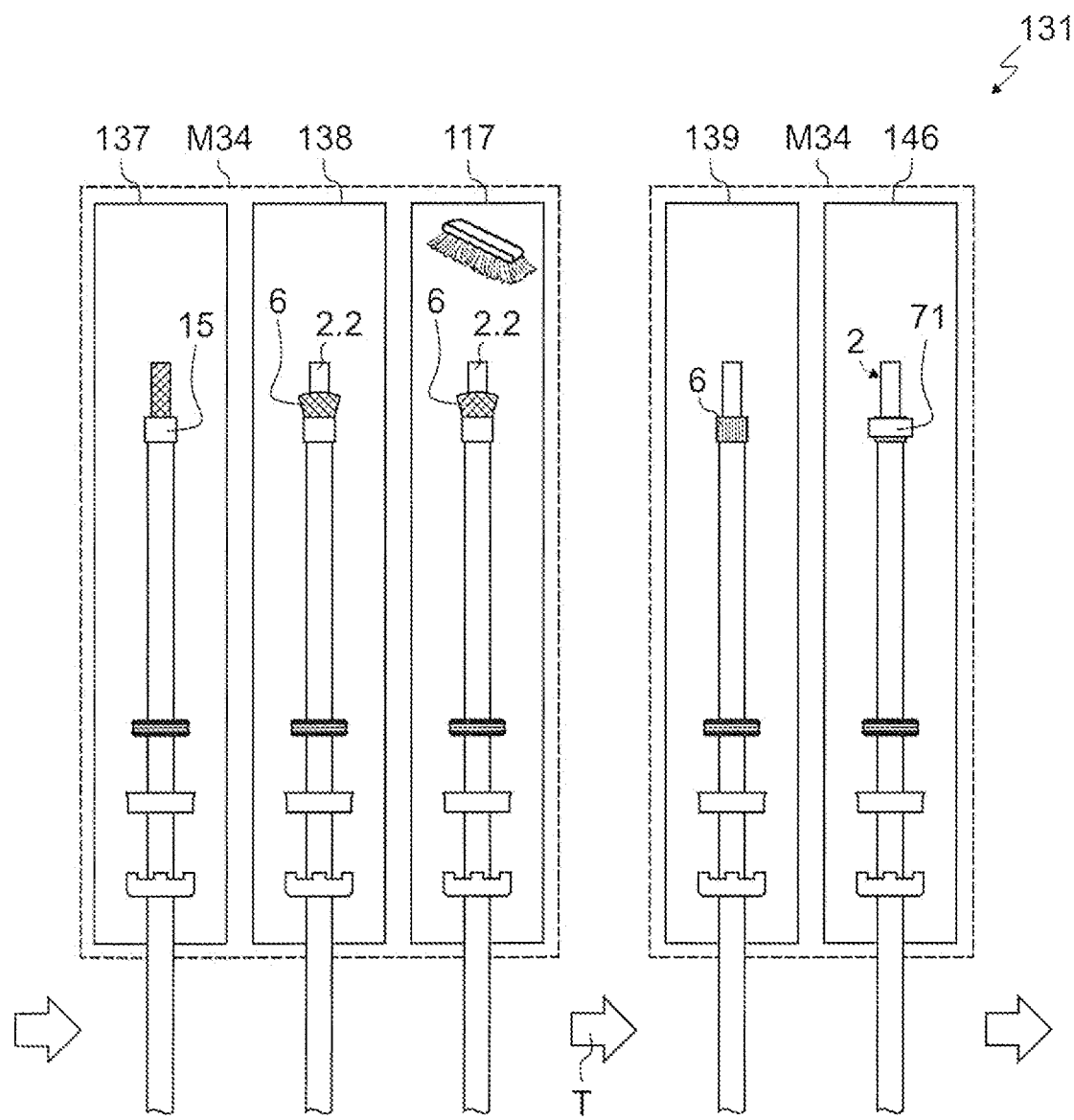
FIG. 78 shows a second detail, which adjoins the first detail along the transport direction, of the apparatus according to the invention of the second exemplary embodiment.
Figure 79:
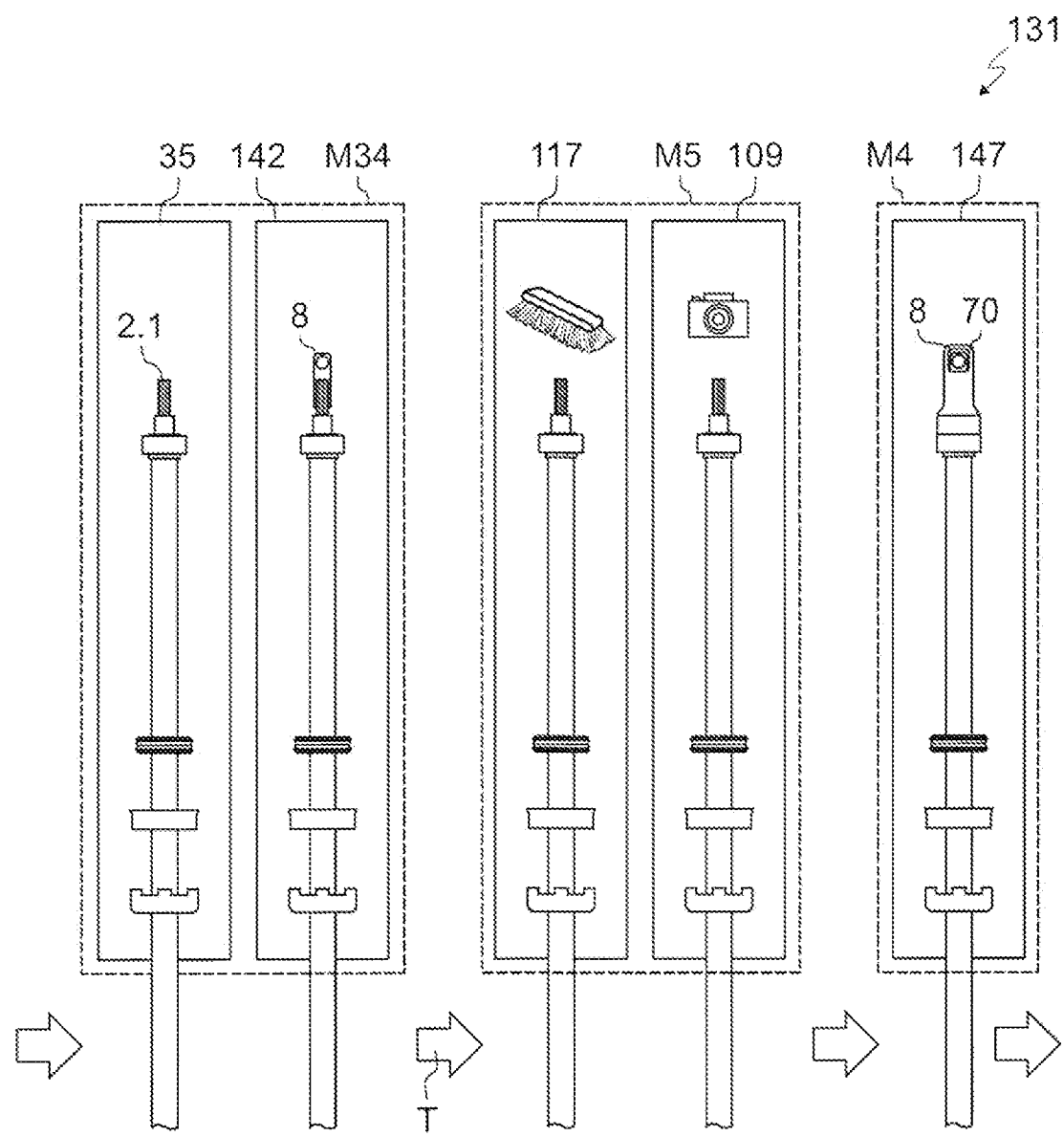
FIG. 79 shows a third detail, which adjoins the second detail along the transport direction, of the apparatus according to the invention of the second exemplary embodiment.

Firstly, multiple fitting modules, in particular at least one above-described multiple fitting module 50 and/or one above-described single fitting module 59, may again be provided in order to push the later required plug connector components 45, 46, 47 onto the cable 1b in the required sequence. By way of example, only a single fitting module is illustrated in FIG. 77. The fitting modules may together form a second module group M2 (shown using dashed lines). For example, a respective fitting module may be provided in order to push the end cap 47, the cable retainer 46 and the line seal 45 in the illustrated sequence onto the cable sheath 5 of the cable 1a.

A stripping module 35 may be arranged downstream of the one or more fitting modules or of the second module group M2 in order to strip a part 5a of the cable sheath 5 of the cable 1a.

A cable foil processing module 135 may be arranged downstream of the stripping module 35 for stripping the cable sheath 5 in order to remove a cable foil 136, which is situated under the cable sheath 5, of the cable 1a. A stripping module 35a for pulling off the part 5a may be arranged downstream of the cable foil processing module 135. The stripping module 35, the cable foil processing module 135 and the stripping module 35a for pulling off the part 5a can form a third module group M3.

An assembly module 137 for assembling the support sleeve 15 may be arranged downstream of the stripping module 35a for pulling off the part 5a or of the third module group M3. A cable shielding braid processing module 138 arranged downstream of the assembly module 137 may be designed to process the cable shielding braid 6 of the cable 1a, in particular to cut it to a defined length and/or to brush it straight. Finally, a cleaning module 117 may be arranged downstream of the cable shielding braid processing module 138 in order to remove particles 118 from the cable end 3, 4 that have formed as a result of the previous mechanical processing operations. The processing modules mentioned in this paragraph may form a combined module group M34.

A further cable shielding braid processing module 139 may be arranged downstream of the cleaning module 117 or the combined module group M34 in order to fold the cable shielding braid 6 back over the support sleeve 15. This may then be followed by an assembly module 146 for compressing the crimp sleeve 71 on the support sleeve 15. Here, the cable shielding braid 6 may advantageously be pressed in between the support sleeve 15 and the crimp sleeve 71. The processing modules mentioned in this paragraph may advantageously form a combined module group M34.

A further stripping module 35 may be arranged downstream of the assembly module 146 for compressing the crimp sleeve 71 in order to strip a part 2.2a of the insulation 2.2 of the inner conductor 2. An assembly module 142 for assembling the inner conductor contact element 8 may be arranged downstream of the stripping module 35 for removing the part 2.2a of the insulation 2.2 of the inner conductor 2. The inner conductor contact element 8 may preferably be welded, for example ultrasound-welded, to the inner conductor 2 of the cable 1b. The stripping module 35 and the assembly module 139 for assembling the inner conductor contact element 8 may be part of a further combined module group M34.

A fifth module group M5, comprising a further cleaning module 117 and a quality monitoring module 109 for checking and optionally for documenting the processing state of the cable 1b, may be arranged downstream of the assembly module 139 for assembling the inner conductor contact element 8 or of the combined module group M34.

An assembly module 147 for assembling the insulating housing 70, in particular for assembling the insulating housing 70 on the inner conductor contact element 8, may be arranged downstream of the fifth module group M5. The insulating housing 70 may preferably receive the inner conductor contact element 8 within it. The insulating housing 70 may preferably be of multi-part, in particular two-part form and, after the inner conductor contact element 8 has been inserted into one of the shell halves, may be joined together with the other shell half and fixed. For this process, it is for example also possible for multiple processing modules to be provided, which then form a common fourth module group M4.

A press-in module 69 may be arranged downstream of the assembly module 147 for assembling the insulating housing 70 in order to press the cable end 3, 4 fitted with the insulating housing 70 and with the inner conductor contact element 8 into a plug connector housing 44. Finally, a final assembly module 145 may be provided. The processing modules mentioned in this paragraph preferably form a common fourth module group M4.

After a first plug connector 12 has been assembled on one of the cable ends 3, 4 of the cable 1a, 1b, provision may be made for the cable 1a, 1b to be fed back to the apparatus 131 for the assembly of a second plug connector 12 on the opposite cable end 3, 4. For this purpose, the cable 1a, 1b may be correspondingly turned round or over, wherein the orientation of the first plug connector 12 is preferably detected for the assembly of the second plug connector 12, or it is ensured that the orientation of the first plug connector 12 is known during the assembly of the second plug connector 12.

It may be provided that, within the apparatus 131, processing modules 18, 19, 29, 35, 50, 59, 69, 93, 103, 109, 117, 134, 135, 137, 138, 139, 140, 141, 142, 143, 144, 145, 146, 147 or even entire module groups M1, M2, M3, M4, M5, M34 are intentionally skipped or omitted during the plug connector assembly process. For example, it may be provided that multiple examples of some or all of the processing modules 18, 19, 29, 35, 50, 59, 69, 93, 103, 109, 117, 134, 135, 137, 138, 139, 140, 141, 142, 143, 144, 145, 146, 147 for different cable types (for example cable diameters) and/or plug connector types to be assembled are arranged in the production line along the transport direction T. The processing modules 18, 19, 29, 35, 50, 59, 69, 93, 103, 109, 117, 134, 135, 137, 138, 139, 140, 141, 142, 143, 144, 145, 146, 147 may therefore process or not process the cable 1a, 1b as required. The identifier or the marking 21, 23 of the cable 1a, 1b, of the workpiece carrier 11 or of the sheath clamp 48a, 48b, 48c, 48d may be used for the decision as to whether the cable 1a, 1b is to be processed in a respective processing module 18, 19, 29, 35, 50, 59, 69, 93, 103, 109, 117, 134, 135, 137, 138, 139, 140, 141, 142, 143, 144, 145, 146, 147. In this way, the apparatus 131 can be used in a very particularly modular and efficient manner for the plug connector assembly process.

For example, it is possible in particular for different fitting modules to be provided for fitting the plug connector components 26, 44, 45, 46, 47, 56 for different cable diameters of the cable 1a, 1b. Furthermore, it is for example also possible for different assembly modules 140 to be provided for assembling the support sleeve 15 for different cable diameters. For example, it is also possible for different assembly modules 139 to be provided for assembling the inner conductor contact elements 8 for different cable diameters.

In order to yet further increase the throughput of the cables 1a, 1b or in order to reduce the process time, provision may optionally be made for several examples of module groups M1, M2, M3, M4, M34, M5 and/or individual processing modules 18, 19, 29, 35, 50, 59, 69, 93, 103, 109, 117, 134, 135, 137, 138, 139, 140, 141, 142, 143, 144, 145, 146, 147, in particular processing modules that require a longer processing time than other processing modules, to be provided in the apparatus 131.

For example, multiple (for example two, three, four or five) examples of the assembly module 139 for assembling the inner conductor contact elements 8 of the single-core cable 1b, in which the conductor 2.1 of the cable 1b is preferably ultrasound-welded to the inner conductor contact element 8, may be provided, because the welding process generally takes a relatively long time.

By means of the apparatus 131 according to the invention, an electrical cable 1a, 1b can be fully fabricated starting from an endless cable, following which the cable 1a, 1b can then be fitted with one or two plug connectors 12 and removed from the apparatus 131 in a defined fabrication length L. All processing steps may be recorded in documentation 96 and assigned to the cable 1a, 1b or to its plug connector(s) 12.

OPERATION

Having described the structure of my device and method for assembling an electrical plug connector, its operation is briefly described.

A principal object of the present invention is to provide an apparatus for assembling an electrical plug connector (12) on a first cable end (3, 4) of an electrical cable (1a, 1b) that has one or more inner conductors, (2), the apparatus comprising: a module group (M1, M2, M3, M4, M5, M34) having at least two processing modules (18, 19, 29, 35, 50, 59, 69, 93, 103, 109, 117, 134, 135, 137, 138, 139, 140, 141, 142, 143, 144, 145, 146, 147) and a processing static on (B) for processing the electrical cable (1a, 1b); a feed device (54) for feeding the cable end (3, 4) of the electrical cable (1a, 1b) along a feed direction (X) to the processing station (B) in the module group (M1, M2, M3, M4, M5, M34), and wherein the module group (M1, M2, M3, M4, M5, M34) has a module transport device (134) for feeding the at least two processing modules (18, 19, 29, 35, 50, 59, 69, 93, 103, 109, 117, 134, 135, 137, 138, 139, 140, 141, 142, 143, 144, 145, 146, 147) of the module group (M1, M2, M3, M4, M5, M34) to the processing station (B), and wherein the feed device (54) is configured to remove the cable end (3, 4) from the module group (M1, M2, M3, M4, M5, M34) again counter to the feed direction (X) after the processing.

A further object of the present invention is to provide an apparatus for assembling an electrical plug connector and further comprising: a control unit operatively communicating with at least one of the module groups (M1, M2, M3, M4, M5, M34) and/or one of the processing modules (18, 19, 29, 35, 50, 59, 69, 93, 103, 109, 117, 134, 135, 137, 138, 139, 140, 141, 142, 143, 144, 145, 146, 147) to control and/or monitor the processing of the electrical cable (1a, 1b).

A further object of the present invention is to provide an apparatus for assembling an electrical plug connector wherein the module transport device (134) is designed to feed the processing modules (18, 19, 29, 35, 50, 59, 69, 93, 103, 109, 117, 134, 135, 137, 138, 139, 140, 141, 142, 143, 144, 145, 146, 147) of the module group (M1, M2, M3, M4, M5, M34) along a module transport direction (M) to the processing station (B).

A further object of the present invention is to provide an apparatus for assembling an electrical plug connector wherein the feed direction (X) deviates from the module transport direction (M).

A further object of the present invention is to provide an apparatus for assembling an electrical plug connector wherein the module transport device (134) is designed to feed, in each case, only a single one of the processing modules (18, 19, 29, 35, 50, 59, 69, 93, 103, 109, 117, 134, 135, 137, 138, 139, 140, 141, 142, 143, 144, 145, 146, 147) of the module group (M1, M2, M3, M4, M5, M34) to the processing station (B).

A further object of the present invention is to provide an apparatus for assembling an electrical plug connector wherein the module transport device (134) is designed to move all processing modules (18, 19, 29, 35, 50, 59, 69, 93, 103, 109, 117, 134, 135, 137, 138, 139, 140, 141, 142, 143. 144, 145, 146, 147) of the module group (M1, M2, M3, M4, M5, M34) simultaneously in a coupled movement.

A further object of the present invention is to provide an apparatus for assembling an electrical plug connector wherein at least one of the processing modules (18, 19, 29, 35, 50, 59, 69, 93, 103, 109, 117, 134, 135, 137, 138, 139, 140, 141, 142, 143, 144, 145, 146, 147) of the module group (M1, M2, M3, M4, M5, M34) has a processing tool that can be fed to the cable end (3, 4) when the processing module (18, 19, 29, 35, 50, 59, 69, 93, 103, 109, 117, 134, 135, 137, 138, 139, 140, 141, 142, 143, 144, 145, 146, 147) and the cable end (3, 4) are situated at the processing station (B).

A further object of the present invention is to provide an apparatus for assembling an electrical plug connector wherein the module group (M1, M2, M3, M4, M5, M34) has at least one storage location (L) to store at least one of the processing modules (18, 19, 29, 35, 50, 59, 69, 93, 103, 109, 117, 134, 135, 137, 138, 139, 140, 141, 142, 143, 144, 145, 146, 147) of the module group (M1, M2, M3, M4, M5, M34).

A further object of the present invention is to provide an apparatus for assembling an electrical plug connector wherein the number of storage locations (L) of the module group (M1, M2, M3, M4, M5, M34) corresponds to twice the number of processing modules (18, 19, 29, 35, 50, 59, 69, 93, 103, 109, 117, 134, 135, 137, 138, 139, 140, 141, 142, 143, 144, 145, 146, 147) of the module group (M1, M2, M3, M4, M5, M34) minus one storage location (L).

A further object of the present invention is to provide an apparatus for assembling an electrical plug connector wherein at least one single processing module (18, 19, 29, 35, 50, 59, 69, 93, 103, 109, 117, 134, 135, 137, 138, 139, 140, 141, 142, 143, 144, 145, 146. 147) is provided that is not part of a module group (M1, M2, M3, M4, M5, M34) of processing modules (18, 19, 29, 35, 50, 59, 69, 93, 103, 109, 117, 134, 135, 137, 138, 139, 140, 141, 142, 143, 144, 146, 146, 147).

A further object of the present invention is to provide an apparatus for assembling an electrical plug connector and further comprising a common transport device (72) for transporting the electrical cable (1a, 1b) along a transport direction (T) between multiple module groups (M1, M2, M3, M4, M34) or between at least one module group (M1, M2, M3, M4, M5, M34).

A further object of the present invention is to provide an apparatus for assembling an electrical plug connector where in the feed direction (X) deviates from the transport direction (T).

A further object of the present invention is to provide an apparatus for assembling an electrical plug connector wherein the module transport direction (M) runs parallel to the transport direction (T).

A further object of the present invention is to provide an apparatus for assembling an electrical plug connector wherein the common transport device (72) has a workpiece carrier system (94) with at least one workpiece carrier (11) for the electrical cable (1a, 1b) to transport the electrical cable (1a, 1b) along the transport direction (T).

A further object of the present invention is to provide an apparatus for assembling an electrical plug connector wherein the common transport device (72) has a gripper device with at least one gripper (132) to transport the electrical cable (1a, 1b) along the transport direction (T).

A further object of the present invention is to provide an apparatus for assembling an electrical plug connector wherein the at least two processing modules (18, 19, 29, 35, 50, 59, 69, 93, 103, 109, 117, 134, 135, 137, 138, 139, 140, 141, 142, 143, 144, 145, 146, 147) and/or the module groups (M1, M2, M3, M4, M5, M34) are clocked in a synchronized manner.

A further object of the present invention is to provide an apparatus for assembling an electrical plug connector and further comprising a control device (96) to control and/or monitor the assembly of the plug connector (12) by the module groups (M1, M2, M3, M4, M5, M34).

A further object of the present invention is to provide an apparatus for assembling an electrical plug connector wherein at least one of the following module groups is provided:

a) a first module group (M1), comprising processing modules for aligning, orienting, measuring and/or marking the cable (1a, 1b); or b) a second module group (M2), comprising processing modules for pre-fitting the electrical cable (1a, 1b) with plug connector components (26, 44, 45, 46, 47, 56) of the plug connector (12); or c) a third module group (M3), comprising processing modules for a d) a fourth module group (M4), comprising processing modules for assembling plug connector components (26, 44, 45, 46, 47, 56) on the electrical cable (1a, 1b); or e) a combined module group (M34), comprising processing modules for stripping and processing cable components of the electrical cable (1a, 1b) and for assembling plug connector components (26, 44, 45, 46, 47, 56) on the electrical cable (1a, 1b) and optionally for cleaning the cable end (3, 4); or f) a fifth module group (M5), comprising processing modules for inspecting and/or cleaning the cable end (3, 4).

A further object of the present invention is to provide an method for assembling an electrical plug connector (12) on a cable end (3, 4) of an electrical cable (1a, 1b) which has one or more inner conductors (2) comprising the steps: providing at least two processing modules (18, 19, 29, 35, 60, 59, 69, 93, 103, 109, 117, 134, 135, 137, 138, 139, 140, 141, 142, 143, 144, 145, 146, 147) of at least one common module group (M1, M2, M3, M4, M5, M34), the common module group having a processing station (B); providing a feed device (54) that feeds the cable end (3, 4) along a feed direction (X) to the processing station (B) in the common module group (M1, M2, M3, M4, M5, M34); and wherein providing a module transport device (134) of the module group (M1, M2, M3, M4, M5, M34) that feeds respective processing modules (18, 19, 29, 35, 50, 59, 69, 93, 103, 109, 117, 134, 135, 137, 138, 139, 140, 141, 142, 143, 144, 145, 146, 147) for processing the cable end (3, 4) to the processing station (B); and wherein the cable end (3, 4) is removed from the common module group (M1, M2, M3, M4, M5, M34) counter to the feed direction (X) after the processing.

A further object of the present invention is to provide an apparatus for assembling an electrical plug connector (12) on a cable end (3, 4) of an electrical cable (1a, 1b) which has one or more inner conductors (2), the apparatus comprising: a module group (M1, M2, M3, M4, M5, M34) with at least two processing modules (18, 19, 29, 35, 50, 59, 69, 93, 103, 109, 117, 134, 135, 137, 138, 139, 140, 141, 142, 143, 144, 145, 146, 147) for processing the electrical cable (1a, 1b); a feed device (54) for feeding the cable end (3, 4) along a feed direction (X) to a processing station (B) in the module group (M1, M2, M3, M4, M5, M34); and wherein the module group (M1, M2, M3, M4, M5, M34) has a module transport device (134) for feeding respective processing modules (18, 19, 29, 35, 50, 59, 69, 93, 103, 109, 117, 134, 135, 137, 138, 139, 140, 141, 142, 143, 144, 145, 146, 147) of the module group (M1, M2, M3, M4, M5, M34) to the processing station (B); and wherein the feed device (54) is configured to remove the cable end (3, 4) from the module group (M1, M2, M3, M4, M5, M34) counter to the feed direction (X) after the processing; and wherein the module transport device (134) is designed to feed the processing modules (18, 19, 29, 35, 50, 59, 69, 93, 103, 109, 117, 134, 135, 137, 138, 139, 140, 141, 142, 143, 144, 145, 146, 147) of the module group (M1, M2, M3, M4, M5, M34) along a module transport direction (M) to the processing station (B); and wherein the feed direction (X) deviates from the transport direction (T); and wherein the module transport device (134) is designed to feed, in each case, only a single one of the processing modules (18, 19, 29, 35, 50, 59, 69, 93, 103, 109, 117, 134, 135, 137, 138, 139, 140, 141, 142, 143, 144, 145, 146, 147) of the module group (M1, M2, M3, M4, M5, M34) to the processing station (B); and wherein at least one of the processing modules (18, 19, 29, 35, 50, 59, 69, 93, 103, 109, 117, 134, 135, 137, 138, 139, 140, 141, 142, 143, 144, 145, 146, 147) of the module group (M1, M2, M3, M4, M5, M34) has a processing tool that can be fed to the cable end (3, 4) when the processing module (18, 19, 29, 35, 50, 59, 69, 93, 103, 109, 117, 134, 135, 137, 138, 139, 140, 141, 142, 143, 144, 145, 146, 147) and the cable end (3, 4) are situated at the processing station (B).

A further object of the present invention is to provide an apparatus for assembling an electrical plug connector wherein the feed direction (X) runs orthogonally with respect to the module transport direction (M).

A further object of the present invention is to provide an apparatus for assembling an electrical plug connector wherein the feed direction (X) runs orthogonally with respect to the transport direction (T).

In compliance with the statute, the present invention has been described in language more or less specific, as to structural and methodical features. It is to be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalents.

The invention claimed is:

1. An apparatus for assembling an electrical plug connector on a cable end of an electrical cable that has one or more inner conductors, the apparatus for assembling an electrical plug connector on a cable end of an electrical cable comprising:
   a feed device for feeding the cable end of the electrical cable along a feed direction (X) to a processing station (B); and
   a module group that comprises the processing station (B), a transport device for moving processing modules along a module transport direction (M) to and from the processing station (B), and at least two processing modules for assembling the electrical plug connector on the cable end of the electrical cable; and
   the transport device of the module group feeds the at least two processing modules of the module group along the module transport direction (M) to the processing station (B) for processing the cable end of the electrical cable; and wherein
   the feed device moves the cable end of the electrical cable in a direction counter to the feed direction (X) after the processing of the cable end by the at least two processing modules in the processing station (B); and wherein
   the feed direction (X) is not the same as the module transport direction (M).

2. The apparatus as claimed in claim 1, and further comprising:
   a control unit operatively communicating with at least one of the module groups or one of the processing modules to control and monitor the processing of the electrical cable.

3. The apparatus as claimed in claim 1 and wherein the module transport device is designed to feed, in each case, only a single one of the processing modules of the module group to the processing station (B).

4. The apparatus as claimed in claim 1 and wherein the module transport device is designed to move all processing modules of the module group simultaneously in a coupled movement.

5. The apparatus as claimed in claim 1 and wherein at least one of the processing modules of the module group has a processing tool that can be fed to the cable end when the processing module and the cable end are situated at the processing station (B).

6. The apparatus as claimed in claim 1 and wherein the module group has at least one storage location (L) to store at least one of the processing modules of the module group.

7. The apparatus as claimed in claim 6 and wherein a number of storage locations (L) of the module group corresponds to twice the number of processing modules of the module group minus one storage location (L).

8. The apparatus as claimed in claim 1 and wherein at least one single processing module is provided that is not part of a module group of processing modules.

9. The apparatus as claimed in claim 1 and further comprising:
   a common transport device for transporting the electrical cable along a transport direction (T) between multiple module groups or between at least one module group.

10. The apparatus as claimed in claim 9 and wherein the feed direction (X) deviates from the transport direction (T).

11. The apparatus as claimed in claim 9 and wherein the module transport direction (M) runs parallel to the transport direction (T).

12. The apparatus as claimed in claim 9 and wherein-the common transport device has a workpiece carrier system with at least one workpiece carrier for the electrical cable to transport the electrical cable along the transport direction (T).

13. The apparatus as claimed in claim 9 and wherein-the common transport device has a gripper device with at least one gripper to transport the electrical cable along the transport direction (T).

14. The apparatus as claimed in claim 9 and wherein the feed direction (X) runs orthogonally with respect to the transport direction (T).

15. The apparatus as claimed in claim 1 and wherein the at least two processing modules and/or the module groups are clocked in a synchronized manner.

16. The apparatus as claimed in claim 1 and further comprising:
   a control device to control and/or monitor the assembly of the plug connector by the module groups.

17. The apparatus as claimed in claim 1 and wherein at least one of the following module groups is provided:
   a) a first module group (M1), comprising processing modules for aligning, orienting, measuring or marking the cable; or
   b) a second module group (M2), comprising processing modules for pre-fitting the electrical cable with plug connector components of the plug connector; or
   c) a third module group (M3), comprising processing modules for stripping and processing cable components of the cable; or
   d) a fourth module group (M4), comprising processing modules for assembling plug connector components on the electrical cable; or
   e) a combined module group (M34), comprising processing modules for stripping and processing cable components of the electrical cable and for assembling plug connector components on the electrical cable and optionally for cleaning the cable end; or
   f) a fifth module group (M5), comprising processing modules for inspecting or cleaning the cable end.

18. The apparatus as claimed in claim 1 and wherein the feed direction (X) runs orthogonally with respect to the module transport direction (M).

19. A method for assembling an electrical plug connector on a cable end of an electrical cable which has one or more inner conductors, the method comprising the steps:
   providing a feed device for feeding the cable end of the electrical cable along a feed direction (X) to a processing station (B); and
   providing a common module group that comprises the processing station (B), a transport device for moving processing modules along a module transport direction (M) to and from the processing station (B), and at least two processing modules for assembling the electrical plug connector on the cable end of the electrical cable; and wherein
   the transport device of the common module group feeds the at least two processing modules of the common module group along the module transport direction (M) to the processing station (B) for processing the cable end of the electrical cable; and wherein
   the feed device removes the cable end of the electrical cable from the processing station in a direction counter to the feed direction (X) after the cable end is processed by the at least two processing modules in the processing station (B); and wherein
   the feed direction (X) is not the same as the module transport direction (M).

\* \* \* \* \*